US010102226B1

(12) United States Patent
Cosic

(10) Patent No.: US 10,102,226 B1
(45) Date of Patent: Oct. 16, 2018

(54) OPTICAL DEVICES AND APPARATUSES FOR CAPTURING, STRUCTURING, AND USING INTERLINKED MULTI-DIRECTIONAL STILL PICTURES AND/OR MULTI-DIRECTIONAL MOTION PICTURES

(71) Applicant: Jasmin Cosic, Miami, FL (US)

(72) Inventor: Jasmin Cosic, Miami, FL (US)

( * ) Notice: Subject to any disclaimer, the term of this patent is extended or adjusted under 35 U.S.C. 154(b) by 358 days.

(21) Appl. No.: 14/732,792

(22) Filed: Jun. 8, 2015

(51) Int. Cl.

| | |
|---|---|
| ***G06F 17/30*** | (2006.01) |
| ***H04N 5/20*** | (2006.01) |
| ***G06F 3/0484*** | (2013.01) |
| ***G06F 3/0482*** | (2013.01) |
| ***H04N 5/232*** | (2006.01) |

(52) U.S. Cl.
CPC ...... *G06F 17/30268* (2013.01); *G06F 3/0482* (2013.01); *G06F 3/04842* (2013.01); *G06F 17/3028* (2013.01); *G06F 17/3087* (2013.01); *G06F 17/30241* (2013.01); *G06F 17/30256* (2013.01); *G06F 17/30265* (2013.01); *H04N 5/23222* (2013.01)

(58) Field of Classification Search
CPC ......... G06F 17/30247; G06F 17/30241; G06F 17/30265; G06F 17/30268; G06F 17/3028; H04N 5/23222
See application file for complete search history.

(56) References Cited

U.S. PATENT DOCUMENTS

| | | | |
|---|---|---|---|
| 4,988,981 | A | 1/1991 | Zimmerman |
| 5,491,743 | A | 2/1996 | Shiio et al. |
| 5,659,691 | A | 8/1997 | Durward et al. |
| 5,680,558 | A | 10/1997 | Hatanaka et al. |
| 5,704,837 | A | 1/1998 | Iwasaki et al. |
| 5,710,897 | A | 1/1998 | Schneider |
| 5,781,730 | A | 7/1998 | Reimer et al. |
| 5,808,613 | A | 9/1998 | Marrin et al. |
| 5,861,881 | A | 1/1999 | Freeman et al. |
| 5,907,178 | A | 5/1999 | Baker et al. |
| 6,043,805 | A | 3/2000 | Hsieh |
| 6,057,856 | A | 5/2000 | Miyashita et al. |
| 6,304,714 | B1 | 10/2001 | Krause et al. |
| 6,336,210 | B1 | 1/2002 | Taima et al. |
| 6,600,168 | B1 | 7/2003 | Geng |
| 6,727,887 | B1 | 4/2004 | Levine et al. |
| 6,954,906 | B1 | 10/2005 | Kamachi et al. |
| 7,113,946 | B2 | 9/2006 | Cosic |
| 7,117,225 | B2 | 10/2006 | Cosic |
| 7,151,564 | B2 | 12/2006 | Kubo |
| 7,174,033 | B2 | 2/2007 | Yukhin et al. |
| 7,639,878 | B2 | 12/2009 | Ibrahim et al. |

(Continued)

OTHER PUBLICATIONS

Anguelov, D., Dulong, C., Filip, D., Frueh, C., Lafon, S., Lyon, R., . . . & Weaver, J. (2010). Google street view: Capturing the world at street level. Computer, 43(6), 32-38.*

(Continued)

*Primary Examiner* — William Speiler

(57) ABSTRACT

The disclosure is generally directed to optical devices and apparatuses for capturing, structuring, and using interlinked multi-directional still pictures and/or multi-directional motion pictures as well as the related systems and methods, and their applications on computing and/or other devices.

20 Claims, 51 Drawing Sheets

(56) References Cited

U.S. PATENT DOCUMENTS

| | | | | | |
|---|---|---|---|---|---|
| 7,692,707 | B2 | 4/2010 | Kondo et al. | | |
| 7,990,422 | B2 | 8/2011 | Ahiska et al. | | |
| 8,264,486 | B2 | 9/2012 | Brown et al. | | |
| 8,295,553 | B2 | 10/2012 | Machida | | |
| 8,300,121 | B2 | 10/2012 | Yahata | | |
| 8,300,977 | B2 | 10/2012 | Morishita | | |
| 8,335,805 | B2 | 12/2012 | Cosic | | |
| 8,417,740 | B2 | 4/2013 | Cosic | | |
| 8,572,035 | B2 | 10/2013 | Cosic | | |
| 8,606,458 | B2 | 12/2013 | Hu | | |
| 8,606,493 | B1 | 12/2013 | Gold et al. | | |
| 8,655,900 | B2 | 2/2014 | Cosic | | |
| 8,660,358 | B1 * | 2/2014 | Bergboer | G06K 9/00677 | 345/629 |
| 8,788,968 | B1 * | 7/2014 | Filip | G06F 3/0481 | 715/764 |
| 8,933,929 | B1 * | 1/2015 | Filip | G06K 9/32 | 345/419 |
| 9,047,324 | B2 | 6/2015 | Cosic | | |
| 2002/0036649 | A1 | 3/2002 | Kim et al. | | |
| 2002/0124259 | A1 | 9/2002 | Chang et al. | | |
| 2003/0065662 | A1 | 4/2003 | Cosic | | |
| 2003/0078938 | A1 | 4/2003 | Noble | | |
| 2003/0107585 | A1 | 6/2003 | Samuelson | | |
| 2003/0122949 | A1 | 7/2003 | Kanematsu et al. | | |
| 2003/0133044 | A1 | 7/2003 | Akiyama et al. | | |
| 2004/0194017 | A1 | 9/2004 | Cosic | | |
| 2005/0149517 | A1 | 7/2005 | Cosic | | |
| 2005/0149542 | A1 | 7/2005 | Cosic | | |
| 2005/0289105 | A1 | 12/2005 | Cosic | | |
| 2006/0078321 | A1 | 4/2006 | Osawa et al. | | |
| 2006/0271287 | A1 | 11/2006 | Gold et al. | | |
| 2007/0025614 | A1 | 2/2007 | Qian | | |
| 2007/0154070 | A1 | 7/2007 | Kondo | | |
| 2007/0211022 | A1 | 9/2007 | Boillot | | |
| 2008/0129580 | A1 | 6/2008 | McRae | | |
| 2008/0187688 | A1 | 8/2008 | Gunther | | |
| 2009/0067727 | A1 * | 3/2009 | Hirohata | G06K 9/4638 | 382/201 |
| 2010/0023541 | A1 | 1/2010 | Cosic | | |
| 2010/0082536 | A1 | 4/2010 | Cosic | | |
| 2010/0231687 | A1 | 9/2010 | Amory et al. | | |
| 2010/0262924 | A1 | 10/2010 | Kalu | | |
| 2011/0112665 | A1 | 5/2011 | Roberts et al. | | |
| 2011/0141141 | A1 * | 6/2011 | Kankainen | G01C 21/3647 | 345/632 |
| 2011/0161001 | A1 | 6/2011 | Fink | | |
| 2011/0286720 | A1 | 11/2011 | Obana et al. | | |
| 2012/0144408 | A1 | 6/2012 | Kim et al. | | |
| 2012/0257084 | A1 * | 10/2012 | Kiyoshige | H04N 5/23222 | 348/231.5 |
| 2012/0299920 | A1 | 11/2012 | Coombe et al. | | |
| 2012/0306913 | A1 | 12/2012 | Fialho et al. | | |
| 2013/0218932 | A1 | 8/2013 | Cosic | | |
| 2013/0226974 | A1 | 8/2013 | Cosic | | |
| 2013/0339848 | A1 | 12/2013 | Patil et al. | | |
| 2014/0232819 | A1 | 8/2014 | Armstrong | | |
| 2015/0138314 | A1 | 5/2015 | Vincent | | |
| 2015/0153933 | A1 * | 6/2015 | Filip | G06F 17/30265 | 715/838 |
| 2016/0005229 | A1 * | 1/2016 | Lee | G06F 3/0488 | 345/419 |
| 2017/0221244 | A1 * | 8/2017 | Hiraga | G06T 11/60 | |

OTHER PUBLICATIONS

Filip et al., Navigate Your Way Through User Photos in Street View, Feb. 26, 2010, accessed Aug. 1, 2017 at https://maps.googleblog.com/2010/02/navigate-your-way-through-user-photos.html.*

Stack Overflow, How can I quantify difference between two images?, various dates, accessed Aug. 2, 2017 at https://stackoverflow.com/questions/189943/how-can-i-quantify-difference-between-two-images.*

Schonfeld, If You Could See Google Street View in Video, It Would Look like YellowBird, accessed Feb. 14, 2018 at https://techcrunch.com/2009/08/03/if-you-could-see-google-street-view-in-video-it-would-look-like-yellowbird/ (Year: 2009).*

Apple Final Cut Pro, retrieved from <URL: http://www.apple.com/final-cut-pro/specs/> on Dec. 16, 2013, 8 pages.

Adobe Premiere Pro, retrieved from <URL: http://www.adobe.com/products/premiere/features.html> on Dec. 16, 2013, 4 pages.

Sony Vegas Pro, retrieved from <URL: http://www.sonycreativesoftware.com/vegaspro> on Dec. 16, 2013, 9 pages.

Avid Media Composer, retrieved from <URL: http://www.avid.com/US/products/media-composer#features> on Dec. 16, 2013, 9 pages.

Magix Video Pro, retrieved from <URL: http://pro.magix.com/en/video-pro-x/features.280.html> on Dec. 16, 2013, 3 pages.

Edius Pro, retrieved from <URL: http://www.grassvalley.com/products/edius_pro_7> on Dec. 16, 2013, 3 pages.

Roxio Creator NXT, retrieved from <URL: http://www.roxio.com/enu/products/creator/pro/video-movies.html> on Dec. 16, 2013, 3 pages.

Pinnacle Studio, retrieved from <URL: http://www.pinnaclesys.com/PublicSite/us/Products/studio/ultimate/> on Dec. 16, 2013, 3 pages.

TurboCAD Pro, retrieved from <URL: http://www.turbocad.com/TurboCAD/TurboCADWindows/TurboCADPro20/KeyFeatures/tabid/2351/Default.aspx> on Dec. 16, 2013, 7 pages.

SolidWorks Premium, retrieved from <URL: http://www.solidworks.com/sw/products/3d-cad/capabilities.htm> on Dec. 16, 2013, 3 page.

AutoCAD, retrieved from <URL: http://www.autodesk.com/products/autodesk-autocad/features/all/gallery-view> on Dec. 16, 2013, 4 pages.

Shark FX, retrieved from <URL: http://www.punchcad.com/p-2-shark-fx-v7.aspx> on Dec. 16, 2013, 7 pages.

DesignCAD 3D Max, retrieved from <URL: http://www.imsidesign.com/Products/DesignCAD/DesignCAD3DMax23/KeyFeatures/tabid/2483/Default.aspx> on Dec. 16, 2013, 5 pages.

Alibre Design Pro, retrieved from <URL: http://www.alibre.com/products/mainpage.asp> on Dec. 16, 2013, 4 pages.

ZWCAD+, retrieved from <URL: http://www.zwsoft.com/zwcad/zwcad_features/> on Dec. 16, 2013, 9 pages.

Waze, retrieved from <URL: http://www.waze.com> on Jun. 22, 2015, 4 pages.

Adobe Photoshop, retrieved from <URL: http://www.adobe.com/products/photoshop.html> on Jun. 22, 2015, 6 pages.

paint.net, retrieved from <URL: http://www.getpaint.net/index.html> on Jun. 22, 2015, 2 pages.

IOS Maps, retrieved from <URL: http://www.apple.com/ios/maps> on Jun. 22, 2015, 5 pages.

Acorn, retrieved from <URL: http://www.flyingmeat.com/acorn> on Jun. 22, 2015, 3 pages.

Mapquest, retrieved from <URL: http://www.mapquest.com> on Jun. 22, 2015, 1 pages.

Google Maps, retrieved from <URL: http://www.google.com/maps/about> on Jun. 22, 2015, 16 pages.

GIMP, retrieved from <URL: http://www.gimp.org> on Jun. 22, 2015, 6 pages.

Bing Maps, retrieved from <URL: http://www.bing.com/maps> on Jun. 22, 2015, 1 pages.

PaintShop Pro, retrieved from <URL: http://www.paintshoppro.com/en/products/paintshop-pro> on Jun. 22, 2015, 2 pages.

Sygic, retrieved from <URL: http://www.sygic.com/company/about> on Jun. 22, 2015, 3 pages.

Anguelov, D., Dulong, C., Filip, D., Frueh, C., Lafon, S., Lyon, R., . . . & Weaver, J. (2010). Google street view: Capturing the world at street level. Computer, 43(6), 32-38, 7 pages.

Filip et al., Navigate Your Way Through User Photos in Street View, Feb. 26, 2010, accessed Aug. 1, 2017 at https://maps.googleblog.com/201 0/02/navigate-your-way-through-user-photos.html, 5 pages.

Stack Overflow, How can I quantify difference between two images?, various dates, accessed Aug. 2, 2017 at https://stackoverflow.com/questions/189943/how-can-i-quantify-difference-between-two-images, 8 pages.

* cited by examiner

STEP2: USER MAKES A STEP FORWARD TOWARD THE BUILDING

STEP1: USER CLICKS FORWARD ARROW

STEP2: USER MAKES A STEP FORWARD TOWARD ANOTHER USER'S AVATAR

STEP1: USER CLICKS FORWARD ARROW

Step 1: incrementally downsize comparative picture

Step 2: compare the incrementally downsized comparative picture with subsets of a reference picture starting at pixel [1,1]

OPTICAL DEVICES AND APPARATUSES FOR CAPTURING, STRUCTURING, AND USING INTERLINKED MULTI-DIRECTIONAL STILL PICTURES AND/OR MULTI-DIRECTIONAL MOTION PICTURES

FIELD

The disclosure generally relates to digital imaging. The disclosure includes optical devices and apparatuses for capturing, structuring, and using interlinked multi-directional still pictures and/or multi-directional motion pictures as well as the related systems and methods.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

A still picture generally represents a photographer's choice of a fixed view of an object. Still pictures do not enable an intuitive portrayal of most objects nor an interactive way in which a viewer may want to experience an object on today's mobile, embedded, and other computing devices.

Sequentially changing pictures (i.e. film, etc.) are merely a view of what the director of the film wanted viewers to see. Predefined sequence of changing pictures makes film inflexible from the viewer's standpoint. Usually, the only operations viewers can perform on a film are playing, pausing, forwarding, and rewinding the sequence of pictures. These imaging and viewing options are limiting to the user, failing to provide the user with interactive viewing and flexible operating options.

SUMMARY OF THE INVENTION

In some aspects, the disclosure relates to a system for using multi-directional motion pictures. The system may operate on one or more computing devices. In some embodiments, the system comprises a processor circuit that is coupled to a memory unit. The system may also include an interface, coupled to the processor circuit, for receiving a plurality of multi-directional motion pictures each multi-directional motion picture associated with a different location of a represented object and including one or more differently directed streams of time stamped still pictures from the location and one or more links to other one or more multi-directional motion pictures. The system may further include a display, coupled to the processor circuit, for rendering a first stream of time stamped still pictures depicting a first view from a location associated with a first multi-directional motion picture. The system may further include an input device, coupled to the processor circuit, for receiving a selection of a first link of the first multi-directional motion picture, the first link referring to a second multi-directional motion picture. The processor circuit may be configured to: determine a time stamp of a currently displayed still picture, and cause the display to render a first stream of time stamped still pictures depicting a first view from a location associated with the second multi-directional motion picture starting with a still picture having an incrementally subsequent time stamp from the time stamp of the currently displayed still picture.

In certain embodiments, the determining the time stamp of the currently displayed still picture is performed by a tracker, wherein the tracker is part of, operating on, or coupled to the processor circuit. In further embodiments, the first and the second multi-directional motion pictures are stored in the memory unit, wherein the processor circuit reads the first and the second multi-directional still pictures from the memory unit. In further embodiments, the interface includes at least one of: a direct connection, an operative connection, a wired connection, a wireless connection, a device, a network, a bus, a circuit, a firmware, a driver, or a program.

In some embodiments, the input device is further configured to receive a selection of a second stream of time stamped still pictures of the second multi-directional motion picture, wherein the processor circuit is configured to determine a time stamp of a currently displayed still picture and cause the display to render the second stream of time stamped still pictures depicting a second view from a location associated with the second multi-directional motion picture starting with a still picture having an incrementally subsequent time stamp from the time stamp of the currently displayed still picture. In further embodiments, the input device is further configured to receive a selection of a second link of the first multi-directional motion picture, the second link referring to an outside application or process, wherein the processor circuit is further configured to access the outside application or process.

In certain embodiments, the plurality of multi-directional motion pictures includes a plurality of multi-directional motion pictures residing on a remote computing device. The remote computing device may include at least one of: an application server, a network service server, or a cloud server. In further embodiments, at least one multi-directional motion picture of the plurality of multi-directional motion pictures includes one or more multi-directional motion picture angles, each multi-directional motion picture angle associated with a link to a multi-directional motion picture and indicating an angle to the multi-directional motion picture referred to by the link.

In some embodiments, the processor circuit is further configured to combine the one or more differently directed streams of time stamped still pictures of a multi-directional motion picture into a combined stream of time stamped still pictures and approximate a link to another multi-directional motion picture from an angle of view of the combined stream of time stamped still pictures.

In certain embodiments, at least one multi-directional motion picture of the plurality of multi-directional motion pictures includes one or more multi-directional motion picture distances, each multi-directional motion picture distance associated with a link to a multi-directional motion picture and indicating a distance to the multi-directional motion picture referred to by the link. In further embodiments, at least one multi-directional motion picture of the plurality of multi-directional motion pictures includes an orientation. The orientation may include an absolute or a relative orientation. In further embodiments, at least one multi-directional motion picture of the plurality of multi-directional motion pictures includes a coordinate of the associated location of the represented object. In further embodiments, the represented object includes a physical object or a computer generated object. The computer generated object may include at least one of: an object of a 3D game, an object of a CAD application, or an object of a CAM application, in further embodiments, the location of the represented object includes a location corresponding to a shape of the represented object.

In some embodiments, the one or more links to other one or more multi-directional motion pictures includes a differently directed link such as a forward link, a backward link, a right link, a left link, an up link, a down link, or an angular link. In further embodiments, the one or more differently directed streams of time stamped still pictures includes a differently directed view from the location of the represented object such as a forward view, a backward view, a right view, a left view, an up view, a down view, or an angular view. In further embodiments, at least one still picture of the one or more differently directed streams of time stamped still pictures includes an order indicating its position in a sequence. In further embodiments, at least one still picture of the one or more differently directed streams of time stamped still pictures includes a time stamp indicating its position in a time continuum. In further embodiments, the one or more differently directed streams of time stamped still pictures includes a digital video. The digital video may include at least one of: a MPEG video, an AVI video, a FLV video, a MOV video, a RM video, a SWF video, a WMV video, or a DivX video.

In certain embodiments, the input device includes a user interface for selecting the one or more links to other one or more multi-directional motion pictures. In further embodiments, the input device includes a user interface for selecting the one or more differently directed streams of time stamped still pictures. In further embodiments, the input device includes a microphone for receiving an audio input, and speech recognizer for interpreting the audio input as selection of the one or more links to other one or more multi-directional motion pictures or selection of the one or more differently directed streams of time stamped still pictures. The speech recognizer may include a keyword spotting or a full lexicon speech recognition.

In some embodiments, the processor circuit is further configured to insert a user controllable avatar into the one or more differently directed streams of time stamped still pictures. In further embodiments, the processor circuit is further configured to detect a moving object or an action scene in the one or more differently directed streams of time stamped still pictures. The detecting of a moving object or an action scene in the one or more differently directed streams of time stamped still pictures may include comparing pixels of one still picture with pixels of a reference still picture and determining that a number of different pixels meets a minimum threshold. The reference still picture may include a preceding still picture, a subsequent still picture, or a background still picture. The detecting of a moving object or an action scene in the one or more differently directed streams of time stamped still pictures may include determining a coordinate of the detected moving object or the action scene. The detecting of a moving object or an action scene in the one or more differently directed streams of time stamped still pictures may include associating the detected moving object or the action scene with at least one multi-directional motion picture of the plurality of multi-directional motion pictures.

In certain embodiments, the interface is further configured to receive an automatic pattern of movement including a sequence of multi-directional motion pictures. The processor circuit may be further configured to cause the display to render at least one stream of time stamped still pictures of each multi-directional motion picture in the sequence, each stream of time stamped still pictures rendered starting with a still picture having an incrementally subsequent time stamp from the time stamp of a currently rendered still picture. At least one multi-directional motion picture in the sequence may include a time period for controlling a length of stay on the multi-directional motion picture. In further embodiments, the interface is further configured to receive a map of locations of the represented object, each location of the map selectable by a user and associated with a multi-directional motion picture of the plurality of multi-directional motion pictures.

In some embodiments, The system further comprises: at least one of: a maze-like or sequence-like data structure for organizing the plurality of multi-directional motion pictures.

In certain embodiments, at least one multi-directional motion picture of the plurality of multi-directional motion pictures includes an interpretive information on a content of the one or more differently directed streams of time stamped still pictures of the multi-directional motion picture. The content of the one or more differently directed streams of time stamped still pictures of the multi-directional motion picture may include an object, a person, or a place depicted in the one or more differently directed streams of time stamped still pictures of the multi-directional motion picture. In further embodiments, the processor circuit is further configured to cause the display to render an interpretive information on a content of the first stream of time stamped still pictures of the first multi-directional motion picture. In further embodiments, the input device is further configured to receive a selection of a third link of the first multi-directional motion picture, the third link comprising an interpretive information on a content of the one or more differently directed streams of time stamped still pictures of the first multi-directional motion picture, wherein the processor circuit is further configured to access the interpretive information. The interpretive information may include a reference to at least one of: a content, a resource, a system, an application, or a process comprising information on an object, a person, or a place depicted in the one or more differently directed streams of time stamped still pictures of the first multi-directional motion picture. In further embodiments, the input device is further configured to receive a selection of a fourth link of the first multi-directional motion picture, the fourth link referring to an object whose location corresponds or is proximal to the first multi-directional motion picture, wherein the processor circuit is further configured to access the object.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional motion pictures each multi-directional motion picture associated with a different location of a represented object and including one or more differently directed streams of time stamped still pictures from the location and one or more links to other one or more multi-directional motion pictures. The operations may also include rendering a first stream of time stamped still pictures depicting a first view from a location associated with a first multi-directional motion picture. The operations may further include receiving a selection of a second stream of time stamped still pictures of the first multi-directional motion picture. The operations may further include determining a time stamp of a currently displayed still picture. The operations may further include rendering the second stream of time stamped still pictures depicting a second view from the location associated with the first multi-directional motion picture starting with a still picture having an incrementally subsequent time stamp from the time stamp of the currently displayed still picture.

In certain aspects, the disclosure relates to a method comprising: receiving a plurality of multi-directional motion pictures each multi-directional motion picture associated with a different location of a represented object and including one or more differently directed streams of time stamped still pictures from the location and one or more links to other one or more multi-directional motion pictures. The method may also include rendering a first stream of time stamped still pictures depicting a first view from a location associated with a first multi-directional motion picture. The method may further include receiving a selection of a second stream of time stamped still pictures of the first multi-directional motion picture. The method may further include determining a time stamp of a currently displayed still picture. The method may further include rendering the second stream of time stamped still pictures depicting a second view from the location associated with the first multi-directional motion picture starting with a still picture having an incrementally subsequent time stamp from the time stamp of the currently displayed still picture.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In some embodiments, the non-transitory computer storage medium and/or the method further comprise: receiving a selection of a first link of the first multi-directional motion picture, the first link referring to a second multi-directional motion picture; determining a time stamp of a currently displayed still picture; and rendering a first stream of time stamped still pictures depicting a first view from a location associated with the second multi-directional motion picture starting with a still picture having an incrementally subsequent time stamp from the time stamp of the currently displayed still picture.

In certain embodiments, the non-transitory computer storage medium and/or the method further comprise: receiving a selection of a second link of the first multi-directional motion picture, the second link referring to an outside application or process; and accessing the outside application or process.

In some embodiments, the plurality of multi-directional motion pictures includes a plurality of multi-directional motion pictures residing on a remote computing device. The remote computing device may include at least one of: an application server, a network service server, or a cloud server. In further embodiments, at least one multi-directional motion picture of the plurality of multi-directional motion pictures includes one or more multi-directional motion picture angles, each multi-directional motion picture angle associated with a link to a multi-directional motion picture and indicating an angle to the multi-directional motion picture referred to by the link.

In certain embodiments, the non-transitory computer storage medium and/or the method further comprise: combining the one or more differently directed streams of time stamped still pictures of a multi-directional motion picture into a combined stream of time stamped still pictures; and approximating a link to another multi-directional motion picture from an angle of view of the combined stream of time stamped still pictures.

In some embodiments, at least one multi-directional motion picture of the plurality of multi-directional motion pictures includes one or more multi-directional motion picture distances, each multi-directional motion picture distance associated with a link to a multi-directional motion picture and indicating a distance to the multi-directional motion picture referred to by the link. In further embodiments, at least one multi-directional motion picture of the plurality of multi-directional motion pictures includes an orientation. The orientation may include an absolute or a relative orientation.

In certain embodiments, at least one multi-directional motion picture of the plurality of multi-directional motion pictures includes a coordinate of the associated location of the represented object. In further embodiments, the represented object includes a physical object or a computer generated object. The computer generated object may include at least one of: an object of a 3D game, an object of a CAD application, or an object of a CAM application. In further embodiments, the location of the represented object includes a location corresponding to a shape of the represented object. In further embodiments, the one or more links to other one or more multi-directional motion pictures includes a differently directed link such as a forward link, a backward link, a right link, a left link, an up link, a down link, or an angular link. In further embodiments, the one or more differently directed streams of time stamped still pictures includes a differently directed view from the location of the represented object such as a forward view, a backward view, a right view, a left view, an up view, a down view, or an angular view.

In some embodiments, at least one still picture of the one or more differently directed streams of time stamped still pictures includes an order indicating its position in a sequence. In further embodiments, at least one still picture of the one or more differently directed streams of time stamped still pictures includes a time stamp indicating its position in a time continuum. In further embodiments, the one or more differently directed streams of time stamped still pictures includes a digital video. The digital video may include at least one of: a MPEG video, an AVI video, a FLV video, a MOV video, a RM video, a SWF video, a WMV video, or a DivX video.

In certain embodiments, the non-transitory computer storage medium and/or the method further comprise: generating a user interface for selecting the one or more links to other one or more multi-directional motion pictures. In further embodiments, the non-transitory computer storage medium and/or the method further comprise: generating a user interface for selecting the one or more differently directed streams of time stamped still pictures. In further embodiments, the non-transitory computer storage medium and/or the method further comprise: receiving an audio input via a microphone; and interpreting, using a speech recognizer, the audio input as a selection of the one or more links to other one or more multi-directional motion pictures or a selection of the one or more differently directed streams of time stamped still pictures. The speech recognizer may include a keyword spotting or a full lexicon speech recognition.

In some embodiments, the non-transitory computer storage medium and/or the method further comprise: inserting a user controllable avatar into the one or more differently directed streams of time stamped still pictures. In further embodiments, the non-transitory computer storage medium and/or the method further comprise: detecting a moving object or an action scene in the one or more differently directed streams of time stamped still pictures. The detecting of a moving object or an action scene in the one or more differently directed streams of time stamped still pictures may include comparing pixels of one still picture with pixels of a reference still picture and determining that a number of different pixels meets a minimum threshold. The reference still picture may include a preceding still picture, a subsequent still picture, or a background still picture. The detecting of a moving object or an action scene in the one or more differently directed streams of time stamped still pictures may include determining a coordinate of the detected moving object or the action scene. The detecting of a moving object or an action scene in the one or more differently directed streams of time stamped still pictures may include associating the detected moving object or the action scene with at least one multi-directional motion picture of the plurality of multi-directional motion pictures.

In certain embodiments, the non-transitory computer storage medium and/or the method further comprise: receiving an automatic pattern of movement including a sequence of multi-directional motion pictures. In further embodiments, the non-transitory computer storage medium and/or the method further comprise: rendering at least one stream of time stamped still pictures of each multi-directional motion picture in the sequence, each stream of time stamped still pictures rendered starting with a still picture having an incrementally subsequent time stamp from the time stamp of a currently rendered still picture. At least one multi-directional motion picture in the sequence may include a time period for controlling a length of stay on the multi-directional motion picture.

In some embodiments, the non-transitory computer storage medium and/or the method further comprise: receiving a map of locations of the represented object, each location of the map selectable by a user and associated with a multi-directional motion picture of the plurality of multi-directional motion pictures. In further embodiments, the non-transitory computer storage medium and/or the method further comprise: utilizing at least one of: a maze-like or sequence-like data structure for organizing the plurality of multi-directional motion pictures.

In certain embodiments, at least one multi-directional motion picture of the plurality of multi-directional motion pictures includes an interpretive information on a content of the one or more differently directed streams of time stamped still pictures of the multi-directional motion picture. In further embodiments, the content of the one or more differently directed streams of time stamped still pictures of the multi-directional motion picture includes an object, a person, or a place depicted in the one or more differently directed streams of time stamped still pictures of the multi-directional motion picture.

In certain embodiments, the non-transitory computer storage medium and/or the method further comprise: rendering an interpretive information on a content of the first stream of time stamped still pictures of the first multi-directional motion picture. In some embodiments, the non-transitory computer storage medium and/or the method further comprise: receiving a selection of a third link of the first multi-directional motion picture, the third link comprising an interpretive information on a content of the one or more differently directed streams of time stamped still pictures of the first multi-directional motion picture; and accessing the interpretive information. The interpretive information may include a reference to at least one of: a content, a resource, a system, an application, or a process comprising information on an object, a person, or a place depicted in the one or more differently directed streams of time stamped still pictures of the first multi-directional motion picture. In further embodiments, the non-transitory computer storage medium and/or the method further comprise: receiving a selection of a fourth link of the first multi-directional motion picture, the fourth link referring to an object whose location corresponds or is proximal to the first multi-directional motion picture; and accessing the object.

In some aspects, the disclosure relates to a system for inserting an avatar into streams of time stamped still pictures. The system may operate on one or more computing devices. In some embodiments, the system comprises a processor circuit that is coupled to a memory unit. The system may further include an interface, coupled to the processor circuit, for receiving a plurality of multi-directional motion pictures each multi-directional motion picture associated with a different location of a represented object and including one or more differently directed streams of time stamped still pictures from the location. The processor circuit may be configured to: insert an avatar's picture into a first stream of time stamped still pictures of a first multi-directional motion picture. The processor may be further configured to identify a region of the first stream of time stamped still pictures of the first multi-directional motion picture around a position where the avatar's picture is inserted, incrementally resize the identified region, compare at least one subset of a first stream of time stamped still pictures of a second multi-directional motion picture with the incrementally resized identified region, and determine that a subset of the first stream of time stamped still pictures of the second multi-directional motion picture is sufficiently similar to the incrementally resized identified region to indicate a line of sight. The processor may be further configured to resize the avatar's picture proportional to the incrementally resized identified region to portray the avatar in perspective, and insert the resized avatar's picture into the first stream of time stamped still pictures of the second multi-directional motion picture in a position where the subset sufficiently similar to the incrementally resized identified region is found.

In certain embodiments, the identifying the region of the first stream of time stamped still pictures of the first multi-directional motion picture around the position where the avatar's picture is inserted, the incrementally resizing the identified region, the comparing the at least one subset of the first stream of time stamped still pictures of the second multi-directional motion picture with the incrementally resized identified region, and the determining that a subset of the first stream of time stamped still pictures of the second multi-directional motion picture is sufficiently similar to the incrementally resized identified region to indicate a line of sight is performed by a comparator, wherein the comparator is part of, operating on, or coupled to the processor circuit. In further embodiments, the first and the second multi-directional motion pictures are stored in the memory unit, wherein the processor circuit reads the first and the second multi-directional still pictures from the memory unit.

In some embodiments, the processor circuit is further configured to associate a user's avatar with the first multi-directional motion picture. In further embodiments, the avatar's picture includes at least one of: a still picture, an animated picture, or a video. In further embodiments, the avatar's picture includes a differently directed avatar's picture of a plurality of differently directed avatar's pictures. In further embodiments, the inserting the avatar's picture into the first stream of time stamped still pictures of the first multi-directional motion picture includes inserting or overlaying pixels of the avatar's picture into/onto one or more still pictures of the first stream of time stamped still pictures of the first multi-directional motion picture. In further embodiments, the inserting the avatar's picture into the first stream of time stamped still pictures of the first multi-directional motion picture includes portraying the avatar in a first-person view or a third-person view in the one or more still pictures of the first stream of time stamped still pictures of the first multi-directional motion picture. In further embodiments, the processor circuit is further configured to control at least one of: the avatar's movement, the avatar's appearance, or the avatar's behavior.

In certain embodiments, the region of the first stream of time stamped still pictures of the first multi-directional motion picture includes a region of one or more still pictures of the first stream of time stamped still pictures of the first multi-directional motion picture. In further embodiments, the identifying a region of the first stream of time stamped still pictures of the first multi-directional motion picture around a position where the avatar's picture is inserted includes identifying a region centered relative to the avatar's picture and having a size of at least the size of the avatar's picture. In further embodiments, the incrementally resizing the identified region includes proportionally resizing a region of one or more still pictures of the first stream of time stamped still pictures of the first multi-directional motion picture. In further embodiments, the incrementally resizing the identified region includes resizing a region of one or more still pictures of the first stream of time stamped still pictures of the first multi-directional motion picture by one pixel in a length or a width keeping an aspect ratio constant. In further embodiments, a subset of the first stream of time stamped still pictures of the second multi-directional motion picture includes a subset of one or more still pictures of the first stream of time stamped still pictures of the second multi-directional motion picture.

In some embodiments, the determining that a subset of the first stream of time stamped still pictures of the second multi-directional motion picture is sufficiently similar to the incrementally resized identified region includes determining a sufficient similarity among all but a threshold number of pixels from the incrementally resized identified region and a subset of one or more still pictures of the first stream of time stamped still pictures of the second multi-directional motion picture. The sufficient similarity among all but a threshold number of pixels from the incrementally resized identified region and the subset of one or more still pictures of the first stream of time stamped still pictures of the second multi-directional motion picture may include determining that a difference between each compared pixel does not exceed a threshold for the highest allowed difference.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional motion pictures each multi-directional motion picture associated with a different location of a represented object and including one or more differently directed streams of time stamped still pictures from the location. The operations may also include inserting an avatar's picture into a first stream of time stamped still pictures of a first multi-directional motion picture, The operations may further include identifying a region of the first stream of time stamped still pictures of the first multi-directional motion picture around a position where the avatar's picture is inserted. The operations may further include incrementally resizing the identified region. The operations may further include comparing at least one subset of a first stream of time stamped still pictures of a second multi-directional motion picture with the incrementally resized identified region. The operations may further include determining that a subset of the first stream of time stamped still pictures of the second multi-directional motion picture is sufficiently similar to the incrementally resized identified region to indicate a line of sight. The operations may further include resizing the avatar's picture proportional to the incrementally resized identified region to portray the avatar in perspective. The operations may further include inserting the resized avatar's picture into the first stream of time stamped still pictures of the second multi-directional motion picture in a position where the subset sufficiently similar to the incrementally resized identified region is found.

In some aspects, the disclosure relates to a method comprising: receiving a plurality of multi-directional motion pictures each multi-directional motion picture associated with a different location of a represented object and including one or more differently directed streams of time stamped still pictures from the location. The method may also include inserting an avatar's picture into a first stream of time stamped still pictures of a first multi-directional motion picture. The method may further include identifying a region of the first stream of time stamped still pictures of the first multi-directional motion picture around a position where the avatar's picture is inserted. The method may also include incrementally resizing the identified region. The method may further include comparing at least one subset of a first stream of time stamped still pictures of a second multi-directional motion picture with the incrementally resized identified region. The method may further include determining that a subset of the first stream of time stamped still pictures of the second multi-directional motion picture is sufficiently similar to the incrementally resized identified region to indicate a line of sight. The method may further include resizing the avatar's picture proportional to the incrementally resized identified region to portray the avatar in perspective. The method may further include inserting the resized avatar's picture into the first stream of time stamped still pictures of the second multi-directional motion picture in a position where the subset sufficiently similar to the incrementally resized identified region is found.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In some embodiments, the non-transitory computer storage medium and/or the method further comprise: associating a user's avatar with the first multi-directional motion picture.

In certain embodiments, the avatar's picture includes at least one of: a still picture, an animated picture, or a video. In further embodiments, the avatar's picture includes a differently directed avatar's picture of a plurality of differently directed avatar's pictures. In further embodiments, the inserting the avatar's picture into the first stream of time stamped still pictures of the first multi-directional motion picture includes inserting or overlaying pixels of the avatar's picture into/onto one or more still pictures of the first stream of time stamped still pictures of the first multi-directional motion picture. In further embodiments, the inserting the avatar's picture into the first stream of time stamped still pictures of the first multi-directional motion picture includes portraying the avatar in a first-person view or a third-person view in the one or more still pictures of the first stream of time stamped still pictures of the first multi-directional motion picture.

In some embodiments, the non-transitory computer storage medium and/or the method further comprise: controlling at least one of: the avatar's movement, the avatar's appearance, or the avatar's behavior.

In certain embodiments, the region of the first stream of time stamped still pictures of the first multi-directional motion picture includes a region of one or more still pictures of the first stream of time stamped still pictures of the first multi-directional motion picture. In further embodiments, the identifying a region of the first stream of time stamped still pictures of the first multi-directional motion picture around a position where the avatar's picture is inserted includes identifying a region centered relative to the avatar's picture and having a size of at least the size of the avatars picture. In further embodiments, the incrementally resizing the identified region includes proportionally resizing a region of one or more still pictures of the first stream of time stamped still pictures of the first multi-directional motion picture. In further embodiments, the incrementally resizing the identified region includes resizing a region of one or more still pictures of the first stream of time stamped still pictures of the first multi-directional motion picture by one pixel in a length or a width keeping an aspect ratio constant. In further embodiments, a subset of the first stream of time stamped still pictures of the second multi-directional motion picture includes a subset of one or more still pictures of the first stream of time stamped still pictures of the second multi-directional motion picture. In further embodiments, the determining that a subset of the first stream of time stamped still pictures of the second multi-directional motion picture is sufficiently similar to the incrementally resized identified region includes determining a sufficient similarity among all but a threshold number of pixels from the incrementally resized identified region and a subset of one or more still pictures of the first stream of time stamped still pictures of the second multi-directional motion picture. The sufficient similarity among all but a threshold number of pixels from the incrementally resized identified region and the subset of one or more still pictures of the first stream of time stamped still pictures of the second multi-directional motion picture may include determining that a difference between each compared pixel does not exceed a threshold for the highest allowed difference.

In some aspects, the disclosure relates to a system for generating multi-directional motion pictures. The system may operate on one or more computing devices. In some embodiments, the system comprises a processor circuit that is coupled to a memory unit. The system may further include an interface, coupled to the processor circuit, for receiving one or more streams of time stamped still pictures each stream of time stamped still pictures depicting a differently directed view from a location of plurality locations of a represented object. The processor may be configured to generate a first multi-directional motion picture to include the one or more streams of time stamped still pictures from a first location and generate a second multi-directional motion picture to include the one or more streams of time stamped still pictures from a second location. The processor may be further configured to add a link with the second multi-directional motion picture to the first multi-directional motion picture and add a link with the first multi-directional motion picture to the second multi-directional motion picture, the first location being adjacent to the second location. The processor may be further configured to store the first and the second multi-directional motion pictures into the memory unit.

In certain embodiments, the generating the first multi-directional motion picture to include the one or more streams of time stamped still pictures from the first location and generating the second multi-directional motion picture to include the one or more streams of time stamped still pictures from the second location, and the adding the link with the second multi-directional motion picture to the first multi-directional motion picture and the adding the link with the first multi-directional motion picture to the second multi-directional motion picture is performed by an assembler, wherein the assembler is part of, operating on, or coupled to the processor circuit.

In some embodiments, the system further comprises: an input device, coupled to the processor circuit, for receiving a user's selection to add a link with a third multi-directional motion picture to the first multi-directional motion picture, wherein the processor circuit is further configured to add the link with the third multi-directional motion picture to the first multi-directional motion picture. The adding the link with the third multi-directional motion picture to the first multi-directional motion picture is performed by an assembler, wherein the assembler is part of, operating on, or coupled to the processor circuit.

In some embodiments, the system further comprises: an input device, coupled to the processor circuit, for receiving a user's selection to replace a link of the first multi-directional motion picture, wherein the processor circuit is further configured to replace the link of the first multi-directional motion picture. The replacing the link of the first multi-directional motion picture is performed by an assembler, wherein the assembler is part of, operating on, or coupled to the processor circuit.

In certain embodiments, the system further comprises: one or more differently directed motion picture cameras, coupled to the interface, for simultaneous capturing the one or more streams of time stamped still pictures. The one or more differently directed motion picture cameras are grouped into sets of one or more differently directed motion picture cameras, each set positioned in a different location of the represented object. The one or more differently directed motion picture cameras may include a means to mount the motion picture camera onto an object or a surface, the means comprising at least one of: a clip, a screw, an attachment element, or an adhesive element. The one or more differently directed motion picture cameras may include a means to connect the motion picture camera with the interface, the means comprising at least one of: a cable, a wireless connection, or a network. The one or more differently directed motion picture cameras may include a means to detect a moving object or an action scene, the means comprising at least one of: an infrared sensor, an optical sensor, a radio frequency energy sensor, a sound sensor, a vibration sensor, or a magnetism sensor. The one or more differently directed motion picture cameras may include a means to align the motion picture camera toward the detected moving object or action scene, the means comprising at least one of: a motor or an actuator. The one or more differently directed motion picture cameras may include a means to focus the motion picture camera on the detected moving object or action scene, the means comprising a lens moving mechanism for adjusting a position of the lens of the motion picture camera to achieve focus.

In some embodiments, the system further comprises: a multi-directional motion picture taking device including one or more differently directed motion picture cameras, coupled to the interface, for simultaneous capturing the one or more streams of time stamped still pictures. The one or more differently directed motion picture cameras may include at least one of: a forward directed motion picture camera, a backward directed motion picture camera, a right directed motion picture camera, a left directed motion picture camera, an up directed motion picture camera, a down directed motion picture camera, or an angular directed motion picture camera.

In certain embodiments, the processor circuit is further configured to detect, from a plurality of streams of time stamped still pictures, the one or more streams of time stamped still pictures from the first location and the one or more streams of time stamped still pictures from the second location. In further embodiments, the processor circuit is further configured to detect the link of the first multi-directional motion picture referring to the second multi-directional motion picture and the link of the second multi-directional motion picture referring to the first multi-directional motion picture.

In some embodiments, the system further comprises: an input device, coupled to the processor circuit, for receiving a user's selection of the one or more streams of time stamped still pictures from the first location and the one or more streams of time stamped still pictures from the second location. In further embodiments, the processor circuit is further configured to associate the one or more streams of time stamped still pictures from the first location with the first multi-directional motion picture and associate the one or more streams of time stamped still pictures from the second location with the second multi-directional motion picture.

In certain embodiments, the system further comprises: an input device, coupled to the processor circuit, for receiving a user's selection of the link of the first multi-directional motion picture referring to the second multi-directional motion picture and a link of the second multi-directional motion picture referring to the first multi-directional motion picture.

In some embodiments, the processor circuit is further configured to interpret content of the one or more streams of time stamped still pictures of the first multi-directional motion picture, wherein the processor circuit is further configured to add an interpretive information on the content to the first multi-directional motion picture. The adding the interpretive information on the content to the first multi-directional motion picture is performed by an assembler, wherein the assembler is part of, operating on, or coupled to the processor circuit. In further embodiments, the processor circuit is further configured to interpret content of the one or more streams of time stamped still pictures of the second multi-directional motion picture, wherein the processor circuit is further configured to add an interpretive information on the content to the second multi-directional motion picture. The adding the interpretive information on the content to the second multi-directional motion picture is performed by an assembler, wherein the assembler is part of, operating on, or coupled to the processor circuit.

In some aspects, the disclosure relates to a non-transitory computer storage medium having a computer program stored thereon, the program comprising instructions that when executed by one or more computing devices cause the one or more computing devices to perform operations comprising: receiving one or more streams of time stamped still pictures each stream of time stamped still pictures depicting a differently directed view from a location of plurality locations of a represented object. The operations may also include generating a first multi-directional motion picture to include the one or more streams of time stamped still pictures from a first location. The operations may further include generating a second multi-directional motion picture to include the one or more streams of time stamped still pictures from a second location. The operations may further include adding a link with the second multi-directional motion picture to the first multi-directional motion picture, and adding a link with the first multi-directional motion picture to the second multi-directional motion picture, the first location being adjacent to the second location. The operations may further include storing the first and the second multi-directional motion pictures in a memory unit.

In certain aspects, the disclosure relates to a method comprising: receiving one or more streams of time stamped still pictures each stream of time stamped still pictures depicting a differently directed view from a location of plurality locations of a represented object. The method may also include generating a first multi-directional motion picture to include the one or more streams of time stamped still pictures from a first location. The method may further include generating a second multi-directional motion picture to include the one or more streams of time stamped still pictures from a second location. The method may further include adding a link with the second multi-directional motion picture to the first multi-directional motion picture, and adding a link with the first multi-directional motion picture to the second multi-directional motion picture, the first location being adjacent to the second location. The method may further include storing the first and the second multi-directional motion pictures in a memory unit.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments:

In some embodiments, the non-transitory computer storage medium and/or the method further comprise: receiving a user's selection to add a link with a third multi-directional motion picture to the first multi-directional motion picture; and adding the link with the third multi-directional motion picture to the first multi-directional motion picture. In further embodiments, the non-transitory computer storage medium and/or the method further comprise: receiving a user's selection to replace a link of the first multi-directional motion picture; and replacing the link of the first multi-directional motion picture.

In certain embodiments, the non-transitory computer storage medium and/or the method further comprise: utilizing one or more differently directed motion picture cameras, coupled to the interface, for simultaneous capturing the one or more streams of time stamped still pictures. The one or more differently directed motion picture cameras are grouped into sets of one or more differently directed motion picture cameras, each set positioned in a different location of the represented object. The one or more differently directed motion picture cameras may include a means to mount the motion picture camera onto an object or a surface, the means comprising at least one of: a clip, a screw, an attachment element, or an adhesive element. The one or more differently directed motion picture cameras may include a means to transmit a stream of time stamped still pictures, the means comprising at least one of: a cable, a wireless connection, or a network. The one or more differently directed motion picture cameras may include a means to detect a moving object or an action scene, the means comprising at least one of: an infrared sensor, an optical sensor, a radio frequency energy sensor, a sound sensor, a vibration sensor, or a magnetism sensor. The one or more differently directed motion picture cameras may include a means to align the motion picture camera toward the detected moving object or action scene, the means comprising at least one of: a motor or an actuator. The one or more differently directed motion picture cameras my include a means to focus the motion picture camera on the detected moving object or action scene, the means comprising a lens moving mechanism for adjusting a position of the lens of the motion picture camera to achieve focus.

In some embodiments, the non-transitory computer storage medium and/or the method further comprise: utilizing a multi-directional motion picture taking device including one or more differently directed motion picture cameras, coupled to the interface, for simultaneous capturing the one or more streams of time stamped still pictures. The one or more differently directed motion picture cameras may include at least one of: a forward directed motion picture camera, a backward directed motion picture camera, a right directed motion picture camera, a left directed motion picture camera, an up directed motion picture camera, a down directed motion picture camera, or an angular directed motion picture camera.

In certain embodiments, the non-transitory computer storage medium and/or the method further comprise: detecting, from a plurality of streams of time stamped still pictures, the one or more streams of time stamped still pictures from the first location and the one or more streams of time stamped still pictures from the second location. In further embodiments, the non-transitory computer storage medium and/or the method further comprise: detecting the link of the first multi-directional motion picture referring to the second multi-directional motion picture and the link of the second multi-directional motion picture referring to the first multi-directional motion picture. In further embodiments, the non-transitory computer storage medium and/or the method further comprise: receiving a user's selections of the one or more streams of time stamped still pictures from the first location and the one or more streams of time stamped still pictures from the second location. In further embodiments, the non-transitory computer storage medium and/or the method further comprise: associating the one or more streams of time stamped still pictures from the first location with the first multi-directional motion picture; and associating the one or more streams of time stamped still pictures from the second location with the second multi-directional motion picture. In further embodiments, the non-transitory computer storage medium and/or the method further comprise: receiving a user's selections of the link of the first multi-directional motion picture referring to the second multi-directional motion picture and the link of the second multi-directional motion picture referring to the first multi-directional motion picture.

In some embodiments, the non-transitory computer storage medium and/or the method further comprise: interpreting content of the one or more streams of time stamped still pictures of the first multi-directional motion picture; and adding an interpretive information on the content to the first multi-directional motion picture. In further embodiments, the non-transitory computer storage medium and/or the method further comprise: interpreting content of the one or more streams of time stamped still pictures of the second multi-directional motion picture; and adding an interpretive information on the content to the second multi-directional motion picture.

In some aspects, the disclosure relates to a system for detecting streams of time stamped still pictures. The system may operate on one or more computing devices. In some embodiments, the system comprises a processor circuit that is coupled to a memory unit. The system may further include an interface, coupled to the processor circuit, for receiving a plurality of streams of time stamped still pictures. The processor may be configured to compare at least one subset of a first stream of time stamped still pictures and at least one subset of a second stream of time stamped still pictures, the compared subsets being near opposite edges of the first and the second streams of time stamped still pictures. The processor may be further configured to determine that a subset of the first stream of time stamped still pictures is sufficiently similar to a subset of the second stream of time stamped still pictures to indicate an overlapping field of view between the two streams of time stamped still pictures. The processor may be further configured to generate a first multi-directional motion picture to include the first and the second streams of time stamped still pictures, the first and the second streams of time stamped still pictures depicting a first and a second differently directed views from a first location of a represented object.

In some embodiments, the comparing the at least one subset of the first stream of time stamped still pictures and at least one subset of the second stream of time stamped still pictures, and determining that a subset of the first stream of time stamped still pictures is sufficiently similar to a subset of the second stream of time stamped still pictures is performed by a comparator, wherein the comparator is part of, operating on, or coupled to the processor circuit. In further embodiments, the generating the first multi-directional motion picture to include the first and the second streams of time stamped still pictures is performed by an assembler, wherein the assembler is part of, operating on, or coupled to the processor circuit. In further embodiments, the first and the second streams of time stamped still pictures are stored in the memory unit, wherein the processor circuit reads the first and the second streams of time stamped still pictures from the memory unit.

In certain embodiments, compare at least one subset of the first stream of time stamped still pictures and at least one subset of a third stream of time stamped still pictures, the compared subsets being near opposite edges of the first and the third streams of time stamped still pictures, determine that a subset of the first stream of time stamped still pictures is sufficiently similar to a subset of the third stream of time stamped still pictures to indicate an overlapping field of view between the two streams of time stamped still pictures, and add the third stream of time stamped still pictures to the first multi-directional motion picture, the third stream of time stamped still pictures depicting a third differently directed view from the first location of the represented object. The comparing the at least one subset of the first stream of time stamped still pictures and at least one subset of the third stream of time stamped still pictures, and determining that a subset of the first stream of time stamped still pictures is sufficiently similar to a subset of the third stream of time stamped still pictures is performed by a comparator, wherein the comparator is part of, operating on, or coupled to the processor circuit. The adding the third stream of time stamped still pictures to the first multi-directional motion picture is performed by an assembler, wherein the assembler is part of, operating on, or coupled to the processor circuit.

In some embodiments, a subset of the first stream of time stamped still pictures includes a subset of one or more still pictures of the first stream of time stamped still pictures and a subset of the second stream of time stamped still pictures includes a subset of one or more still pictures of the second stream of time stamped still pictures. In further embodiments, the determining that a subset of the first stream of time stamped still pictures is sufficiently similar to a subset of the second stream of time stamped still pictures includes determining a sufficient similarity among all but a threshold number of pixels from a subset of one or more still pictures of the first stream of time stamped still pictures and a subset of one or more still pictures of the second stream of time stamped still pictures. The sufficient similarity among all but a threshold number of pixels from a subset of one or more still pictures of the first stream of time stamped still pictures and a subset of one or more still pictures of the second stream of time stamped still pictures may include determining that a difference between each compared pixel does not exceed a threshold for the highest allowed difference.

In some aspects, the disclosure relates to a non-transitory computer storage medium having a computer program stored thereon, the program comprising instructions that when executed by one or more computing devices cause the one or more computing devices to perform operations comprising: receiving a plurality of streams of time stamped still pictures. The operations may also include comparing at least one subset of a first stream of time stamped still pictures and at least one subset of a second stream of time stamped still pictures, the compared subsets being near opposite edges of the first and the second streams of time stamped still pictures. The operations may further include determining that a subset of the first stream of time stamped still pictures is sufficiently similar to a subset of the second stream of time stamped still pictures to indicate an overlapping field of view between the two streams of time stamped still pictures. The operations may further include generating a first multi-directional motion picture to include the first and the second streams of time stamped still pictures, the first and the second streams of time stamped still pictures depicting a first and a second differently directed views from a first location of a represented object.

In some aspects, the disclosure relates to a method comprising: receiving a plurality of streams of time stamped still pictures. The method may also include comparing at least one subset of a first stream of time stamped still pictures and at least one subset of a second stream of time stamped still pictures, the compared subsets being near opposite edges of the first and the second streams of time stamped still pictures. The method may further include determining that a subset of the first stream of time stamped still pictures is sufficiently similar to a subset of the second stream of time stamped still pictures to indicate an overlapping field of view between the two streams of time stamped still pictures. The method may further include generating a first multi-directional motion picture to include the first and the second streams of time stamped still pictures, the first and the second streams of time stamped still pictures depicting a first and a second differently directed views from a first location of a represented object.

The operations or steps of the non-transitory computer storage medium and/or the method may be performed by any of the elements of the above described system as applicable. The non-transitory computer storage medium and/or the method may include any of the operations, steps; and embodiments of the above described system as applicable as well as the following embodiments.

In certain embodiments, the non-transitory computer storage medium and/or the method further comprise: comparing at least one subset of the first stream of time stamped still pictures and at least one subset of a third stream of time stamped still pictures, the compared subsets being near opposite edges of the first and the third streams of time stamped still pictures; determining that a subset of the first stream of time stamped still pictures is sufficiently similar to a subset of the third stream of time stamped still pictures to indicate an overlapping field of view between the two streams of time stamped still pictures; and adding the third stream of time stamped still pictures to the first multi-directional motion picture, the third stream of time stamped still pictures depicting a third differently directed view from the first location of the represented object.

In some aspects, the disclosure relates to a system for detecting links among multi-directional motion pictures. The system may operate on one or more computing devices. In some embodiments, the system comprises a processor circuit that is coupled to a memory unit. The system may further include an interface, coupled to the processor circuit, for receiving a plurality of multi-directional motion pictures each multi-directional motion picture associated with a different location of a represented object and including one or more differently directed streams of time stamped still pictures from the location. The processor may be configured to incrementally resize a first stream of time stamped still pictures of the first multi-directional motion picture. The processor may be further configured to compare at least one subset of a first stream of time stamped still pictures of a second multi-directional motion picture with at least one subset of the incrementally resized first stream of time stamped still pictures of the first multi-directional motion picture. The processor may be further configured to determine that a subset of the first stream of time stamped still pictures of the second multi-directional motion picture is sufficiently similar to a subset of the incrementally resized first stream of time stamped still pictures of the first multi-directional motion picture to indicate a line of sight. The processor may be further configured to add a link with the second multi-directional motion picture to the first multi-directional motion picture, and add a link with the first multi-directional motion picture to the second multi-directional motion picture.

In certain embodiments, the comparing the at least one subset of the first stream of time stamped still pictures of the second multi-directional motion picture with at least one subset of the incrementally resized first stream of time stamped still pictures of the first multi-directional motion picture, and determining that a subset of the first stream of time stamped still pictures of the second multi-directional motion picture is sufficiently similar to a subset of the incrementally resized first stream of time stamped still pictures of the first multi-directional motion picture to indicate a line of sight is performed by a comparator, wherein the comparator is part of, operating on, or coupled to the processor circuit. In further embodiments, the adding the link with the second multi-directional motion picture to the first multi-directional motion picture; and adding the link with the first multi-directional motion picture to the second multi-directional motion picture is performed by an assembler, wherein the assembler is part of, operating on, or coupled to the processor circuit. In further embodiments, the first and the second multi-directional motion pictures are stored in the memory unit, wherein the processor circuit reads the first and the second multi-directional motion pictures from the memory unit.

In some embodiments, the incrementally resizing the first stream of time stamped still pictures of the first multi-directional motion picture includes proportionally resizing one or more still pictures of the first stream of time stamped still pictures of the first multi-directional motion picture to a next smaller size. In further embodiments, the incrementally resizing the first stream of time stamped still pictures of the first multi-directional motion picture includes resizing one or more still pictures of the first stream of time stamped still pictures of the first multi-directional motion picture by one pixel in a length or a width keeping an aspect ratio constant. In further embodiments, a subset of the first stream of time stamped still pictures of the second multi-directional motion picture includes a subset of one or more still pictures of the first stream of time stamped still pictures of the second multi-directional motion picture. In further embodiments, a subset of the incrementally resized first stream of time stamped still pictures of the first multi-directional motion picture includes a subset of one or more still pictures of the incrementally resized first stream of time stamped still pictures of the first multi-directional motion picture. In further embodiments, the determining that a subset of the first stream of time stamped still pictures of the second multi-directional motion picture is sufficiently similar to a subset of the incrementally resized first stream of time stamped still pictures of the first multi-directional motion picture includes determining a sufficient similarity among all but a threshold number of pixels from the subset of one or more still pictures of the incrementally resized first stream of time stamped still pictures of the first multi-directional motion picture and the subset of one or more still pictures of the first stream of time stamped still pictures of the second multi-directional motion picture. The sufficient similarity among all but a threshold number of pixels from the subset of one or more still pictures of the incrementally resized first stream of time stamped still pictures of the first multi-directional motion picture and the subset of one or more still pictures of the first stream of time stamped still pictures of the second multi-directional motion picture may include determining that a difference between each compared pixel does not exceed a threshold for the highest allowed difference.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional motion pictures each multi-directional motion picture associated with a different location of a represented object and including one or more differently directed streams of time stamped still pictures from the location. The operations may further include incrementally resizing a first stream of time stamped still pictures of the first multi-directional motion picture. The operations may further include comparing at least one subset of a first stream of time stamped still pictures of a second multi-directional motion picture with at least one subset of the incrementally resized first stream of time stamped still pictures of the first multi-directional motion picture. The operations may further include determining that a subset of the first stream of time stamped still pictures of the second multi-directional motion picture is sufficiently similar to a subset of the incrementally resized first stream of time stamped still pictures of the first multi-directional motion picture to indicate a line of sight. The operations may further include adding a link with the second multi-directional motion picture to the first multi-directional motion picture; and adding a link with the first multi-directional motion picture to the second multi-directional motion picture.

In certain aspects, the disclosure relates to a method comprising: receiving a plurality of multi-directional motion pictures each multi-directional motion picture associated with a different location of a represented object and including one or more differently directed streams of time stamped still pictures from the location. The method may further include incrementally resizing a first stream of time stamped still pictures of the first multi-directional motion picture. The method may further include comparing at least one subset of a first stream of time stamped still pictures of a second multi-directional motion picture with at least one subset of the incrementally resized first stream of time stamped still pictures of the first multi-directional motion picture. The method may further include determining that a subset of the first stream of time stamped still pictures of the second multi-directional motion picture is sufficiently similar to a subset of the incrementally resized first stream of time stamped still pictures of the first multi-directional motion picture to indicate a line of sight. The method may further include adding a link with the second multi-directional motion picture to the first multi-directional motion picture; and adding a link with the first multi-directional motion picture to the second multi-directional motion picture.

The operations or steps of the non-transitory computer storage medium and/or the method may be performed by any of the elements of the above described system as applicable. The non-transitory computer storage medium and/or the method may include any of the operations, steps, and embodiments of the above described system as applicable.

In some aspects, the disclosure relates to a system for interpreting streams of time stamped still pictures. The system may operate on one or more computing devices. In some embodiments, the system comprises a processor circuit that is coupled to a memory unit. The system may further include an interface, coupled to the processor circuit, for: receiving a plurality of multi-directional motion pictures each multi-directional motion picture associated with a different location of a represented object and including one or more differently directed streams of time stamped still pictures from the location, and receiving a plurality of interpretive still pictures each interpretive still picture associated with an interpretive information on its content. The processor may be configured to compare at least one subset of a first stream of time stamped still pictures of a first multi-directional motion picture with at least one subset of the first interpretive still picture. The processor may be further configured to determine that a subset of the first stream of time stamped still pictures of the first multi-directional motion picture is sufficiently similar to a subset of the first interpretive still picture. The processor may be further configured to add the interpretive information on the content of the first interpretive still picture to the first multi-directional motion picture.

In certain embodiments, the comparing the at least one subset of a first stream of time stamped still pictures of a first multi-directional motion picture with at least one subset of the first interpretive still picture, and the determining that a subset of the first stream of time stamped still pictures of the first multi-directional motion picture is sufficiently similar to a subset of the first interpretive still picture is performed by a comparator, wherein the comparator is part of, operating on, or coupled to the processor circuit. In further embodiments, the adding the interpretive information on the content of the first interpretive still picture to the first multi-directional motion picture is performed by an assembler, wherein the assembler is part of, operating on, or coupled to the processor circuit. In further embodiments, the first multi-directional motion picture and the first interpretive still picture are stored in the memory unit, wherein the processor circuit reads the first multi-directional motion picture and the first interpretive still picture from the memory unit.

In some embodiments, the plurality of interpretive still pictures includes at least one of: a publically available repository of pictures, a privately held repository of pictures, a repository of pictures available to members of a picture sharing service, or a repository of pictures available to members of a social medium. In further embodiments, the interpretive still picture associated with the interpretive information on its content includes an interpretive still picture comprising the interpretive information on its content. In further embodiments, the content of the first interpretive still picture includes an object, a person, or a place depicted in the first interpretive still picture. In further embodiments, the interpretive information includes interpretive information created by a creator of the first interpretive still picture or by an optical device that captured the first interpretive still picture. The optical device that captured the first interpretive still picture may include at least one of: a digital camera, a GPS enabled camera, or a video camera.

In certain embodiments, the interpretive information associated with the first interpretive still picture includes at least one of: an identifying information, a descriptive information, an associative information, a metadata, a time information, a location information, or a referential information. The identifying information may include an identifier of an object, a person, or a place depicted in the first interpretive still picture. The descriptive information may include a descriptor of an object, a person, or a place depicted in the first interpretive still picture. The associative information may include at least one of: an identifier, a descriptor, or a reference to a resource comprising similar content to the content of the first interpretive still picture. The metadata may include at least one of: a resolution, a format, a size, a time of creation, or a date of creation of the first interpretive still picture. The time information may include an age of an object, a person, or a place depicted in the first interpretive still picture. The location information may include a coordinate, an address, or an information that can define a location of an object, a person, or a place depicted in the first interpretive still picture. The referential information may include a reference to at least one of: a content, a resource, a system, an application, or a process comprising information on an object, a person, or a place depicted in the first interpretive still picture.

In certain embodiments, a subset of the first stream of time stamped still pictures of the first multi-directional motion picture includes a subset of one or more still pictures of the first stream of time stamped still pictures of the first multi-directional motion picture. In further embodiments, the determining that a subset of the first stream of time stamped still pictures of the first multi-directional motion picture is sufficiently similar to a subset of the first interpretive still picture includes determining a sufficient similarity among all but a threshold number of pixels from the subset of the first interpretive still picture and the subset of the first stream of time stamped still pictures of the first multi-directional motion picture. The sufficient similarity among all but a threshold number of pixels from the subset of the first interpretive still picture and the subset of the first stream of time stamped still pictures of the first multi-directional motion picture may include determining that a difference between each compared pixel does not exceed a threshold for the highest allowed difference.

In some embodiments, the determining that a subset of the first stream of time stamped still pictures of the first multi-directional motion picture is sufficiently similar to a subset of the first interpretive still picture includes an optical character recognition (OCR), the OCR for determining that a subset of the first stream of time stamped still pictures of the first multi-directional motion picture comprising a textual shape is sufficiently similar to a subset of the first interpretive still picture comprising the textual shape. In further embodiments, the determining that a subset of the first stream of time stamped still pictures of the first multi-directional motion picture is sufficiently similar to a subset of the first interpretive still picture includes a facial recognition, the facial recognition for determining that a subset of the first stream of time stamped still pictures of the first multi-directional motion picture comprising a facial feature is sufficiently similar to a subset of the first interpretive still picture comprising the facial feature. In further embodiments, the determining that a subset of the first stream of time stamped still pictures of the first multi-directional motion picture is sufficiently similar to a subset of the first interpretive still picture includes an object recognition, the object recognition for determining that a subset of the first stream of time stamped still pictures of the first multi-directional motion picture comprising an object is sufficiently similar to a subset of the first interpretive still picture comprising the object.

In certain embodiments, the adding the interpretive information on the content of the first interpretive still picture to the first multi-directional motion picture includes associating the interpretive information on the content of the first interpretive still picture with the first multi-directional motion picture. In further embodiments, the adding the interpretive information on the content of the first interpretive still picture to the first multi-directional motion picture includes associating the interpretive information on the content of the first interpretive still picture with the first stream of time stamped still pictures of the first multi-directional motion picture. In further embodiments, the adding the interpretive information on the content of the first interpretive still picture to the first multi-directional motion picture includes adding a link comprising the interpretive information on the content of the first interpretive still picture to the first multi-directional motion picture.

In some embodiments, the system further comprises: an input device, coupled to the processor circuit, for receiving a user's selection to add an additional interpretive information to the first multi-directional motion picture, wherein the processor circuit is further configured to add the additional interpretive information to the first multi-directional motion picture. The adding the additional interpretive information to the first multi-directional motion picture is performed by an assembler, wherein the assembler is part of, operating on, or coupled to the processor circuit.

In certain embodiments, the system further comprises: an input device, coupled to the processor circuit, for receiving a user's selection to modify the interpretive information of the first multi-directional motion picture, wherein the processor circuit is further configured to modify the interpretive information of the first multi-directional motion picture. The modifying the interpretive information of the first multi-directional motion picture is performed by an assembler, wherein the assembler is part of, operating on, or coupled to the processor circuit.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional motion pictures each multi-directional motion picture associated with a different location of a represented object and including one or more differently directed streams of time stamped still pictures from the location. The operations may further include receiving a plurality of interpretive still pictures each interpretive still picture associated with an interpretive information on its content. The operations may further include comparing at least one subset of a first stream of time stamped still pictures of a first multi-directional motion picture with at least one subset of the first interpretive still picture. The operations may further include determining that a subset of the first stream of time stamped still pictures of the first multi-directional motion picture is sufficiently similar to a subset of the first interpretive still picture. The operations may further include adding the interpretive information on the content of the first interpretive still picture to the first multi-directional motion picture.

In certain aspects, the disclosure relates to a method comprising: receiving a plurality of multi-directional motion pictures each multi-directional motion picture associated with a different location of a represented object and including one or more differently directed streams of time stamped still pictures from the location. The method may further include receiving a plurality of interpretive still pictures each interpretive still picture associated with an interpretive information on its content. The method may further include comparing at least one subset of a first stream of time stamped still pictures of a first multi-directional motion picture with at least one subset of the first interpretive still picture. The method may further include determining that a subset of the first stream of time stamped still pictures of the first multi-directional motion picture is sufficiently similar to a subset of the first interpretive still picture. The method may further include adding the interpretive information on the content of the first interpretive still picture to the first multi-directional motion picture.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In some embodiments, the plurality of interpretive still pictures includes at least one of: a publically available repository of pictures, a privately held repository of pictures, a repository of pictures available to members of a picture sharing service, or a repository of pictures available to members of a social medium. In further embodiments, the interpretive still picture associated with the interpretive information on its content includes an interpretive still picture comprising the interpretive information on its content. In further embodiments, the content of the first interpretive still picture includes an object, a person, or a place depicted in the first interpretive still picture. In further embodiments, the interpretive information includes interpretive information created by a creator of the first interpretive still picture or by an optical device that captured the first interpretive still picture. The optical device that captured the first interpretive still picture may include at least one of: a digital camera, a GPS enabled camera, or a video camera.

In certain embodiments, the interpretive information associated with the first interpretive still picture includes at least one of: an identifying information, a descriptive information, an associative information, a metadata, a time information, a location information, or a referential information. The identifying information may include an identifier of an object, a person, or a place depicted in the first interpretive still picture. The descriptive information may include a descriptor of an object, a person, or a place depicted in the first interpretive still picture. The associative information may include at least one of: an identifier, a descriptor, or a reference to a resource comprising similar content to the content of the first interpretive still picture. The metadata may include at least one of: a resolution, a format, a size, a time of creation, or a date of creation of the first interpretive still picture. The time information may include an age of an object, a person, or a place depicted in the first interpretive still picture. The location information may include a coordinate, an address, or an information that can define a location of an object, person, or place depicted in the first interpretive still picture. The referential information may include a reference to at least one of: a content, a resource, a system, an application, or a process comprising information on an object, a person, or a place depicted in the first interpretive still picture.

In some embodiments, a subset of the first stream of time stamped still pictures of the first multi-directional motion picture includes a subset of one or more still pictures of the first stream of time stamped still pictures of the first multi-directional motion picture. In further embodiments, the determining that a subset of the first stream of time stamped still pictures of the first multi-directional motion picture is sufficiently similar to a subset of the first interpretive still picture includes determining a sufficient similarity among all but a threshold number of pixels from the subset of the first interpretive still picture and the subset of the first stream of time stamped still pictures of the first multi-directional motion picture. The sufficient similarity among all but a threshold number of pixels from the subset of the first interpretive still picture and the subset of the first stream of time stamped still pictures of the first multi-directional motion picture may include determining that a difference between each compared pixel does not exceed a threshold for the highest allowed difference.

In certain embodiments, the determining that a subset of the first stream of time stamped still pictures of the first multi-directional motion picture is sufficiently similar to a subset of the first interpretive still picture includes an optical character recognition (OCR), the OCR for determining that a subset of the first stream of time stamped still pictures of the first multi-directional motion picture comprising a textual shape is sufficiently similar to a subset of the first interpretive still picture comprising the textual shape. In further embodiments, the determining that a subset of the first stream of time stamped still pictures of the first multi-directional motion picture is sufficiently similar to a subset of the first interpretive still picture includes a facial recognition, the facial recognition for determining that a subset of the first stream of time stamped still pictures of the first multi-directional motion picture comprising a facial feature is sufficiently similar to a subset of the first interpretive still picture comprising the facial feature. In further embodiments, the determining that a subset of the first stream of time stamped still pictures of the first multi-directional motion picture is sufficiently similar to a subset of the first interpretive still picture includes an object recognition, the object recognition for determining that a subset of the first stream of time stamped still pictures of the first multi-directional motion picture comprising an object is sufficiently similar to a subset of the first interpretive still picture comprising the object.

In some embodiments, the adding the interpretive information on the content of the first interpretive still picture to the first multi-directional motion picture includes associating the interpretive information on the content of the first interpretive still picture with the first multi-directional motion picture. In further embodiments, the adding the interpretive information on the content of the first interpretive still picture to the first multi-directional motion picture includes associating the interpretive information on the content of the first interpretive still picture with the first stream of time stamped still pictures of the first multi-directional motion picture. In further embodiments, the adding the interpretive information on the content of the first interpretive still picture to the first multi-directional motion picture includes adding a link comprising the interpretive information on the content of the first interpretive still picture to the first multi-directional motion picture.

In certain embodiments, the non-transitory computer storage medium and/or the method further comprise: receiving a user's selection to add an additional interpretive information to the first multi-directional motion picture; and adding the additional interpretive information to the first multi-directional motion picture. In further embodiments, the non-transitory computer storage medium and/or the method further comprise: receiving a user's selection to modify the interpretive information of the first multi-directional motion picture; and modifying the interpretive information of the first multi-directional motion picture.

In some aspects, the disclosure relates to a system for creating links among multi-directional motion pictures. The system may operate on one or more computing devices. In some embodiments, the system comprises a processor circuit that is coupled to a memory unit. The system may further include an interface, coupled to the processor circuit, for: receiving a plurality of multi-directional motion pictures each multi-directional motion picture associated with a different location of a represented object, and including the location information and one or more differently directed streams of time stamped still pictures from the location. The processor may be configured to compute a proximity and an angle between a first and a second multi-directional motion pictures using the location information of the first and the second multi-directional motion pictures. The processor may be further configured to determine that the proximity between the first and the second multi-directional motion pictures falls between a minimum and a maximum proximity thresholds, and that the angle between the first and the second multi-directional motion pictures falls between a minimum and a maximum angle thresholds. The processor may be further configured to add a link with the second multi-directional motion picture to the first multi-directional motion picture, and add a link with the first multi-directional motion picture to the second multi-directional motion picture.

In certain embodiments, the adding the link with the second multi-directional motion picture to the first multi-directional motion picture, and adding the link with the first multi-directional motion picture to the second multi-directional motion picture is performed by an assembler, wherein the assembler is part of, operating on, or coupled to the processor circuit. In further embodiments, the first and the second multi-directional motion pictures are stored in the memory unit, wherein the processor circuit reads the first and the second multi-directional motion pictures from the memory unit. In further embodiments, the location information of the first multi-directional motion picture includes coordinates of the first multi-directional motion picture and the location information of the second multi-directional motion picture includes coordinates of the second multi-directional motion picture.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional motion pictures each multi-directional motion picture associated with a different location of a represented object, and including the location information and one or more differently directed streams of time stamped still pictures from the location. The operations may further include computing a proximity and an angle between a first and a second multi-directional motion pictures using the location information of the first and the second multi-directional motion pictures. The operations may further include determining that the proximity between the first and the second multi-directional motion pictures falls between a minimum and a maximum proximity thresholds; and that the angle between the first and the second multi-directional motion pictures falls between a minimum and a maximum angle thresholds. The operations may further include adding a link with the second multi-directional motion picture to the first multi-directional motion picture; and adding a link with the first multi-directional motion picture to the second multi-directional motion picture.

In certain aspects, the disclosure relates to a method comprising: receiving a plurality of multi-directional motion pictures each multi-directional motion picture associated with a different location of a represented object, and including the location information and one or more differently directed streams of time stamped still pictures from the location. The method may further include computing a proximity and an angle between a first and a second multi-directional motion pictures using the location information of the first and the second multi-directional motion pictures. The method may further include determining that the proximity between the first and the second multi-directional motion pictures falls between a minimum and a maximum proximity thresholds, and that the angle between the first and the second multi-directional motion pictures falls between a minimum and a maximum angle thresholds. The method may further include adding a link with the second multi-directional motion picture to the first multi-directional motion picture; and adding a link with the first multi-directional motion picture to the second multi-directional motion picture.

The operations or steps of the non-transitory computer storage medium and/or the method may be performed by any of the elements of the above described system as applicable. The non-transitory computer storage medium and/or the method may include any of the operations, steps; and embodiments of the above described system as applicable.

In some aspects, the disclosure relates to a system for associating a multi-directional motion picture using location information. The system may operate on one or more computing devices. In some embodiments, the system comprises a processor circuit that is coupled to a memory unit. The system may further include an interface, coupled to the processor circuit, for: receiving a plurality of multi-directional motion pictures each multi-directional motion picture including a location information on the multi-directional motion picture and one or more differently directed streams of time stamped still pictures from the location, the location information on the multi-directional motion picture identifying a location with which the multi-directional motion picture is associated, and receiving a plurality of objects each object including a location information on the object, the location information on the object identifying the object's location. The processor may be configured to compare the location information on a first multi-directional motion picture with the location information on a first object. The processor may be further configured to determine that the location information on the first multi-directional motion picture corresponds to the location information on the first object. The processor may be further configured to associate the first multi-directional motion picture with the first object.

In certain embodiments, the associating the first multi-directional motion picture with the first object is performed by an assembler, wherein the assembler is part of, operating on, or coupled to the processor circuit. In further embodiments, the first multi-directional motion picture and the first object are stored in the memory unit, wherein the processor circuit reads the first multi-directional motion picture and the first object from the memory unit.

In some embodiments, the location information on the first multi-directional motion picture includes an address of the first multi-directional motion picture and the location information on the first object includes an address of the first object, and wherein the comparing the location information on the first multi-directional motion picture with the location information on the first object includes comparing the addresses of the first multi-directional motion picture and the first object, and wherein the determining that the location information on the first multi-directional motion picture corresponds to the location information on the first object includes determining that the addresses of the first multi-directional motion picture and the first object are same or similar. In further embodiments, the location information on the first multi-directional motion picture includes coordinates of the first multi-directional motion picture and the location information on the first object includes coordinates of the first object, and wherein the comparing the location information on the first multi-directional motion picture with the location information on the first object includes computing a proximity between the first multi-directional motion picture and the first object using the coordinates of the first multi-directional motion picture and the first object, and wherein the determining that the location information on the first multi-directional motion picture corresponds to the location information on the first object includes determining that the proximity between the first multi-directional motion picture and the first object falls within a proximity threshold.

In some embodiments, the associating the first multi-directional motion picture with the first object includes adding a link with the first object to the first multi-directional motion picture. In further embodiments, the first object includes an interpretive information on the first object, and wherein the associating the first multi-directional motion picture with the first object includes adding the interpretive information on the first object to the first multi-directional motion picture.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional motion pictures each multi-directional motion picture including a location information on the multi-directional motion picture and one or more differently directed streams of time stamped still pictures from the location, the location information on the multi-directional motion picture identifying a location with which the multi-directional motion picture is associated. The operations may further include receiving a plurality of objects each object including a location information on the object, the location information on the object identifying the object's location. The operations may further include comparing the location information on a first multi-directional motion picture with the location information on a first object. The operations may further include determining that the location information on the first multi-directional motion picture corresponds to the location information on the first object. The operations may further include associating the first multi-directional motion picture with the first object.

In certain aspects, the disclosure relates to a method comprising: receiving a plurality of multi-directional motion pictures each multi-directional motion picture including a location information on the multi-directional motion picture and one or more differently directed streams of time stamped still pictures from the location, the location information on the multi-directional motion picture identifying a location with which the multi-directional motion picture is associated. The method may further include receiving a plurality of objects each object including a location information on the object, the location information on the object identifying the object's location. The method may further include comparing the location information on a first multi-directional motion picture with the location information on a first object. The method may further include determining that the location information on the first multi-directional motion picture corresponds to the location information on the first object. The method may further include associating the first multi-directional motion picture with the first object.

The operations or steps of the non-transitory computer storage medium and/or the method may be performed by any of the elements of the above described system as applicable. The non-transitory computer storage medium and/or the method may include any of the operations, steps, and embodiments of the above described system as applicable.

In some aspects, the disclosure relates to a system for using multi-directional still pictures. The system may operate on one or more computing devices. In some embodiments, the system comprises a processor circuit that is coupled to a memory unit. The system may further include an interface, coupled to the processor circuit, for receiving a plurality of multi-directional still pictures each multi-directional still picture associated with a different location of a represented object and including one or more differently directed still pictures from the location and one or more links to other one or more multi-directional still pictures. The system may further include a display, coupled to the processor circuit, for rendering a first still picture depicting a first view from a location associated with a first multi-directional still picture. The system may further include an input device, coupled to the processor circuit, for receiving a selection of a first link of the first multi-directional still picture, the first link referring to a second multi-directional still picture. The processor may be configured to cause the display to render a first still picture depicting a first view from a location associated with the second multi-directional still picture.

In some embodiments, the first and the second multi-directional still pictures are stored in the memory unit, wherein the processor circuit reads the first and the second multi-directional still pictures from the memory unit. In further embodiments, the interface includes at least one of: a direct connection, an operative connection, a wired connection, a wireless connection, a device, a network, a bus, a circuit, a firmware, a driver, or a program.

In certain embodiments, the input device is further configured to receive a selection of a second still picture of the second multi-directional still picture, wherein the processor circuit is further configured to cause the display to render the second still picture depicting a second view from the location associated with the second multi-directional still picture. In further embodiments, the input device is further configured to receive a selection of a second link of the first multi-directional still picture, the second link referring to an outside application or process, wherein the processor circuit is further configured to access the outside application or process.

In some embodiments, the plurality of multi-directional still pictures includes a plurality of multi-directional still pictures residing on a remote computing device. The remote computing device may include at least one of: an application server, a network service server, or a cloud server. In further embodiments, at least one multi-directional still picture of the plurality of multi-directional still pictures includes one or more multi-directional still picture angles, each multi-directional still picture angle associated with a link to a multi-directional still picture and indicating an angle to the multi-directional still picture referred to by the link. In further embodiments, the processor circuit is further configured to combine the one or more differently directed still pictures of a multi-directional still picture into a combined still picture and approximate a link to another multi-directional still picture from an angle of view of the combined still picture. In further embodiments, at least one multi-directional still picture of the plurality of multi-directional still pictures includes one or more multi-directional still picture distances, each multi-directional still picture distance associated with a link to a multi-directional still picture and indicating a distance to the multi-directional still picture referred to by the link. In further embodiments, at least one multi-directional still picture of the plurality of multi-directional still pictures includes an orientation. The orientation may include an absolute or a relative orientation.

In certain embodiments, at least one multi-directional still picture of the plurality of multi-directional still pictures includes a coordinate of the associated location of the represented object. In further embodiments, the represented object includes a physical object or a computer generated object. The computer generated object may include at least one of: an object of a 3D game, an object of a CAD application, or an object of a CAM application. In further embodiments, the location of the represented object includes a location corresponding to a shape of the represented object. In further embodiments, the one or more links to other one or more multi-directional still pictures includes a differently directed link such as a forward link, a backward link, a right link, a left link, an up link, a down link, or an angular link. In further embodiments, the one or more differently directed still pictures includes a differently directed view from the location of the represented object such as a forward view, a backward view, a right view, a left view, an up view, a down view, or an angular view. In further embodiments, the one or more differently directed still pictures includes a digital picture. The digital picture may include at least one of: a BMP picture, a PEG picture, a GIF picture, a TIFF picture, a PNG picture, or a PDF picture.

In some embodiments, the input device includes a user interface for selecting the one or more links to other one or more multi-directional still pictures. In further embodiments, the input device includes a user interface for selecting the one or more differently directed still pictures. In further embodiments, the input device includes a microphone for receiving an audio input and speech recognizer for interpreting the audio input as a selection of the one or more links to other one or more multi-directional still pictures or a selection of the one or more differently directed still pictures. The speech recognizer may include a keyword spotting or a full lexicon speech recognition.

In certain embodiments, the processor circuit is further configured to insert a user controllable avatar into the one or more differently directed still pictures. In further embodiments, the interface is further configured to receive an automatic pattern of movement including a sequence of multi-directional still pictures. The processor circuit is further configured to cause the display to render at least one still picture of each multi-directional still picture in the sequence. At least one multi-directional still picture in the sequence may include a time period for controlling a length of stay on the multi-directional still picture. In further embodiments, the interface is further configured to receive a map of locations of the represented object, each location of the map selectable by a user and associated with a multi-directional still picture of the plurality of multi-directional still pictures.

In some embodiments, the system further comprises: at least one of: a maze-like or sequence-like data structure for organizing the plurality of multi-directional still pictures.

In certain embodiments, at least one multi-directional still picture of the plurality of multi-directional still pictures includes an interpretive information on a content of the one or more differently directed still pictures of the multi-directional still picture. The content of the one or more differently directed still pictures of the multi-directional still picture may include an object, a person, or a place depicted in the one or more differently directed still pictures of the multi-directional still picture. In further embodiments, the processor circuit is further configured to cause the display to render an interpretive information on a content of the first still picture of the first multi-directional still picture. In further embodiments, the input device is further configured to receive a selection of a third link of the first multi-directional still picture, the third link comprising an interpretive information on a content of the one or more differently directed still pictures of the first multi-directional still picture, wherein the processor circuit is further configured to access the interpretive information. The interpretive information may include a reference to at least one of: a content, a resource, a system, an application, or a process comprising information on an object, a person, or a place depicted in the one or more differently directed still pictures of the first multi-directional still picture. In further embodiments, the input device is further configured to receive a selection of a fourth link of the first multi-directional still picture, the fourth link referring to an object whose location corresponds or is proximal to the first multi-directional still picture, wherein the processor circuit is further configured to access the object.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional still pictures each multi-directional still picture associated with a different location of a represented object and including one or more differently directed still pictures from the location and one or more links to other one or more multi-directional still pictures. The operations may further include rendering a first still picture depicting a first view from a location associated with a first multi-directional still picture. The operations may further include receiving a selection of a second still picture of the first multi-directional still picture. The operations may further include rendering the second still picture depicting a second view from the location associated with the first multi-directional still picture.

In certain aspects, the disclosure relates to a method comprising: receiving a plurality of multi-directional still pictures each multi-directional still picture associated with a different location of a represented object and including one or more differently directed still pictures from the location and one or more links to other one or more multi-directional still pictures. The method may further include rendering a first still picture depicting a first view from a location associated with a first multi-directional still picture. The method may further include receiving a selection of a second still picture of the first multi-directional still picture. The method may further include rendering the second still picture depicting a second view from the location associated with the first multi-directional still picture.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the non-transitory computer storage medium and/or the method further comprise: receiving a selection of a first link of the first multi-directional still picture, the first link referring to a second multi-directional still picture; and rendering a first still picture depicting a first view from a location associated with the second multi-directional still picture.

In certain embodiments, the non-transitory computer storage medium and/or the method further comprise: receiving a selection of a second link of the first multi-directional still picture, the second link referring to an outside application or process; and accessing the outside application or process.

In certain embodiments, the plurality of multi-directional still pictures includes a plurality of multi-directional still pictures residing on a remote computing device. The remote computing device may include at least one of: an application server, a network service server, or a cloud server. In further embodiments, at least one multi-directional still picture of the plurality of multi-directional still pictures includes one or more multi-directional still picture angles, each multi-directional still picture angle associated with a link to a multi-directional still picture and indicating an angle to the multi-directional still picture referred to by the link.

In certain embodiments, the non-transitory computer storage medium and/or the method further comprise: combining the one or more differently directed still pictures of a multi-directional still picture into a combined still picture; and approximating a link to another multi-directional still picture from an angle of view of the combined still picture. In further embodiments, at least one multi-directional still picture of the plurality of multi-directional still pictures includes one or more multi-directional still picture distances, each multi-directional still picture distance associated with a link to a multi-directional still picture and indicating a distance to the multi-directional still picture referred to by the link. In further embodiments, at least one multi-directional still picture of the plurality of multi-directional still pictures includes an orientation. The orientation may include an absolute or a relative orientation.

In some embodiments, at least one multi-directional still picture of the plurality of multi-directional still pictures includes a coordinate of the associated location of the represented object. In further embodiments, the represented object includes a physical object or a computer generated object. The computer generated object may include at least one of: an object of a 3D game, an object of a CAD application, or an object of a CAM application. In further embodiments, the location of the represented object includes a location corresponding to a shape of the represented object. In further embodiments, the one or more links to other one or more multi-directional still pictures includes a differently directed link such as a forward link, a backward link, a right link, a left link, an up link, a down link, or an angular link. In further embodiments, the one or more differently directed still pictures includes a differently directed view from the location of the represented object such as a forward view, a backward view, a right view, a left view, an up view, a down view, or an angular view. In further embodiments, the one or more differently directed still pictures includes a digital picture. The digital picture may include at least one of: a BMP picture, a PEG picture, a GIF picture, a TIFF picture, a PNG picture, or a PDF picture.

In certain embodiments, the non-transitory computer storage medium and/or the method further comprise: generating a user interface for selecting the one or more links to other one or more multi-directional still pictures. In further embodiments, the non-transitory computer storage medium and/or the method further comprise: generating a user interface for selecting the one or more differently directed still pictures. In further embodiments, the non-transitory computer storage medium and/or the method further comprise: receiving an audio input via a microphone; and interpreting, using a speech recognizer, the audio input as a selection of the one or more links to other one or more multi-directional still pictures or a selection of the one or more differently directed still pictures. The speech recognizer may include a keyword spotting or a full lexicon speech recognition.

In certain embodiments, the non-transitory computer storage medium and/or the method further comprise: inserting a user controllable avatar into the one or more differently directed still pictures. In further embodiments, the non-transitory computer storage medium and/or the method further comprise: receiving an automatic pattern of movement including a sequence of multi-directional still pictures. In further embodiments, the non-transitory computer storage medium and/or the method further comprise: rendering at least one still picture of each multi-directional still picture in the sequence. At least one multi-directional still picture in the sequence may include a time period for controlling a length of stay on the multi-directional still picture.

In some embodiments, the non-transitory computer storage medium and/or the method further comprise: receiving a map of locations of the represented object, each location of the map selectable by a user and associated with a multi-directional still picture of the plurality of multi-directional still pictures. In further embodiments, the non-transitory computer storage medium and/or the method further comprise: utilizing at least one of: a maze-like or sequence-like data structure for organizing the plurality of multi-directional still pictures.

In further embodiments, at least one multi-directional still picture of the plurality of multi-directional still pictures includes an interpretive information on a content of the one or more differently directed still pictures of the multi-directional still picture. The content of the one or more differently directed still pictures of the multi-directional still picture may include an object, a person, or a place depicted in the one or more differently directed still pictures of the multi-directional still picture.

In certain embodiments, the non-transitory computer storage medium and/or the method further comprise: rendering an interpretive information on a content of the first still picture of the first multi-directional still picture. In further embodiments, the non-transitory computer storage medium and/or the method further comprise: receiving a selection of a third link of the first multi-directional still picture, the third link comprising an interpretive information on a content of the one or more differently directed still pictures of the first multi-directional still picture; and accessing the interpretive information. The interpretive information may include a reference to at least one of: a content, a resource, a system, an application, or a process comprising information on an object, a person, or a place depicted in the one or more differently directed still pictures of the first multi-directional still picture. In further embodiments, the non-transitory computer storage medium and/or the method further comprise: receiving a selection of a fourth link of the first multi-directional still picture, the fourth link referring to an object whose location corresponds or is proximal to the first multi-directional still picture; and accessing the object.

In some aspects, the disclosure relates to a system for inserting an avatar into still pictures. The system may operate on one or more computing devices. In some embodiments, the system comprises a processor circuit that is coupled to a memory unit. The system may further include an interface, coupled to the processor circuit, for receiving a plurality of multi-directional still pictures each multi-directional still picture associated with a different location of a represented object and including one or more differently directed still pictures from the location. The processor may be configured to insert an avatar's picture into a first still picture of a first multi-directional still picture. The processor may be further configured to identify a region of the first still picture of the first multi-directional still picture around a position where the avatar's picture is inserted. The processor may be further configured to incrementally resize the identified region. The processor may be further configured to compare at least one subset of a first still picture of a second multi-directional still picture with the incrementally resized identified region. The processor may be further configured to determine that a subset of the first still picture of the second multi-directional still picture is sufficiently similar to the incrementally resized identified region to indicate a line of sight. The processor may be further configured to resize the avatar's picture proportional to the incrementally resized identified region to portray the avatar in perspective. The processor may be further configured to insert the resized avatar's picture into the first still picture of the second multi-directional still picture in a position where the subset sufficiently similar to the incrementally resized identified region is found.

In some embodiments, the identifying the region of the first still picture of the first multi-directional still picture around the position where the avatar's picture is inserted, the incrementally resizing the identified region, the comparing the at least one subset of the first still picture of the second multi-directional still picture with the incrementally resized identified region, and the determining that a subset of the first still picture of the second multi-directional still picture is sufficiently similar to the incrementally resized identified region to indicate a line of sight is performed by a comparator, wherein the comparator is part of, operating on, or coupled to the processor circuit. In further embodiments, the first and the second multi-directional still pictures are stored in the memory unit, wherein the processor circuit reads the first and the second multi-directional still pictures from the memory unit.

In certain embodiments, the processor circuit is further configured to associate a user's avatar with a first multi-directional still picture. In further embodiments, the avatar's picture includes at least one of: a still picture, an animated picture, or a video. In further embodiments, the avatar's picture includes a differently directed avatar's picture of a plurality of differently directed avatar's pictures. In further embodiments, the inserting the avatar's picture into the first still picture of the first multi-directional still picture includes inserting or overlaying pixels of the avatar's picture into/onto the first still picture of the first multi-directional still picture. In further embodiments, the inserting the avatar's picture into the first still picture of the first multi-directional still picture includes portraying the avatar in a first-person view or a third-person view in the first still picture of the first multi-directional still picture. In further embodiments, the processor circuit is further configured to control at least one of: the avatar's movement, the avatar's appearance, or the avatar's behavior.

In some embodiments, the identifying a region of the first still picture of the first multi-directional still picture around a position where the avatar's picture is inserted includes identifying a region centered relative to the avatar's picture and having a size of at least the size of the avatar's picture. In further embodiments, the incrementally resizing the identified region includes proportionally resizing a region of the first still picture of the first multi-directional still picture. In further embodiments, the incrementally resizing the identified region includes resizing a region of the first still picture of the first multi-directional still picture by one pixel in a length or a width keeping an aspect ratio constant. In further embodiments, the determining that a subset of the first still picture of the second multi-directional still picture is sufficiently similar to the incrementally resized identified region includes determining a sufficient similarity among all but a threshold number of pixels from the incrementally resized identified region and the subset of the first still picture of the second multi-directional still picture. The sufficient similarity between all but a threshold number of pixels from the incrementally resized identified region and the subset of the first still picture of the second multi-directional still picture may include determining that a difference between each compared pixel does not exceed a threshold for the highest allowed difference.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional still pictures each multi-directional still picture associated with a different location of a represented object and including one or more differently directed still pictures from the location. The operations may further include inserting an avatar's picture into a first still picture of a first multi-directional still picture. The operations may further include identifying a region of the first still picture of the first multi-directional still picture around a position where the avatar's picture is inserted. The operations may further include incrementally resizing the identified region. The operations may further include comparing at least one subset of a first still picture of a second multi-directional still picture with the incrementally resized identified region. The operations may further include determining that a subset of the first still picture of the second multi-directional still picture is sufficiently similar to the incrementally resized identified region to indicate a line of sight. The operations may further include resizing the avatar's picture proportional to the incrementally resized identified region to portray the avatar in perspective. The operations may further include inserting the resized avatar's picture into the first still picture of the second multi-directional still picture in a position where the subset sufficiently similar to the incrementally resized identified region is found.

In certain aspects, the disclosure relates to a method comprising: receiving a plurality of multi-directional still pictures each multi-directional still picture associated with a different location of a represented object and including one or more differently directed still pictures from the location. The method may further include inserting an avatar's picture into a first still picture of a first multi-directional still picture. The method may further include identifying a region of the first still picture of the first multi-directional still picture around a position where the avatar's picture is inserted. The method may further include incrementally resizing the identified region. The method may further include comparing at least one subset of a first still picture of a second multi-directional still picture with the incrementally resized identified region. The method may further include determining that a subset of the first still picture of the second multi-directional still picture is sufficiently similar to the incrementally resized identified region to indicate a line of sight. The method may further include resizing the avatar's picture proportional to the incrementally resized identified region to portray the avatar in perspective. The method may further include inserting the resized avatar's picture into the first still picture of the second multi-directional still picture in a position where the subset sufficiently similar to the incrementally resized identified region is found.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the non-transitory computer storage medium and/or the method further comprise: associating a user's avatar with a first multi-directional still picture. In further embodiments, the avatar's picture includes at least one of: a still picture, an animated picture, or a video. In further embodiments, the avatar's picture includes a differently directed avatar's picture of a plurality of differently directed avatar's pictures. In further embodiments, the inserting the avatar's picture into the first still picture of the first multi-directional still picture includes inserting or overlaying pixels of the avatar's picture into/onto the first still picture of the first multi-directional still picture. In further embodiments, the inserting the avatar's picture into the first still picture of the first multi-directional still picture includes portraying the avatar in a first-person view or a third-person view in the first still picture of the first multi-directional still picture. In further embodiments, the non-transitory computer storage medium and/or the method further comprise: controlling at least one of: the avatar's movement, the avatar's appearance, or the avatar's behavior.

In some embodiments, the identifying a region of the first still picture of the first multi-directional still picture around a position where the avatar's picture is inserted includes identifying a region centered relative to the avatar's picture and having a size of at least the size of the avatar's picture. In further embodiments, the incrementally resizing the identified region includes proportionally resizing a region of the first still picture of the first multi-directional still picture. In further embodiments, the incrementally resizing the identified region includes resizing a region of the first still picture of the first multi-directional still picture by one pixel in a length or a width keeping an aspect ratio constant. In further embodiments, the determining that a subset of the first still picture of the second multi-directional still picture is sufficiently similar to the incrementally resized identified region includes determining a sufficient similarity among all but a threshold number of pixels from the incrementally resized identified region and the subset of the first still picture of the second multi-directional still picture. The sufficient similarity between all but a threshold number of pixels from the incrementally resized identified region and the subset of the first still picture of the second multi-directional still picture may include determining that a difference between each compared pixel does not exceed a threshold for the highest allowed difference.

In some aspects, the disclosure relates to a system for generating multi-directional still pictures. The system may operate on one or more computing devices. In some embodiments, the system comprises a processor circuit that is coupled to a memory unit. The system may further include an interface, coupled to the processor circuit, for receiving one or more still pictures each still picture depicting a differently directed view from a first location of plurality locations of a represented object. The processor may be configured to generate a first multi-directional still picture to include the one or more still pictures from the first location. The interface may be further configured to receive one or more still pictures each still picture depicting a differently directed view from a second location of plurality locations of the represented object. The processor may be further configured to generate a second multi-directional still picture to include the one or more still pictures from the second location and to include a link with the first multi-directional still picture, the first location being adjacent to the second location. The processor may be further configured to add a link with the second multi-directional still picture to the first multi-directional still picture. The processor may be further configured to store the first and the second multi-directional still pictures into the memory unit.

In certain embodiments, the generating the first multi-directional still picture to include the one or more still pictures from the first location, the generating the second multi-directional still picture to include the one or more still pictures from the second location and to include the link with the first multi-directional still picture, and the adding a link with the second multi-directional still picture to the first multi-directional still picture is performed by an assembler, wherein the assembler is part of, operating on, or coupled to the processor circuit.

In some embodiments, the system further comprises: an input device, coupled to the processor circuit, for receiving a user's selection to add a link with a third multi-directional still picture to the first multi-directional still picture, wherein the processor circuit is further configured to add the link with the third multi-directional still picture to the first multi-directional still picture. The adding the link with the third multi-directional still picture to the first multi-directional still picture is performed by an assembler, wherein the assembler is part of, operating on, or coupled to the processor circuit.

In certain embodiments, the system further comprises: an input device, coupled to the processor circuit, for receiving a user's selection to replace a link of the first multi-directional still picture, wherein the processor circuit is further configured to replace the link of the first multi-directional still picture. The replacing the link of the first multi-directional still picture is performed by an assembler, wherein the assembler is part of, operating on; or coupled to the processor circuit.

In some embodiments, the system further comprises: a still picture camera, coupled to the interface, for capturing the one or more still pictures from the first and the second locations. The still picture camera is positioned in the first location to capture the one or more still pictures from the first location and in the second location to capture the one or more still pictures from the second location. The still picture camera may include a means to mount the still picture camera onto an object or a surface, the means comprising at least one of: a clip, a screw, an attachment element, or an adhesive element. The still picture camera may include a means to connect the still picture camera with the interface, the means comprising at least one of: a cable, a wireless connection, or a network. The still picture camera may include a means to detect a moving object or an action scene, the means comprising at least one of: an infrared sensor, an optical sensor, a radio frequency energy sensor, a sound sensor, a vibration sensor, or a magnetism sensor. The still picture camera may include a means to align the still picture camera toward the detected moving object or action scene, the means comprising at least one of: a motor or an actuator. The still picture camera may include a means to focus the still picture camera on the detected moving object or action scene, the means comprising a lens moving mechanism for adjusting a position of the lens of the still picture camera to achieve focus.

In certain embodiments, the system further comprises: a set of one or more differently directed still picture cameras, coupled to the interface, for simultaneous capturing the one or more still pictures from the first and the second locations. The set of one or more differently directed still picture cameras is positioned in the first location to capture the one or more still pictures from the first location and in the second location to capture the one or more still pictures from the second location.

In some embodiments, the system further comprises: a multi-directional still picture taking device including one or more differently directed still picture cameras, coupled to the interface, for simultaneous capturing of the one or more still pictures from the first and the second locations. The multi-directional still picture taking device is positioned in the first location to capture the one or more still pictures from the first location and in the second location to capture the one or more still pictures from the second location. The one or more differently directed still picture cameras may include at least one of: a forward directed still picture camera, a backward directed still picture camera, a right directed still picture camera, a left directed still picture camera, an up directed still picture camera, a down directed still picture camera, or an angular directed still picture camera.

In certain embodiments, the processor circuit is further configured to detect, from a plurality of still pictures, the one or more still pictures from the first location and the one or more still pictures from the second location. In further embodiments, the processor circuit is further configured to detect the link of the first multi-directional still picture referring to the second multi-directional still picture and the link of the second multi-directional still picture referring to the first multi-directional still picture.

In some embodiments, the system further comprises: an input device, coupled to the processor circuit, for receiving a user's selections of the one or more still pictures from the first location and the one or more still pictures from the second location. In further embodiments, the processor circuit is further configured to associate the one or more still pictures from the first location with the first multi-directional still picture and associate the one or more still pictures from the second location with the second multi-directional still picture.

In certain embodiments, the system further comprises: an input device, coupled to the processor circuit, for receiving a user's selections of the link of the first multi-directional still picture referring to the second multi-directional still picture and the link of the second multi-directional still picture referring to the first multi-directional still picture. In further embodiments, the processor circuit is further configured to guide a user in generating one or more sequences of multi-directional still pictures.

In some embodiments, the system of further comprises: an input device, coupled to the processor circuit, for receiving a user's selection to link the one or more sequences of multi-directional still pictures with other one or more sequences of multi-directional still pictures.

In certain embodiments, the processor circuit is further configured to interpret content of the one or more still pictures of the first multi-directional still picture, wherein the processor circuit is further configured to add an interpretive information on the content to the first multi-directional still picture. The adding the interpretive information on the content to the first multi-directional still picture is performed by an assembler, wherein the assembler is part of, operating on, or coupled to the processor circuit. In further embodiments, the processor circuit is further configured to interpret content of the one or more still pictures of the second multi-directional still picture, wherein the processor circuit is further configured to add an interpretive information on the content to the second multi-directional still picture. The adding the interpretive information on the content to the second multi-directional still picture is performed by an assembler, wherein the assembler is part of, operating on, or coupled to the processor circuit.

In some aspects, the disclosure relates to a non-transitory computer storage medium having a computer program stored thereon, the program comprising instructions that when executed by one or more computing devices cause the one or more computing devices to perform operations comprising: receiving one or more still pictures each still picture depicting a differently directed view from a first location of plurality locations of a represented object. The operations may further include generating a first multi-directional still picture to include the one or more still pictures from the first location. The operations may further include receiving one or more still pictures each still picture depicting a differently directed view from a second location of plurality locations of the represented object. The operations may further include generating a second multi-directional still picture to include the one or more still pictures from the second location and to include a link with the first multi-directional still picture, the first location being adjacent to the second location. The operations may further include adding a link with the second multi-directional still picture to the first multi-directional still picture. The operations may further include storing the first and the second multi-directional still pictures in a memory unit.

In certain aspects, the disclosure relates to a method comprising: receiving one or more still pictures each still picture depicting a differently directed view from a first location of plurality locations of a represented object. The method may further include generating a first multi-directional still picture to include the one or more still pictures from the first location. The method may further include receiving one or more still pictures each still picture depicting a differently directed view from a second location of plurality locations of the represented object. The method may further include generating a second multi-directional still picture to include the one or more still pictures from the second location and to include a link with the first multi-directional still picture, the first location being adjacent to the second location. The method may further include adding a link with the second multi-directional still picture to the first multi-directional still picture. The method may further include storing the first and the second multi-directional still pictures in a memory unit.

The operations or steps of the non-transitory computer storage medium and/or the method may be performed by any of the elements of the above described system as applicable. The non-transitory computer storage medium and/or the method may include any of the operations, steps; and embodiments of the above described system as applicable as well as the following embodiments.

In certain embodiments, the non-transitory computer storage medium and/or the method further comprise: receiving a users selection to add a link with a third multi-directional still picture to the first multi-directional still picture; and adding the link with the third multi-directional still picture to the first multi-directional still picture. In further embodiments, the non-transitory computer storage medium and/or the method further comprise: receiving a user's selection to replace a link of the first multi-directional still picture; and replacing the link of the first multi-directional still picture.

In some embodiments, the non-transitory computer storage medium and/or the method further comprise: utilizing a still picture camera, coupled to the interface, for capturing the one or more still pictures from the first and the second locations. The still picture camera is positioned in the first location to capture the one or more still pictures from the first location and in the second location to capture the one or more still pictures from the second location. The still picture camera may include a means to mount the still picture camera onto an object or a surface, the means comprising at least one of: a clip, a screw, an attachment element, or an adhesive element. The still picture camera may include a means to connect the still picture camera with the interface, the means comprising at least one of: a cable, a wireless connection; or a network. The still picture camera may include a means to detect a moving object or an action scene, the means comprising at least one of: an infrared sensor, an optical sensor, a radio frequency energy sensor, a sound sensor, a vibration sensor, or a magnetism sensor. The still picture camera may include a means to align the still picture camera toward the detected moving object or action scene, the means comprising at least one of: a motor or an actuator. The still picture camera may include a means to focus the still picture camera on the detected moving object or action scene, the means comprising a lens moving mechanism for adjusting a position of the lens of the still picture camera to achieve focus.

In certain embodiments, the non-transitory computer storage medium and/or the method further comprise: utilizing a set of one or more differently directed still picture cameras, coupled to the interface, for simultaneous capturing the one or more still pictures from the first location and simultaneous capturing the one or more still pictures from the second location. The set of one or more differently directed still picture cameras is positioned in the first location to capture the one or more still pictures from the first location and in the second location to capture the one or more still pictures from the second location.

In some embodiments, the non-transitory computer storage medium and/or the method further comprise: utilizing a multi-directional still picture taking device including one or more differently directed still picture cameras, coupled to the interface, for simultaneous capturing the one or more still pictures from the first location and simultaneous capturing the one or more still pictures from the second location. The multi-directional still picture taking device is positioned in the first location to capture the one or more still pictures from the first location and in the second location to capture the one or more still pictures from the second location. The one or more differently directed still picture cameras may include at least one of: a forward directed still picture camera, a backward directed still picture camera, a right directed still picture camera, a left directed still picture camera, an up directed still picture camera, a down directed still picture camera, or an angular directed still picture camera.

In certain embodiments, the non-transitory computer storage medium and/or the method further comprise: detecting, from a plurality of still pictures, the one or more still pictures from the first location and the one or more still pictures from the second location. In further embodiments, the non-transitory computer storage medium and/or the method further comprise: detecting the link of the first multi-directional still picture referring to the second multi-directional still picture and the link of the second multi-directional still picture referring to the first multi-directional still picture. In further embodiments, the non-transitory computer storage medium and/or the method further comprise: receiving a user's selections of the one or more still pictures from the first location and the one or more still pictures from the second location. In further embodiments, the non-transitory computer storage medium and/or the method further comprise: associating the one or more still pictures from the first location with the first multi-directional still picture; and associating the one or more still pictures from the second location with the second multi-directional still picture. In further embodiments, the non-transitory computer storage medium and/or the method further comprise: receiving a user's selections of the link of the first multi-directional still picture referring to the second multi-directional still picture and the link of the second multi-directional still picture referring to the first multi-directional still picture. In further embodiments, the non-transitory computer storage medium and/or the method further comprise: guiding a user in generating one or more sequences of multi-directional still pictures. In further embodiments, the non-transitory computer storage medium and/or the method further comprise: receiving a user's selection to link the one or more sequences of multi-directional still pictures with other one or more sequences of multi-directional still pictures.

In some embodiments, the non-transitory computer storage medium and/or the method further comprise: interpreting content of the one or more still pictures of the first multi-directional still picture; and adding an interpretive information on the content to the first multi-directional still picture. In further embodiments, the non-transitory computer storage medium and/or the method further comprise: interpreting content of the one or more still pictures of the second multi-directional still picture; and adding an interpretive information on the content to the second multi-directional still picture.

In some aspects, the disclosure relates to a system for detecting still pictures. The system may operate on one or more computing devices. In some embodiments, the system comprises a processor circuit that is coupled to a memory unit. The system may further include an interface, coupled to the processor circuit, for receiving a plurality of still pictures. The processor may be configured to compare at least one subset of a first still picture and at least one subset of a second still picture, the compared subsets being near opposite edges of the first and the second still pictures. The processor may be further configured to determine that a subset of the first still picture is sufficiently similar to a subset of the second still picture to indicate an overlapping field of view between the two still pictures. The processor may be further configured to generate a first multi-directional still picture to include the first and the second still pictures, the first and the second still pictures depicting a first and a second differently directed views from a first location of a represented object.

In some embodiments, the comparing the at least one subset of the first still picture and at least one subset of the second still picture, and determining that a subset of the first still picture is sufficiently similar to a subset of the second still picture is performed by a comparator, wherein the comparator is part of, operating on, or coupled to the processor circuit. In further embodiments, the generating the first multi-directional still picture to include the first and the second still pictures is performed by an assembler, wherein the assembler is part of, operating on, or coupled to the processor circuit. In further embodiments, the first and the second still pictures are stored in the memory unit, wherein the processor circuit reads the first and the second still pictures from the memory unit.

In certain embodiments, the processor circuit is further configured to: compare at least one subset of the first still picture and at least one subset of a third still picture, the compared subsets being near opposite edges of the first and the third still pictures, determine that a subset of the first still picture is sufficiently similar to a subset of the third still picture to indicate an overlapping field of view between the two still pictures, and add the third still picture to the first multi-directional still picture, the third still picture depicting a third differently directed view from the first location of the represented object. The comparing the at least one subset of the first still picture and at least one subset of the third still picture, and determining that a subset of the first still picture is sufficiently similar to a subset of the third still picture is performed by a comparator, wherein the comparator is part of, operating on, or coupled to the processor circuit. The adding the third still picture to the first multi-directional still picture is performed by an assembler, wherein the assembler is part of, operating on, or coupled to the processor circuit.

In some embodiments, the determining that a subset of the first still picture is sufficiently similar to a subset of the second still picture includes determining a sufficient similarity among all but a threshold number of pixels from the subset of the first still picture and the subset of the second still picture. The sufficient similarity among all but a threshold number of pixels from the subset of the first still picture and the subset of the second still picture may include determining that a difference between each compared pixel does not exceed a threshold for the highest allowed difference.

In some aspects, the disclosure relates to a non-transitory computer storage medium having a computer program stored thereon, the program comprising instructions that when executed by one or more computing devices cause the one or more computing devices to perform operations comprising: receiving a plurality of still pictures. The operations may further include comparing at least one subset of a first still picture and at least one subset of a second still picture, the compared subsets being near opposite edges of the first and the second still pictures. The operations may further include determining that a subset of the first still picture is sufficiently similar to a subset of the second still picture to indicate an overlapping field of view between the two still pictures. The operations may further include generating a first multi-directional still picture to include the first and the second still pictures, the first and the second still pictures depicting a first and a second differently directed views from a first location of a represented object.

In certain aspects, the disclosure relates to a method comprising: receiving a plurality of still pictures. The method may further include comparing at least one subset of a first still picture and at least one subset of a second still picture, the compared subsets being near opposite edges of the first and the second still pictures. The method may further include determining that a subset of the first still picture is sufficiently similar to a subset of the second still picture to indicate an overlapping field of view between the two still pictures. The method may further include generating a first multi-directional still picture to include the first and the second still pictures, the first and the second still pictures depicting a first and a second differently directed views from a first location of a represented object.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the non-transitory computer storage medium and/or the method further comprise: comparing at least one subset of the first still picture and at least one subset of a third still picture, the compared subsets being near opposite edges of the first and the third still pictures; determining that a subset of the first still picture is sufficiently similar to a subset of the third still picture to indicate an overlapping field of view between the two still pictures; and adding the third still picture to the first multi-directional still picture, the third still picture depicting a third differently directed view from the first location of the represented object.

In some aspects, the disclosure relates to a system for detecting links among multi-directional still pictures. The system may operate on one or more computing devices. In some embodiments, the system comprises a processor circuit that is coupled to a memory unit. The system may further include an interface, coupled to the processor circuit, for receiving a plurality of multi-directional still pictures each multi-directional still picture associated with a different location of a represented object and including one or more differently directed still pictures from the location. The processor may be configured to incrementally resize a first still picture of the first multi-directional still picture. The processor may be further configured to compare at least one subset of a first still picture of a second multi-directional still picture with at least one subset of the incrementally resized first still picture of the first multi-directional still picture. The processor may be further configured to determine that a subset of the first still picture of the second multi-directional still picture is sufficiently similar to a subset of the incrementally resized first still picture of the first multi-directional still picture to indicate a line of sight. The processor may be further configured to add a link with the second multi-directional still picture to the first multi-directional still picture, and add a link with the first multi-directional still picture to the second multi-directional still picture.

In some embodiments, the comparing the at least one subset of the first still picture of the second multi-directional still picture with at least one subset of the incrementally resized first still picture of the first multi-directional still picture, and determining that a subset of the first still picture of the second multi-directional still picture is sufficiently similar to a subset of the incrementally resized first still picture of the first multi-directional still picture to indicate a line of sight is performed by a comparator, wherein the comparator is part of, operating on, or coupled to the processor circuit. In further embodiments, the adding the link with the second multi-directional still picture to the first multi-directional still picture, and adding the link with the first multi-directional still picture to the second multi-directional still picture is performed by an assembler, wherein the assembler is part of, operating on, or coupled to the processor circuit. In further embodiments, the first and the second multi-directional still pictures are stored in the memory unit, wherein the processor circuit reads the first and the second multi-directional still pictures from the memory unit.

In certain embodiments, the incrementally resizing the first still picture of the first multi-directional still picture includes proportionally resizing the first still picture of the first multi-directional still picture to a next smaller size. In further embodiments, the incrementally resizing the first still picture of the first multi-directional still picture includes resizing the first still picture of the first multi-directional still picture by one pixel in a length or a width keeping an aspect ratio constant. In further embodiments, the determining that a subset of the first still picture of the second multi-directional still picture is sufficiently similar to a subset of the incrementally resized first still picture of the first multi-directional still picture includes determining a sufficient similarity among all but a threshold number of pixels from the subset of the incrementally resized first still picture of the first multi-directional still picture and the subset of the first still picture of the second multi-directional still picture. The sufficient similarity among all but a threshold number of pixels from the subset of the incrementally resized first still picture of the first multi-directional still picture and the subset of the first still picture of the second multi-directional still picture may include determining that a difference between each compared pixel does not exceed a threshold for the highest allowed difference.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional still pictures each multi-directional still picture associated with a different location of a represented object and including one or more differently directed still pictures from the location. The operations may further include incrementally resizing a first still picture of the first multi-directional still picture. The operations may further include comparing at least one subset of a first still picture of a second multi-directional still picture with at least one subset of the incrementally resized first still picture of the first multi-directional still picture. The operations may further include determining that a subset of the first still picture of the second multi-directional still picture is sufficiently similar to a subset of the incrementally resized first still picture of the first multi-directional still picture to indicate a line of sight. The operations may further include adding a link with the second multi-directional still picture to the first multi-directional still picture and adding a link with the first multi-directional still picture to the second multi-directional still picture.

In certain aspects, the disclosure relates to a method comprising: receiving a plurality of multi-directional still pictures each multi-directional still picture associated with a different location of a represented object and including one or more differently directed still pictures from the location. The method may further include incrementally resizing a first still picture of the first multi-directional still picture. The method may further include comparing at least one subset of a first still picture of a second multi-directional still picture with at least one subset of the incrementally resized first still picture of the first multi-directional still picture. The method may further include determining that a subset of the first still picture of the second multi-directional still picture is sufficiently similar to a subset of the incrementally resized first still picture of the first multi-directional still picture to indicate a line of sight. The method may further include adding a link with the second multi-directional still picture to the first multi-directional still picture and adding a link with the first multi-directional still picture to the second multi-directional still picture.

The operations or steps of the non-transitory computer storage medium and/or the method may be performed by any of the elements of the above described system as applicable. The non-transitory computer storage medium and/or the method may include any of the operations, steps, and embodiments of the above described system as applicable.

In some aspects, the disclosure relates to a system for interpreting still pictures. The system may operate on one or more computing devices. In some embodiments, the system comprises a processor circuit that is coupled to a memory unit. The system may further include an interface, coupled to the processor circuit, for: receiving a plurality of multi-directional still pictures each multi-directional still picture associated with a different location of a represented object and including one or more differently directed still pictures from the location, and receiving a plurality of interpretive still pictures each interpretive still picture associated with an interpretive information on its content. The processor may be configured to compare at least one subset of a first still picture of a first multi-directional still picture with at least one subset of a first interpretive still picture. The processor may be further configured to determine that a subset of the first still picture of the first multi-directional still picture is sufficiently similar to a subset of the first interpretive still picture. The processor may be further configured to add the interpretive information on the content of the first interpretive still picture to the first multi-directional still picture.

In certain embodiments, the comparing the at least one subset of the first still picture of the first multi-directional still picture with the at least one subset of the first interpretive still picture, and the determining that a subset of the first still picture of the first multi-directional still picture is sufficiently similar to a subset of the first interpretive still picture is performed by a comparator, wherein the comparator is part of, operating on, or coupled to the processor circuit. In further embodiments, the adding the interpretive information on the content of the first interpretive still picture to the first multi-directional still picture is performed by an assembler, wherein the assembler is part of, operating on, or coupled to the processor circuit. In further embodiments, the first multi-directional still picture and the first interpretive still picture are stored in the memory unit, wherein the processor circuit reads the first multi-directional still picture and the first interpretive still picture from the memory unit. In further embodiments, the interface includes at least one of: a direct connection, an operative connection, a wired connection, a wireless connection, a device, a network, a bus, a circuit, a firmware, a driver, or a program.

In some embodiments, the plurality of interpretive still pictures includes at least one of: a publically available repository of pictures, a privately held repository of pictures, a repository of pictures available to members of a picture sharing service, or a repository of pictures available to members of a social medium. In further embodiments, the interpretive still picture associated with the interpretive information on its content includes an interpretive still picture comprising the interpretive information on its content. In further embodiments, the content of the first interpretive still picture includes an object, a person, or a place depicted in the first interpretive still picture. In further embodiments, the interpretive information includes interpretive information created by a creator of the first interpretive still picture or by an optical device that captured the first interpretive still picture. The optical device that captured the first interpretive still picture may include at least one of: a digital camera, a GPS enabled camera, or a video camera.

In certain embodiments, the interpretive information associated with the first interpretive still picture includes at least one of: an identifying information, a descriptive information, an associative information, a metadata, a time information, a location information, or a referential information. The identifying information may include an identifier of an object, a person, or a place depicted in the first interpretive still picture. The descriptive information may include a descriptor of an object, a person, or a place depicted in the first interpretive still picture. The associative information may include at least one of: an identifier, a descriptor, or a reference to a resource comprising similar content to the content of the first interpretive still picture. The metadata may include at least one of: a resolution, a format, a size, a time of creation, or a date of creation of the first interpretive still picture. The time information may include an age of an object, a person, or a place depicted in the first interpretive still picture. The location information may include a coordinate, an address, or an information that can define a location of an object, person, or place depicted in the first interpretive still picture. The referential information may include a reference to at least one of: a content, a resource, a system, an application, or a process comprising information on an object, person, or place depicted in the first interpretive still picture.

In some embodiments, the determining that a subset of the first still picture of the first multi-directional still picture is sufficiently similar to a subset of the first interpretive still picture includes determining a sufficient similarity among all but a threshold number of pixels from the subset of the first interpretive still picture and the subset of the first still picture of the first multi-directional still picture. The sufficient similarity among all but a threshold number of pixels from the subset of the first interpretive still picture and the subset of the first still picture of the first multi-directional still picture may include determining that a difference between each compared pixel does not exceed a threshold for the highest allowed difference.

In certain embodiments, the determining that a subset of the first still picture of the first multi-directional still picture is sufficiently similar to a subset of the first interpretive still picture includes an optical character recognition (OCR), the OCR for determining that a subset of the first still picture of the first multi-directional still picture comprising a textual shape is sufficiently similar to a subset of the first interpretive still picture comprising the textual shape. In further embodiments, the determining that a subset of the first still picture of the first multi-directional still picture is sufficiently similar to a subset of the first interpretive still picture includes a facial recognition, the facial recognition for determining that a subset of the first still picture of the first multi-directional still picture comprising a facial feature is sufficiently similar to a subset of the first interpretive still picture comprising the facial feature. In further embodiments, the determining that a subset of the first still picture of the first multi-directional still picture is sufficiently similar to a subset of the first interpretive still picture includes an object recognition, the object recognition for determining that a subset of the first still picture of the first multi-directional still picture comprising an object is sufficiently similar to a subset of the first interpretive still picture comprising the object.

In some embodiments, the adding the interpretive information on the content of the first interpretive still picture to the first multi-directional still picture includes associating the interpretive information on the content of the first interpretive still picture with the first multi-directional still picture. In further embodiments, the adding the interpretive information on the content of the first interpretive still picture to the first multi-directional still picture includes associating the interpretive information on the content of the first interpretive still picture with the first still picture of the first multi-directional still picture. In further embodiments, the adding the interpretive information on the content of the first interpretive still picture to the first multi-directional still picture includes adding a link comprising the interpretive information on the content of the first interpretive still picture to the first multi-directional still picture.

In certain embodiments, the system further comprises: an input device, coupled to the processor circuit, for receiving a user's selection to add an additional interpretive information to the first multi-directional still picture, wherein the processor circuit is further configured to add the additional interpretive information to the first multi-directional still picture. The adding the additional interpretive information to the first multi-directional still picture is performed by an assembler, wherein the assembler is part of, operating on, or coupled to the processor circuit.

In some embodiments, the system further comprises: an input device, coupled to the processor circuit, for receiving a user's selection to modify the interpretive information of the first multi-directional still picture, wherein the processor circuit is further configured to modify the interpretive information of the first multi-directional still picture. The modifying the interpretive information of the first multi-directional still picture is performed by an assembler, wherein the assembler is part of, operating on, or coupled to the processor circuit.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional still pictures each multi-directional still picture associated with a different location of a represented object and including one or more differently directed still pictures from the location. The operations may further include receiving a plurality of interpretive still pictures each interpretive still picture associated with an interpretive information on its content. The operations may further include comparing at least one subset of a first still picture of a first multi-directional still picture with at least one subset of a first interpretive still picture. The operations may further include determining that a subset of the first still picture of the first multi-directional still picture is sufficiently similar to a subset of the first interpretive still picture. The operations may further include adding the interpretive information on the content of the first interpretive still picture to the first multi-directional still picture.

In some aspects, the disclosure relates to a method comprising: receiving a plurality of multi-directional still pictures each multi-directional still picture associated with a different location of a represented object and including one or more differently directed still pictures from the location. The method may further include receiving a plurality of interpretive still pictures each interpretive still picture associated with an interpretive information on its content. The method may further include comparing at least one subset of a first still picture of a first multi-directional still picture with at least one subset of a first interpretive still picture. The method may further include determining that a subset of the first still picture of the first multi-directional still picture is sufficiently similar to a subset of the first interpretive still picture. The method may further include adding the interpretive information on the content of the first interpretive still picture to the first multi-directional still picture.

The operations or steps of the non-transitory computer storage medium and/or the method may be performed by any of the elements of the above described system as applicable. The non-transitory computer storage medium and/or the method may include any of the operations, steps, and embodiments of the above described system as applicable as well as the following embodiments.

In certain embodiments, the content of the first interpretive still picture includes an object, a person, or a place depicted in the first interpretive still picture. In further embodiments, the interpretive still picture associated with the interpretive information on its content includes an interpretive still picture comprising the interpretive information on its content. In further embodiments, the plurality of interpretive still pictures includes at least one of: a publically available repository of pictures, a privately held repository of pictures, a repository of pictures available to members of a picture sharing service, or a repository of pictures available to members of a social medium. In further embodiments, the interpretive information includes interpretive information created by a creator of the first interpretive still picture or by an optical device that captured the first interpretive still picture. The optical device that captured the first interpretive still picture may include at least one of: a digital camera, a GPS enabled camera, or a video camera.

In some embodiments, the interpretive information associated with the first interpretive still picture includes at least one of: an identifying information, a descriptive information, an associative information, a metadata, a time information, a location information, or a referential information. The identifying information may include an identifier of an object, a person, or a place depicted in the first interpretive still picture. The descriptive information may include a descriptor of an object, a person, or a place depicted in the first interpretive still picture. The associative information may include at least one of: an identifier, a descriptor, or a reference to a resource comprising similar content to the content of the first interpretive still picture. The metadata may include at least one of: a resolution, a format, a size, a time of creation, or a date of creation of the first interpretive still picture. The time information may include an age of an object, a person, or a place depicted in the first interpretive still picture. The location information may include a coordinate, an address, or an information that can define a location of an object, person, or place depicted in the first interpretive still picture. The referential information may include a reference to at least one of: a content, a resource, a system, an application, or a process comprising information on an object, a person, or a place depicted in the first interpretive still picture.

In certain embodiments, the determining that a subset of the first still picture of the first multi-directional still picture is sufficiently similar to a subset of the first interpretive still picture includes determining a sufficient similarity among all but a threshold number of pixels from the subset of the first interpretive still picture and the subset of the first still picture of the first multi-directional still picture. The sufficient similarity among all but a threshold number of pixels from the subset of the first interpretive still picture and the subset of the first still picture of the first multi-directional still picture may include determining that a difference between each compared pixel does not exceed a threshold for the highest allowed difference.

In some embodiments, the determining that a subset of the first still picture of the first multi-directional still picture is sufficiently similar to a subset of the first interpretive still picture includes an optical character recognition (OCR), the OCR for determining that a subset of the first still picture of the first multi-directional still picture comprising a textual shape is sufficiently similar to a subset of the first interpretive still picture comprising the textual shape. In further embodiments, the determining that a subset of the first still picture of the first multi-directional still picture is sufficiently similar to a subset of the first interpretive still picture includes a facial recognition, the facial recognition for determining that a subset of the first still picture of the first multi-directional still picture comprising a facial feature is sufficiently similar to a subset of the first interpretive still picture comprising the facial feature. In further embodiments, the determining that a subset of the first still picture of the first multi-directional still picture is sufficiently similar to a subset of the first interpretive still picture includes an object recognition, the object recognition for determining that a subset of the first still picture of the first multi-directional still picture comprising an object is sufficiently similar to a subset of the first interpretive still picture comprising the object.

In certain embodiments, the adding the interpretive information on the content of the first interpretive still picture to the first multi-directional still picture includes associating the interpretive information on the content of the first interpretive still picture with the first multi-directional still picture. In further embodiments, the adding the interpretive information on the content of the first interpretive still picture to the first multi-directional still picture includes associating the interpretive information on the content of the first interpretive still picture with the first still picture of the first multi-directional still picture. In further embodiments, the adding the interpretive information on the content of the first interpretive still picture to the first multi-directional still picture includes adding a link comprising the interpretive information on the content of the first interpretive still picture to the first multi-directional still picture.

In some embodiments, the non-transitory computer storage medium and/or the method further comprise: receiving a user's selection to add an additional interpretive information to the first multi-directional still picture; and adding the additional interpretive information to the first multi-directional still picture. In further embodiments, the non-transitory computer storage medium and/or the method further comprise: receiving a user's selection to modify the interpretive information of the first multi-directional still picture; and modifying the interpretive information of the first multi-directional still picture.

In some aspects, the disclosure relates to a system for creating links among multi-directional still pictures. The system may operate on one or more computing devices. In some embodiments, the system comprises a processor circuit that is coupled to a memory unit. The system may further include an interface, coupled to the processor circuit, for: receiving a plurality of multi-directional still pictures each multi-directional still picture associated with a different location of a represented object, and including the location information and one or more differently directed still pictures from the location. The processor may be configured to compute a proximity and an angle between a first and a second multi-directional still pictures using the location information of the first and the second multi-directional still pictures. The processor may be further configured to determine that the proximity between the first and the second multi-directional still pictures falls between a minimum and a maximum proximity thresholds, and that the angle between the first and the second multi-directional still pictures falls between a minimum and a maximum angle thresholds. The processor may be further configured to add a link with the second multi-directional still picture to the first multi-directional still picture, and add a link with the first multi-directional still picture to the second multi-directional still picture.

In some embodiments, the adding the link with the second multi-directional still picture to the first multi-directional still picture, and adding the link with the first multi-directional still picture to the second multi-directional still picture is performed by an assembler, wherein the assembler is part of, operating on, or coupled to the processor circuit. In further embodiments, the first and the second multi-directional still pictures are stored in the memory unit, wherein the processor circuit reads the first and the second multi-directional still pictures from the memory unit. In further embodiments, the location information of the first multi-directional still picture includes coordinates of the first multi-directional still picture and the location information of the second multi-directional still picture includes coordinates of the second multi-directional still picture.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional still pictures each multi-directional still picture associated with a different location of a represented object, and including the location information and one or more differently directed still pictures from the location. The operations may further include computing a proximity and an angle between a first and a second multi-directional still pictures using the location information of the first and the second multi-directional still pictures. The operations may further include determining that the proximity between the first and the second multi-directional still pictures falls between a minimum and a maximum proximity thresholds, and that the angle between the first and the second multi-directional still pictures falls between a minimum and a maximum angle thresholds. The operations may further include adding a link with the second multi-directional still picture to the first multi-directional still picture; and adding a link with the first multi-directional still picture to the second multi-directional still picture.

In some aspects, the disclosure relates to a method comprising: receiving a plurality of multi-directional still pictures each multi-directional still picture associated with a different location of a represented object, and including the location information and one or more differently directed still pictures from the location. The method may further include computing a proximity and an angle between a first and a second multi-directional still pictures using the location information of the first and the second multi-directional still pictures. The method may further include determining that the proximity between the first and the second multi-directional still pictures falls between a minimum and a maximum proximity thresholds, and that the angle between the first and the second multi-directional still pictures falls between a minimum and a maximum angle thresholds. The method may further include adding a link with the second multi-directional still picture to the first multi-directional still picture; and adding a link with the first multi-directional still picture to the second multi-directional still picture.

The operations or steps of the non-transitory computer storage medium and/or the method may be performed by any of the elements of the above described system as applicable. The non-transitory computer storage medium and/or the method may include any of the operations, steps, and embodiments of the above described system as applicable.

In some aspects, the disclosure relates to a system for associating a multi-directional still picture using location information. The system may operate on one or more computing devices. In some embodiments, the system comprises a processor circuit that is coupled to a memory unit. The system may further include an interface, coupled to the processor circuit, for: receiving a plurality of multi-directional still pictures each multi-directional still picture including a location information on the multi-directional still picture and one or more differently directed still pictures from the location, the location information on the multi-directional still picture identifying a location with which the multi-directional still picture is associated, and receiving a plurality of objects each object including a location information on the object, the location information on the object identifying the object's location. The processor may be configured to compare the location information on a first multi-directional still picture with the location information on a first object. The processor may be further configured to determine that the location information on the first multi-directional still picture corresponds to the location information on the first object. The processor may be further configured to associate the first multi-directional still picture with the first object.

In certain embodiments, the associating the first multi-directional still picture with the first object is performed by an assembler, wherein the assembler is part of, operating on, or coupled to the processor circuit. In further embodiments, the first multi-directional still picture and the first object are stored in the memory unit, wherein the processor circuit reads the first multi-directional still picture and the first object from the memory unit.

In some embodiments, the location information on the first multi-directional still picture includes an address of the first multi-directional still picture and the location information on the first object includes an address of the first object, and wherein the comparing the location information on the first multi-directional still picture with the location information on the first object includes comparing the addresses of the first multi-directional still picture and the first object, and wherein the determining that the location information on the first multi-directional still picture corresponds to the location information on the first object includes determining that the addresses of the first multi-directional still picture and the first object are same or similar, in further embodiments, the location information on the first multi-directional still picture includes coordinates of the first multi-directional still picture and the location information on the first object includes coordinates of the first object, and wherein the comparing the location information on the first multi-directional still picture with the location information on the first object includes computing a proximity between the first multi-directional still picture and the first object using the coordinates of the first multi-directional still picture and the first object, and wherein the determining that the location information on the first multi-directional still picture corresponds to the location information on the first object includes determining that the proximity between the first multi-directional still picture and the first object falls within a proximity threshold.

In certain embodiments, the associating the first multi-directional still picture with the first object includes adding a link with the first object to the first multi-directional still picture. In further embodiments, the first object includes an interpretive information on the first object, and wherein the associating the first multi-directional still picture with the first object includes adding the interpretive information on the first object to the first multi-directional still picture.

In some aspects, the disclosure relates to a non-transitory computer storage medium having a computer program stored thereon, the program comprising instructions that when executed by one or more computing devices cause the one or more computing devices to perform operations comprising: receiving a plurality of multi-directional still pictures each multi-directional still picture including a location information on the multi-directional still picture and one or more differently directed still pictures from the location, the location information on the multi-directional still picture identifying a location with which the multi-directional still picture is associated. The operations may further include receiving a plurality of objects each object including a location information on the object, the location information on the object identifying the object's location. The operations may further include comparing the location information on a first multi-directional still picture with the location information on a first object. The operations may further include determining that the location information on the first multi-directional still picture corresponds to the location information on the first object. The operations may further include associating the first multi-directional still picture with the first object.

In certain aspects, the disclosure relates to a method comprising: receiving a plurality of multi-directional still pictures each multi-directional still picture including a location information on the multi-directional still picture and one or more differently directed still pictures from the location, the location information on the multi-directional still picture identifying a location with which the multi-directional still picture is associated. The method may further include receiving a plurality of objects each object including a location information on the object, the location information on the object identifying the object's location. The method may further include comparing the location information on a first multi-directional still picture with the location information on a first object. The method may further include determining that the location information on the first multi-directional still picture corresponds to the location information on the first object. The method may further include associating the first multi-directional still picture with the first object.

The operations or steps of the non-transitory computer storage medium and/or the method may be performed by any of the elements of the above described system as applicable. The non-transitory computer storage medium and/or the method may include any of the operations, steps, and embodiments of the above described system as applicable.

Other features and advantages of the disclosure will become apparent from the following description, including the claims and drawings.

Figure 1:
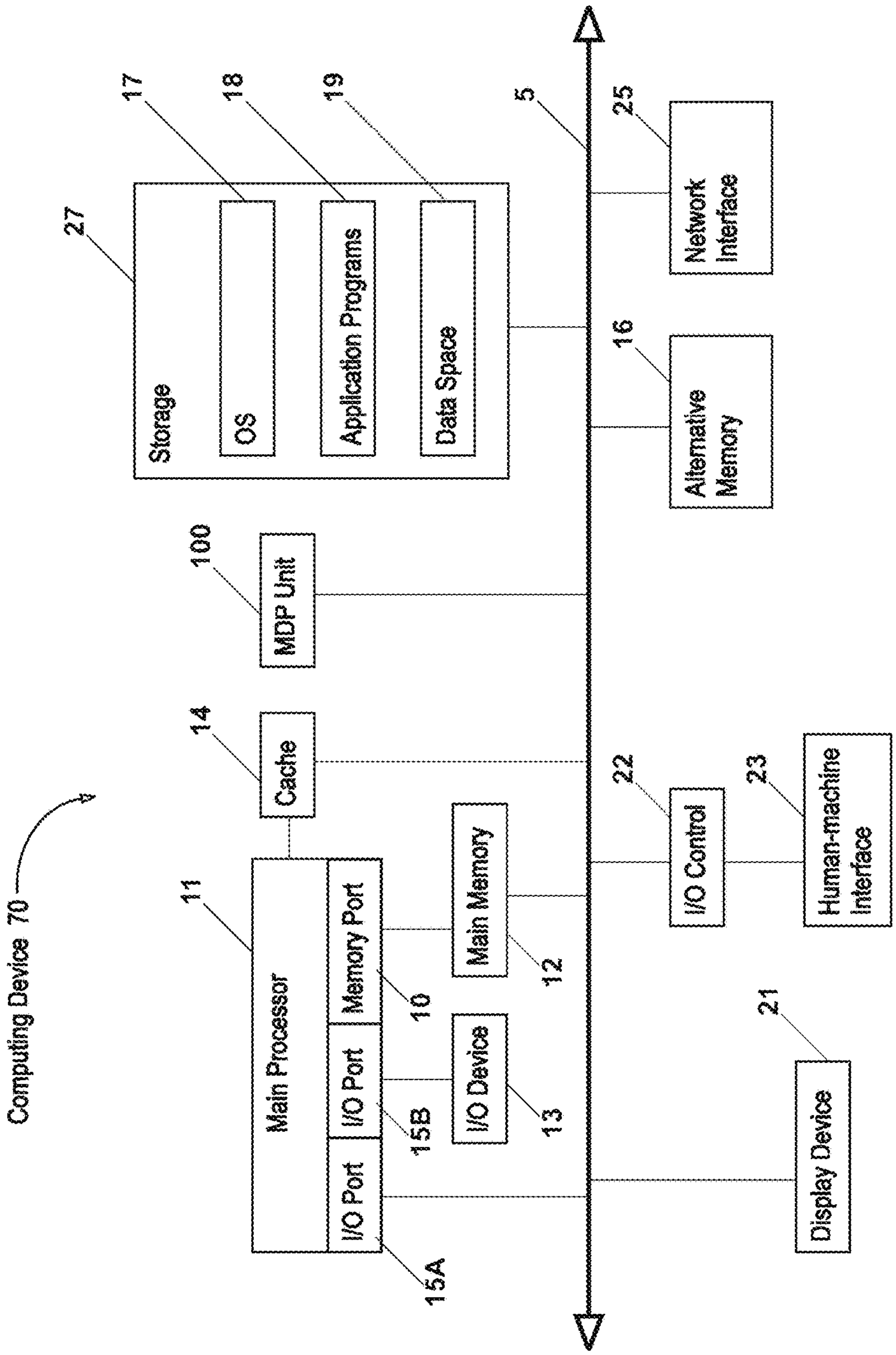
FIG. 1 illustrates a block diagram of an embodiment of Computing Device 70 that may provide processing capabilities used in some of the disclosed optical devices, apparatuses, systems, and/or methods.

Like reference numerals in different figures indicate like elements. Horizontal or vertical " . . . " or other such indicia may be used to indicate additional instances of the same type of element, n, m, n+m, n−m or other such indicia may represent integers or other sequential numbers that follow the sequence where they are indicated. Any of these or other such indicia may be used interchangeably according to the context and space available. The drawings are not necessarily to scale, with emphasis instead being placed upon illustrating the embodiments, principles, and concepts of the disclosure. A line or arrow between any of the disclosed elements comprises an interface that enables the coupling, connection, and/or interaction between the elements.

DETAILED DESCRIPTION

The disclosed optical devices and apparatuses for capturing, structuring, and using interlinked multi-directional still pictures and/or multi-directional motion pictures as well as the related systems and methods may include features, functionalities, embodiments, and applications of still and/or motion pictures for advanced representation of objects. The disclosed optical devices, apparatuses, systems, and/or methods, any of their elements, any of their embodiments, or a combination thereof may generally be referred to as MDP Unit 100, MDP application, or other similar name or reference.

Referring now to FIG. 1, an embodiment is illustrated of Computing Device 70 that may provide processing capabilities used in some of the embodiments of the forthcoming disclosure. Later described optical devices and apparatuses, in combination with processing capabilities of Computing Device 70, provide the functionalities for capturing, structuring, and using interlinked multi-directional still pictures and/or multi-directional motion pictures. Various embodiments of the disclosed optical devices, apparatuses, systems, and/or methods include hardware, functions, logic, programs, and/or a combination thereof that may be provided or implemented on any type or form of computing or other device such as an optical device, a digital camera, a mobile device, a computer, a computing capable telephone, a server, a gaming device, a television device, a GPS receiver, a media player, an embedded device, a supercomputer, or any other type or form of optical or computing device capable of performing the operations described herein.

Computing Device 70 comprises hardware, processing techniques or capabilities, programs, or a combination thereof. Computing device 70 includes a central processing unit, which may also be referred to as main processor 11. Main processor 11 includes one or more memory ports 10 and/or one or more input-output ports, also referred to as I/O ports 15, such as I/O ports 15A and 15B. Main processor 11 may be special or general purpose. Computing Device 70 may further include a memory, also referred to as main memory 12, which may be connected to the remainder of the components of Computing Device 70 via bus 5. Memory 12 may be connected to main processor 11 via memory port 10. Computing Device 70 may also include display device 21 such as a monitor, projector, glasses, and/or other display device. Computing Device 70 may also include human-machine interface 23 such as a keyboard, a pointing device, a mouse, a touchscreen, a joystick, and/or other input device that may be connected with the remainder of the Computing Device 70 components via I/O control 22. In some implementations, human-machine interface 23 can be directly connected with bus 5 or specific components of Computing Device 70. Computing Device 70 may include additional optional elements, such as one or more input/output devices 13. Main processor 11 may include or be interfaced with cache memory 14. Storage 27 may include memory, which provides an operating system, also referred to as OS 17, additional application programs 18 operating on OS 17, and/or data space 19 in which additional data or information can be stored. Alternative memory device 16 may be connected to the remaining components of Computing Device 70 via bus 5. Network interface 25 may also be connected with bus 5 and be used to communicate with external computing devices via an external network. Some or all described elements of Computing Device 70 can be directly or operatively connected or coupled with each other or with other additional elements as depicted in FIG. 1 or using any other connection means known in art in alternate implementations.

Main processor 11 includes any logic circuitry that can respond to and process instructions fetched from main memory unit 12 or other element. Main processor 11 may also include any combination of hardware and/or processing techniques or capabilities for implementing and executing logic functions or programs. Main processor 11 may include a single core or a multi core processor. Main processor 11 may include any functionality for loading operating system 17 and operating any application programs 18 thereon. In some embodiments, the central processing unit may be provided by a microprocessing or a processing unit, such as, for example, Snapdragon processors produced by Qualcomm Inc., processors by Intel Corporation of Mountain View, Calif., those manufactured by Motorola Corporation of Schaumburg, Ill.; those manufactured by Transmeta Corporation of Santa Clara, Calif.; the RS/6000 processor, those manufactured by international Business Machines of White Plains, N.Y.; those manufactured by Advanced Micro Devices of Sunnyvale, Calif., or any computing unit for performing similar functions. Computing Device 70 may be based on any of these processors, or any other processor capable of operating as described herein, whether on a mobile or embedded device, or a more conventional machine.

Memory 12 includes one or more memory chips capable of storing data and allowing any storage location to be accessed by microprocessor 11, such as Static random access memory (SRAM), Flash memory, Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). Memory 12 may be based on any of the above described memory chips, or any other available memory chips capable of operating as described herein. In some embodiments, main processor 11 can communicate with memory 12 via a system bus 5. In other embodiments, main processor 11 can communicate directly with main memory 12 via a memory port 10.

Main processor 11 can communicate directly with cache memory 14 via a connection means such as a secondary bus which may also sometimes be referred to as a backside bus. In some embodiments, main processor 11 can communicate with cache memory 14 using the system bus 5. Memory 12, I/O device 13, and/or other components of Computing Device 70 may be connected with any other components via similar secondary bus, depending on design, Cache memory 14, however, may typically have a faster response time than main memory 12 and can include a type of memory which is considered faster than main memory 12, such as for example SRAM, BSRAM, or EDRAM. Cache memory includes any structure such as multilevel caches, for example. In some embodiments, main processor 11 can communicate with one or more I/O devices 13 via a system bus 5. Various busses can be used to connect main processor 11 to any of the I/O devices 13, such as a VESA VL bus, an ISA bus, an EISA bus, a MicroChannel Architecture (MCA) bus, a PCI bus, a PCI-X bus, a PCI-Express bus, or a NuBus. In some embodiments, main processor 11 can communicate directly with I/O device 13 via HyperTransport, Rapid I/O, or InfiniBand. In further embodiments, local busses and direct communication may be mixed. For example, main processor 11 can communicate with an I/O device 13 using a local interconnect bus while communicating with another I/O device 13 directly. Similar configurations can be used for any other components described herein.

Computing Device 70 may further include alternative memory such as a SD memory slot, a USB memory stick, an optical drive such as a CD-ROM drive, a CD-R/RW drive, a DVD-ROM drive or a BlueRay disc, a hard-drive, and/or any other device comprising non-volatile memory suitable for storing data or installing application programs. Computing device 70 may further include a storage device 27 comprising any type or form of non-volatile memory for storing an operating system (OS) such as any type or form of Windows OS, Mac OS, Unix OS, Linux OS, Android OS, iPhone OS, mobile version of Windows OS, an embedded OS, or any other OS that can operate on Computing Device 70, Computing Device 70 may also include application programs 18, and/or data space 19 for storing additional data or information. In some embodiments, alternative memory 16 can be used as or similar to storage device 27. Additionally, OS 17 and/or application programs 18 may be run from a bootable medium, such as for example, a flash drive, a micro SD card, a bootable CD for GNU/Linux that is available as a GNU/Linux distribution from knoppix.net, and/or other bootable medium.

Application Program 18 (also referred to as program, computer program, application, script, code, etc.) comprises instructions that can provide functionality when executed by processor 11. Application program 18 can be implemented in a high-level procedural or object-oriented programming language, or in a low-level machine or assembly language. Any language used may be a compiled, interpreted, or otherwise translated language. Application program 18 can be deployed in any form including as a stand-alone program or as a module, component, subroutine, or other unit suitable for use in a computing system. Application program 18 does not necessarily correspond to a file in a file system. A program can be stored in a portion of a file that may hold other programs or data, in a single file dedicated to the program, or in multiple files (i.e. files that store one or more modules, sub programs, or portions of code, etc.). Application program 18 can be deployed to be executed on one computer or on multiple computers (i.e. cloud, distributed, or parallel computing, etc.), or at one site or distributed across multiple sites interconnected by a communication network.

Network interface 25 can be utilized for interfacing Computing Device 70 with other devices via a communication network through a variety of connections including standard telephone lines, wired or wireless connections, LAN or WAN links (i.e. 802.11, T1, T3, 56 kb, X.25, etc.), broadband connections (i.e. ISDN, Frame Relay, ATM, etc.), or a combination thereof. Examples of communication networks include the Internet, an intranet, an extranet, a local area network (LAN), a wide area network (WAN), a personal area network (PAN), a home area network (HAN), a campus area network (CAN), a metropolitan area network (MAN), a global area network (GAN), a storage area network (SAN), virtual network, a virtual private network (VPN), Bluetooth network, a wireless network, a wireless LAN, a radio network, a HomePNA, a power line communication network, a G.hn network, an optical fiber network, an Ethernet network, an active networking network, a client-server network, a peer-to-peer network, a bus network, a star network, a ring network, a mesh network, a star-bus network, a tree network, a hierarchical topology network, and/or other networks known in art. Network interface 25 comprises Bluetooth or WiFi capability. Network interface 25 may include a built-in network adapter, network interface card, PCMCIA network card, card bus network adapter, wireless network adapter, Bluetooth adapter, USB network adapter, modem, and/or any other device suitable for interfacing Computing Device 70 with any type of network capable of communication and/or operations described herein.

Still referring to FIG. 1, I/O devices 13 may be present in various shapes or forms in Computing Device 70. Examples of an input device include a joystick, a keyboard, a mouse, a trackpad, a trackpoint, a touchscreen, a trackball, a microphone, a drawing tablet, a glove, a tactile input device, a video camera, and/or other input device. Examples of an output device include a video display, a touchscreen, a projector, a glasses, a speaker, a tactile output device, and/or other output device. Examples of a device capable of input and output include a disk drive, an optical storage device, a modem, a network card, and/or other output device. I/O devices 13 may be controlled by I/O control 22 in some implementations. I/O control 22 may control one or more I/O devices such as human-machine interface 23 (i.e. keyboard, pointing device, touchscreen, joystick, mouse, optical pen, etc.). I/O control 22 enables any type or form of a detecting device such as a video camera or microphone to be interfaced with other components of Computing Device 70, Furthermore, I/O device 13 may also provide storage such as or similar to storage 27, and/or alternative memory such as or similar to alternative memory 16 in some implementations. In some embodiments, Computing Device 70 may receive handheld USB storage devices such as, for example, USB flash drive line of devices manufactured by Twintech Industry, Inc. of Los Alamitos, Calif.

Output interfaces such as a graphical user interface, an acoustical output interface, a tactile output interface, any device driver (i.e. audio, video, or other driver), and/or other output interface or system can be utilized to process output from Computing Device 70 elements for conveyance on an output device such as Display 21. In some aspects, Display 21 or other output device itself may include an output interface for processing output from Computing Device 70 elements. Further, input interfaces such as a keyboard listener, a keypad listener, a touchscreen listener, a mouse listener, a trackball listener, any device driver (i.e. audio, video, keyboard, mouse, touchscreen, or other driver), a speech recognizes, a video interpreter, and/or other input interface or system can be utilized to process input from Human-machine Interface 23 or other input device for use by Computing Device 70 elements. In some aspects, Human-machine Interface 23 or other input device itself may include an input interface for processing input for use by Computing Device 70 elements.

Computing Device 70 may include or be connected to multiple display devices 21. Display devices 21 can each be of the same or different type or form. Computing Device 70 and/or its elements comprise any type or form of suitable hardware, programs, or a combination thereof to support, enable, or provide for the connection and use of multiple display devices 21 or multiple detection devices. In one example, Computing Device 70 includes any type or form of video adapter, video card, driver, and/or library to interface, communicate, connect, or otherwise use display devices 21. In some aspects, a video adapter includes multiple connectors to interface to multiple display devices 21. In other aspects, Computing Device 70 includes multiple video adapters, with each video adapter connected to one or more display devices 21. In some embodiments, any portion of Computing Device's 70 operating system may be configured for using multiple displays 21. In other embodiments, one or more display devices 21 may be provided by one or more other computing devices such as remote computing devices connected to Computing Device 70 via a network. In some aspects, main processor 11 may use an Advanced Graphics Port (AGP) to communicate with one or more display devices 21.

In some embodiments, I/O device 13 may be a bridge between system bus 5 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, and/or other bus.

Computing Device 70 can operate under the control of an operating system 17, which may support Computing Device's 70 basic functions, interface with and manage hardware resources, interface with and manage peripherals, provide common services for application programs, schedule tasks, and/or perform other functionalities. A modern operating system enables features and functionalities such as a high resolution display, graphical user interface (GUI), touchscreen, cellular network connectivity (i.e. mobile operating system, etc.), Bluetooth connectivity, WiFi connectivity, global positioning system (GPS) capabilities, mobile navigation, microphone, speaker, still picture camera, video camera, voice recorder, speech recognition, music player, video player, near field communication, personal digital assistant (PDA), and/or other features, functionalities, or applications. For example, Computing Device 70 may use any conventional operating system, any embedded operating system, any real-time operating system, any open source operating system, any video gaming operating system, any proprietary operating system, any online operating system, any operating system for mobile computing devices, or any other operating system capable of running on Computing Device 70 and performing operations described herein. Typical operating systems include: Windows XP, Windows 7, Windows 8, etc. manufactured by Microsoft Corporation of Redmond, Wash.; Mac OS, iPhone OS, etc. manufactured by Apple Computer of Cupertino, Calif.; OS/2 manufactured by International Business Machines of Armonk, N.Y.; Linux, a freely-available operating system distributed by Caldera Corp, of Salt Lake City, Utah; or any type or form of a Unix operating system, among others. Similarly, any operating systems such as the ones for Android devices can be utilized, just as those of Microsoft or Apple.

Computing Device 70 can be implemented as or be a part of various different model architectures such as web services, distributed computing, grid computing, cloud computing, and/or other architectures or environments. For example, in addition to the traditional desktop, server, or mobile operating system architectures, a cloud-based operating system can be utilized to provide the structure on which embodiments of the disclosure may be implemented. Other aspects of Computing Device 70 can also be implemented in the cloud without departing from the spirit and scope of the disclosure. For example, memory, storage, processing elements, and/or other elements can be hosted in the cloud. In some embodiments, Computing Device 70 can be implemented on multiple devices. For example, a portion of Computing Device 70 can be implemented on a mobile device and another portion can be implemented on wearable electronics.

Computing Device 70 may be, or include, any mobile device, a mobile phone, a smartphone (i.e. iPhone, Windows phone, Blackberry, Android phone, etc.), a tablet, a personal digital assistant (PDA), wearable electronics, implantable electronics, or another mobile device capable of implementing the functionalities described herein. In other embodiments, Computing Device 70 may be, or include, an embedded device, which can be any device or system with a dedicated function within another device or system. Embedded systems may range from the simplest ones dedicated to one task with no user interface to complex ones with advanced user interface that may resemble modern desktop computer systems. Simple embedded devices can use buttons, light emitting diodes (LEDs), graphic or character LCDs with a simple menu system. More sophisticated devices can use a graphical screen with touch sensing or screen-edge buttons where the meaning of the buttons changes with the screen. Examples of devices comprising an embedded device include a mobile telephone, a personal digital assistant (PDA), a gaming device, a media player, a digital still or video camera, a pager, a television device, a set-top box, a personal navigation device, a global positioning system (GPS) receiver, a portable storage device (i.e. a USB flash drive, etc.), a digital watch, a DVD player, a printer, a microwave oven, a washing machine, a dishwasher, a gateway, a router, a hub, an automobile entertainment system, an automobile navigation system, a refrigerator, a washing machine, a factory automation device, an assembly line device, a factory floor monitoring device, a thermostat, an automobile, a factory controller, a telephone, a network bridge, and/or other devices, An embedded device may operate under control of an operating system for embedded devices such as MicroC/OS-II, QNX, VxWorks, eCos, TinyOS, Windows Embedded, Embedded Linux, and/or other embedded device operating systems.

Computing Device 70 may include any combination of processors, operating systems, input/output devices, and/or other elements to implement the device's purpose. In one example, Computing Device 70 includes a Snapdragon by Qualcomm, Inc., or Tegra processors by nVidia, or any other mobile device processor or a microprocessor for a similar application. Computing Device 70 can be operated under the control of the Android OS, iPhone OS, Palm OS, or any other operating system for a similar purpose. Computing Device 70 may also include a stylus input device as well as a five-way navigator device. In another example, Computing Device 70 includes a Wii video game console released by Nintendo Co. operating an es operating system. I/O devices may include a video camera or an infrared camera for recording or tracking movements of a player or a participant of a Wii video game. Other I/O devices may include a joystick, a keyboard, or an RF wireless remote control device. Similarly, Computing Device 70 can be tailored to any workstation, mobile or desktop computer, laptop or notebook computer, smartphone device or tablet, server, handheld computer, gaming device, embedded device, or any other computer or computing product, or other type or form of computing or telecommunication device that has sufficient processor power and memory capacity to perform the functionalities described herein.

Various implementations of the disclosed optical devices, apparatuses, systems, and/or methods can be realized in digital electronic circuitry, integrated circuitry, specially designed application specific integrated circuits (ASICs), field programmable gate arrays (FPGAs), computer hardware, firmware, programs, virtual machines, and/or combinations thereof including their structural, logical, and/or physical equivalents.

The disclosed optical devices, apparatuses, systems, and/or methods may include clients and servers. A client and server are generally remote from each other and typically interact through a communication network. The relationship of a client and server may arise by virtue of computer programs running on the respective computers and having a client-server relationship to each other.

Computing Device 70 may include or be interfaced with a computer program product comprising computer program logic encoded on a computer-readable medium that, when performed in a computing device, programs a processor to perform the operations and/or functionalities disclosed herein. For example, a computer program can be provided or encoded on a computer-readable medium such as an optical medium (i.e. DVD-ROM, etc.), flash drive, hard drive, any memory, or other medium such as firmware or microcode in one or more ROM, RAM, or PROM chips or as an Application Specific Integrated Circuit (ASIC). Computer program can be installed onto a computing device to cause the computing device to perform the operations and/or functionalities disclosed herein. As used in this disclosure, machine-readable medium, computer-readable medium, or other such terms may refer to any computer program product, apparatus, and/or device for providing instructions and/or data to a programmable processor. As such, machine-readable medium includes any medium that can send or receive machine instructions as a machine-readable signal. The term machine-readable signal may refer to any signal used for providing instructions and/or data to a programmable processor, Examples of a machine-readable medium include a volatile and/or non-volatile medium, a removable and/or non-removable medium, a communication medium, a storage medium, and/or other medium. A communication medium, for example, may transmit computer readable instructions and/or data in a modulated data signal such as a carrier wave or other transport technique, and may include any other form of information delivery medium known in art. A non-transitory machine-readable medium comprises all machine-readable media except for a transitory, propagating signal.

The disclosed optical devices, apparatuses, systems, and/or methods can be implemented in a computing system that includes a back end component, a middleware component, a front end component, or any combination thereof. The components of the system can be interconnected by any form or medium of digital data communication such as, for example, a communication network.

Any of the described files may reside in any repository accessible by an embodiment of the disclosed optical devices, apparatuses, systems, and/or methods. In each instance where a specific file or file type is mentioned, other files, file types or formats can be substituted.

Where a reference to an element that includes or comprises another element is used herein, it should be understood that the element may be associated or in any way related to the other element, and vice versa. Therefore, terms include, comprise, or variations or synonyms thereof comprise the terms associate, relate, or variations or synonyms thereof.

Where a reference to a data structure is used herein, it should be understood that any variety of data structures can be used such as, for example, array, list, linked list, doubly linked list, queue, tree, heap, graph, map, grid, matrix, multi-dimensional matrix, table, database, DBMS, and/or any other type or form of a data structure including a custom one. A data structure may include one or more fields or data fields that are a part of or associated with the data structure. A field or data field may include a data, an object, a data structure, and/or any other element or a reference/pointer thereto. A data structure may be stored in one or more files or other repositories.

Where a reference to a repository is used herein, it should be understood that a repository may be or include one or more files or file systems, one or more storage locations or structures, one or more storage systems, one or more data structures or objects, one or more memory locations or structures, and/or other storage or data arrangements.

Where a reference to picture processing or image processing is used herein, it should be understood that picture processing or image processing may generally include changing pixels of a digital picture, resizing a digital picture, reshaping a digital picture, detecting patterns or shapes in a digital picture, comparing digital pictures or portions thereof, manipulating a digital picture or its pixels, transforming a digital picture or its pixels, and/or performing any other operation on a digital picture or a stream of digital pictures.

Where a reference to an interface is used herein, it should be understood that the interface comprises any hardware, programs, techniques, and/or other means that may enable direct or operative coupling, connection, and/or interaction between the elements where the interface is indicated. A line or arrow shown in the figures between any of the depicted elements comprises such interface. Examples of an interface include a direct connection, an operative connection, a wired connection (i.e. wire, cable, etc.), a wireless connection, a device, a network, a bus, a circuit, a firmware, a driver, a program, a combination thereof, and/or others.

Where a reference to an interface or any other element coupled or connected to a processor is used herein, it should be understood the interface or any other element may be part of or operating on the processor. Also, one of ordinary skill in art will understand that an element coupled or connected to another element may include an element in communication (i.e. wired or wireless network communication, etc.) or any other interactive relationship with another element. Furthermore, an element coupled or connected to another element may be coupled or connected to any other element in alternate implementations. Terms coupled, connected, interfaced, or other such terms may be used interchangeably herein.

Where a mention of a function, method, routine, subroutine, or other such procedure is used herein, it should be understood that the function, method, routine, subroutine, or other such procedure comprises a call, reference, or pointer to the function, method, routine, subroutine, or other such procedure.

Where a mention of data, object, data structure, item, element, or thing is used herein, it should be understood that the data, object, data structure, item, element, or thing comprises a reference or pointer to the data, object, data structure, item, element, or thing.

The term operating or operation when used casually may refer to processing, executing, or other such actions, and vice versa. Therefore, the terms operating, operation, processing, executing, or other such actions may be used interchangeably herein.

The term collection of elements may refer to plurality of elements without implying that the collection is an element itself.

Figure 2:
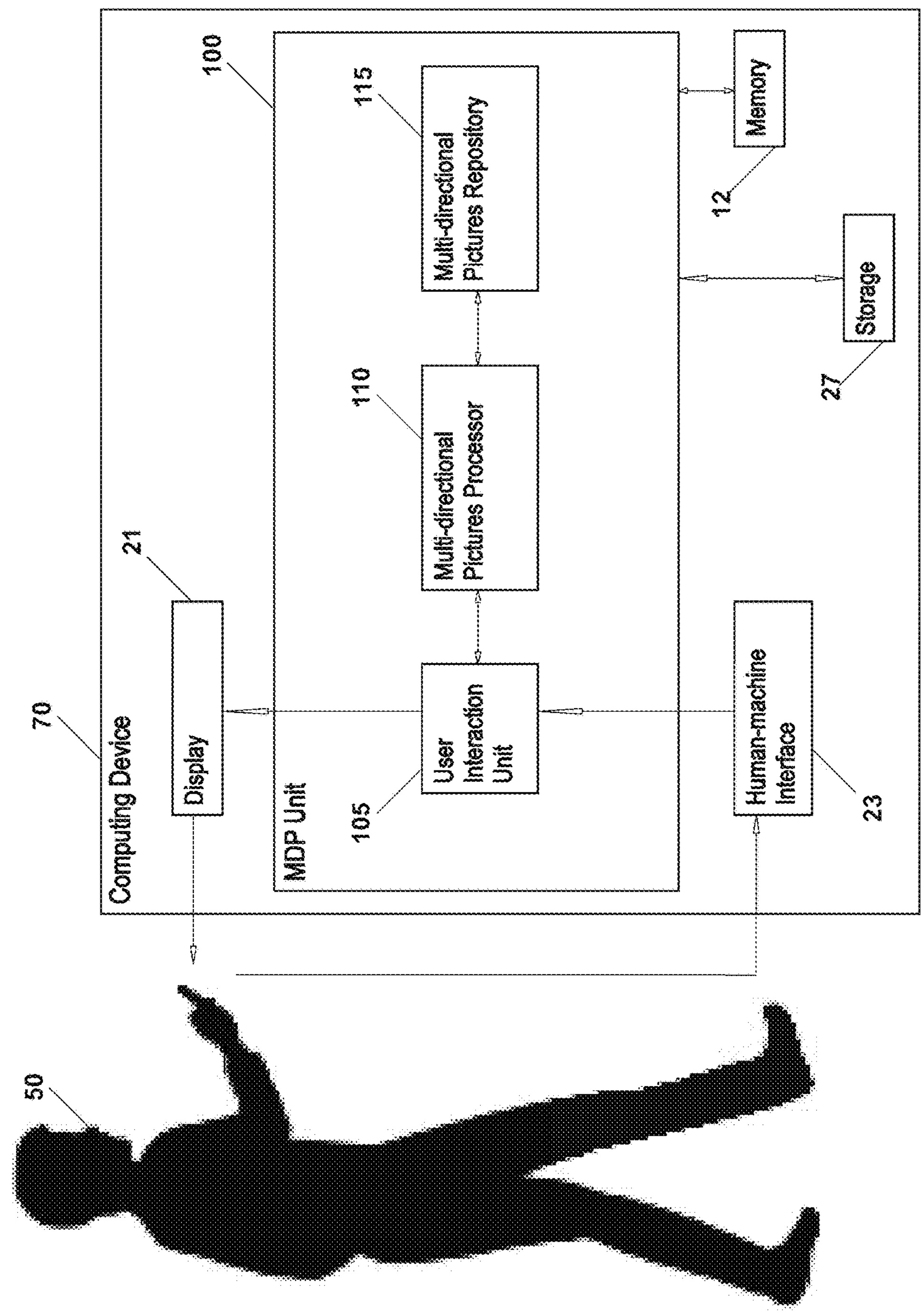
FIG. 2 shows an embodiment of MDP Unit 100 implemented on Computing Device 70.

Referring to FIG. 2, an embodiment of MDP Unit 100 implemented on Computing Device 70 is illustrated, MDP Unit 100 comprises interconnected User Interaction Unit 105, Multi-directional Pictures Processor 110, and Multi-directional Pictures Repository 115. MDP Unit 100 may be coupled with Human-machine Interface 23, Display 21, Memory 12, and Storage 27. Other additional elements may be included as needed, or some of the disclosed ones may be excluded, or a combination thereof may be utilized in alternate embodiments.

MDP Unit 100 comprises any hardware, programs, or a combination thereof. MDP Unit 100 comprises the functionality for implementing multi-directional still pictures and/or multi-directional motion pictures, and/or for other disclosed functionalities. MDP Unit 100 comprises the functionality for making, processing, and/or using multi-directional still pictures and/or multi-directional motion pictures. Similarly, MDP Unit 100 comprises the functionality for implementing an interface for making, processing, and/or using multi-directional still pictures and/or multi-directional motion pictures. In some embodiments, MDP Unit 100 can be implemented in a device (i.e. microchip, circuitry, electronic device, processor, storage device, embedded device, etc.) or system comprising or provided with MDP Unit 100 instructions, which device or system may operate on its own, be embedded in another system, work in combination with other devices or systems, or be available in any other configuration. As such, MDP Unit 100 and/or any of its elements comprise the features and embodiments of Processor 11 and/or other elements of Computing Device 70. In other embodiments, MDP Unit 100 can be implemented as Application Program 18 and executed by one or more Processors 11 as previously described. As such, MDP Unit 100 and/or any of its elements can be implemented in one or more modules or units of Application Program 18. In yet other embodiments, MDP Unit 100 may be included in Alternative Memory 18, which provides instructions to Processor 11 for implementation of MDP Unit 100 functionalities. In further embodiments, MDP Unit 100 can be implemented as network, web, distributed, cloud, or other such application accessed on a remote computing device via Network Interface 25, such remote computing device including processing capabilities and MDP Unit 100 instructions encoded thereon. In further embodiments, MDP Unit 100 may be an embedded computing device, a processor, or other such computing device dedicated to implementing MDP Unit 100 functionalities, such computing device including processing capabilities and MDP Unit 100 instructions encoded thereon.

In one example and as a general overview, MDP Unit 100 may include Multi-directional Pictures Processor 110 that receives user's operating instructions to move from one multi-directional still or motion picture to another multi-directional still or motion picture in a collection of inter-linked multi-directional still or motion pictures representing an object, Multi-directional Pictures Processor 110 may process corresponding instructions to access a certain picture within a particular multi-directional still or motion picture. Multi-directional Pictures Processor 110 may also process instructions to transmit the desired picture to be presented to the user to simulate movement relative to the represented object. The instructions may include any computer command, instruction set, operation, Structured Query Language (SQL) statement, instruction, or any other command (these terms may be used interchangeably herein). Multi-directional Pictures Processor 110 may include or be coupled to Multi-directional Pictures Repository 115 that stores pictures (i.e. still or motion pictures, etc.) or references thereto, any data structures (i.e. multi-directional still or motion pictures, mazes, sequences, etc.), and/or other elements. Multi-directional Pictures Repository 115 can be stored or encoded in MDP Unit's 100 circuitry, Memory 12, Storage 27, and/or other storage arrangement. User 50 can interact with MDP Unit 100 through inputting operating instructions via Human-machine Interface 23 or any input device. User 50 can also interact with MDP Unit 100 through viewing results via Display 21 or any output device.

In another example, the teaching presented by the disclosure can be implemented in a device or system for using Multi-directional Still Pictures 200. The device or system may include Multi-directional Pictures Processor 110 and an interface, coupled to Multi-directional Pictures Processor 110, for receiving a plurality of multi-directional still pictures each multi-directional still picture associated with a different location of a represented object and including one or more differently directed still pictures from the location and one or more links to other one or more multi-directional still pictures. The device or system may further include Display 21, coupled to the Multi-directional Pictures Processor 110, for rendering a first still picture depicting a first view from a location associated with a first multi-directional still picture. The device or system may further include Human-machine Interface 23 or another input device, coupled to Multi-directional Pictures Processor 110, for receiving a selection (i.e. from a user, etc.) of a first link of the first multi-directional still picture, the first link referring to a second multi-directional still picture, wherein Multi-directional Pictures Processor 110 may be configured to cause the Display 21 to render a first still picture depicting a first view from a location associated with the second multi-directional still picture. Human-machine Interface 23 or another input device may further be configured to receive a selection of a second still picture of the second multi-directional still picture, wherein Multi-directional Pictures Processor 110 may be further configured to cause the Display 21 to render the second still picture depicting a second view from the location associated with the second multi-directional still picture. Any of the operations of the described elements can be performed repeatedly and/or in different orders in alternate embodiments. For example, Human-machine Interface 23 includes a means for inputting a user's operating instructions regarding the view of the represented object and movement relative to the represented object, which operating instructions can be available to Multi-directional Pictures Processor 110 or other disclosed elements. Multi-directional Pictures Processor 110 can be implemented as a device or processor that receives or reads multi-directional still pictures and/or other elements from Multi-directional Pictures Repository 115 to obtain appropriate still pictures from various locations of a represented object that correspond to user's operating instructions. Display 21 may render, display or show the still pictures from various locations of the represented object. Multi-directional Pictures Processor 110 (or its functionalities), and/or other disclosed elements can be implemented as separate hardware components or processors dedicated to their functionalities, they can be implemented as a single program or objects/modules/functions of a single program or separate programs operating on Processor 11, they can be provided in other suitable configurations, or a combination thereof in alternate embodiments. In some designs, Multi-directional Pictures Processor 110 may include some or all of the functionalities of other disclosed elements in which case the elements whose functionalities are integrated with Multi-directional Pictures Processor 110 may be omitted. The device or system for using Multi-directional Still Pictures 200 can similarly be implemented for using Multi-directional motion Pictures 400. The device or system for using Multi-directional Still Pictures 200 may also include any functionalities or steps of any disclosed methods such as method 2100 (later described).

In a further example, MDP Unit 100 can be implemented as a Java Micro Edition (ME), Java Standard Edition (SE), or other Java Edition (also referred to as Java or Java platform) application or program. Java ME is generally designed for mobile and embedded devices that provides a robust and flexible environment for application programs including flexible user interfaces, robust security, built-in network protocols, powerful application programming interfaces, DBMS connectivity and interfacing functionalities, file manipulation capabilities, support for networked and offline applications, and/or other features or functionalities. Application programs based on Java ME may be portable across many devices, yet leverage each device's native capabilities. The feature-rich Java SE is generally designed for traditional computing devices, but more mobile and embedded devices continue to support it. Java SE supports the feature sets of most smartphones and a broad range of high-end connected devices while still fitting within their resource constraints. Java platforms include one or more basic application programming interfaces (APIs) and virtual machine features comprising a runtime environment for application programs such as some embodiments of MDP Unit 100. Java applications may provide a wide range of user-level functionalities that can be implemented in application programs such as providing an Internet browser, displaying text and graphics, playing and recording audio media, displaying and recording visual media, communicating with another computing device, and/or other functionalities. In one example, MDP Unit 100 can be implemented as a Xlet within a Java platform. A Xlet may include a Java applet or application configured to execute on a mobile, embedded, and/or other computing device. MDP Unit 100 is programming language, platform, and operating system independent. Programming languages that can be used in addition to Java include C, C++, Cobol, Python, Java Script, Tcl, Visual Basic, Pascal, VB Script, Perl, PHP, Ruby, and/or other programming languages capable of implementing the functionalities described herein.

User Interaction Unit 105 comprises the functionality for implementing a user interface through which a user can input operating instructions, and/or other disclosed functionalities. User interaction Unit 105 comprises the functionality for portraying content (i.e. still pictures, motion pictures, etc.) in a user interface. Examples of user interfaces that can be utilized include a graphical user interface (GUI), acoustical user interface, tactile user interface, and/or other interfaces.

Multi-directional Pictures Processor 110 comprises the functionality for implementing one or more pictures of an object in an interlinked simulation or representation of the object, and/or other disclosed functionalities. Multi-directional Pictures Processor 110 may implement a plurality of pictures, each depicting an object from a different location and/or different point of view, to enable a user to view the object from a multitude of locations and/or directions in an interlinked application. As such, Multi-directional Pictures Processor 110 enables a user to view all views (i.e. forward, backward, right, left, up, down, diagonal, angular, etc.) from all locations of a represented object as well as to simulate user's motion relative to the represented object.

Multi-directional Pictures Repository 115 comprises the functionality for storing pictures (i.e. still or motion pictures, etc.) or references thereto, any data structures (i.e. multi-directional still or motion pictures, mazes, sequences, etc.), and/or other elements. In some embodiments, Multi-directional Pictures Repository 115 comprises the functionality for storing a data structure whose data fields include pictures (i.e. still or motion pictures, etc.) or references thereto, any data structures (i.e. multi-directional still or motion pictures, mazes, sequences, etc.), and/or other elements. Pictures may include still or motion pictures (i.e. video, etc.), and/or any other visual content.

In some embodiments, Multi-directional Pictures Repository 115 comprises a file, a data structure, an object, and/or other similar repository. Multi-directional Pictures Processor 110 may read Multi-directional Pictures Repository 115 by opening or connecting to the file, data structure, object, and/or other similar repository, and accessing the stored pictures (i.e. still or motion pictures, etc.) or references thereto, any data structures (i.e. multi-directional still or motion pictures, mazes, sequences, etc), and/or other elements. In some aspects, Multi-directional Pictures Repository 115 includes plurality of files, data structures, objects, and/or other similar repositories. In one example, all pictures (i.e. still or motion pictures, etc.) or references thereto, any data structures (i.e. multi-directional still or motion pictures, mazes, sequences, etc.), and/or other elements are stored in one file. In another example, some or each of the pictures (i.e. still or motion pictures, etc.) or references thereto, any data structures (i.e. multi-directional still or motion pictures, mazes, sequences, etc.), and/or other elements are stored in a separate file.

In other embodiments, Multi-directional Pictures Repository 115 comprises a database management system (DBMS), a database, a system, a process, and/or other similar repository. Multi-directional Pictures Processor 110 may read Multi-directional Pictures Repository 115 by opening or connecting to the DBMS, database, system, process, and/or other similar repository, and accessing the stored pictures (i.e. still or motion pictures, etc.) or references thereto, any data structures (i.e. multi-directional still or motion pictures, mazes, sequences, etc.), and/or other elements. In one example, Multi-directional Pictures Processor 110 connects to a DBMS, a database, or a similar repository or system through an ODBC connection. The inter-process interaction may occur on a single mobile, embedded or other computing device, or between two or more mobile, embedded or other computing devices over a network, Other elements or types of connections such as a database API, database driver, database bridge, specialized database interface, a socket, an operating system command, a global function, a local function, a direct command, etc. may be included, or some of the disclosed ones may be excluded, or a combination thereof may be utilized in alternate implementations of the connection between the Multi-directional Pictures Processor 110 and the DBMS, database, or a similar repository. Upon connecting to a database, for example, Multi-directional Pictures Processor 110 may transmit to the database a command or instruction set understood by the database. Subsequently, the database performs an operation corresponding to the command or instruction set, and the database transmits results (i.e. picture or a reference thereto that the user wanted to view, link, etc.) to the Multi-directional Pictures Processor 110 for presentation to User 50. In some embodiments, the command or instruction set used may include a SQL statement, which is platform independent and supported by a vast majority of commercial and open-source DBMSs. It should be clear to one of ordinary skill in art that the command or instruction (i.e. SQL statement, etc.) discussed herein as an example, may be replaced by any type or form of command, instruction, instruction set, or statement in any other language or script, as needed to conform to a given DBMS or database. In one example, a single table in a database can be used as Multi-directional Pictures Repository 115. As such, a multi-directional still or motion picture may be stored within the table where each of the data fields (i.e. still or motion pictures, links, etc.) of the multi-directional still or motion picture includes a record with a common identifier that signifies the data field's association with its parent multi-directional still or motion picture. Later in the process, a simple call to the table to read records with a specific identifier would reconstruct data fields of the multi-directional still or motion picture. In another example of a single table in a database being used as Multi-directional Pictures Repository 115, a multi-directional still or motion picture can be stored within the table where each of the data fields of the multi-directional still or motion picture includes a field (i.e. column) in a record of the table. Later in the process, a simple call to the table to read fields of the record would reconstruct data fields of the multi-directional still or motion picture. In some embodiments, separate tables or databases can be utilized for each of the data structures used such as multi-directional still or motion pictures, mazes, and/or sequences. In one example, records in a table can be utilized to store data fields of multi-directional still or motion pictures, tables can be utilized to store sequences of multi-directional still or motion pictures, and/or databases can be utilized to store mazes of multi-directional still or motion pictures and/or their sequences. In some embodiments, Multi-directional Pictures Repository 115 includes an entire DBMS with all of its databases and tables dedicated to Multi-directional Pictures Repository 115.

In yet other embodiments, Multi-directional Pictures Repository 115 may be embedded within the Multi-directional Pictures Processor 110 (i.e. hard coded). As such, Multi-directional Pictures Processor 110 may have direct access to the stored pictures (i.e. still or motion pictures, etc.) or references thereto, any data structures (i.e. multi-directional still or motion pictures, mazes, sequences, etc.), and/or other elements without utilizing an element such as Multi-directional Pictures Repository 115.

In yet other embodiments, Multi-directional Pictures Repository 115 includes a separate file, a separate data structure, a separate object, a separate DBMS, a separate database, a separate system, a separate process, and/or other separate repository or system for each of the pictures (i.e. still or motion pictures, etc.) or references thereto, any data structures (i.e. multi-directional still or motion pictures, mazes, sequences, etc.), and/or other elements. In one example, Multi-directional Pictures Repository 115 includes a file comprising definitions of data structures used such as multi-directional still or motion pictures, mazes, sequences, etc., which data structures may further comprise references to picture (i.e. still or motion picture, etc.) files. As such, Multi-directional Pictures Processor 110 may read Multi-directional Pictures Repository 115 by opening or connecting to the file including the definitions of multi-directional still or motion pictures, mazes, sequences, etc. and by accessing the picture (i.e. still or motion picture, etc.) files through references included in the multi-directional still or motion pictures, mazes, sequences, etc.

In yet other embodiments, Multi-directional Pictures Repository 115 includes definitions of pictures (i.e. still or motion pictures, etc.) or references thereto, any data structures (i.e. multi-directional still or motion pictures, mazes, sequences, etc.), and/or other elements. Such definitions can be embedded in other files or programs such as HTML, XML, Perl, PHP, Ruby, Java, Java Script, C++, Visual Basic, or other similar files or programs. In one example, Multi-directional Pictures Repository 115 includes a collection of definitions embedded into a HTML file. Such collection of definitions may define any data structures used (i.e. multi-directional still or motion pictures, mazes, sequences, etc.) that can further comprise references to picture (i.e. still or motion pictures, etc.) files. As such, Multi-directional Pictures Processor 110 may read Multi-directional Pictures Repository 115 by opening the HTML file including the definitions of the data structures (i.e. multi-directional still or motion pictures, mazes, sequences, etc.) and by accessing picture files through the references included in the data structures (i.e. multi-directional still or motion pictures, mazes, sequences, etc.). In some embodiments, Multi-directional Pictures Processor 110 itself can be embedded into HTML, XML, Perl, PHP, Ruby, Java, Java Script, Active X, C++, Visual Basic, or other similar files or programs.

User 50 (also referred to as user, etc.) may be a human user or non-human user, A non-human User 50 includes any system, device, program, and/or other mechanism for controlling or manipulating MDP Unit 100, and/or other disclosed elements. A non-human User 50 can utilize more suitable interfaces instead of, or in addition to, HMI 23 and Display 21 such as application programming interface (API), bridge (i.e. bridge between applications or devices, etc.), driver, socket, direct or operative connection, handle, and/or other such interfaces to interact with MDP Unit 100, and/or other disclosed elements.

Figure 3:
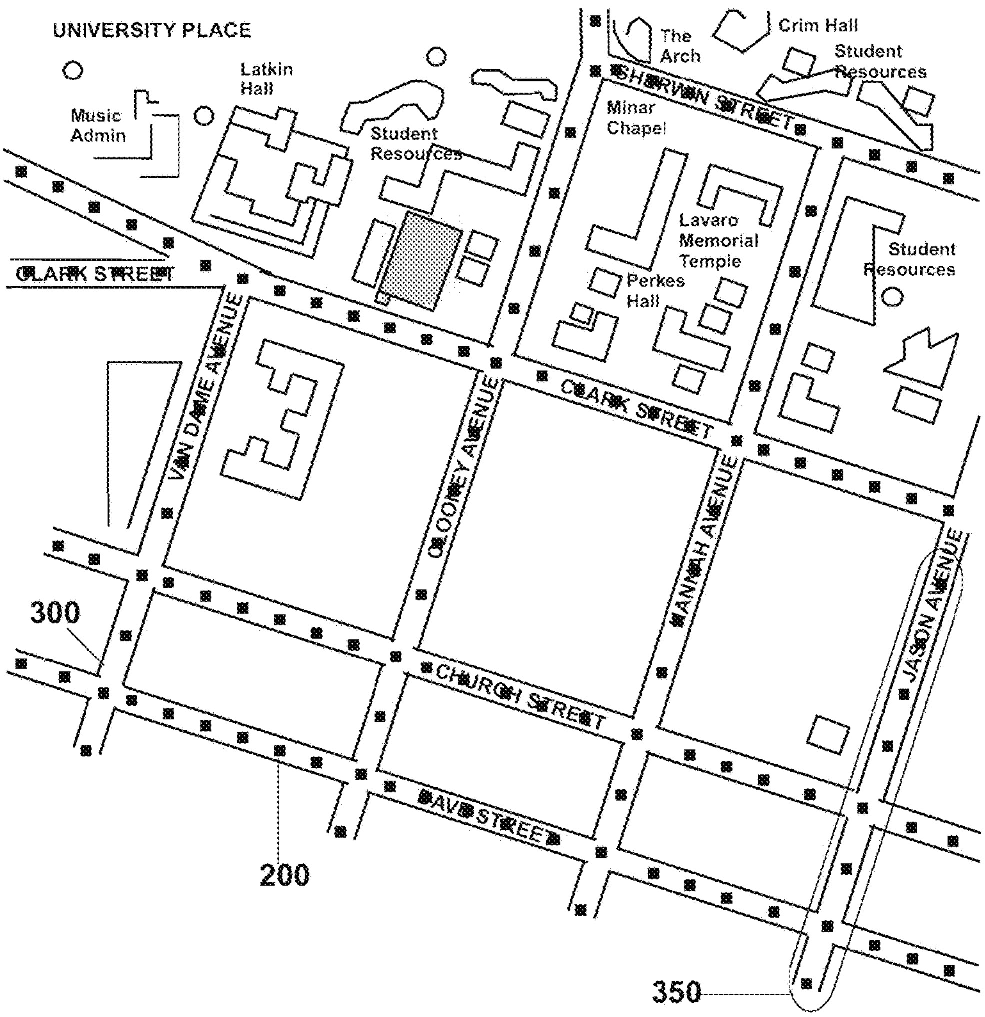
FIG. 3 shows an embodiment of a collection of Multi-directional Still Pictures 200 representing a park.

Referring to FIG. 3, a collection of Multi-directional Still Pictures 200 (later described) representing an object such as a park is illustrated, for example. Such collection of Multi-directional Still Pictures 200 representing an object enables a user to visually experience the object such as a park where every step may include a view of what a user would see stepping down the park's walkways at a specific point in time. Multi-directional Still Pictures 200, Maze 300 (later described), and/or Multi-directional Picture Sequences 350 (later described) can be arranged and/or interconnected to correspond to the shape of the park's walkways. In some embodiments, MDP Unit 100 can be implemented to include (1) Multi-directional Still Pictures 200, and/or (2) a means for a user to move among Multi-directional Still Pictures 200. In other embodiments, MDP Unit 100 may be implemented to include (1) Multi-directional Picture Sequences 350 that comprise Multi-directional Still Pictures 200 of each of the park's continuous walkways, and/or (2) a means for a user to connect with Multi-directional Picture Sequences 350 and/or move among Multi-directional Still Pictures 200. In yet other embodiments, MDP Unit 100 may be implemented to include (1) a Maze 300 that comprises Multi-directional Still Pictures 200 and/or Multi-directional Picture Sequences 350, and/or (2) a means for a user to connect with Multi-directional Picture Sequences 350 and/or move among Multi-directional Still Pictures 200. Other additional elements may be included as needed, or some of the disclosed ones may be excluded, or a combination thereof may be utilized in alternate embodiments. In some aspects, the term moving among Multi-directional Still Pictures 200 comprises moving, connecting, linking, shifting, or switching from one Multi-directional Still Picture 200 to another. As such, moving among Multi-directional Still Pictures 200 enables a user to experience a represented object one picture at a time in an arrangement in which the pictures would appear in reality had the user actually been at the scene of the object. It should be understood that park, interior of a building, room, and/or other objects described herein are used as examples of objects that can be represented by a MDP application (i.e. collection of multi-directional still or motion pictures, etc.). Any objects can be represented including linear objects, two dimensional objects, multi-dimensional objects, multi-directional objects, multi-leveled objects, branched objects, systems of objects, connected objects, collections of objects, and/or any other objects. Examples of objects that can be represented include real world objects such as parks, streets, campuses, buildings, houses, stadiums, cities, museums, rooms, persons, vehicles, furniture, and/or any other conceivable real world objects. Examples of objects that can be represented also include computer generated objects such as computer generated parks, computer generated streets, computer generated campuses, computer generated buildings, computer generated houses, computer generated stadiums, computer generated cities, computer generated museums, computer generated rooms, computer generated persons, computer generated vehicles, computer generated furniture, and/or any other conceivable computer generated objects. Examples of objects that can be represented further include a microscopic object such as bacteria and/or any other microscopic object. Examples of objects that can be represented further include a gigantic object such as a planet and/or any other gigantic object. Objects that can be represented comprise any number of other objects including objects within other objects.

Multi-directional Picture Sequence 350 comprises the functionality for organizing and/or storing Multi-directional Still Pictures 200, and/or other disclosed functionalities. In some embodiments in which Multi-directional Picture Sequences 350 are used, a Multi-directional Picture Sequence 350 includes Multi-directional Still Pictures 200 created in a sequential order. In other embodiments in which Multi-directional Picture Sequences 350 are used, a Multi-directional Picture Sequence 350 includes Multi-directional Still Pictures 200 that correspond to a branch of Maze 300 as each continuous branch of Maze 300 can be seen as a sequence, MDP Unit 100 is independent of the data structure used, and can utilize any sequence-like or other suitable data structure. In general, MDP Unit 100 includes Multi-directional Still Pictures 200 associated with locations of a represented object, such Multi-directional Still Pictures 200 may be interlinked in any conceivable manner. Therefore, each MDP application (i.e. collection of multi-directional still or motion pictures, etc.) may possess its own unique data structures depending on the represented object, and/or on links defined among Multi-directional Still Pictures 200. It should not be understood that the term sequence only indicates representation of a straight lined object or a portion thereof. A Multi-directional Picture Sequence 350 can represent an object or a portion thereof with straight physical lineup (i.e. a straight lined walkway in a park, etc.), any type of curved lineup (i.e. a curved walkway in a park, a path through multiple walkways in a park, etc.), or any other type of lineup (i.e. zig-zag, etc.). In some embodiments, a Multi-directional Picture Sequence 350 includes an actual data structure used to organize and/or store Multi-directional Still Pictures 200. In other embodiments, Multi-directional Picture Sequence 350 may be conceptual used to organize Multi-directional Still Pictures 200 in user's mind in which case an actual Multi-directional Picture Sequence 350 data structure may be omitted.

Maze 300 comprises the functionality for organizing and/or storing Multi-directional Still Pictures 200 or Multi-directional Picture Sequences 350, and/or other disclosed functionalities. MDP Unit 100 is independent of the data structure used, and can utilize any maze-like or other suitable data structure. In general, MDP Unit 100 includes Multi-directional Still Pictures 200 associated with locations of a represented object, such Multi-directional Still Pictures 200 may be interlinked in any conceivable manner. Therefore, each MDP Unit 100 implementation may possess its own unique data structures depending on the represented object, and/or on links defined among Multi-directional Still Pictures 200. In some embodiments, Maze 300 includes an actual data structure used to organize and/or store Multi-directional Still Pictures 200 and/or Multi-directional Picture Sequences 350. In other embodiments, Maze 300 may be conceptual used to organize Multi-directional Still Pictures 200 and/or Multi-directional Picture Sequences 350 in user's mind in which case an actual Maze 300 data structure may be omitted.

Figure 4:
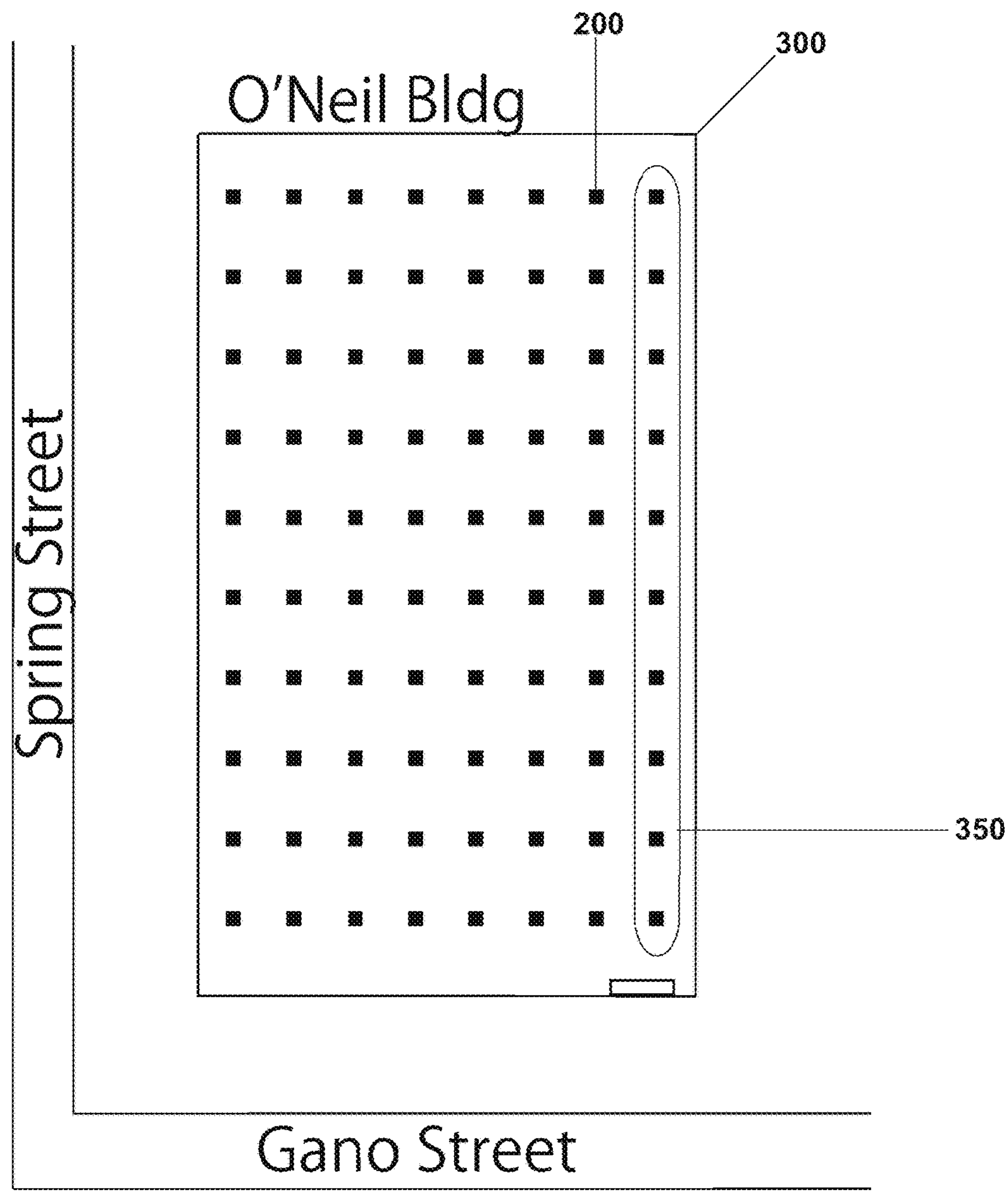
FIG. 4 shows an embodiment of a collection of Multi-directional Still Pictures 200 representing interior of a building.

Referring to FIG. 4, an embodiment of MDP Unit 100 implemented to represent an object such as interior of a building (i.e. room, etc.) is illustrated. Such embodiment enables a user to visually experience an object such as interior of a building where every step may include a view of what a user would see stepping through interior of the building at a specific point in time. Any of the previously described elements such as Multi-directional Still Picture 200, Multi-directional Picture Sequence 350, Maze 300, and/or other elements may be included in any embodiments of MDP Unit 100 implemented to represent interior of a building or other objects. Other additional elements may be included as needed, or some of the disclosed ones may be excluded, or a combination thereof may be utilized in alternate embodiments.

Figure 5:
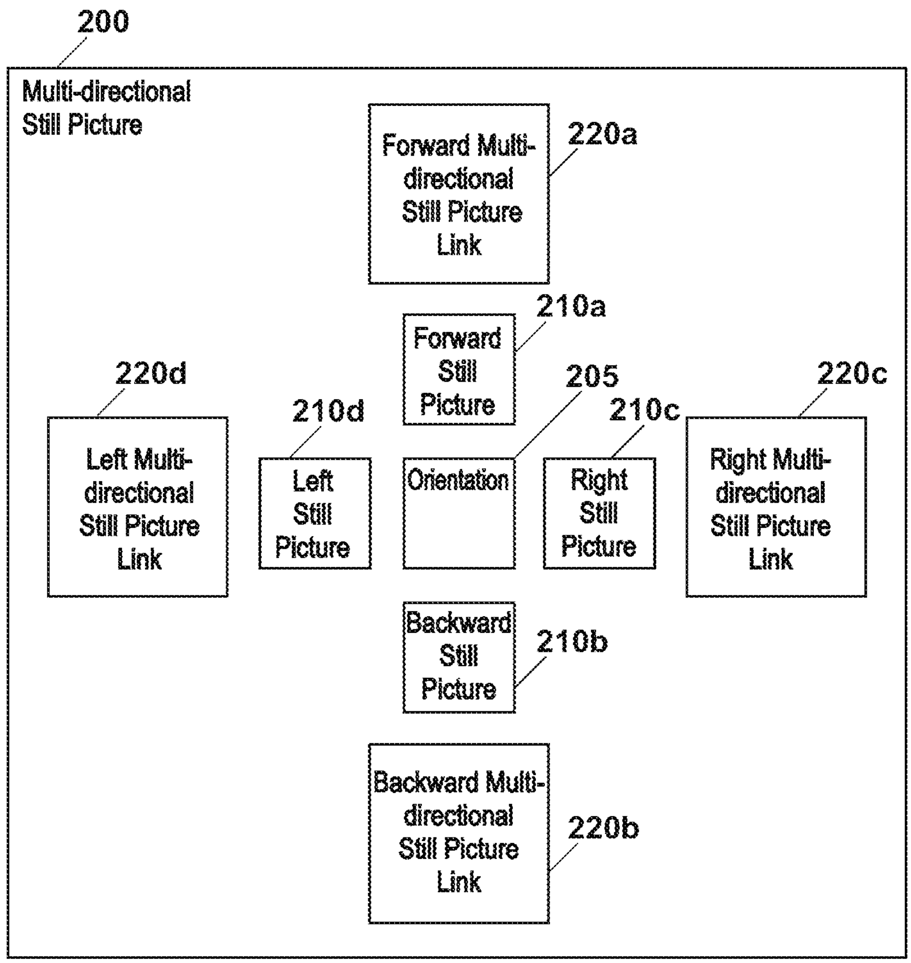
FIG. 5 is a diagram showing an embodiment of a Multi-directional Still Picture 200.

Referring to FIG. 5, an embodiment of Multi-directional Still Picture 200 is illustrated. Multi-directional Still Picture 200 comprises the functionality for organizing and/or storing one or more Still Pictures 210 or references thereto, one or more Multi-directional Still Picture Links 220, and/or Orientation 205, and/or other disclosed functionalities. In other embodiments, a Multi-directional Still Picture 200 comprises the functionality for organizing and/or storing a data structure whose data fields include one or more Still Pictures 210 or references thereto, one or more Multi-directional Still Picture Links 220, and/or Orientation 205. In one example, Multi-directional Still Picture 200 includes a data structure comprising nine data fields: (1) Forward Still Picture 210*a* or reference thereto, (2) Backward Still Picture 210*b* or reference thereto, (3) Right Still Picture 210*c* or reference thereto, (4) Left Still Picture 210*d* or reference thereto, (5) Forward Multi-directional Still Picture Link 220*a*, (6) Backward Multi-directional Still Picture Link 220*b*, (7) Right Multi-directional Still Picture Link 220*c*, (8) Left Multi-directional Still Picture Link 220*d*, and (9) Orientation 205. In general, MDP Unit 100 enables a user to view all conceivable views from all locations represented by Multi-directional Still Pictures 200, and/or to move among Multi-directional Still Pictures 200 in all conceivable directions. Therefore, additional Still Pictures 210 may be included such as up still picture, down still picture, diagonal still picture, angular still picture, behind still picture, turn around still picture, reverse still picture, oblique still picture, circular still picture, and/or others. Also, additional Multi-directional Still Picture Links 220 may be included such as up link, down link, diagonal link, angular link, behind link, turn around link, reverse link, oblique link, circular link, and/or others. Multi-directional Still Picture 200 includes some or all the features and embodiments of the later described Multi-directional Motion Picture 400.

Still Picture 210*a*, 210*b*, 210*c*, 210*d*, etc. comprises the functionality for storing a digital picture or other visual content, a reference thereto, and/or other disclosed functionalities. While Still Pictures 210 may be referred to or illustrated as Still Pictures 210*a-d*, one of ordinary skill in art will understand that any number of Still Pictures 210*a-n* can be utilized. In general, Still Picture 210*a*, 210*b*, 210*c*, 210*d*, etc. may include or refer to a collection of digitally colored dots (i.e. pixels) of any digital picture format. In some aspects, Still Picture 210*a*, 210*b*, 210*c*, 210*d*, etc. comprises any type or form of a digital picture such as digital bitmap, JPEG picture, GIF picture, TIFF picture, PDF picture, and/or any other digital picture. In other aspects, Still Picture 210*a*, 210*b*, 210*c*, 210*d*, etc. comprises any type or form of animated picture such as animated GIF picture, and/or any other animated picture. In yet other aspects, Still Picture 210*a*, 210*b*, 210*c*, 210*d*, etc. comprises any computer-generated picture such as a view of a 3D game or CAD/CAM application captured as a digital picture. In further aspects, Still Picture 210*a*, 210*b*, 210*c*, 210*d*, etc. comprises an application or process of any type that can generate digital pictures or other visual content. Still Picture 210*a*, 210*b*, 210*c*, 210*d*, etc. may also include a reference or pointer to a digital picture or other visual content. In some embodiments, a user can create Still Picture 210*a*, 210*b*, 210*c*, 210*d*, etc. by utilizing an optical device such as a digital camera, and/or any other digital picture taking equipment (i.e. still or motion picture taking equipment, etc.). Such digital picture taking equipment can be combined with an apparatus specially constructed for digital picture creation such as a tripod, rails, wheels, slidable components, robotic arm, and/or other such apparatuses or devices. In other embodiments, a user can create Still Picture 210*a*, 210*b*, 210*c*, 210*d*, etc. by capturing a view (i.e. picture, frame, etc.) of a computer generated object (i.e. 3D game, CAD/CAM application, etc.). In yet other embodiments, a user can create Still Picture 210*a*, 210*b*, 210*c*, 210*d*, etc. in a picture editing/creation programs such as Adobe's Photoshop (i.e. pixel focused), Corel's Draw (i.e. vector focused), and/or any other picture editing/creation program. Still Picture 210*a*, 210*b*, 210*c*, 210*d*, etc. can be stored in a digital file or other repository in Memory 12 or Storage 27, for example. Multi-directional Pictures Processor 110 can then access and utilize the stored Still Picture 210*a*, 210*b*, 210*c*, 210*d*, etc. to implement the features and functionalities described herein.

Multi-directional Still Picture Link 220*a*, 220*b*, 220*c*, 220*d*, etc. (also referred to as link, etc.) comprises the functionality for referring to or storing a reference or pointer to a Multi-directional Still Picture 200, and/or other disclosed functionalities. While Multi-directional Still Picture Links 220 may be referred to or illustrated as Multi-directional Still Picture Links 220*a-d*, one of ordinary skill in art will understand that any number of Multi-directional Still Picture Links 220*a-n* can be utilized. In some embodiments, Multi-directional Still Picture Link 220*a*, 220*b*, 220*c*, 220*d*, etc. refers to or includes a reference or pointer to an outside application or process. In other embodiments, Multi-directional Still Picture Link 220*a*, 220*b*, 220*c*, 220*d*, etc. comprises interpretive information, which interpretive information itself may refer to or include a reference or pointer to a content, resource, system, application, and/or process as later described. In further embodiments, Multi-directional Still Picture Link 220*a*, 220*b*, 220*c*, 220*d*, etc. may be undefined, non-existent or empty indicating no reference or pointer to a Multi-directional Still Picture 200. Multi-directional Still Picture Link 220*a*, 220*b*, 220*c*, 220*d*, etc. can be created or modified automatically by MPD Unit 100, Multi-directional Pictures Processor 110, Maker 920 (later described), Assembler 113 (later described), and/or other disclosed elements, or by a user through a means such as a graphical user interface.

Orientation 205 comprises the functionality for storing orientation of a Multi-directional Still Picture 200, and/or other disclosed functionalities. In some embodiments, Orientation 205 may be associated with a direction of a Still Picture 210*a*, 210*b*, 210*c*, 210*d*, etc., with a direction of a Multi-directional Still Picture Link 220*a*, 220*b*, 220*c*, 220*d*, etc., and/or with any other direction. In some aspects, Orientation 205 comprises absolute or relative orientation. Absolute Orientation 205 may include a reference point such as a side of the world (i.e. north, south, east, west, northeast, northwest, southeast, southwest, or any other side of the world), a nearby tree, a nearby mountain, a nearby building, or any other reference point. In some embodiments, absolute Orientation 205 includes an association between the reference point (i.e. north, south, east, west, tree, mountain, building, etc.) and a direction such as, for example, association of north with forward direction (any other associations may be defined without limitation). In other embodiments, absolute Orientation 205 includes an association between the reference point (i.e. north, south, east, west, tree, mountain, building, etc.) and a Still Picture 210*a*, 210*b*, 210*c*, 210*d*, etc., of a Multi-directional Still Picture 200 such as, for example, association of north with Forward Still Picture 210*a* (any other associations may be defined without limitation). In yet other embodiments, absolute Orientation 205 includes an association between the reference point (i.e. north, south, east, west, tree, mountain, building, etc.) and a Multi-directional Still Picture Link 220*a*, 220*b*, 220*c*, 220*d*, etc. of a Multi-directional Still Picture 200 such as, for example, association of north with Forward Multi-directional Still Picture Link 220*a* (any other associations may be defined without limitation). Relative Orientation 205 may include any direction (i.e. forward, backward, right, left, up, down, diagonal, angular, etc.) of a Still Picture 210*a*, 210*b*, 210*c*, 210*d*, etc., of a Multi-directional Still Picture Link 220*a*, 220*b*, 220*c*, 220*d*, etc., and/or any other relative direction. In some embodiments, relative Orientation 205 includes an association between a direction (i.e. forward, backward, right, left, up, down, diagonal, angular, etc.) and a Still Picture 210*a*, 210*b*, 210*c*, 210*d*, etc. of a Multi-directional Still Picture 200 such as, for example, association of forward direction with Forward Still Picture 210*a* (any other associations may be defined without limitation). In other embodiments, relative Orientation 205 includes an association between a direction (i.e. forward, backward, right, left, up, down, diagonal, angular, etc.) and a Multi-directional Still Picture Link 220*a*, 220*b*, 220*c*, 220*d*, etc. of a Multi-directional Still Picture 200 such as, for example, association of forward direction with Forward Multi-directional Still Picture Link 220*a* (any other associations may be defined without limitation).

In some embodiments, Orientation 205 may be used to determine which Still Picture 210*a*, 210*b*, 210*c*, 210*d*, etc. is displayed. In other embodiments, Orientation 205 may be used to determine a default Still Picture 210*a*, 210*b*, 210*c*, 210*d*, etc. to be displayed when user moves from one Multi-directional Still Picture 200 to another. In yet other embodiments, Orientation 205 may be used to determine to which Multi-directional Still Picture 200 a specific Multi-directional Still Picture Link 220*a*, 220*b*, 220*c*, 220*d*, etc. points. A user can choose to change Orientation 205 or Multi-directional Pictures Processor 110 (or other disclosed elements) may change Orientation 205 automatically as needed. In some aspects, Multi-directional Pictures Processor 110 may change Orientation 205 automatically responsive to user's use or execution of Still Pictures 210*a*, 210*b*, 210*c*, 210*d*, etc. and/or Multi-directional Still Picture Links 220*a*, 220*b*, 220*c*, 220*d*, etc. in other aspects, Orientation 205 can change by user's rotating the view of a combined picture if picture stitching (later described) is used. In some designs, MDP Unit 100 includes a setting for a user to choose the circumstances under which Multi-directional Pictures Processor 110 (or other disclosed elements) can change Orientation 205. In one example where north is used as absolute Orientation 205 and where north is associated with forward direction, when user indicates a right motion by executing Right Multi-directional Still Picture Link 220*c*, Multi-directional Pictures Processor 110 may display Forward Still Picture 210*a* of the destination Multi-directional Still Picture 200. In another example where north is used as absolute Orientation 205 and where north is associated with forward direction, user may first want to change the absolute Orientation 205 to east, and then when user indicates a right motion by executing Right Multi-directional Still Picture Link 220*c*, Multi-directional Pictures Processor 110 may display Right Still Picture 210*c* of the destination Multi-directional Still Picture 200. In yet another example where north is used as absolute Orientation 205 and where north is associated with forward direction, when user indicates a right motion by executing Right Multi-directional Still Picture Link 220*c*, Multi-directional Pictures Processor 110 may automatically change the absolute Orientation 205 to east and then display Right Still Picture 210*c* of the destination Multi-directional Still Picture 200. In a further example where forward relative Orientation 205 is used, when user indicates a right motion by executing Right Multi-directional Still Picture Link 220*c*, Multi-directional Pictures Processor 110 may display Forward Still Picture 210*a* of the destination Multi-directional Still Picture 200. In another example where forward relative Orientation 205 is used, when user indicates a right motion by executing Right Multi-directional Still Picture Link 220*c*, Multi-directional Pictures Processor 110 may use the direction of the last executed Multi-directional Still Picture Link (i.e. Right Multi-directional Still Picture Link 220*c* in this example) to automatically change the relative Orientation 205 to right and then display Right Still Picture 210*c* of the destination Multi-directional Still Picture 200.

In some embodiments, responsive to a change in absolute or relative Orientation 205, Multi-directional Pictures Processor 110 may redefine some or all Still Pictures 210*a*, 210*b*, 210*c*, 210*d*, etc. and/or some or all Multi-directional Still Picture Links 220*a*, 220*b*, 220*c*, 220*d*, etc. of some or all Multi-directional Still Pictures 200 to correspond to a new absolute or relative Orientation 205. In one example where north is used as absolute Orientation 205 and where north is associated with forward direction, when user indicates right view from a location represented by the current Multi-directional Still Picture 200 by executing Right Still Picture 210*c*, Multi-directional Pictures Processor 110 may automatically change the absolute Orientation 205 of all Multi-directional Still Pictures 200 and redefine east as the new forward direction, Multi-directional Pictures Processor 110 may perform the following redefinitions of Still Pictures and Multi-directional Still Picture Links of all Multi-directional Still Pictures 200: (1) Right Still Pictures 210*c* may be redefined as new Forward Still Pictures 210*a*, (2) Backward Still Pictures 210*b* may be redefined as new Right Still Pictures 210*c*, (3) Left Still Pictures 210*d* may be redefined as new Backward Still Pictures 210*b*, (4) Forward Still Pictures 210*a* may be redefined as new Left Still Pictures 210*d*, (5) Right Multi-directional Still Picture Links 220*c* may be redefined as new Forward Multi-directional Still Picture Links 220*a*, (6) Backward Multi-directional Still Picture Links 220*b* may be redefined as new Right Multi-directional Still Picture Links 220*c*, (7) Left Multi-directional Still Picture Links 220*d* may be redefined as new Backward Multi-directional Still Picture Links 220*b*, and (8) Forward Multi-directional Still Picture Links 220*a* may be redefined as new Left Multi-directional Still Picture Links 220*d*. Once redefinitions are complete, Multi-directional Pictures Processor 110 may display the new Forward Still Picture 210*a* (previous Right Still Picture 210*c* before the redefinition) of the current Multi-directional Still Picture 200. Also, if a user indicates a forward movement by executing the new Forward Multi-directional Still Picture Link 220*a* (previous Right Multi-directional Still Picture Link 220*c* before the redefinition) of the current Multi-directional Still Picture 200, Multi-directional Pictures Processor 110 may display the new Forward Still Picture 210*a* (previous Right Still Picture 210*c* before the redefinition) of the destination Multi-directional Still Picture 200. In one example where forward relative Orientation 205 is used, when user indicates right view from a location represented by the current Multi-directional Still Picture 200 by executing Right Still Picture 210*c*, Multi-directional Pictures Processor 110 may automatically change the relative Orientation 205 of all Multi-directional Still Pictures 200 and redefine right direction as the new forward direction. Multi-directional Pictures Processor 110 may perform the following redefinitions of Still Pictures and Multi-directional Still Picture Links of all Multi-directional Still Pictures 200: (1) Right Still Pictures 210*c* may be redefined as new Forward Still Pictures 210*a*, (2) Backward Still Pictures 210*b* may be redefined as new Right Still Pictures 210*c*, (3) Left Still Pictures 210*d* may be redefined as new Backward Still Pictures 210*b*, (4) Forward Still Pictures 210*a* may be redefined as new Left Still Pictures 210*d*, (5) Right Multi-directional Still Picture Links 220*c* may be redefined as new Forward Multi-directional Still Picture Links 220*a*, (6) Backward Multi-directional Still Picture Links 220*b* may be redefined as new Right Multi-directional Still Picture Links 220*c*, (7) Left Multi-directional Still Picture Links 220*d* may be redefined as new Backward Multi-directional Still Picture Links 220*b*, and (8) Forward Multi-directional Still Picture Links 220*a* may be redefined as new Left Multi-directional Still Picture Links 220*d*. Once redefinitions are complete, Multi-directional Pictures Processor 110 may display the new Forward Still Picture 210*a* (previous Right Still Picture 210*c* before the redefinition) of the current Multi-directional Still Picture 200. Also, if a user indicates a forward movement by executing the new Forward Multi-directional Still Picture Link 220*a* (previous Right Multi-directional Still Picture Link 220*c* before the redefinition) of the current Multi-directional Still Picture 200, Multi-directional Pictures Processor 110 may display the new Forward Still Picture 210*a* (previous Right Still Picture 210*c* before the redefinition) of the destination Multi-directional Still Picture 200. In yet other examples, a similar change of absolute or relative Orientation 205 and redefinitions of Still Pictures 210*a*, 210*b*, 210*c*, 210*d*, etc. and/or Multi-directional Still Picture Links 220*a*, 220*b*, 220*c*, 220*d*, etc. of all Multi-directional Still Pictures 200 may be triggered by user's utilizing or executing any Multi-directional Still Picture Link 220*a*, 220*b*, 220*c*, 220*d*, etc.

Figure 6:
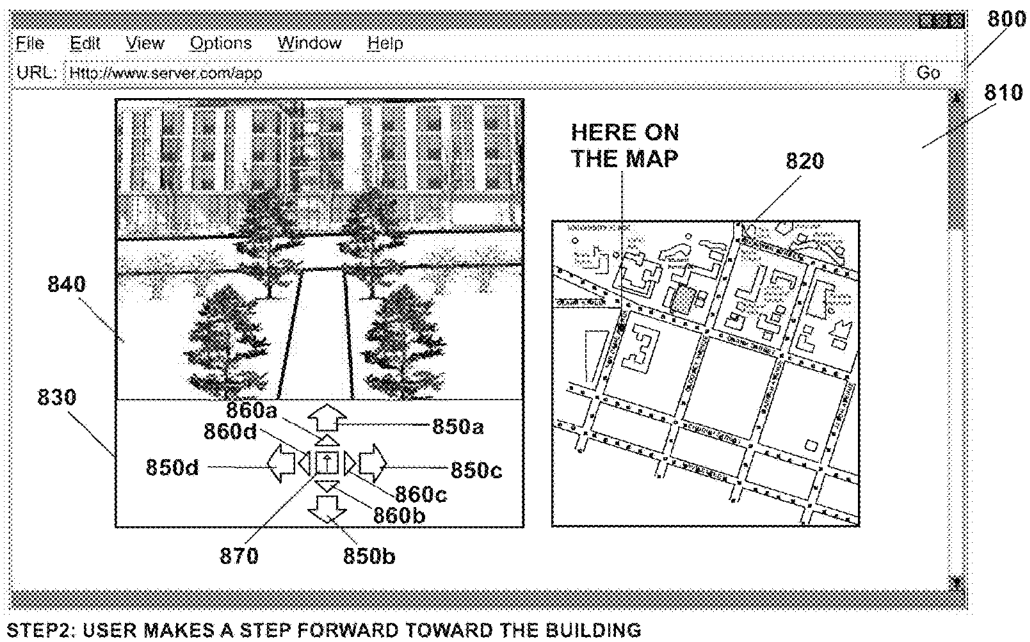
FIG. 6 shows an embodiment of MDP Unit 100 implemented as a web application in a web browser.
Figure 6:
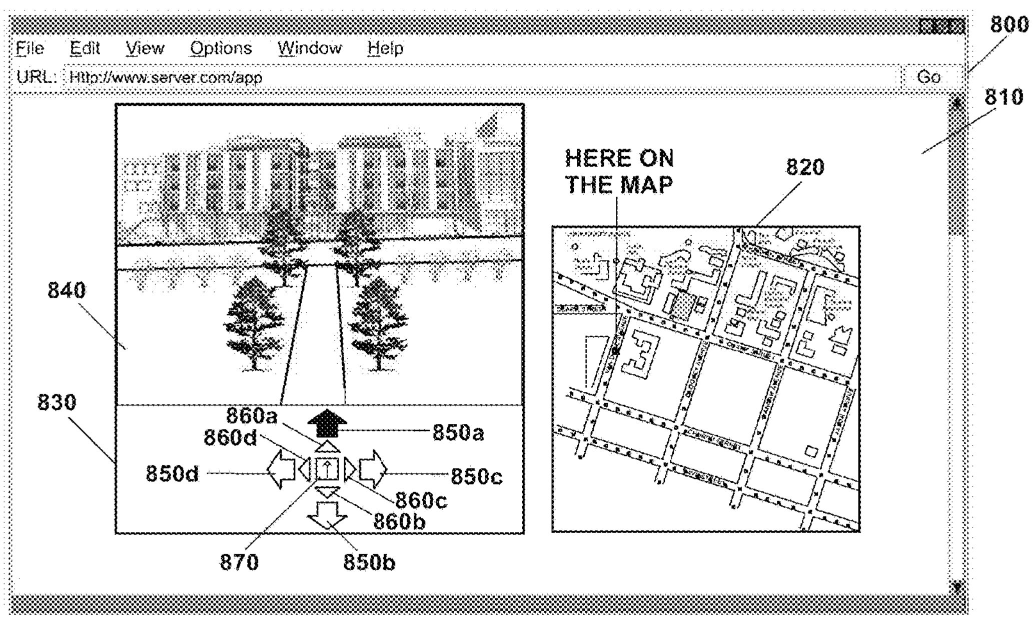

Referring to FIG. 6, an embodiment of MDP Unit 100 implemented as a web application in a web browser is illustrated. In some aspects, MDP Unit 100 can be implemented as an embeddable program such as a Java applet embedded into a Web Page 810 in which case Java applet may be visually represented by, or include, Window 830, In other aspects, MDP Unit 100 can be implemented as a standalone program such as a Java program that is not embedded into and does not use a web browser or any other application to realize the functionalities described herein. MDP Unit 100 is not limited to using a Java applet, Java program or any other programming language or platform described herein. MDP Unit 100 can be implemented using any programming language or platform including, but not limited to, HTML, XML, DHTML, Java, Java Script, C++, Visual Basic, Basic, Perl, PhP, Ruby and others. Languages and applications that MDP Unit 100 can be embedded into or implemented within include, but are not limited to, HTML, XML, DHTML, Java, Java Script, C++, Visual Basic, Basic, Perl, PhP, Ruby, web applications, activeX applications, flash applications, Microsoft applications, Lotus applications, Corel applications, Adobe applications, Netscape applications, Firefox applications, Google applications, Yahoo applications, Facebook applications, Twitter applications, and others.

In one example where MDP Unit 100 is implemented as Java applet, the following may be a statement embedded into Hypertext Markup Language (HTML) of Web Page 810 used to initiate Java applet:

```
<APPLET
ARCHIVE="MDP.jar"
CODE="MDP.class"
NAME="MDP"
HEIGHT=335 WIDTH=310>
```

In the above statement, ARCHIVE="MDP.jar" includes the name of the file where MDP Unit's 100 executable code is stored. CODE="MDR.class" includes the object of MDP Unit 100. NAME="MDP" includes the name of the Java applet within Web Page 810. HEIGHT=335 WIDTH=310 comprise the height and width of the Java applet in pixels within Web Page 810.

Following an initiation of the Java applet, Multi-directional Pictures Processor 110 can utilize Multi-directional Still Pictures 200 and/or any other data structures (i.e. sequences, maze, etc.) by accessing and reading Multi-directional Pictures Repository 115. Multi-directional Pictures Repository 115 may include data fields of Multi-directional Still Pictures 200 and/or any other data structures (i.e. sequences, maze, etc.) as well as information on which Multi-directional Still Picture 200 is the initial one to execute. In some embodiments, Multi-directional Pictures Repository 115 and/or any information needed to utilize Multi-directional Still Pictures 200 and/or any other data structures (i.e. sequences, maze, etc.) can be embedded into HTML of Web Page 810. For example, Multi-directional Pictures Repository 115 utilized in some embodiments include:

```
<PARAM NAME=picture0             VALUE="picture0">
<PARAM NAME=forward_picture0     VALUE="Pic0.jpg">
<PARAM NAME=backward_picture0    VALUE="Pic1.jpg">
<PARAM NAME=right_picture0       VALUE="Pic2.jpg">
<PARAM NAME=left_picture0        VALUE="Pic3.jpg">
<PARAM NAME=forward_link0        VALUE="picture1">
<PARAM NAME=backward_link0       VALUE="null">
<PARAM NAME=right_link0          VALUE="null">
<PARAM NAME=left_link0           VALUE="null">
<PARAM NAME=picture1             VALUE="picture1">
<PARAM NAME=forward_picture1     VALUE="Pic4.jpg">
<PARAM NAME=backward_picture1    VALUE="Pic5.jpg">
```

-continued

```
<PARAM NAME=right_picture1       VALUE="Pic6.jpg">
<PARAM NAME=left_picture1        VALUE="Pic7.jpg">
<PARAM NAME=forward_link1        VALUE="picture2">
<PARAM NAME=backward_link1       VALUE="picture0">
<PARAM NAME=right_link1          VALUE="picture3">
<PARAM NAME=left_link1           VALUE="picture4">
```

The first set of definitions (first nine lines of the above code) include an initial Multi-directional Still Picture 200 to be executed when Multi-directional Pictures Processor 110 starts.

<PARAM NAME=picture0 VALUE="picture0"> indicates that the initial Multi-directional Still Picture 200 includes a Multi-directional Still Picture 200 named "picture0".

<PARAM NAME=forward_picture0 VALUE="Pic0.jpg"> indicates that Forward Still Picture 210*a* of the initial Multi-directional Still Picture 200 includes a digital picture named "Pic0.jpg".

<PARAM NAME=backward_picture0 VALUE="Pic1.jpg"> indicates that Backward Still Picture 210*b* of the initial Multi-directional Still Picture 200 includes a digital picture named "Pic1.jpg".

<PARAM NAME=right_picture0 VALUE="Pic2.jpg"> indicates that Right Still Picture 210*c* of the initial Multi-directional Still Picture 200 includes a digital picture named "Pic2.jpg".

<PARAM NAME=left_picture0 VALUE="Pic3.jpg"> indicates that Left Still Picture 210*d* of the initial Multi-directional Still Picture 200 includes a digital picture named "Pic3.jpg".

<PARAM NAME=forward_link0 VALUE="picture1"> indicates that Forward Multi-directional Still Picture Link 220*a* of the initial Multi-directional Still Picture 200 points to Multi-directional Still Picture 200 named "picture1".

<PARAM NAME=backward_link0 VALUE="null"> indicates that Backward Multi-directional Still Picture Link 220*b* of the initial Multi-directional Still Picture 200 is empty and does not point to a Multi-directional Still Picture 200 or to an outside application or process.

<PARAM NAME=right_link0 VALUE="null"> indicates that Right Multi-directional Still Picture Link 220*c* of the initial Multi-directional Still Picture 200 is empty and does not point to a Multi-directional Still Picture 200 or to an outside application or process.

<PARAM NAME=left_link0 VALUE="null"> indicates that Left Multi-directional Still Picture Link 220*d* of the initial Multi-directional Still Picture 200 is empty and does not point to a Multi-directional Still Picture 200 or to an outside application or process.

The second set of definitions (next nine lines of the above code) follows the same logic of utilizing a next Multi-directional Still Picture 200 based on the above-described process. " . . . " indicates that any number of additional Multi-directional Still Pictures 200 can be utilized or defined by the same process.

Web Browser 800 comprises the functionality for accessing, presenting, or navigating information, and/or other disclosed functionalities. Web Browser 800 comprises the functionality for accessing, presenting, and/or navigating information accessible over a network. Information may include Web Pages 810, applications, programs, databases, and/or any other data or resource. Examples of Web Browsers 800 include Mozilla Firefox, Google Chrome, Netscape Navigator, Microsoft Internet Explorer, and others.

Web Page 810 comprises the functionality for storing information, and/or other disclosed functionalities. Web Page 810 comprises the functionality for storing information readable by a Web Browser 800 or by any other application, program, device, and/or system able to read web pages. In some embodiments, Web Page 810 can be stored in a file that resides on a Remote Computing Device 1310 (later described) accessible over a Network 1300 (later described). In other embodiments, Web Page 810 can be stored in a file that resides on a user's Computing Device 70. In yet other embodiments, Web Page 810 can be dynamically created by a program and delivered over a network. Examples of Web Page 810 formats and/or programs that can dynamically create Web Pages 810 include HTML, XML, DHTML, Java Script, Perl, PhP, Ruby, and others.

Window 830 comprises the functionality for visual representation of an instance of MDP Unit 100, and/or other disclosed functionalities. In some embodiments, Window 830 includes Picture Display 840, Forward Direction Arrow 850*a*, Backward Direction Arrow 850*b*, Right Direction Arrow 850*c*, Left Direction Arrow 850*d*, Forward Picture Arrow 860*a*, Backward Picture Arrow 860*b*, Right Picture Arrow 860*c*, Left Picture Arrow 860*d*, and/or Orientation Pointer 870. Other additional elements may be included as needed, or some of the disclosed ones may be excluded, or a combination thereof may be utilized in alternate embodiments.

Picture Display 840 comprises the functionality for showing or rendering (i.e. depicting, etc.) pictures, and/or other disclosed functionalities. Picture Display 840 comprises the functionality for showing or rendering Still Pictures 210*a*, 210*b*, 210*c*, 210*d*, etc. or Motion Pictures 410*a*, 410*b*, 410*c*, 410*d*, etc. (later described). Picture Display 840 may also show or render any other visual content including visual content generated by outside applications or processes in which case the user may interact with the outside application or process through Picture Display 840. In general, Picture Display 840 may show any visual content and/or enable any interaction with an outside application or process as long as Picture Display 840 can (1) access an interpreter that includes information on how to graphically interpret a particular visual content, or (2) access an interface that includes information on how to interact with a particular outside application or process. Such interpreter or interface may include a plugin (also referred to as addin, extension, etc.) such as a plugin for Java Virtual Machine that can be installed in Web Browser 800, a Web application plugin, an ActiveX plugin, a Flash plugin, a Microsoft plugin, a Lotus plugin, a Corel plugin, a Adobe plugin, a Netscape plugin, a Firefox plugin, a Google plugin, a Yahoo plugin, a Facebook plugin, a Twitter plugin, an application programming interface (API), any driver, any program or file such as HTML, XML, DHTML, Java, Java Script, C++, Visual Basic, Basic, Perl, PhP, and others.

Direction Arrow 850*a*, 850*b*, 850*c*, 850*d*, etc. comprises the functionality for referencing Multi-directional Still Picture Link 220*a*, 220*b*, 220*c*, 220*d*, etc. or Multi-directional Motion Picture Link 420*a*, 420*b*, 420*c*, 420*d*, etc. (later described), and/or other disclosed functionalities. Each Direction Arrow 850*a*, 850*b*, 850*c*, 850*d*, etc. may be associated with its corresponding Multi-directional Still Picture Link 220*a*, 220*b*, 220*c*, 220*d*, etc. or Multi-directional Motion Picture Link 420*a*, 420*b*, 420*c*, 420*d*, etc. In addition to Forward Direction Arrow 850*a*, Backward Direction Arrow 850*b*, Right Direction Arrow 850*c*, and Left Direction Arrow 850*d*, any number of other Direction Arrows can be utilized including up Direction Arrow, down Direction Arrow, diagonal Direction Arrow, angular Direction Arrow, behind Direction Arrow, turn around Direction Arrow, reverse Direction Arrow, oblique Direction Arrow, circular Direction Arrow, and others. In general, any Direction Arrow can be utilized corresponding to its associated Multi-directional Still Picture Link or Multi-directional Motion Picture Link. In some embodiments, Direction Arrow 850*a*, 850*b*, 850*c*, 850*d*, etc. can be implemented as a push button (i.e. web form push button, etc.). In other embodiments, Direction Arrow 850*a*, 850*b*, 850*c*, 850*d*, etc. can be implemented as a picture or other visual representation of a direction sign. User may select or activate Direction Arrow 850*a*, 850*b*, 850*c*, 850*d*, etc. by manipulating Human-machine Interface 23, by pressing a keyboard key, by touching a touch screen button, by clicking a mouse button, by pressing a game controller button, by pressing a joystick button, by pressing a remote control button, by sliding a control wheel (i.e. iPod control wheel, etc.), or by using other input means associated with particular Direction Arrow 850*a*, 850*b*, 850*c*, 850*d*, etc. When a user selects a Direction Arrow 850*a*, 850*b*, 850*c*, 850*d*, etc., Multi-directional Pictures Processor 110 may execute a Multi-directional Still Picture Link 220*a*, 220*b*, 220*c*, 220*d*, etc. or a Multi-directional Motion Picture Link 420*a*, 420*b*, 420*c*, 420*d*, etc. associated with the selected Direction Arrow 850*a*, 850*b*, 850*c*, 850*d*, etc. In some embodiments, certain areas on the Picture Display 840 can be associated with Multi-directional Still Picture Links 220*a*, 220*b*, 220*c*, 220*d*, etc. or Multi-directional Motion Picture Links 420*a*, 420*b*, 420*c*, 420*d*, etc. in which case Direction Arrows 850*a*, 850*b*, 850*c*, 850*d*, etc. may be used as secondary input means or not used at all. In one example, a user's clicking on any part of a park's forward walkway depicted in a Still Picture 210*a*, 210*b*, 210*c*, 210*d*, etc. or Motion Picture 410*a*, 410*b*, 410*c*, 410*d*, etc. may execute Forward Multi-directional Still Picture Link 220*a* or Forward Multi-directional Motion Picture Link 420*a* without using Direction Arrows 850*a*, 850*b*, 850*c*, 850*d*, etc.

Picture Arrow 860*a*, 860*b*, 860*c*, 860*d*, etc. comprises the functionality for referencing Still Picture 210*a*, 210*b*, 210*c*, 210*d*, etc. or Motion Picture 410*a*, 410*b*, 410*c*, 410*d*, etc. (later described), and/or other disclosed functionalities. Each Picture Arrow 860*a*, 860*b*, 860*c*, 860*d*, etc. can be associated with its corresponding Still Picture 210*a*, 210*b*, 210*c*, 210*d*, etc. or Motion Picture 410*a*, 410*b*, 410*c*, 410*d*, etc. In addition to Forward Picture Arrow 860*a*, Backward Picture Arrow 860*b*, Right Picture Arrow 860*c*, and Left Picture Arrow 860*d*, any number of other Picture Arrows can be utilized including up Picture Arrow, down Picture Arrow, diagonal Picture Arrow, angular Picture Arrow, behind Picture Arrow, turn around Picture Arrow, reverse Picture Arrow, oblique Picture Arrow, circular Picture Arrow, and others. In general, any Picture Arrow can be utilized corresponding to its associated Still Picture or Motion Picture. In some embodiments, Picture Arrow 860*a*, 860*b*, 860*c*, 860*d*, etc. can be implemented as a push button (i.e. web form push button, etc.). In other embodiments, Picture Arrow 860*a*, 860*b*, 860*c*, 860*d*, etc. may be implemented as a picture or other visual representation of a directional sign. User can select or activate Picture Arrow 860*a*, 860*b*, 860*c*, 860*d*, etc. by manipulating Human-machine interface 23, by pressing a keyboard key, by touching a touch screen button, by clicking a mouse button, by pressing a game controller button, by pressing a joystick button, by pressing a remote control button, by sliding a control wheel (i.e. iPod control wheel, etc.), or by using other input means associated with particular Picture Arrow 860*a*, 860*b*, 860*c*, 860*d*, etc. When a user selects a Picture Arrow 860*a*, 860*b*, 860*c*, 860*d*, etc., Multi-directional Pictures Processor 110 may execute a Still Picture 210*a*, 210*b*, 210*c*, 210*d*, etc. or Motion Picture 410*a*, 410*b*, 410*c*, 410*d*, etc. associated with the selected Picture Arrow 860*a*, 860*b*, 860*c*, 860*d*, etc.

Orientation Pointer 870 comprises the functionality for referencing Orientation 205, and/or other disclosed functionalities. Orientation Pointer 870 may be associated with any absolute or relative Orientation 205 previously described such as north, south, east, west, northeast, northwest, southeast, southwest, tree, mountain, building, forward, backward, right, left, angular, and others. In some embodiments, Orientation Pointer 870 can be implemented as a push button (i.e. web form push button, etc.). In other embodiments, Orientation Pointer 870 can be implemented as a picture or other visual representation of an orientation sign. User may select or activate Orientation Pointer 870 by manipulating Human-machine Interface 23, by pressing a keyboard key, by touching a touch screen button, by clicking a mouse button, by pressing a game controller button, by pressing a joystick button, by pressing a remote control button, by sliding a control wheel (i.e. iPod control wheel, etc.), or by using other input means associated with Orientation Pointer 870. Once a user selects Orientation Pointer 870, any means of changing Orientation 205 can be utilized such as selecting orientation choices (i.e. north, south, east, west, northeast, northwest, southeast, southwest, tree, mountain, building, forward, backward, right, left, angular, etc.) from a list, utilizing directional signs (i.e. arrows, pointers, etc.) representing orientation choices, utilizing x, y, and z axes and/or any coordinates representing orientation choices in 3D objects or spaces, sliding a wheel component (i.e. control wheel, etc.) of an input device in the direction of orientation choices, manipulating Human-machine Interface 23, or any other means of changing Orientation 205. When a user selects Orientation Pointer 870 including any sub-selections, Multi-directional Pictures Processor 110 may change Orientation 205. In some embodiments, responsive to a change in Orientation 205, Multi-directional Pictures Processor 110 may redefine some or all Still Pictures 210*a*, 210*b*, 210*c*, 210*d*, etc. and/or some or all Multi-directional Still Picture Links 220*a*, 220*b*, 220*c*, 220*d*, etc. of some or all Multi-directional Still Pictures 200 to correspond to a new Orientation 205 as previously described. In other embodiments, responsive to a change in Orientation 205, Multi-directional Pictures Processor 110 may redefine some or all Motion Pictures 410*a*, 410*b*, 410*c*, 410*d*, etc. and/or some or all Multi-directional Motion Picture Links 420*a*, 420*b*, 420*c*, 420*d*, etc. of some or all Multi-directional Motion Pictures 400 to correspond to a new Orientation 205.

Map 820 comprises the functionality for representing an object and/or its associated Multi-directional Still Pictures 200 or Multi-directional Motion Pictures 400 in a summarized or miniaturized form, and/or other disclosed functionalities. In some embodiments, Map 820 can be implemented as a digital picture comprising locations (i.e. "hot spots") that a user can click on to quickly move to a specific Multi-directional Still Picture 200 or Multi-directional Motion Picture 400 of interest. In such embodiments, Map 820 may be an example of an outside application or process that can execute Multi-directional Still Pictures 200 within MDP Unit 100. Such execution can be implemented using one or more global functions accessible or executable by the outside application or process. Global functions are widely used in application design where applications or processes need to execute each other's internal functions. Such global functions may be available within the Java platform, the operating system, any system elements, or any elements of the Computing Device 70. Such global functions may further have access to one or more MDP Unit's 100 internal functions, objects, or procedures. In the case that an outside application or process needs to execute a Multi-directional Still Picture 200 or Multi-directional Motion Picture 400, it may first execute a global function including passing any parameters to the global function. The executing global function may then reference and execute a desired Multi-directional Still Picture 200 or Multi-directional Motion Picture 400 execution function, or any other internal function within MDP Unit 100. In one example, an outside application or process such as Map 820 can execute a specific Multi-directional Still Picture 200 or Multi-directional Motion Picture 400 associated with a clickable location (i.e. "hot spot") of interest on the Map 820. Clicking on a location (i.e. "hot spot") of interest enables a user to quickly display a Multi-directional Still Picture 200 or Multi-directional Motion Picture 400 associated with the clicked location (i.e. "hot spot") of interest without having to move among other Multi-directional Still Pictures 200 or Multi-directional Motion Picture 400 to arrive at such location of interest. The outside application or process (i.e. Map 820 in this example) may execute a global function including passing to it parameters such as an identifier of the Multi-directional Still Picture 200 or Multi-directional Motion Picture 400 to be executed. The executing global function may then execute a desired MDP Unit's 100 internal function such as Multi-directional Still Picture 200 or Multi-directional Motion Picture 400 execution function. In some embodiments, MDP Unit's 100 internal function can be defined as a global function in which case outside applications or processes would have direct access to it. In general, an outside application or process can execute any MDP Unit's 100 internal function that is defined as a global function or for which there exists a global function accessible or executable by an outside application or process.

In some embodiments, a Multi-directional Still Picture Link 220*a*, 220*b*, 220*c*, 220*d*, etc. or Multi-directional Motion Picture Link 420*a*, 420*b*, 420*c*, 420*d*, etc. includes a reference or pointer to an outside application or process which MDP Unit 100 can interact with or execute. In some aspects, such execution can be implemented using one or more global functions accessible or executable by MDP Unit 100. As previously described, global functions are widely used in application design where application programs or processes need to execute each other's internal functions and, as such, global functions enable MDP Unit 100 to access one or more internal functions, objects, or procedures of outside applications or processes. In the case that MDP Unit 100 needs to execute an outside application or process, it may first execute a global function including passing any parameters to the global function. The executing global function may then reference and execute a desired function of the outside application or process. In one example, a Multi-directional Still Picture Link 220*a*, 220*b*, 220*c*, 220*d*, etc. or Multi-directional Motion Picture Link 420*a*, 420*b*, 420*c*, 420*d*, etc. may point to an outside application or process such as a web page that contains information about an object or location pointed to by the Multi-directional Still Picture Link 220*a*, 220*b*, 220*c*, 220*d*, etc. or Multi-directional Motion Picture Link 420*a*, 420*b*, 420*c*, 420*d*, etc. MDP Unit 100 can execute the outside application or processes (i.e. open a web browser and show the web page in this example, etc.) by executing a global function including passing to it parameters such as a URL of the web page to be viewed in the web browser. The executing global function may then execute a desired internal function of the outside application or process (i.e. web browser in this example) such as a function for showing the web page. In some embodiments, an internal function of an outside application or process can be defined as a global function in which case MDP Unit 100 would have direct access to it. In general, MDP Unit 100 can execute any internal function of an outside application or process that is defined as a global function or for which there exists a global function accessible or executable by MDP Unit 100.

Web Browser 800, Web Page 810, Map 820, Window 830, Picture Display 840, Picture Arrow 860*a*, 860*b*, 860*c*, 860*d*, etc., Direction Arrow 850*a*, 850*b*, 850*c*, 850*d*, etc., Orientation Pointer 870, and/or other disclosed graphical elements may be a part of the previously described User Interaction Unit 105 in some implementations.

In some embodiments, an instance of MDP Unit 100 starts by Multi-directional Pictures Processor's 110 executing or displaying a Still Picture 210*a*, 210*b*, 210*c*, 210*d*, etc. of an initial Multi-directional Still Picture 200. Any Multi-directional Still Picture 200 can be defined to be initial. In one example, initial Multi-directional Still Picture 200 includes a Forward Still Picture 210*a* with a view of a park's walkway facing one of the nearby buildings as shown in Step 1 of FIG. 6. Multi-directional Pictures Processor 110 may display the Forward Still Picture 210*a* of the initial Multi-directional Still Picture 200 in Picture Display 840. Multi-directional Pictures Processor 110 may then associate Picture Arrows 860*a*, 860*b*, 860*c*, 860*d*, etc. with Still Pictures 210*a*, 210*b*, 210*c*, 210*d*, etc. of the initial Multi-directional Still Picture 200, Multi-directional Pictures Processor 110 may further associate Direction Arrows 850*a*, 850*b*, 850*c*, 850*d*, etc. with Multi-directional Still Picture Links 220*a*, 220*b*, 220*c*, 220*d*, etc. of the initial Multi-directional Still Picture 200. Multi-directional Pictures Processor 110 may further associate Orientation Pointer 870 with Orientation 205 of the initial Multi-directional Still Picture 200. User can select or activate a Picture Arrow 860*a*, 860*b*, 860*c*, 860*d*, etc. responsive to which Multi-directional Pictures Processor 110 may display a Still Picture 210*a*, 210*b*, 210*c*, 210*d*, etc. to which the selected Picture Arrow 860*a*, 860*b*, 860*c*, 860*d*, etc. points. This way, user can change the view from a location represented by the initial Multi-directional Still Picture 200. User can also select or activate a Direction Arrow 850*a*, 850*b*, 850*c*, 850*d*, etc. responsive to which Multi-directional Pictures Processor 110 may execute Multi-directional Still Picture 200 to which Multi-directional Still Picture Link 220*a*, 220*b*, 220*c*, 220*d*, etc. associated with the selected Direction Arrow 850*a*, 850*b*, 850*c*, 850*d*, etc. points. This way, user can move from the initial to another Multi-directional Still Picture 200, which may bring user to a next location on the park's walkway such as the location depicted in Step 2 of FIG. 6. User can similarly utilize Direction Arrows 850*a*, 850*b*, 850*c*, 850*d*, etc. to move among any Multi-directional Still Pictures 200. User can also select or activate Orientation Pointer 870 responsive to which Multi-directional Pictures Processor 110 may change Orientation 205. As such, MDP Unit 100 enables a user to view all views (i.e. Still Pictures 210*a*, 210*b*, 210*c*, 210*d*, etc.) from all locations (i.e. Multi-directional Still Pictures 200) of a represented object (i.e. park in this example) as well as to simulate user's motion (i.e. stepping, flying, etc.) relative to the represented object. Execution of a subsequent Multi-directional Still Picture 200 may trigger any of the described steps of executing the initial Multi-directional Still Picture 200. Any of the described steps of executing the initial Multi-directional Still Picture 200 can similarly be utilized with Multi-directional Motion Pictures 400 (later described) where Multi-directional Pictures Processor 110 may display Motion Pictures 410*a*, 410*b*, 410*c*, 410*d*, etc., associate Picture Arrows 860*a*, 860*b*, 860*c*, 860*d*, etc. with Motion Pictures 410*a*, 410*b*, 410*c*, 410*d*, etc., associate Direction Arrows 850*a*, 850*b*, 850*c*, 850*d*, etc. with Multi-directional Motion Picture Links 420*a*, 420*b*, 420*c*, 420*d*, etc., associate Orientation Pointer 870 with Orientation 405, and/or perform other operations as described.

Figure 7:
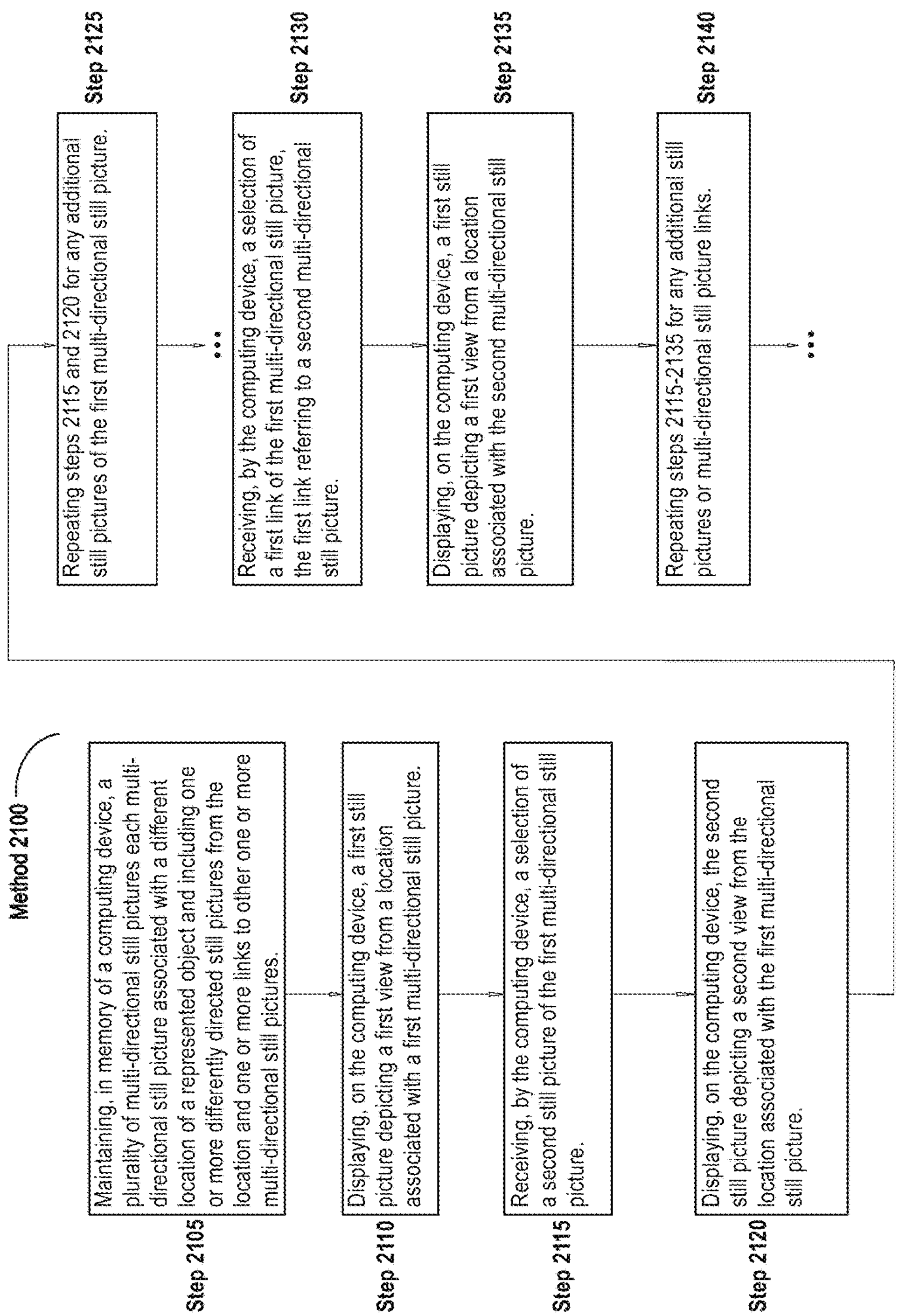
FIG. 7 illustrates a flow chart diagram of an embodiment of a method 2100 implemented by MDP Unit 100.

Referring to FIG. 7, the illustration shows an embodiment of a method 2100 for using a collection of Multi-directional Still Pictures 200. The method may therefore be used on one or more computing devices to enable a user to view all views (i.e. forward, backward, right, left, up, down, diagonal, angular, etc.) from all locations of a represented object and enable the user to move among the Multi-directional Still Pictures 200 this way simulating motion relative to the represented object. In some embodiments, the method may be used on one or more computing devices operating an interface for MDP Unit 100 to enable a user to view all views (i.e. forward, backward, right, left, up, down, diagonal, angular, etc.) from all locations of a represented object and enable the user to move among the Multi-directional Still Pictures 200 this way simulating motion relative to the represented object, Some or all steps of this method may similarly be implemented for using a collection of Multi-directional Motion Pictures 400 (later described). In some embodiments, the steps of this method can be used in combination with steps of other disclosed methods.

At step 2105, a plurality of multi-directional still pictures is maintained in memory of a computing device each multi-directional still picture associated with a different location of a represented object and including one or more differently directed still pictures from the location and one or more links to other one or more multi-directional still pictures. One or more multi-directional still pictures may also be received by the computing device or any computing device in some embodiments. MDP Unit 100 enables representation of objects using multi-directional still pictures associated with locations of the represented object. Any locations can be used to represent the object. In one example, steps (i.e. every two feet, etc.) in a park's walkways can be used as the locations to simulate a user's stepping through the park. In another example, evenly spaced points (i.e. points in the center of every square yard, etc.) in a building's interior can be used as the locations to simulate a user's stepping through the building. In some embodiments, a multi-directional still picture includes a data structure storing one or more differently directed still pictures and one or more links to other multi-directional still pictures. In other embodiments, multi-directional still pictures may be ordered to include a first multi-directional still picture, followed by a second multi-directional still picture, which may also be followed by a third multi-directional still picture, and so on, to complete a sequence. In yet other embodiments, multi-directional still pictures can be arranged in a maze that corresponds to a shape of a represented object. In yet other embodiments, multi-directional still pictures may be interlinked in any conceivable manner without using any intermediary or supporting data structures such as the sequence and/or maze. Generally, multi-directional still pictures may correspond to a shape of a represented object. Any number of multi-directional still pictures including still pictures pointed to any number of directions (i.e. forward, backward, right, left, up, down, diagonal, angular, etc.) can be utilized to cover the entire represented object or a portion thereof. Also, any number of links among multi-directional still pictures can be used. Such links may connect multi-directional still pictures in any conceivable direction (i.e. forward, backward, right, left, up, down, diagonal, angular, etc.). The links enable the user to move among multi-directional still pictures this way simulating motion relative to the represented object. Furthermore, any multi-directional still picture or an element thereof may include or be associated with interpretive information (later described). In some aspects, any still picture may include or be associated with interpretive information on its content. Interpretive information comprises any identifying, descriptive, associative, time related, location related, and/or other information or metadata on a content of a still picture or on the multi-directional still picture to which the still picture belongs.

At step 2110, a first still picture depicting a first view from a location associated with a first multi-directional still picture is displayed on the computing device. A user can view, on the display of a computing device, a still picture such as the first still picture of the first multi-directional still picture. In one example, the first location may be a logical starting point such as a location near an entrance into a park or near a door of a building in which case the first still picture may depict a view from this logical starting location (i.e. a view of what a pedestrian would see entering a gate of the park, etc.). In another example, the first location may be any location of the represented object. In some embodiments, a still picture such as the first still picture of the first multi-directional still picture may be obtained from a file, a data structure, an object, and/or other similar repository. In other embodiments, a still picture may be obtained from a database management system (DBMS), a database, a system, a process, and/or other similar repository. In further embodiments, a still picture can be embedded within an instance of MDP Unit 100 (i.e. hard coded in the Multi-directional Pictures Processor 110). In yet further embodiments, a still picture may be obtained from a separate file (i.e. object file, etc.), a separate data structure, a separate DBMS, a separate database, a separate system, a separate process, and/or other separate repository or system for each of the still pictures or references thereto. In yet further embodiments, a still picture may be obtained from a collection of definitions of pictures or references thereto embedded in other files or programs. In other embodiments, a still picture may be obtained from a Multi-directional Pictures Repository 115 comprising a file (i.e. object file, etc.), a data structure, a DBMS, a database, a system, a process, and/or other repository or system. In some aspects, picture processing can be implemented to insert or overlay a picture of an avatar into/onto a still picture such as the first still picture. Furthermore, in addition to displaying the first still picture, interpretive information (later described) on the content of the first still picture or interpretive information on the multi-directional still picture to which the first still picture belongs can also be displayed. Displaying includes any action or operation by or for a User Interaction Unit 105, Picture Display 840, and/or other disclosed elements.

At step 2115, the computing device receives a selection of a second still picture of the first multi-directional still picture. In some embodiments, MDP Unit 100 includes a means such as a graphical user interface (GUI) configured to show graphical pointers each associated with a specific still picture and/or specific multi-directional still picture link of a multi-directional still picture such as the first multi-directional still picture. In one example, a pointer to each of the one or more still pictures of the first multi-directional still picture and a pointer to each of the one or more links of the first multi-directional still picture may be displayed on the computing device for selection by a user. In some embodiments, a pointer in a GUI includes an arrow, a triangle, a push button (i.e. web form push button, etc.), a picture, and/or other such graphical directional signs or indicia indicating a direction of its associated still picture and/or multi-directional still picture link, in one example, an upward pointed triangle may be associated with a forward still picture and/or an upward pointed arrow may be associated with a forward multi-directional still picture link. In other embodiments, certain areas on the displayed still picture may be associated with other still pictures and/or multi-directional still picture links in which case pointers can be used as secondary input means or not used at all. In one example, a user's clicking on any part of a park's forward walkway depicted in a still picture may execute a forward multi-directional still picture link without selecting its associated pointer. A pointer may be selected through any internal or external input means of the computing device such as Human-machine Interface 23, keyboard, mouse, touch screen, control wheel, remote control, joystick, microphone, and/or other input means. User can select a pointer by manipulating Human-machine Interface 23, by pressing keyboard keys, by touching touch screen buttons, by clicking mouse buttons, by pressing game controller buttons, by pressing joystick buttons, by pressing remote control buttons, by sliding a control wheel (i.e. iPod control wheel, etc.), or by using other directional means associated with particular pointer. Upon user's selection, the selected pointer may be received by MDP Unit 100 or any component thereof. A pointer comprises any action or operation by or for a Direction Arrow 850*a*, 850*b*, 850*c*, 850*d*, etc., and/or Picture Arrow 860*a*, 860*b*, 860*c*, 860*d*, etc. Receiving comprises any action or operation by or for a User Interaction Unit 105, and/or other disclosed elements.

At step 2120, the second still picture depicting a second view from the location associated with the first multi-directional still picture is displayed on the computing device. Step 2120 includes any action or operation described in step 2110 as applicable.

At step 2125, steps 2115 and 2120 are repeated for any additional still pictures of the first multi-directional still picture. Steps 2115 and 2120 can be performed repeatedly to display any subsequent still pictures of a multi-directional still picture such as the first multi-directional still picture. Steps 2115 and 2120 may therefore be performed to enable a user to view all views (i.e. forward, backward, right, left, up, down, diagonal, angular, etc.) from the location associated with a multi-directional still picture such as the first multi-directional still picture.

At step 2130, the computing device receives a selection of a first link of the first multi-directional still picture, the first link referring to a second multi-directional still picture. Step 2130 includes any action or operation described in step 2115 as applicable. Furthermore, any link such as the first link of the first multi-directional still picture may include or be associated with interpretive information (later described). Such interpretive information itself may include a link or reference to external content, resources, systems, applications or processes that can be executed when the link is utilized. In one example, identifying interpretive information from a still picture can be used to link the multi-directional still picture with a content, resource, or operation the user may want to access or perform such as enter an object, enter a business, visit a website, utilize a representation of an object, utilize another MDP application, utilize an outside application or process, and/or others.

At step 2135, a first still picture depicting a first view from a location associated with the second multi-directional still picture is displayed on the computing device. Step 2135 includes any action or operation described in steps 2110 and 2120 as applicable. In some embodiments, a pointer to each of the one or more still pictures of the second multi-directional still picture and a pointer to each of the one or more links of the second multi-directional still picture may be displayed on the computing device for a selection by the user.

At step 2140, steps 2115-2135 are repeated for any additional still pictures or multi-directional still picture links, Steps 2115-2135 may be performed repeatedly to display any still pictures of any multi-directional still pictures and/or to move among any multi-directional still pictures.

In some embodiments, MDP Unit 100 can be implemented to generate non-visual or no output, Such embodiments address any situation where a user interacts with an instance of MDP Unit 100 and non-visual output or no output is shown to the user. For example, a blind user would prefer to hear sound associated with or representing a selected Multi-directional Still Picture 200 or its elements. Therefore, a sound file may be played instead of picture shown to the blind user. Also, tactile output associated with or representing a selected Multi-directional Still Picture 200 or its elements may be presented. The blind user may input operating instructions through the above-described Picture Arrows 860*a*, 860*b*, 860*c*, 860*d*, etc., Direction Arrows 850*a*, 850*b*, 850*c*, 850*d*, etc., Orientation Pointer 870, and/or other elements coupled or associated with a tactile input device, speech recognizer, or other suitable interface. As such, MDP Unit 100 may operate and provide same or similar functionalities to the blind user as the MDP Unit 100 that generates visual output for a sighted user.

In some embodiments, MDP Unit 100 can be implemented to represent a multi-leveled object such as, for example, a building with plurality of floors. As such, Multi-directional Still Pictures 200 can be associated with locations on each floor and with locations on connecting structures such as stairs. This way, Multi-directional Still Pictures 200 on each floor may be interconnected and the entire building represented. In other embodiments, MDP Unit 100 can be implemented to represent a three dimensional space such as a room's space. As such, Multi-directional Still Pictures 200 may be associated with locations on the floor and with locations of the room's space (i.e. in the air, etc.). This way, Multi-directional Still Pictures 200 on the floor and in the room's space may be interconnected and the entire room's space represented.

Figure 8:
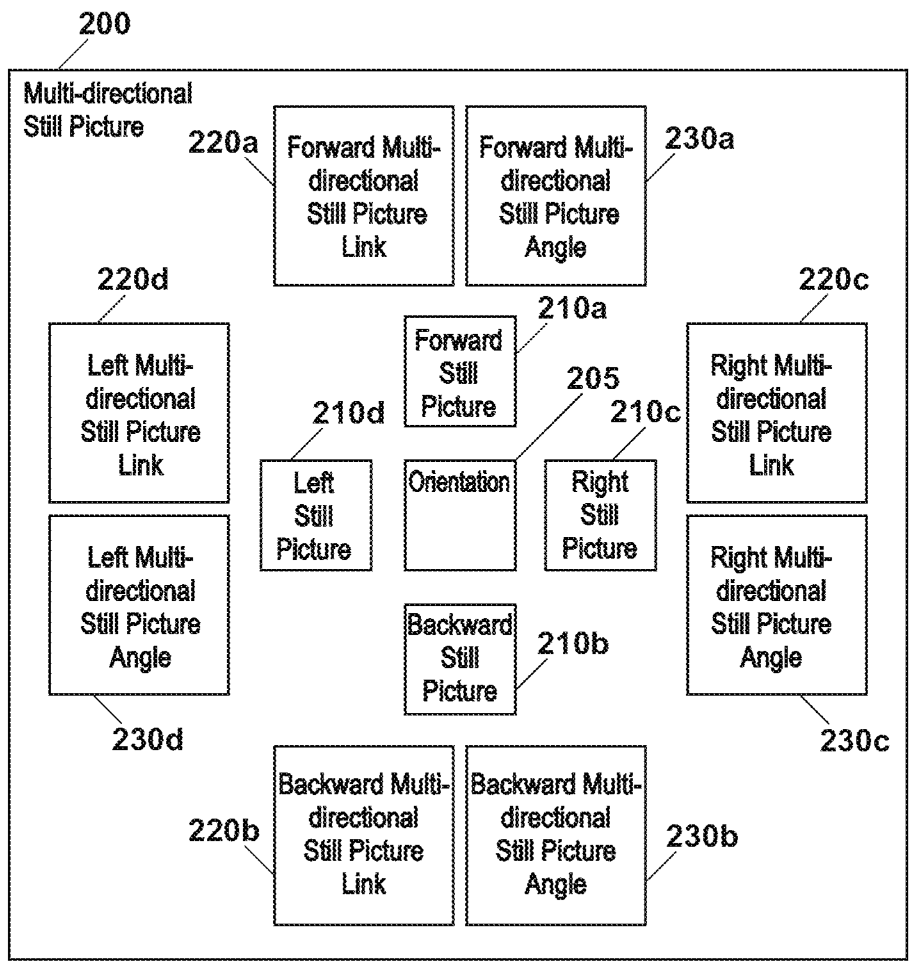
FIG. 8 is a diagram showing an embodiment of a Multi-directional Still Picture 200 including Multi-directional Still Picture Angles 230*a*, 230*b*, 230*c*, 230*d*, etc.

Referring to FIG. 8, an embodiment is illustrated in which Multi-directional Still Picture 200 includes Multi-directional Still Picture Angles 230*a*, 23013, 230*c*, 230*d*, etc. While Multi-directional Still Picture Angles 230 can be referred to or illustrated as Multi-directional Still Picture Angles 230*a-d*, one of ordinary skill in art will understand that any number of Multi-directional Still Picture Angles 230*a-n* can be utilized. In one example, a Multi-directional Still Picture 200 includes a data structure comprising thirteen data fields: (1) Forward Still Picture 210*a*, (2) Backward Still Picture 210*b*, (3) Right Still Picture 210*c*, (4) Left Still Picture 210*d*, (5) Forward Multi-directional Still Picture Link 220*a*, (6) Backward Multi-directional Still Picture Link 220*b*, (7) Right Multi-directional Still Picture Link 220*c*, (8) Left Multi-directional Still Picture Link 220*d*, (9) Forward Multi-directional Still Picture Angle 230*a*, (10) Backward Multi-directional Still Picture Angle 230*b*, (11) Right Multi-directional Still Picture Angle 230*c*, (12) Left Multi-directional Still Picture Angle 230*d*, and/or (13) Orientation 205. Multi-directional Still Picture Angle 230*a*, 230*b*, 230*c*, 230*d*, etc. can be utilized to indicate angle at which a Multi-directional Still Picture 200 referenced or pointed to by a specific Multi-directional Still Picture Link 220*a*, 22013, 220*c*, 220*d*, etc. is relative to the current Multi-directional Still Picture 200. As such, Multi-directional Still Picture Angles 230*a*, 230*b*, 230*c*, 230*d*, etc. can be utilized in representations of objects where Multi-directional Still Pictures 200 are arranged at various angles. In one example, some of a park's walkways may be constructed in a "V" shaped (i.e. fork, etc.) form. Multi-directional Still Pictures 200 including Multi-directional Still Picture Angles 230*a*, 230*b*, 230*c*, 230*d*, etc. would capture this physical feature of the represented object (i.e. park in this example). In another example, a user may want to obtain a graphical representation (i.e. a printout, map, etc.) of the represented object including a collection of Multi-directional Still Pictures 200. The graphical representation of the collection of Multi-directional Still Pictures 200 can be accurately displayed by using Multi-directional Still Picture Angles 230*a*, 230*b*, 230*c*, 230*d*, etc. Any Multi-directional Still Picture Angle 230 can be used such as, for example, 3 degree, 4 degree, 5 degree, 6 degree, 7 degree, 9 degree, 10 degree, 11 degree, 15 degree, 23 degree, 25 degree, 28 degree, 30 degree, 35 degree, 45 degree, 47 degree, 60 degree, 66 degree, 75 degree, 88 degree, 90 degree, 113 degree, 187 degree, 256 degree, 299 degree, 315 degree, 348 degree, 360 degree, 553 degree, 1692 degree, 32884 degree, or others. In addition to degrees, examples of units of measurement for Multi-directional Still Picture Angles 230*a*, 230*b*, 230*c*, 230*d*, etc. include angular minutes, angular seconds, any fractions thereof, or any other units of angular measurement. All described features and embodiments of Multi-directional Still Picture Angles 230*a*, 230*b*, 230*c*, 230*d*, etc. can similarly be utilized in Multi-directional Motion Pictures 400 (later described) where they can be referred to as Multi-directional Motion Picture Angles.

Figure 9:
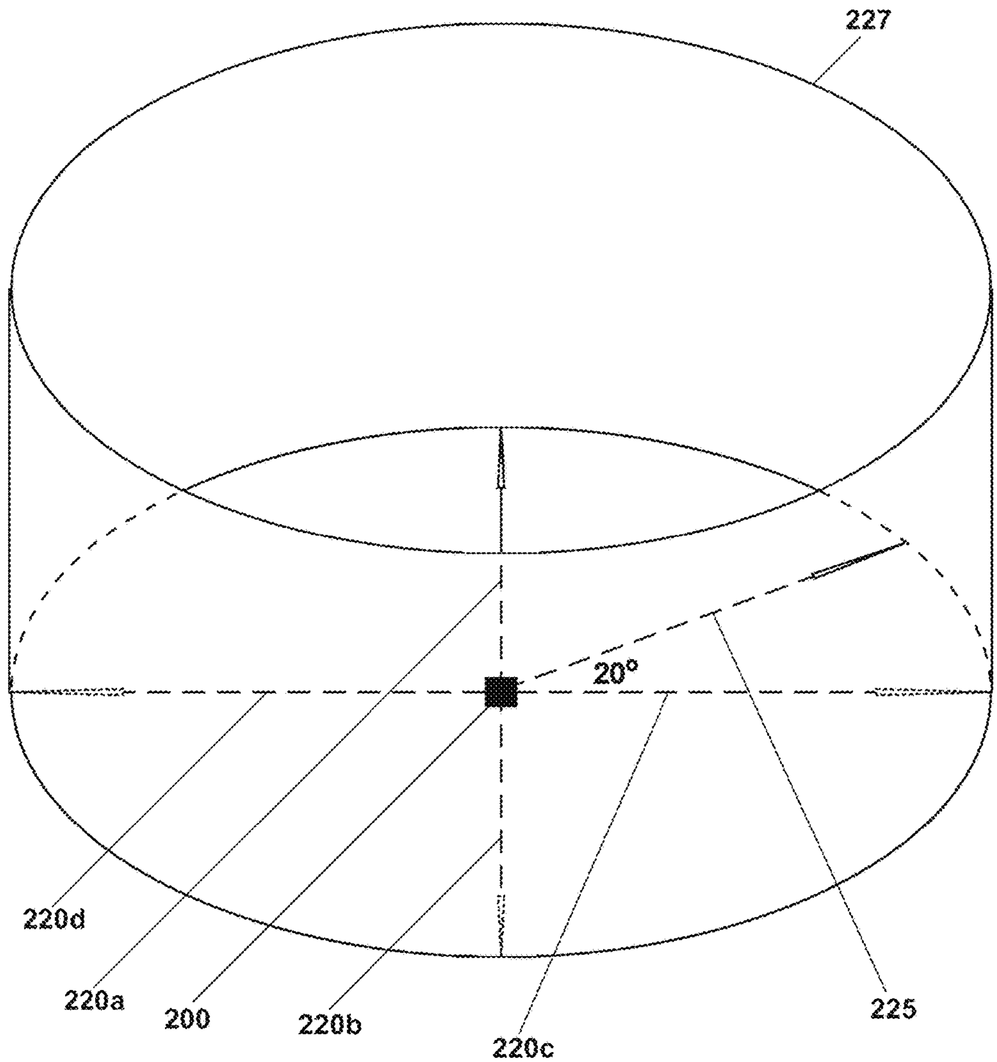
FIG. 9 shows an embodiment of approximating Multi-directional Still Picture Link 220 based on an angle of view of a Combined Picture 227.

Referring to FIG. 9, an embodiment of approximating Multi-directional Still Picture Link 220 based on an angle of view of a Combined Picture 227 is illustrated. Any image stitching or picture stitching programs or techniques known in art can be used to combine digital pictures such as Still Pictures 210*a*, 210*b*, 210*c*, 210*d*, etc. with overlapping fields of view. Commonly performed through the use of computer programs, most approaches to image stitching require nearly exact overlaps between distinct pictures. Some picture taking equipment such as high-end digital cameras enable stitching digital pictures internally. Some of the known programs and/or techniques for picture stitching include Autostitch, Hugin, Panorama Maker, Ptgui, Panorama Tools, Microsoft Research Image Composite Editor, CleVR Stitcher, and others. Some general purpose picture editing programs can also stitch digital pictures such as Adobe Photoshop, which includes tools known as Photomerge and Auto-Blend. MDP Unit 100 may utilize stitched pictures from any of the above-mentioned programs, or may implement internal (i.e. within MDP Unit 100) picture stitching by utilizing a publicly available or custom picture stitching technique. In one example in which Still Pictures 210*a*, 210*b*, 210*c*, 210*d*, etc. include overlapping fields of view needed for picture stitching process, the resulting Combined Picture 227 may be a partial or full 360 degrees panoramic picture that enables a user to rotate the View 225 in various directions from the location represented by a Multi-directional Still Picture 200. As such, means of input such as a control wheel, a track ball, virtual ball (i.e. a ball shown through a graphical user interface, etc.), and/or other rotational means of input can be used instead of, or in addition to, Picture Arrows 860*a*, 860*b*, 860*c*, 860*d*, etc. In some aspects, user's rotation of View 225 of the Combined Picture 227 may be accompanied by Multi-directional Pictures Processor's 110 adjustment or change of Orientation 205 to correspond to the rotation of view. In other aspects, the means of input such as control wheel, track ball, virtual ball, and/or other rotational means of input, Picture Arrows 860*a*, 860*b*, 860*c*, 860*d*, etc., and/or other input means may themselves rotate to correspond to a change of Orientation 205 or direction as the view of Combined Picture 227 rotates.

In some embodiments in which picture stitching is utilized, movement among Multi-directional Still Pictures 200 can be implemented by approximating which Multi-directional Still Picture Link 220*a*, 220*b*, 220*c*, 220*d*, etc. the user wanted to use in cases where the angle or direction of view of the Combined Picture 227 does not perfectly match the angle or direction of a particular Multi-directional Still Picture Link 220*a*, 220*b*, 220*c*, 220*d*, etc. Such approximation may include comparing the angle of user's View 225 of the Combined Picture 227 with Multi-directional Still Picture Angles 230*a*, 230*b*, 230*c*, 230*d*, etc. to determine the closest Multi-directional Still Picture Link 220*a*, 220*b*, 220*c*, 220*d*, etc. In one example, Right Multi-directional Still Picture Link 220*c* can be approximated from 20 degrees angle of user's View 225 of the Combined Picture 227. In another example, Left Multi-directional Still Picture Link 220*d* can be approximated from 170 degrees angle of user's View 225 of the Combined Picture 227. All described features and embodiments of stitching Still Pictures 210*a*, 210*b*, 210*c*, 210*d*, etc. and approximating Multi-directional Still Picture Links 220*a*, 220*b*, 220*c*, 220*d*, etc. can similarly be utilized with Motion Pictures 410*a*, 410*b*, 410*c*, 410*d*, etc. (later described) where the Combined Picture 227 may include combined Motion Pictures 410*a*, 410*b*, 410*c*, 410*d*, etc. In some aspects, streams of time stamped still pictures (i.e. Motion Pictures 410*a*, 410*b*, 410*c*, 410*d*, etc.) can be stitched into a combined stream of time stamped still pictures. In one example, stitching of streams of time stamped still pictures may include stitching of still pictures having same time stamps from each stream as previously described in still picture stitching. In another example, stitching of streams of time stamped still pictures may include detecting still pictures that have similar fields of view from each stream and stitching the detected still pictures from each stream. The combined stream of time stamped still pictures may therefore include a stream of combined still pictures depicting a panoramic view from a location of a represented object.

Figure 10:
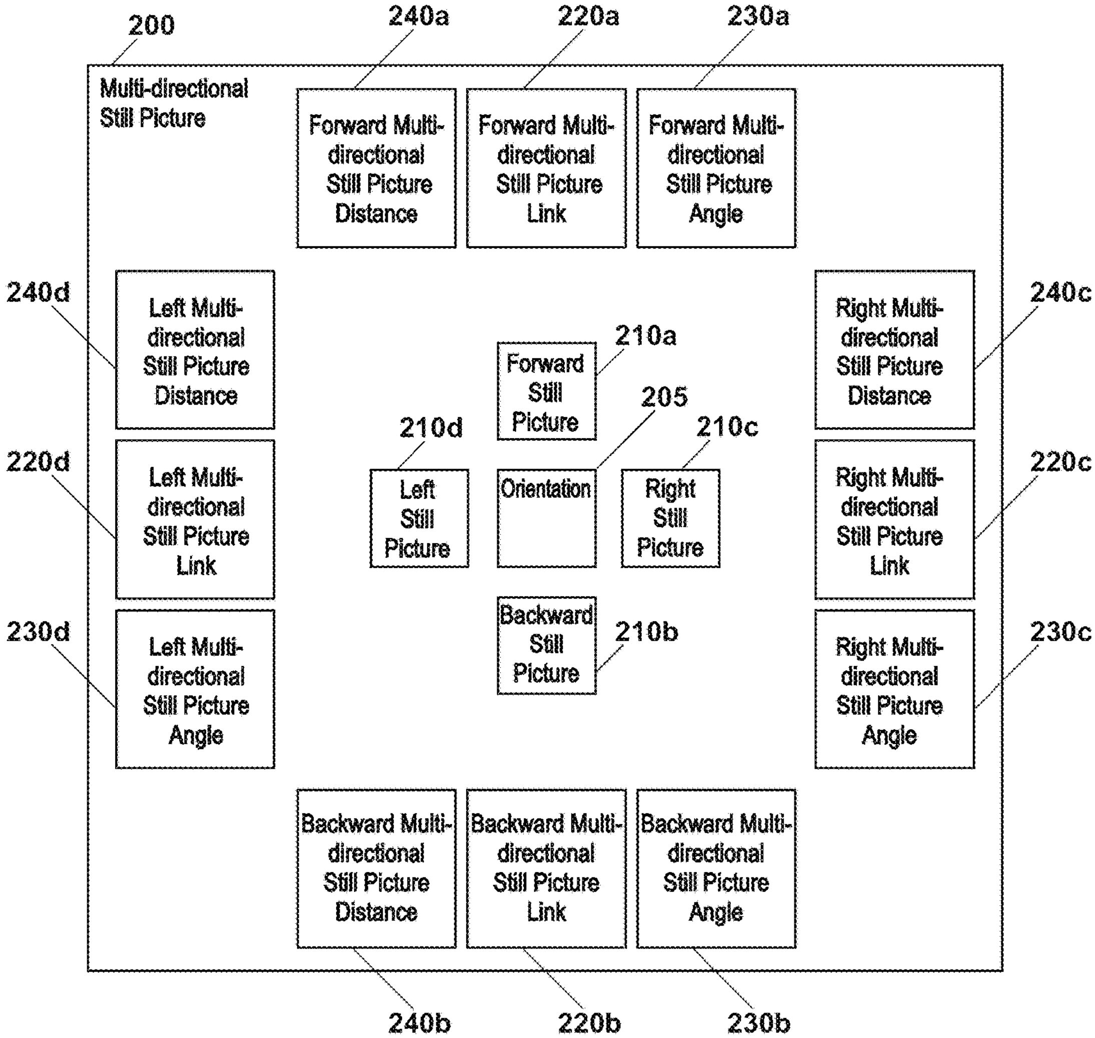
FIG. 10 is a diagram showing an embodiment of a Multi-directional Still Picture 200 including Multi-directional Still Picture Distances 240*a*, 240*b*, 240*c*, 240*d*, etc.

Referring to FIG. 10, an embodiment is illustrated in which Multi-directional Still Picture 200 includes Multi-directional Still Picture Distances 240*a*, 240*b*, 240*c*, 240*d*, etc. While Multi-directional Still Picture Distances 240 can be referred to or illustrated as Multi-directional Still Picture Distances 240*a-d*, one of ordinary skill in art will understand that any number of Multi-directional Still Picture Distances 240*a-n* can be utilized. In one example, a Multi-directional Still Picture 200 includes a data structure comprising seventeen data fields (1) Forward Still Picture 210*a*, (2) Backward Still Picture 210*b*, (3) Right Still Picture 210*c*, (4) Left Still Picture 210*d*, (5) Forward Multi-directional Still Picture Link 220*a*, (6) Backward Multi-directional Still Picture Link 220*b*, (7) Right Multi-directional Still Picture Link 220*c*, (8) Left Multi-directional Still Picture Link 220*d*, (9) Forward Multi-directional Still Picture Angle 230*a*, (10) Backward Multi-directional Still Picture Angle 230*b*, (11) Right Multi-directional Still Picture Angle 230*c*, (12) Left Multi-directional Still Picture Angle 230*d*, (13) Forward Multi-directional Still Picture Distance 240*a*, (14) Backward Multi-directional Still Picture Distance 240*b*, (15) Right Multi-directional Still Picture Distance 240*c*, (16) Left Multi-directional Still Picture Distance 240*d*, and/or (17) Orientation 205. Multi-directional Still Picture Distance 240*a*, 240*b*, 240*c*, 240*d*, etc. can be utilized to indicate a distance between the current Multi-directional Still Picture 200 and a Multi-directional Still Picture 200 referenced or pointed to by a specific Multi-directional Still Picture Link 220*a*, 220*b*, 220*c*, 220*d*, etc. As such, Multi-directional Still Picture Distances 240*a*, 240*b*, 240*c*, 240*d*, etc. can be utilized in representations of objects where Multi-directional Still Pictures 200 are arranged at various distances. In one example, some of park's walkways may be long and fewer Multi-directional Still Pictures 200 can be used to cover the distance. Multi-directional Still Pictures 200 including Multi-directional Still Picture Distances 240*a*, 240*b*, 240*c*, 240*d*, etc. would capture this physical feature of the represented object (i.e. park in this example). In another example, a user may want to obtain a graphical representation (i.e. a printout, map, etc.) of the represented object including a collection of Multi-directional Still Pictures 200. The graphical representation of the collection of Multi-directional Still Pictures 200 can be accurately displayed by using Multi-directional Still Picture Distances 240*a*, 240*b*, 240*c*, 240*d*, etc. Any Multi-directional Still Picture Distance can be used such as, for example, 1 meter, 2 meters, 3 meters, 4 meters, 5 meters, 6 meters, 7 meters, 9 meters, 10 meters, 11 meters, 15 meters, 23 meters, 25 meters, 28 meters, 30 meters, 35 meters, 45 meters, 47 meters, 60 meters, 66 meters, 75 meters, 88 meters, 90 meters, 100 meters, 1000 meters, 10000 meters, 100000 meters, or others. In addition to meters, examples of units of measurement for Multi-directional Still Picture Distances 240*a*, 240*b*, 240*c*, 240*d*, etc. include millimeters, centimeters, decimeters, kilometers, inches, feet, yards, any fractions thereof, or any other units of length measurement. All described features and embodiments of Multi-directional Still Picture Distances 240*a*, 240*b*, 240*c*, 240*d*, etc. can similarly be utilized with Multi-directional Motion Pictures 400 (later described) where they may be referred to as Multi-directional Motion Picture Distances.

Figure 11:
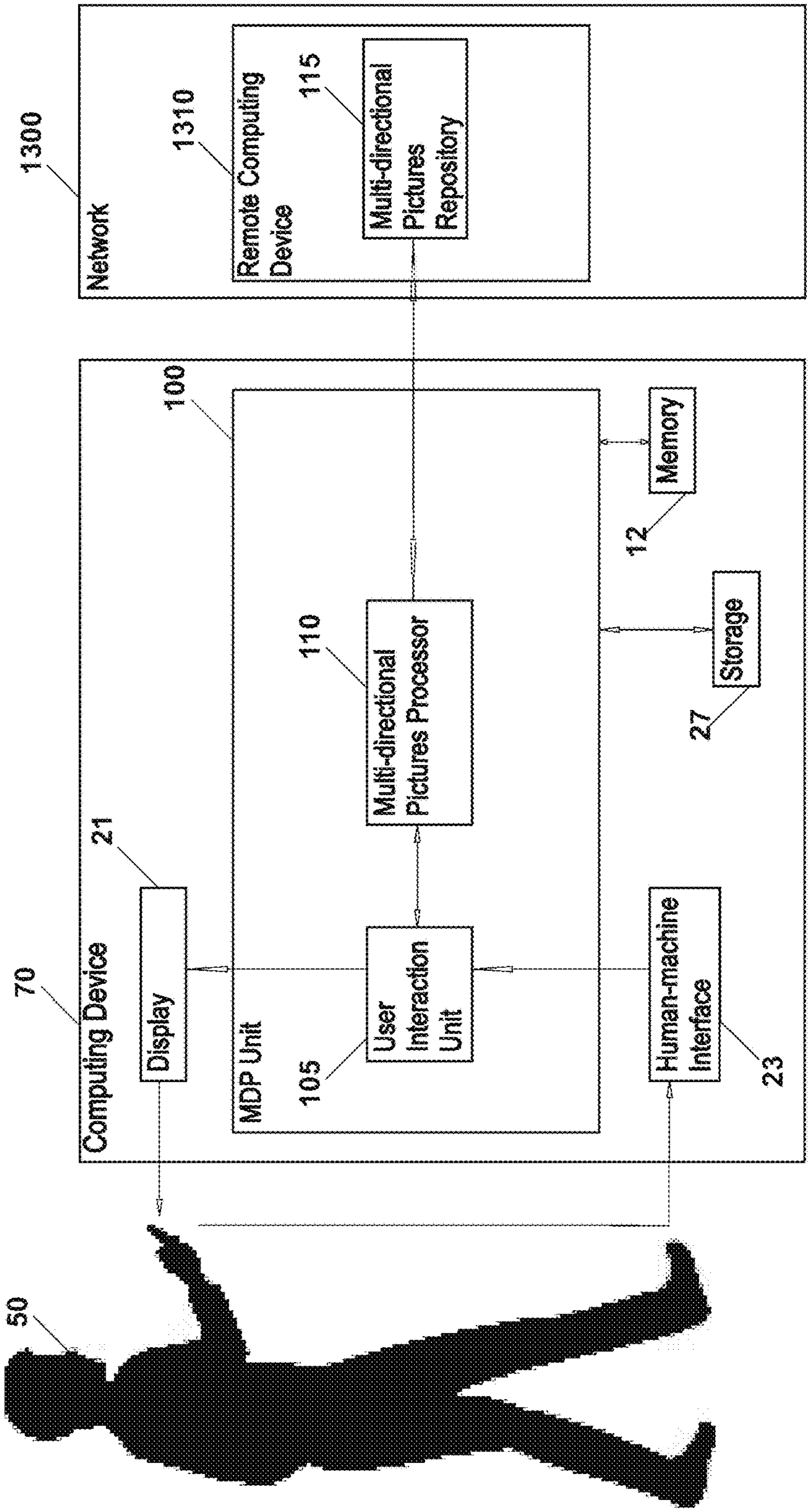
FIG. 11 is a diagram showing an embodiment of Multi-directional Pictures Repository 115 residing on a Remote Computing Device 1310.

Referring to FIG. 11, an embodiment is illustrated in which Multi-directional Pictures Repository 115 (i.e. remote Multi-directional Pictures Repository 115) resides and/or executes on a Remote Computing Device 1310 (i.e. application server, cloud, etc.) accessible over a Network 1300 (i.e. corporate enterprise network, Internet, etc.). Such remote Multi-directional Pictures Repository 115 may be stored in a remote file, DBMS, database, system, process, data structure, and/or any other remote repository. In some embodiments, a remote Multi-directional Pictures Repository 115 accessible over the Internet may be available as a network service to all the world's users who wish to utilize the remote Multi-directional Pictures Repository 115 to experience visual content included within it. In other embodiments, an instance of MDP Unit 100 running on a user's Computing Device 70 may be in a peer-to-peer network or relationship with an instance of MDP Unit 100 running on another user's Computing Device 70. Such peer-to-peer network or relationship may enable both users to share with the other user Multi-directional Pictures Repositories 115 stored on their respective Computing Devices 70. In yet other embodiments, a Multi-directional Pictures Repository 115 may be one of plurality Multi-directional Pictures Repositories 115 that have been created by administrators or users of a network service for sharing Multi-directional Pictures Repositories 115. Such Multi-directional Pictures Repositories 115 can reside in a central repository (i.e. file, DBMS, database, system, process, data structure, and/or any other repository, etc.) accessible to users of the network service. In one example, a user may post into the central repository a Multi-directional Pictures Repository 115 representing a park near his/her workplace, another user may post a Multi-directional Pictures Repository 115 representing his/her home, and yet another user may post a Multi-directional Pictures Repository 115 representing his college campus. Such central repository may be a growing repository of user contributed Multi-directional Pictures Repositories 115 each including Multi-directional Still Pictures 200, Multi-directional Motion Pictures 400, and/or other elements representing a user selected object.

Figure 12:
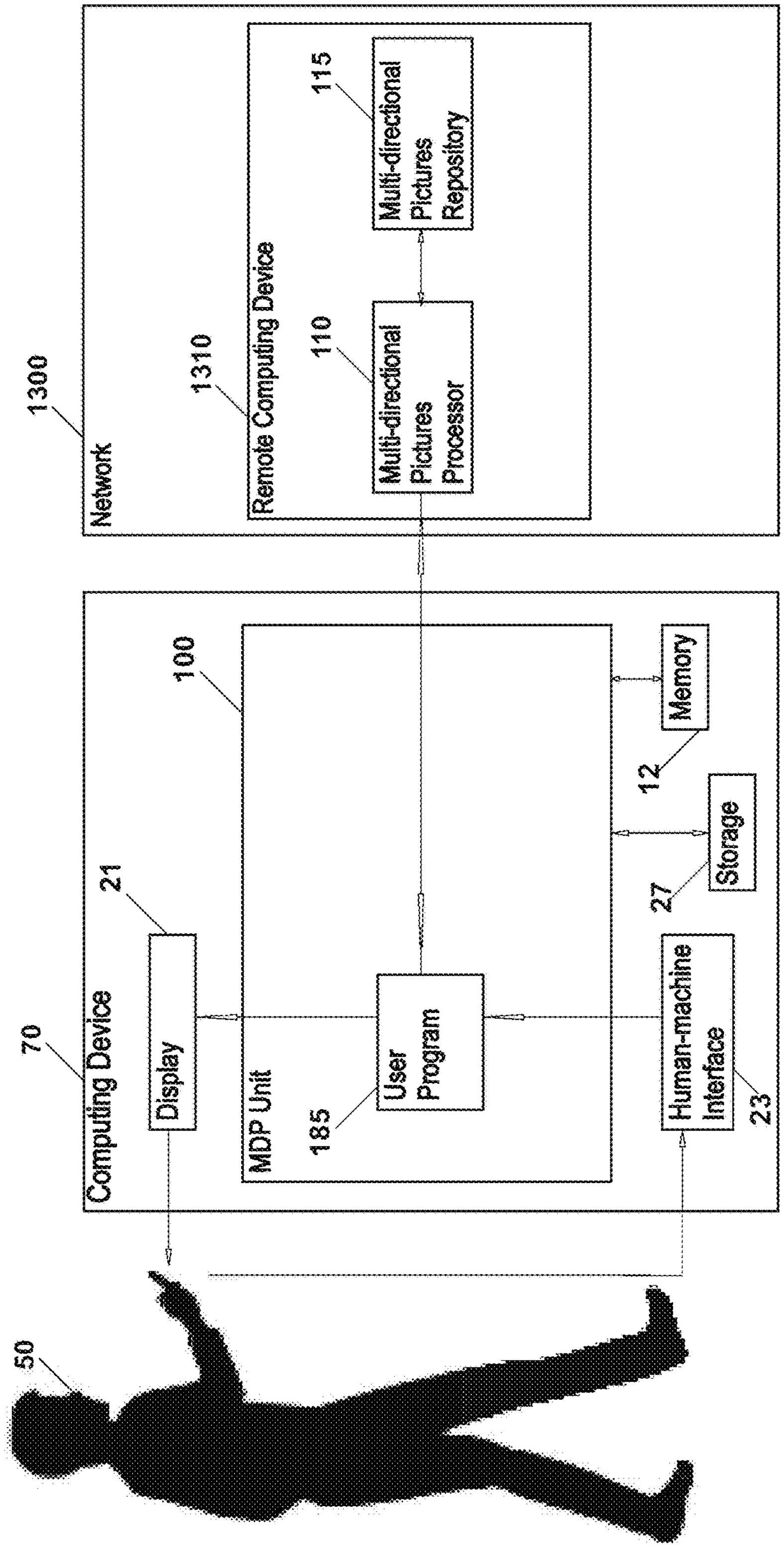
FIG. 12 is a diagram showing an embodiment of Multi-directional Pictures Processor 110 and Multi-directional Pictures Repository 115 executing on a Remote Computing Device 1310.

Referring to FIG. 12, an embodiment is illustrated in which Multi-directional Pictures Processor 110 and Multi-directional Pictures Repository 115 (i.e. remote Multi-directional Pictures Repository 115) both reside and/or execute on a Remote Computing Device 1310 (i.e. application server, cloud, etc.) accessible over a Network 1300 (i.e. corporate enterprise network, Internet, etc.). An example of such embodiment includes the application service provider (ASP) model where computer-based services can be provided to users over a network (i.e. Network 1300, etc.) and where an application such as Multi-directional Pictures Processor 110 and/or data such as the Multi-directional Pictures Repository 115 reside and/or execute on a remote computing device such as an application server or cloud. In some aspects, user can utilize a User Program 185 such as a web browser on the Computing Device 70 to interact with the application server (i.e. Remote Computing Device 1310, etc.).

Figure 13:
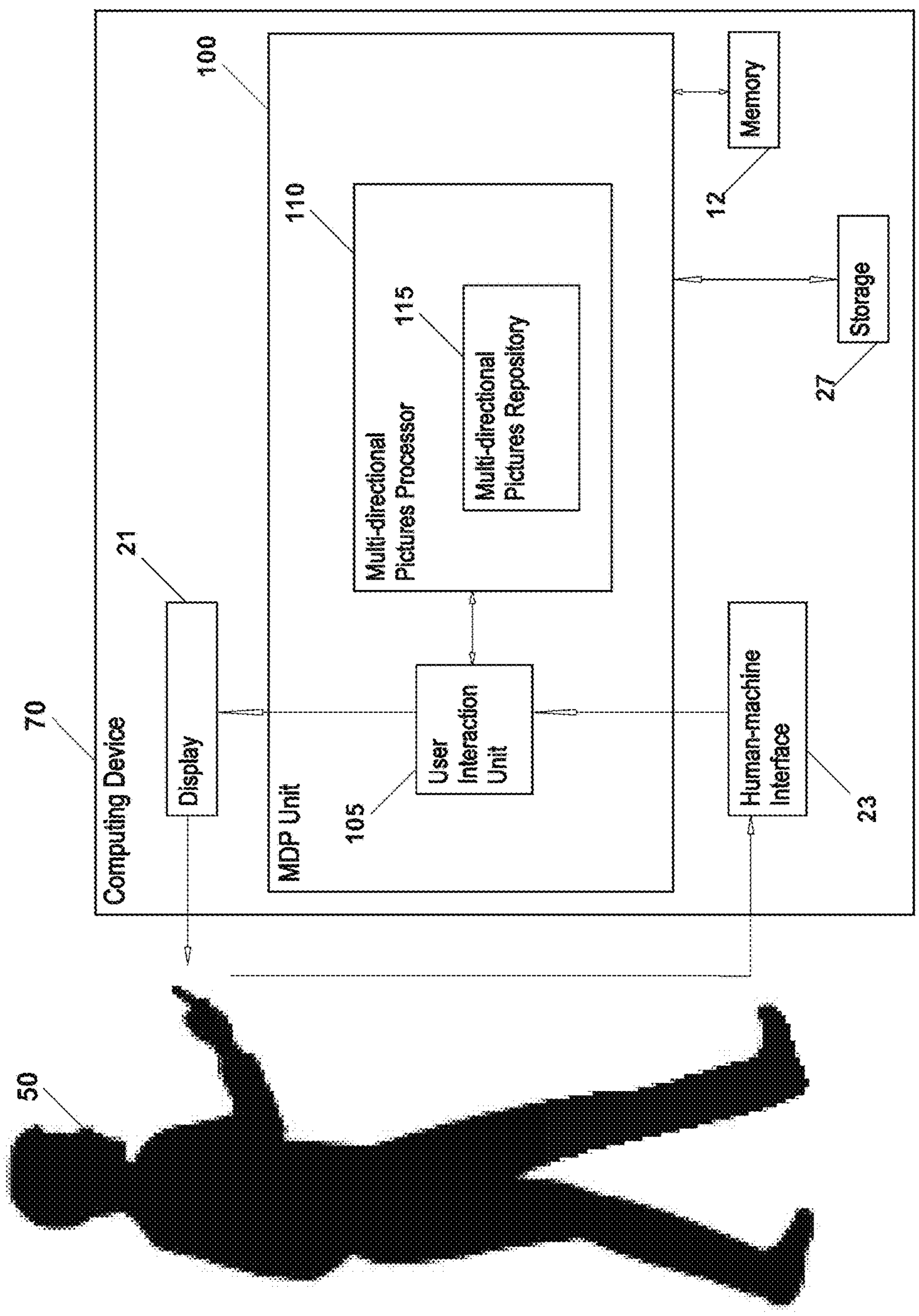
FIG. 13 is a diagram showing an embodiment of Multi-directional Pictures Processor 110 comprising Multi-directional Pictures Repository 115.

Referring to FIG. 13, an embodiment is illustrated in which Multi-directional Pictures Processor 110 includes Multi-directional Pictures Repository 115. In this integrated implementation, Multi-directional Pictures Processor 110 includes hardcoded still or motion pictures or references thereto, any data structures (i.e. multi-directional still or motion pictures, mazes, sequences, etc.) and/or other elements in which case the use of Multi-directional Pictures Repository 115 as a distinct element may optionally be omitted.

Figure 14:
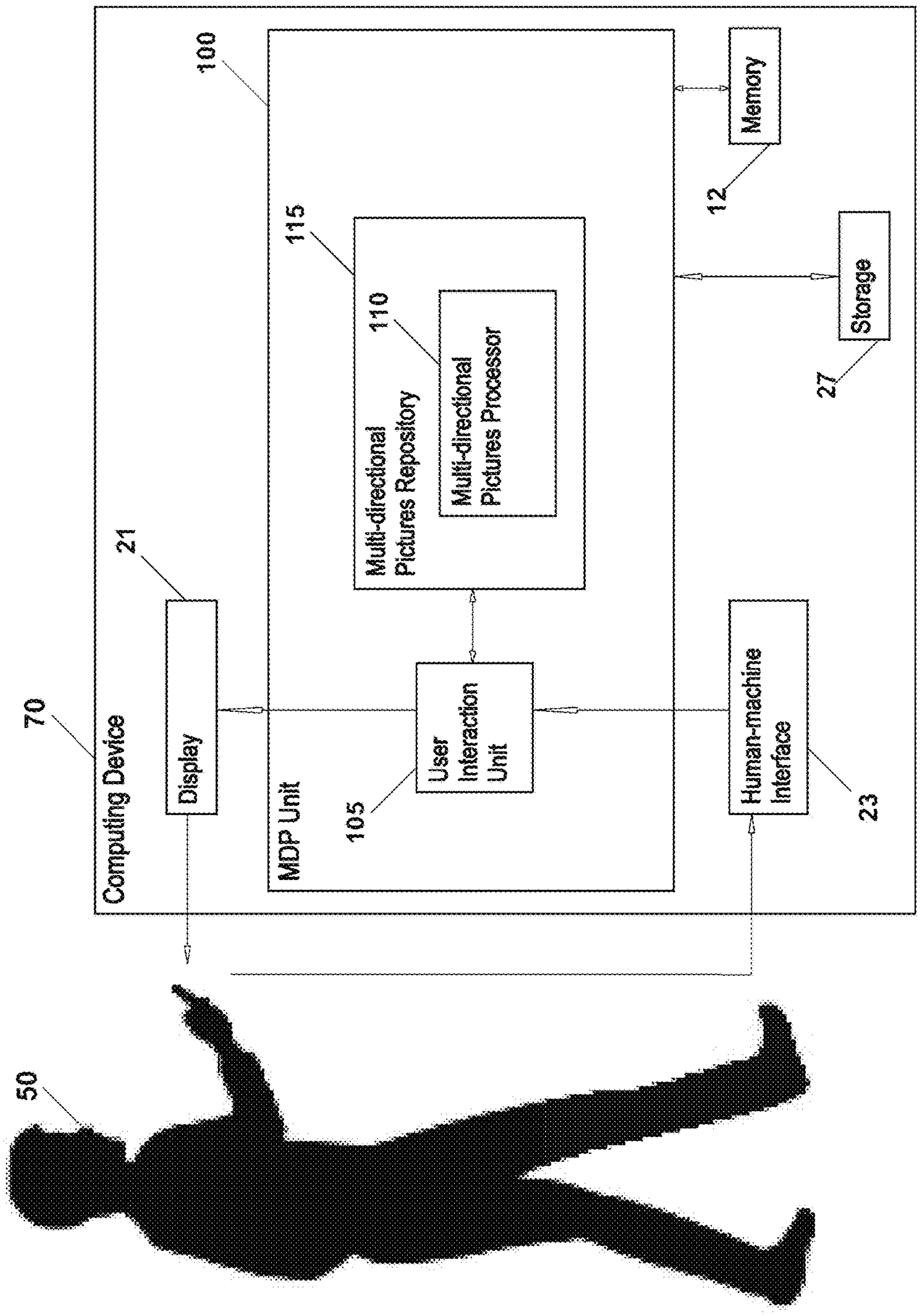
FIG. 14 is a diagram showing an embodiment of Multi-directional Pictures Repository 115 comprising Multi-directional Pictures Processor 110.

Referring to FIG. 14, an embodiment is illustrated in which Multi-directional Pictures Repository 115 includes Multi-directional Pictures Processor 110. In some aspects, Multi-directional Pictures Repository 115 includes a data structure, file structure, memory structure, or other repository comprising Multi-directional Pictures Processor 110 or its instructions. In this integrated implementation, Multi-directional Pictures Processor 110 may initiate or execute when Multi-directional Pictures Repository 115 is executed or opened such as, for example, when a user double-clicks to open a Multi-directional Pictures Repository 115 file including a representation of a particular object.

Figure 15:
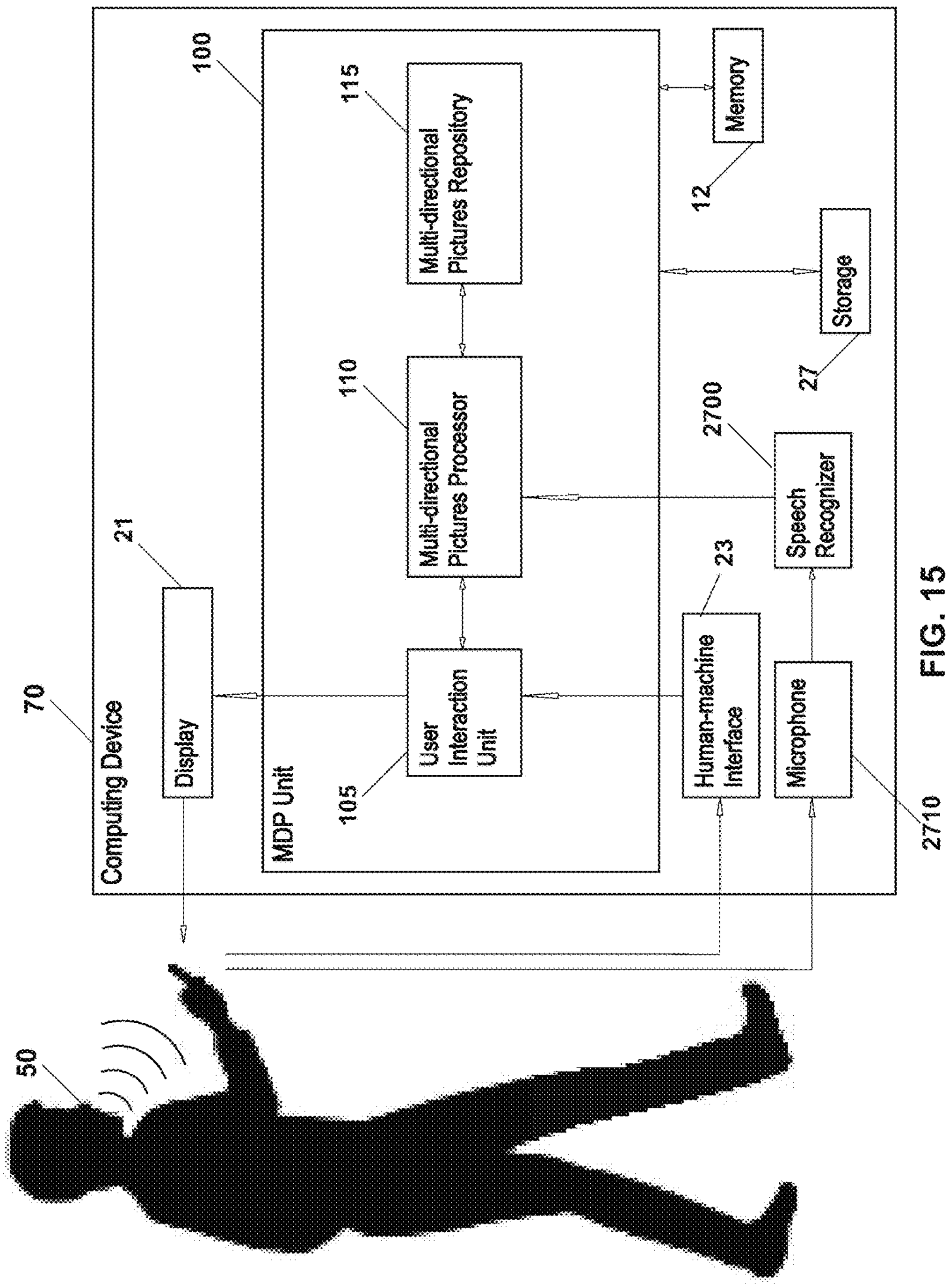
FIG. 15 is a diagram showing an embodiment of MDP Unit 100 comprising Speech Recognizer 2700.

Referring to FIG. 15, in some aspects, the teaching presented by the disclosure can be implemented to include speech recognition for voice input using Speech Recognizer 2700 and/or Microphone 2710. Other additional elements may be included as needed, or some of the disclosed ones may be excluded, or a combination thereof may be utilized in alternate embodiments.

Speech Recognizer 2700 comprises the functionality for processing input events of Microphone 2710 for use by Multi-directional Pictures Processor 110 or other elements, and/or other disclosed functionalities. Speech Recognizer 2700 comprises the functionality for "listening" to voice events on Microphone 2710, interpreting the voice events as User's voice commands, and/or transmitting the voice commands for use by Multi-directional Pictures Processor 110, Speech Recognizer 2700 can be implemented by utilizing (1) a Computing Device 70 operating system's speech recognition functionality such as iOS's Voice Services, Sid, etc. which may come inherently as the part of the computing device or mobile device package; (2) a Java Speech API (JSAPI) or any of its implementations such as The Cloud Garden, Sphinx, etc.; and/or (3) applications or engines providing speech recognition functionality such as OpenEars, Dragon Mobile, iSpeech, CeedVocal, Flite, Julius, etc. In some aspects, a lexicon of voice commands (i.e. words, phrases, etc.) can be utilized in which each voice command may be associated with the previously described input means such as Picture Arrow 860*a*, 860*b*, 860*c*, 860*d*, etc., Direction Arrow 850*a*, 850*b*, 850*c*, 850*d*, etc., Orientation Pointer 870, and/or other input means to facilitate the input of operating instructions through voice input. In one example, a phrase "go forward" may be a voice command in the lexicon and it may be associated with a Forward Multi-directional Still Picture Link 220*a* or Forward Multi-directional Motion Picture Link 420*a*. In another example, a phrase "look right" may be a voice command in the lexicon and it may be associated with a Right Still Picture 210*c* or Right Motion Picture 410*c*. In some embodiments, MDP Unit 100 including Speech Recognizer 2700 enables a user to utilize the functionalities described herein by issuing voice commands (i.e. words, phrases, etc.) combined with utilizing the previously described input means such as Picture Arrows 860*a*, 860*b*, 860*c*, 860*d*, etc., Direction Arrows 850*a*, 850*b*, 850*c*, 850*d*, etc., Orientation Pointer 870, and/or other input means. In other embodiments, MDP Unit 100 with Speech Recognizer 2700 enables a user to utilize the functionalities described herein by issuing voice commands only, which voice commands may select or activate the previously described input means such as Picture Arrows 860*a*, 860*b*, 860*c*, 860*d*, etc., Direction Arrows 850*a*, 850*b*, 850*c*, 850*d*, etc., Orientation Pointer 870, and/or other input means.

Microphone 2710 comprises the functionality for receiving and/or detecting User's voice events or inputs, and/or other disclosed functionalities. Most modern computing and mobile devices include Microphone 2710 as one of the input devices. In general, Speech Recognizer 2700 may identify or recognize speech or sound from Microphone 2710 by comparing sample values of digitally sampled sound (or portions thereof) coming from Microphone 2710 with sample values of digitally sampled sound from a database of known sounds. The database of known sounds can be stored locally on Computing Device 70 or remotely on a remote computing device accessible over a network.

Speech Recognizer 2700 and/or Microphone 2710 can be included or integrated into the previously described User Interaction Unit 105 and/or Human-machine Interface 23. While all these elements may include each other's features, functionalities, and embodiments, Speech Recognizer 2700 and Microphone 2710 are described separately herein to offer additional detail on their functioning.

In some embodiments, MDP Unit 100 can use the Computing Device 70 operating system's native speech recognition functionality or API such as iOS Voice Services as the Speech Recognizer 2700 to obtain user's voice commands. In one example, Microphone 2710 may detect user's voice event; iOS Voice Services may interpret the voice event as user's voice command and make the voice event available as data (i.e. text, instruction, instruction set, command, object, data structure, etc.) to Multi-directional Pictures Processor 110; and the Multi-directional Pictures Processor 110 may use the data for selecting or activating a specific input means such as Picture Arrow 860*a*, 860*b*, 860*c*, 860*d*, etc., Direction Arrow 850*a*, 850*b*, 850*c*, 850*d*, etc., Orientation Pointer 870, and/or other input means.

In other embodiments, MDP Unit 100 can use a Java Speech API (JSAPI) implementation such as The Cloud Garden as the Speech Recognizer 2700 to obtain user's voice commands. In one example, Microphone 2710 may detect user's voice event; the Cloud Garden JSAPI may interpret the voice event as user's voice command and make the voice event available as data (i.e. text, instruction, instruction set, command, object, data structure, etc.) to Multi-directional Pictures Processor 110; and the Multi-directional Pictures Processor 110 may use the data for selecting or activating a specific input means such as Picture Arrow 860*a*, 860*b*, 860*c*, 860*d*, etc., Direction Arrow 850*a*, 850*b*, 850*c*, 850*d*, etc., Orientation Pointer 870, and/or other input means.

In yet other embodiments, MDP Unit 100 may use an application or engine providing speech recognition functionalities such as the OpenEars Software Development Kit (SDK) as the Speech Recognizer 2700 to obtain user's voice commands. In one example, Microphone 2710 may detect user's voice event; the OpenEars SDK may interpret the voice event as user's voice command and make the voice event available as data (i.e. text, instruction, instruction set, command, object, data structure, etc.) to Multi-directional Pictures Processor 110; and the Multi-directional Pictures Processor 110 may use the data for selecting or activating a specific input means such as Picture Arrow 860*a*, 860*b*, 860*c*, 860*d*, etc., Direction Arrow 850*a*, 850*b*, 850*c*, 850*d*, etc., Orientation Pointer 870, and/or other input means.

Depending on resource availability, Speech Recognizer 2700 can be implemented as keyword spotting or as full speech recognition. Keyword spotting attempts to find only a select group of words and/or phrases, and because of this limited lexicon it consumes fewer resources. In the case of keyword spotting implementation, words or phrases such as "forward", "go forward", "backward", "go backward", "right", "go right", "left", "go left", "forward picture", "look forward", "backward picture", "look backward", "right picture", "look right", "left picture", "look left", "north orientation", "south orientation", "east orientation", "west orientation", "forward orientation", "backward orientation", "right orientation" "left orientation" and/or other words or phrases may define the select group of words and/or phrases to be searched. Full speech recognition attempts to find all words and/or phrases that have been spoken, and because of this broader lexicon it consumes significant resources. In the case of full speech recognition implementation, the broadness of words and/or phrases would by definition include all words or phrases needed for MDP Unit 100. Keyword spotting or full speech recognition implementations may include a file or database of words and/or phrases located locally on the Computing Device 70 or remotely on a Remote Computing Device 1310 accessible over a Network 1300.

Figure 16:
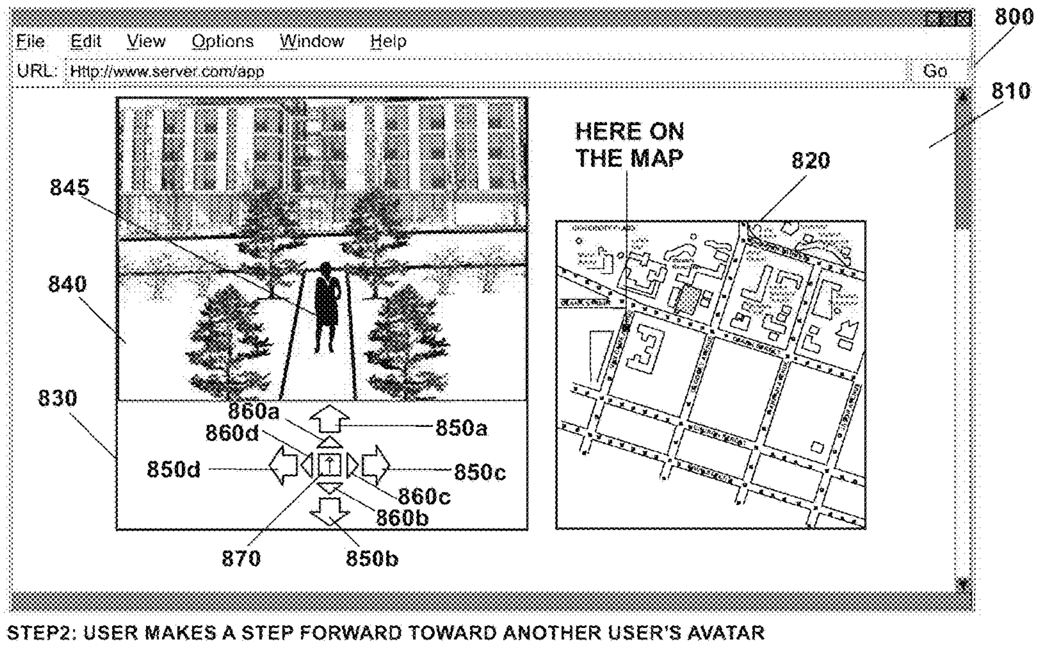
FIG. 16 shows an embodiment of a multi-user MDP Unit 100 implemented in a web browser.
Figure 16:
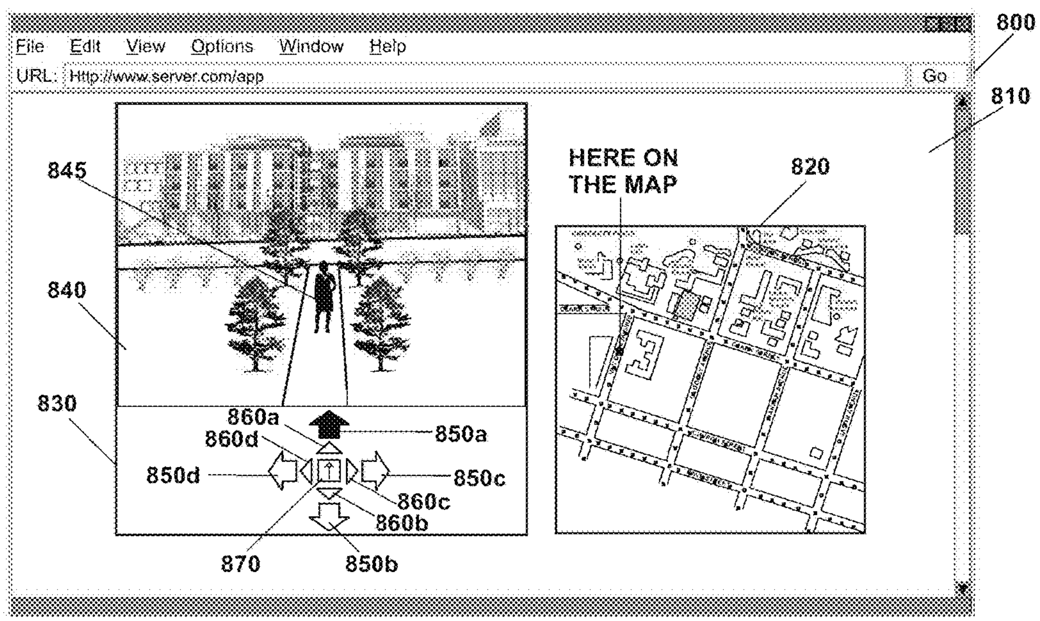

Referring to FIG. 16, the illustration shows an embodiment of MDP Unit 100 implemented to include multi-user functionality (also referred to as multi-user MDP Unit 100 or multi-user MDP application), Multi-user MDP Unit 100 enables multiple users to see and/or interact with each other within a MDP application. In some aspects, each user of a multi-user MDP application may be represented and/or shown by his/her Avatar 845. A user can see other users' Avatars 845 through Display Window 840 as the user moves among Multi-directional Still Pictures 200 and views Still Pictures 220*a*, 220*b*, 220*c*, 220*d*, etc. In some embodiments, an instance of multi-user MDP Unit 100 can execute or run on a Remote Computing Device 1310 (i.e. application server, cloud, etc.) to which users can connect over a Network 1300 (i.e. corporate enterprise network, Internet, etc.). Users may be remote from each other (i.e. in different buildings, in different cities, in different parts of the world, etc.) and may use their Computing Devices' 70 networking functionalities to connect to a Remote Computing Device 1310 (i.e. application server, cloud, etc.) running an instance of multi-user MDP Unit 100. As such, multi-user MDP Unit 100 can be implemented as a network service for all the world's users who wish to experience seeing and/or interacting with each other in a MDP application.

In some aspects, multi-user functionality can be implemented to create or define a virtual world where users see and/or interact with each other. Users may be offered a variety of types or forms of Avatars 845 from which to choose. For example, a female user may prefer a female-looking Avatar 845 wearing a long skirt whereas a male user may prefer a muscular-looking Avatar 845 wearing a T-shirt. Each Avatar 845 can be associated with a Multi-directional Still Picture 200 of the Avatar's 845 user's location within a multi-user MDP application. Association of a user's Avatar 845 and a Multi-directional Still Picture 200 may include Avatars 845 identifier and Multi-directional Still Picture's 200 identifier, Associations of users' Avatars 845 and Multi-directional Still Pictures 200 can be tracked and/or stored in Multi-directional Pictures Repository 115, and/or any file, object, data structure, DBMS, database, system, process, or other repository. Once associated with a Multi-directional Still Picture 200 of the user's location in a represented object, an Avatar 845 can be shown at that location. In some embodiments, showing an Avatar 845 includes inserting Avatar's 845 picture into one or more Still Pictures 210*a*, 210*b*, 210*c*, 210*d*, etc. of one or more Multi-directional Still Pictures 200. As a user moves from one Multi-directional Still Picture 200 to another, his/her Avatar's 845 picture may be deleted from Still Pictures 210*a*, 210*b*, 210*c*, 210*d*, etc. where it was previously inserted and his/her Avatars 845 picture may be inserted into new Still Pictures 210*a*, 210*b*, 210*c*, 210*d*, etc. to correspond to user's new location. In other embodiments, showing an Avatar 845 includes superimposing or overlaying Avatar's 845 picture onto one or more Still Pictures 210*a*, 210*b*, 210*c*, 210*d*, etc. of one or more Multi-directional Still Pictures 200. In some aspects, superimposing or overlaying an Avatar's 845 picture onto one or more Still Pictures 210*a*, 210*b*, 210*c*, 210*d*, etc. of one or more Multi-directional Still Pictures 200 includes defining a layer (i.e. digital picture layer, etc.) comprising the Avatar's 845 picture. As a user moves from one Multi-directional Still Picture 200 to another, his/her Avatar's 845 picture may be removed from Still Pictures 210*a*, 210*b*, 210*c*, 210*d*, etc. where it was previously superimposed and his/her Avatar's 845 picture may be superimposed onto new Still Pictures 210*a*, 210*b*, 210*c*, 210*d*, etc. to correspond to user's location. In yet other embodiments, an Avatar's 845 picture can be dynamically (i.e. as needed, etc.) inserted into or superimposed onto one or more Still Pictures 210*a*, 210*b*, 210*c*, 210*d*, etc. of one or more Multi-directional Still Pictures 200 if Avatar 845 is located within another user's field of view or line of sight. Avatar's 845 picture may include any digital picture, any animated picture (i.e. animated GIF picture, etc.), any computer generated object (i.e. 3D object, etc.), any vector graphics, any video, and/or any other representation of a user's Avatar 845. Avatar's 845 picture can be animated to display various behaviors and/or emotions such as, for example, laughing, crying, jumping, pointing finger, walking back and forth in a specific location, and/or any other behaviors and/or emotions. A user may turn his/her Avatar 845 in various directions in a specific location (i.e. Multi-directional Still Picture 200) of a represented object. In some aspects, an Avatar 845 (i.e. avatar's face and frontal side) can be turned in the direction of his/her user's view or selection of Still Picture 210*a*, 210*b*, 210*c*, 210*d*, etc. For example, if Avatar's 845 user is viewing a Forward Still Picture 210*a* including a view of a building, the Avatar's 845 face and frontal side may be directed toward the building. As such, pictures of variously directed versions of the same Avatar 845 can be maintained and inserted into or superimposed onto Still Pictures 210*a*, 210*b*, 210*c*, 210*d*, etc. based on Avatar's 845 user's direction of view. In some embodiments, Avatar's 845 direction can be associated with Orientation 205. In other embodiments, Avatar's 845 direction can be unassociated with user's direction of view and/or Orientation 205 in which case user may control his/her Avatar's 845 direction by utilizing input means on the Computing Device 70 such as arrows or other directional signs indicating Avatar's 845 direction. A user can move his/her Avatar 845 into various locations by moving among Multi-directional Still Pictures 200 (i.e. locations of a represented object). Generally, Avatar's 845 location may correspond to Avatar's 845 user's location (i.e. Multi-directional Still Picture 200 representing the location) in a represented object and Avatar's 845 movement may correspond to Avatar's 845 user's movement among Multi-directional Still Pictures 200. However, in some embodiments, Avatar's 845 movement can be unassociated with his/her user's movement among Multi-directional Still Pictures 200 in which case user can control his/her Avatar's 845 movement by utilizing input means on the Computing Device 70 such as arrows or other directional signs indicating Avatar's 845 movement.

In some embodiments, multi-user MDP Unit 100 enables a user to experience first-person perspective or view. First-person perspective shows other users' Avatars 845, but does not typically show user's own Avatar 845. In some implementations of first-person perspective, user would see his/her Avatar's 845 hands, feet, other body parts, and/or objects that Avatar 845 is holding. In other embodiments, multi-user MDP Unit 100 enables a user to experience third-person perspective where user can see his/her own Avatar 845 as well as other users' Avatars 845. In some aspects, third-person perspective may be implemented by inserting or superimposing user's own Avatar's 845 picture into/onto a Still Picture 210*a*, 210*b*, 210*c*, 210*d*, etc. of a Multi-directional Still Picture 200 representing user's location in a collection of Multi-directional Still Pictures 200. In other aspects, third-person perspective may be implemented by inserting or superimposing user's own Avatar's 845 picture into/onto a Still Picture 210*a*, 210*b*, 210*c*, 210*d*, etc. of a nearby Multi-directional Still Picture 200 and displaying the Still Picture 210*a*, 210*b*, 210*c*, 210*d*, etc. of the nearby Multi-directional Still Picture 200 comprising Avatar's 845 picture. In some embodiments, positional audio can also be implemented where ambient sounds may vary depending on Avatar's 845 location in a represented object. In other embodiments, audio conversation among proximal Avatars 845 can be implemented via their user's network interconnected Computing Devices 70 and their respective sound input and output devices (i.e. microphones, speakers, etc.) and their associated interfaces. In one example, a user may view a Forward Still Picture 210*a* including a view of a park's walkway facing a nearby building where another user's Avatar 845 stands as shown in Step 1 of FIG. 16. Picture Display 840 may show Forward Still Picture 210*a* including inserted or superimposed picture of the other user's Avatar 845. User may select or activate Forward Direction Arrow 850*a* and move from current to a next Multi-directional Still Picture 200, which may bring user to a next location on park's walkway such as location depicted in Step 2 of FIG. 16. Such movement brings the user and/or his/her Avatar 845 closer to the other user's Avatar 845. User can then interact with the other user and/or his/her Avatar 845 including communication (i.e. verbal communication, signs communication, body language, gestures, etc.), physical contact of the two Avatars 845 (i.e. shaking hands, dancing, fighting, etc.), and/or any other type or form of interaction. As such, multi-user MDP Unit 100 enables a user to view all views (i.e. Still Pictures 210*a*, 210*b*, 210*c*, 210*d*, etc.) from all locations (i.e. Multi-directional Still Pictures 200) of a represented object (i.e. park in this example) as well as to simulate user's motion relative to the represented object (i.e. park in this example) including seeing and/or interacting with other users' Avatars 845. In some embodiments, each Avatar's 845 location and/or identification (i.e. name of user or user's avatar, etc.) can be shown on Map 820. This functionality enables a user to instantly visit a Multi-directional Still Picture 200 (i.e. location of a represented object) associated with another user's Avatar 845 by clicking on Map's 820 spot indicating the other user's Avatar 845.

In some embodiments, movement, appearance, behavior, and/or other features and/or aspects of an Avatar 845 can be controlled by a program or system. Such program or system may include a collection of references to Multi-directional Still Pictures 200 defining a path of movement of Avatar 845. Such program or system may also include Avatar's 845 picture defining appearance of Avatar 845. Such program or system may further include a set of instructions defining Avatar's 845 behaviors and/or emotions such as, for example, behaviors and/or emotions in proximity to other Avatars 845 or objects. Such program or system may include the functionality to control or define any other features or aspects of Avatar 845. In one example, Avatar 845 can be programmed to circle a building in a college campus (i.e. represented object) at night. The program or system controlling Avatar 845 may include a collection of references to Multi-directional Still Pictures 200 representing locations around the building. The program or system controlling Avatar 845 may also include a picture of a security guard as Avatar's 845 picture. The program or system controlling Avatar 845 may further include a set of instructions that cause Avatar 845 to display certain behaviors or emotions in specific situations. Using the collection of references to Multi-directional Still Pictures 200, Avatar 845 can move among the referenced Multi-directional Still Pictures 200. A period of time can be defined to be spent by Avatar 845 in each Multi-directional Still Picture 200 before moving to a next Multi-directional Still Picture 200 in the collection. Users of a multi-user MDP Unit 100 can see the security guard picture of Avatar 845 and interact with the Avatar 845. If a user-controlled Avatar 845 approaches the "guarded" building, the program or system can cause the program-controlled Avatar 845 to position itself in front of the incoming user's Avatar 845 and issue audible warning (i.e. "access to this building is restricted at night", etc.), for example. Any other movements, appearances, behaviors, and/or other features and/or aspects of an Avatar 845 can similarly be implemented by a program or system. In some embodiments, program-controlled Avatars 845 can interact with each other and/or objects in a MDP application as if they were user-controlled Avatars 845. Such functionality enables implementation of an evolving virtual world with various and/or unforeseen scenarios based on program-controlled Avatars' 845 interactions. Human users can enter and experience this evolving virtual world and interact with program-controlled Avatars 845 as previously described.

Figure 17:
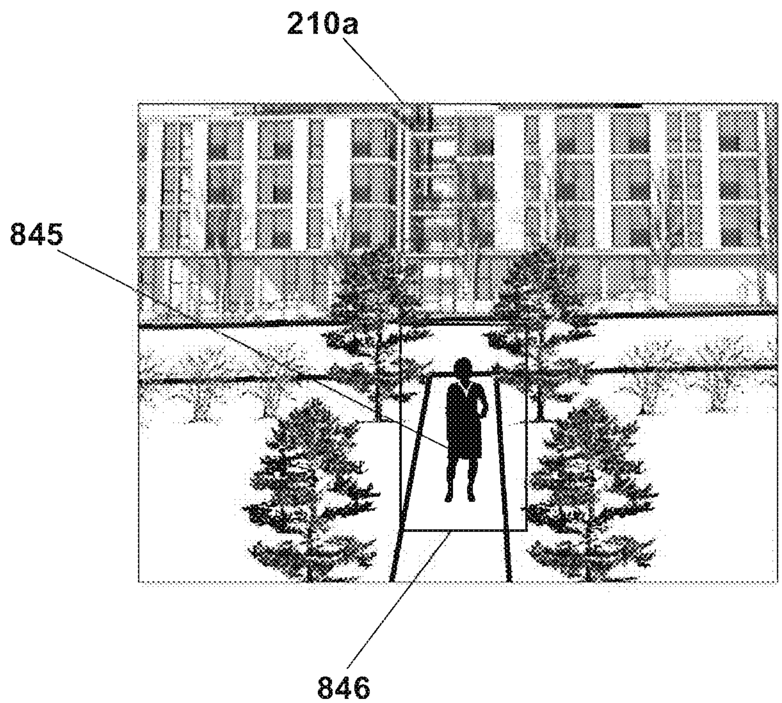
FIG. 17 illustrates an embodiment of picture processing for inserting Avatar 845 in a Still Picture 210*a*, 210*b*, 210*c*, 210*d*, etc.

Referring to FIG. 17, an embodiment of picture processing for inserting Avatar 845 in a Still Picture 210*a*, 210*b*, 210*c*, 210*d*, etc. is illustrated. In one example, a Forward Still Picture 210*a* may include a view from a location of a represented object. Another user's Avatar 845 may be within the field of view or line of sight, and the Avatar's 845 picture can be shown in the Forward Still Picture 210*a*. In some embodiments, Avatar's 845 picture can be inserted into Forward Still Picture 210*a* by replacing pixels of the Forward Still Picture 210*a* with Avatar's 845 picture's pixels through picture processing. Additional picture processing can also be performed on Forward Still Picture 210*a* such as, for example, adding a shadow by darkening pixels near Avatar's 845 picture, smoothing pixels around the edges of Avatar's 845 picture for a finer blending into the background of Forward Still Picture 210*a*, and/or any other picture processing to enhance appearance of Avatar 845. In other embodiments, Avatar's 845 picture can be superimposed or overlayed onto Forward Still Picture 210*a*. In some aspects, superimposing or overlaying Avatar's 845 picture onto Forward Still Picture 210*a* includes creating or defining a new layer (i.e. digital picture layer, etc.) comprising Avatar's 845 picture's pixels for Avatar's appearance and/or transparent pixels for the background (i.e. Forward Still Picture 210*a*, etc.). Examples of the types of digital pictures including layer and/or transparency functionalities include Portable Document Format (PDF), Graphics Interchange Format (GIF), Photoshop Document (PSD), and/or other types or formats of digital pictures. In yet other embodiments, Avatar's 845 picture can be inserted into or superimposed onto a copy (i.e. copy in memory, temporary copy, etc.) of Forward Still Picture 210*a* without altering the original Forward Still Picture 210*a*.

In some embodiments, picture processing can be implemented to find Still Pictures 210*a*, 210*b*, 210*c*, 210*d*, etc. that may be within a line of sight from an Avatar's 845 location. Avatar's 845 picture may then be inserted into or superimposed onto the found Still Pictures 210*a*, 210*b*, 210*c*, 210*d*, etc. for users of a multi-user MDP Unit 100 to see the Avatar 845 from various locations and/or distances within a line of sight. In some aspects, finding Still Pictures 210*a*, 210*b*, 210*c*, 210*d*, etc. that may be within a line of sight from an Avatar's 845 location includes identifying a Region 846 around a position where Avatar's 845 picture is inserted into or superimposed onto a Still Picture 210*a*, 210*b*, 210*c*, 210*d*, etc. In other aspects, finding Still Pictures 210*a*, 210*b*, 210*c*, 210*d*, etc. that may be within a line of sight from an Avatar's 845 location includes identifying a Region 846 around a position where Avatar's 845 picture is inserted into or superimposed onto a Still Picture 210*a*, 210*b*, 210*c*, 210*d*, etc. of a Multi-directional Still Picture 200 associated with Avatar 845 (i.e. Avatar's 845 location). Region 846 may include any portion, subset, or area of Still Picture 210*a*, 210*b*, 210*c*, 210*d*, etc. from which Region 846 originates. Region 846 can be of any shape or size such as, for example, a Region 846 shaped as Avatar's 845 picture, a Region 846 larger or smaller than Avatar's 845 picture, a Region 846 partially shaped as Avatar's 845 picture, a rectangular Region 846 around Avatar's 845 picture, a round Region 846 around Avatar's 845 picture, an odd-shaped Region 846 around Avatar's 845 picture, and/or any other Region 846 around a position where Avatar's 845 picture is inserted or superimposed. Finding Still Pictures 210*a*, 210*b*, 210*c*, 210*d*, etc. that may be within a line of sight from an Avatar's 845 location may further include comparing the identified Region 846 with another Still Picture 210*a*, 210*b*, 210*c*, 210*d*, etc. (i.e. comparative picture) to determine if the Still Picture 210*a*, 210*b*, 210*c*, 210*d*, etc. (i.e. comparative picture) includes all or a portion (i.e. subset, etc.) of Region 846. Finding a Still Picture 210*a*, 210*b*, 210*c*, 210*d*, etc. (i.e. comparative picture) that includes all or a portion (i.e. subset, etc.) of Region 846 may indicate that the Still Picture 210*a*, 210*b*, 210*c*, 210*d*, etc. (i.e. comparative picture) belongs to a same line of sight as a Still Picture 210*a*, 210*b*, 210*c*, 210*d*, etc. from which the identified Region 846 originates. This indication can be derived from a premise that if one digital picture (i.e. comparative picture, etc.) includes all or a portion of a region of another digital picture, the two digital pictures may be portraying the same line of sight. In some aspects, comparing digital pictures to determine if one includes all or a portion of a region (i.e. Region 846) of another picture can be performed by determining if a region of pixels of one picture (i.e. comparative picture) matches or sufficiently matches a region (i.e. Region 846) of pixels of another picture. The threshold for similarity in each of the pixels required for a match or sufficient match may be set or adjusted by a user or automatically. The threshold for the number of pixels required for a match or sufficient match can similarly be set or adjusted. Both thresholds and sufficient similarity comparison process are later described in Comparator 112. In other aspects, comparing digital pictures to determine if one includes all or a portion of a region (i.e. Region 846) of another picture can be performed by determining if a region of pixels of one picture (i.e. comparative picture) matches or sufficiently matches a resized (i.e. downsized, upsized, etc.) region (i.e. Region 846) of pixels of another picture. Any of the publically available, custom, or other digital picture resizing techniques or programs can be utilized such as nearest-neighbor interpolation, bilinear interpolation, bicubic interpolation, and/or others, Resizing of Region 846 can be performed incrementally (i.e. proportionally resizing to a next smaller or larger size, resizing by one pixel at a time in length or width keeping aspect ratio constant, etc.) to reduce or increase the size (i.e. number of pixels, etc.) of Region 846. Each incrementally resized Region 846 or a copy thereof may then be compared with all regions of a comparative picture. A comparative picture whose region is found to match or sufficiently match Region 846 may be a Still Picture 210*a*, 210*b*, 210*c*, 210*d*, etc. within a same line of sight as a Still Picture 210*a*, 210*b*, 210*c*, 210*d*, etc. from which Region 846 originates. If a match or sufficient match is not found between any regions of a comparative picture and any of the incrementally resized Regions 846 or copies thereof, the comparison can be performed between regions of other Still Pictures 210*a*, 210*b*, 210*c*, 210*d*, etc. (i.e. comparative pictures) in a MDP application and resized Regions 846 or copies thereof. As such, regions of all Still Pictures 210*a*, 210*b*, 210*c*, 210*d*, etc. in a MDP application (i.e. collection of multi-directional still or motion pictures, etc.) can be compared with resized Regions 846 or copies thereof to find all Still Pictures 210*a*, 210*b*, 210*c*, 210*d*, etc. that include all or a portion of Region 846. Avatar's 845 picture may then be inserted into or superimposed onto these Still Pictures 210*a*, 210*b*, 210*c*, 210*d*, etc. In some aspects, inserting or superimposing Avatar's 845 picture into/onto Still Pictures 210*a*, 210*b*, 210*c*, 210*d*, etc. found to be within a line of sight may include inserting or superimposing Avatar's 845 picture in position where a resized Region 846 is found in each of the Still Pictures 210*a*, 210*b*, 210*c*, 210*d*, etc. In other aspects, Avatar's 845 picture or a copy thereof may be resized and then inserted into or superimposed onto Still Pictures 210*a*, 210*b*, 210*c*, 210*d*, etc. to show a view of the Avatar 845 in perspective as later described. In some embodiments, interpretive information (later described) regarding location of Multi-directional Still Pictures 200 may be used to selectively choose to compare Region 846 or incrementally resized Regions 846 only with Still Pictures 210*a*, 210*b*, 210*c*, 210*d*, etc. of Multi-directional Still Pictures 200 that fall within a certain threshold distance from the Multi-directional Still Picture 200 from which Region 846 originates.

In one example, Avatar 845 may be associated with a Multi-directional Still Picture 200 on a park's walkway near a building as shown in FIG. 17. Avatar's 845 picture may be inserted into or superimposed onto Forward Still Picture 210*a* of the Multi-directional Still Picture 200 associated with the Avatar 845, This way, Avatar's 845 picture can be shown to users of a multi-user MDP application at Avatar's 845 location. Picture processing can be implemented to find Still Pictures 210*a*, 210*b*, 210*c*, 210*d*, etc. that may be within a line of sight from Avatar's 845 location (i.e. Multi-directional Still Picture 200 associated with Avatar 845). Region 846 may be identified around the position where Avatar's 845 picture is inserted into or superimposed onto Forward Still Picture 210*a*. Such Region 846 may include a selection of pixels such as, for example, a rectangular selection of pixels that may be larger than the Avatar's 845 picture. Still Pictures 210*a*, 210*b*, 210*c*, 210*d*, etc. that may be within a line of sight from Avatar's 845 location can then be detected by finding Still Pictures 210*a*, 210*b*, 210*c*, 210*d*, etc. of any Multi-directional Still Pictures 200 that include all or a portion of the identified Region 846. A first Still Picture 210*a*, 210*b*, 210*c*, 210*d*, etc. (i.e. comparative picture) may be compared with Region 846 to determine if a region of pixels of the first Still Picture 210*a*, 210*b*, 210*c*, 210*d*, etc. (i.e. comparative picture) matches or sufficiently matches all or a portion of pixels of Region 846. Such comparison may include incrementally downsizing Region 846 by one pixel at a time in length or width keeping aspect ratio constant (i.e. reducing the size from 40×120 pixels to 39×117 pixels, etc.) and comparing the downsized Region 846 with all regions of the first Still Picture 210*a*, 210*b*, 210*c*, 210*d*, etc. to find a region of the first Still Picture 210*a*, 210*b*, 210*c*, 210*d*, etc. that matches or sufficiently matches all or a portion of pixels of the downsized Region 846. The downsized Region 846 can first be compared with a same sized (i.e. 39×117 pixels in this example, etc.) initial region of the first Still Picture 210*a*, 210*b*, 210*c*, 210*d*, etc. starting at pixel [1,1], If a match or sufficient match is not found, the downsized Region 846 can then be compared with a same sized (i.e. 39×117 pixels in this example, etc.) region of the first Still Picture 210*a*, 210*b*, 210*c*, 210*d*, etc. starting at pixel [2,1]. If a match or sufficient match is still not found, the downsized Region 846 can then be compared with same sized (i.e. 39×117 pixels in this example, etc.) regions of the first Still Picture 210*a*, 210*b*, 210*c*, 210*d*, etc. each starting at remaining pixels in y line 1 (i.e. [3,1], [4,1], [5,1], . . . ). If a match or sufficient match is still not found, the downsized Region 846 can then be compared with same sized (i.e. 39×117 pixels in this example, etc.) regions of the first Still Picture 210*a*, 210*b*, 210*c*, 210*d*, etc. each starting at remaining pixels in y lines 2 (i.e. [1,2], [2,2], [3,2], . . . ), 3, 4, and so on until the last pixel of the first Still Picture 210*a*, 210*b*, 210*c*, 210*d*, etc. Pixel coordinates in a digital picture and an example of a searching pattern are later described in more detail. The comparison may include any initial region of the first Still Picture 210*a*, 210*b*, 210*c*, 210*d*, etc. such as, for example, region in the middle of first Still Picture 210*a*, 210*b*, 210*c*, 210*d*, etc., region at the end of first Still Picture 210*a*, 210*b*, 210*c*, 210*d*, etc., region at right of first Still Picture 210*a*, 210*b*, 210*c*, 210*d*, etc., region at left of first Still Picture 210*a*, 210*b*, 210*c*, 210*d*, etc., and/or any other initial region. Also, the comparison may include any search pattern for regions of the first Still Picture 210*a*, 210*b*, 210*c*, 210*d*, etc. such as, for example, linear searching in any direction, outward searching from a middle region, forward searching from a region in the beginning, backward searching from a region at the end, and/or any other search pattern. If a match or sufficient match is not found between any region of the first Still Picture 210*a*, 210*b*, 210*c*, 210*d*, etc. and the downsized Region 846, Region 846 can be downsized to a next smaller size. All regions of the first Still Picture 210*a*, 210*b*, 210*c*, 210*d*, etc. can then be compared with the new downsized Region 846 to find a region of the first Still Picture 210*a*, 210*b*, 210*c*, 210*d*, etc. that matches or sufficiently matches all or a portion of the new downsized Region 846. Incrementally downsizing Region 846 and comparing regions of the first Still Picture 210*a*, 210*b*, 210*c*, 210*d*, etc. with downsized Regions 846 may be repeated until a match or sufficient match is found. If any region of the first Still Picture 210*a*, 210*b*, 210*c*, 210*d*, etc. is found to match or sufficiently match all or a portion of any downsized Region 846, the first Still Picture 210*a*, 210*b*, 210*c*, 210*d*, etc. may be within a same line of sight as a Still Picture 210*a*, 210*b*, 210*c*, 210*d*, etc. from which Region 846 originates. Any of the described steps for comparing regions of the first Still Picture 210*a*, 210*b*, 210*c*, 210*d*, etc. with downsized Regions 846 can be performed with all Still Pictures 210*a*, 210*b*, 210*c*, 210*d*, etc. in a MDP application to find Still Pictures 210*a*, 210*b*, 210*c*, 210*d*, etc. within a same line of sight as Still Picture 210*a*, 210*b*, 210*c*, 210*d*, etc. from which Region 846 originates. Avatar's 845 picture can then be inserted into or superimposed onto these Still Pictures 210*a*, 210*b*, 210*c*, 210*d*, etc. in position where Region 846 is found in each of the Still Pictures 210*a*, 210*b*, 210*c*, 210*d*, etc. This way, users of a multi-user MDP application can see Avatar 845 from various locations and/or distances within a line of sight. In some aspects, Avatar's 845 picture can be shown in perspective (i.e. larger as the distance from the observer decreases and smaller as the distance from the observer increases). Showing Avatar's 845 picture in perspective may include inserting or superimposing increased size Avatar's 845 picture into/onto Still Pictures 210*a*, 210*b*, 210*c*, 210*d*, etc. as user approaches Avatar 845 or decreased size Avatar's 845 picture as user retreats from Avatar 845. In some embodiments, a line of sight may be identified as same direction Still Pictures 210*a*, 210*b*, 210*c*, 210*d*, etc. of any Multi-directional Still Pictures 200 positioned in a straight line. For example, Forward Still Pictures 210*a* of any Multi-directional Still Pictures 200 on a straight walkway in a park may be within a line of sight. In some aspects, previously described Multi-directional Still Picture Angles 230*a*, 230*b*, 230*c*, 230*d*, etc. can be utilized to identify Multi-directional Still Pictures 200 on a straight walkway in a park. For example, Multi-directional Still Pictures 200 with a same Forward Multi-directional Still Picture Angle 230*a* starting from a specific Multi-directional Still Picture 200 may be on a straight walkway in a park.

All described features and embodiments of multi-user MDP Unit 100 can similarly be implemented in Multi-directional Motion Pictures 400 (later described) where Avatar 845 may be inserted into streams of still pictures. In some embodiments, insertion of Avatar 845 can be performed as previously described into each still picture in a stream of still pictures (i.e. motion picture, etc.). Also, finding Motion Pictures 410*a*, 410*b*, 410*c*, 410*d*, etc. that may be within a line of sight from an Avatar's 845 location can be performed as previously described where processing or comparisons can be performed for each still picture in a stream of still pictures (i.e. motion picture, etc.) to find a match or sufficient match. Therefore, additional cycles of processing or comparisons may be performed. In some embodiments, still pictures from different streams having same time stamps may be processed or compared. In other embodiments, still pictures from different streams having similar time stamps can be processed or compared in which case a threshold may be defined by user or automatically to control how far before or after a specific still picture (i.e. frame, etc.) a search may go to find a matching or sufficiently matching still picture or a portion thereof.

Figure 18:
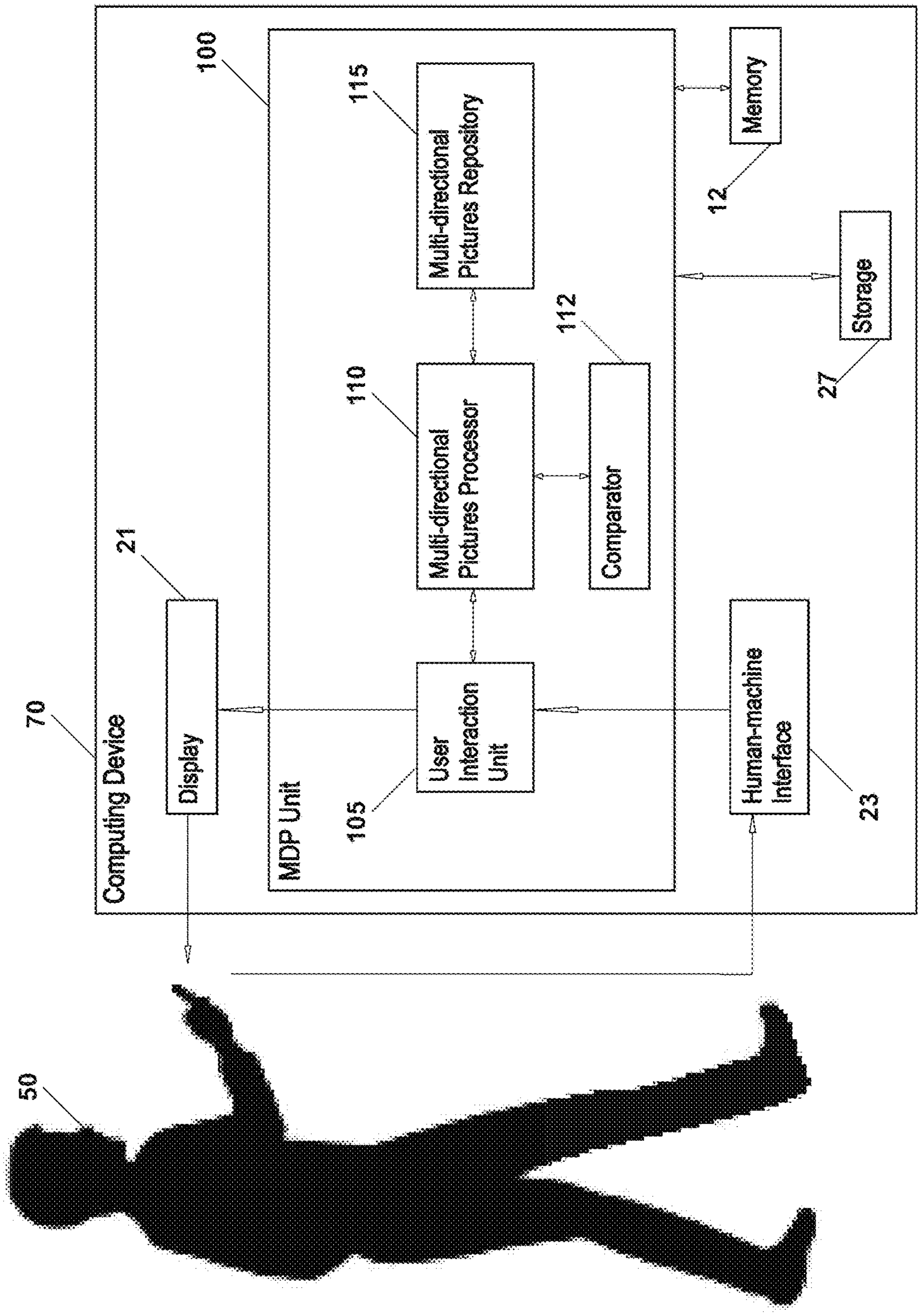
FIG. 18 illustrates an embodiment of MDP Unit 100 implemented in a device or system for inserting Avatar 845 into Still Pictures 210*a*, 210*b*, 210*c*, 210*d*, etc.

Referring to FIG. 18, the illustration shows an embodiment of MDP Unit 100 implemented in a device or system for inserting Avatar 845 into Still Pictures 210*a*, 210*b*, 210*c*, 210*d*, etc. The device or system may include a Multi-directional Pictures Processor 110 and an interface, coupled to Multi-directional Pictures Processor 110, for receiving a plurality of multi-directional still pictures (i.e. from Multi-directional Pictures Repository 115, etc.) each multi-directional still picture associated with a different location of a represented object and including one or more differently directed still pictures from the location, Multi-directional Pictures Processor 110 may be configured to: associate a user's avatar with a first multi-directional still picture and insert the avatar's picture into a first still picture of the first multi-directional still picture. The device or system may further include Comparator 112, coupled to Multi-directional Pictures Processor 110, for identifying a region of the first still picture of the first multi-directional still picture around a position where the avatar's picture is inserted, and incrementally resizing the identified region. Comparator 112 may be further configured to compare at least one subset of a first still picture of a second multi-directional still picture with the incrementally resized identified region, and determine that a subset of the first still picture of the second multi-directional still picture is sufficiently similar to an incrementally resized identified region to indicate a line of sight. Multi-directional Pictures Processor 110 may further be configured to: resize the avatar's picture proportional to the incrementally resized identified region to portray the avatar in perspective, and insert the resized avatar's picture into the first still picture of the second multi-directional still picture in a position where the subset sufficiently similar to the incrementally resized identified region is found. Any of the operations of the described elements can be performed repeatedly and/or in different orders in alternate embodiments. For example, Multi-directional Pictures Processor 110 can be implemented as a device or processor that receives or reads multi-directional still pictures and/or other elements from Multi-directional Pictures Repository 115. As a user moves among multi-directional still pictures, Multi-directional Pictures Processor 110 may insert or show the user's own avatar at a location associated with the user's current multi-directional still picture, Comparator 112 can also be implemented as a device or processor that performs picture processing to find still pictures of any multi-directional still pictures that may be within a line of sight from the avatar's location. Multi-directional Pictures Processor 110 may then insert or show the user's own avatar in the found still pictures for other users to see the avatar from various locations and/or distances within a line of sight from the user's location. Multi-directional Pictures Processor 110 (or its functionalities), Comparator 112 (or its functionalities), and/or other disclosed elements can be implemented as separate hardware components or processors dedicated to their functionalities, they can be implemented as a single program or objects/modules/functions of a single program or separate programs operating on Processor 11, they can be provided in other suitable configurations, or a combination thereof in alternate embodiments. In some designs, Multi-directional Pictures Processor 110 may include some or all of the functionalities of Comparator 112 in which case Comparator 112 may be omitted. The device or system for inserting Avatar 845 into Still Pictures 210*a*, 210*b*, 210*c*, 210*d*, etc. can similarly be implemented for inserting Avatar 845 into Motion Pictures 410*a*, 410*b*, 410*c*, 410*d*, etc. The device or system for inserting Avatar 845 into Still Pictures 210*a*, 210*b*, 210*c*, 210*d*, etc. may also include any functionalities or steps of any of the disclosed methods such as method 3100 (later described).

Comparator 112 comprises the functionality for comparing or matching digital pictures, and/or other disclosed functionalities. Comparator 112 comprises the functionality for comparing or matching digital pictures such as Still Pictures 210*a*, 210*b*, 210*c*, 210*d*, etc., frames of Motion Pictures 410*a*, 410*b*, 410*c*, 410*d*, etc., Interpreted Pictures 218 (later described), and/or any other digital pictures. Comparator 112 or its functionalities may be included in Multi-directional Pictures Processor 110, Maker 920 (later described), and/or other disclosed elements, and vice versa, in which case the integrated element may optionally be omitted. In some embodiments, Comparator 112 comprises functions, rules, logic, and/or program for performing comparisons or matching of digital pictures, and for determining that while a perfect match is not found, a sufficiently similar match has been found. In one example, total equivalence may be found when a subset of pixels of a reference picture matches all pixels of the compared picture. In another example, sufficient similarity may be achieved when a subset of pixels of a reference picture matches or sufficiently matches some pixels in a subset of the compared picture. In a further example, when a total equivalence is not found, Comparator 112 may omit some of the pixels or regions of pixels from the comparison such as omitting a region of pixels comprising white or other color background.

In some embodiments, Comparator 112 can utilize a threshold for highest allowed difference or percentage difference in each compared pixel. A pixel in a digital picture may be encoded using various techniques such as RGB (i.e. red, green, blue), CMYK (i.e. cyan, magenta, yellow, and key [black]), hexadecimal value, numerical value, and/or others. In a typical RGB color scheme, each of red, green, and blue colors are encoded with a value 0-255. A threshold for highest allowed difference in each may be defined and utilized. In one example, a threshold for highest allowed difference (i.e. absolute difference, etc.) can be set at 10 for each of the three colors. Therefore, a pixel encoded as R130, G240, B50 is sufficiently similar to a compared pixel encoded as R135, G231, B57 because the differences in all three colors fall within the highest allowed difference threshold (i.e. 10 in this example, etc.), Furthermore, a pixel encoded as R130, G240, B50 is not sufficiently similar to a compared pixel encoded as R143, G231, B57 because the difference in red value falls outside the highest allowed difference threshold. In some aspects, a threshold for highest allowed difference or percentage difference in red, green, and blue can be set to be different for each. A similar difference determination can be utilized in pixels encoded in any other color scheme.

In further embodiments, Comparator 112 can utilize a threshold for highest allowed difference or percentage difference in the number of compared pixels. In one example, sufficient similarity may be achieved if all but 25,000 (or any other threshold number, etc.) pixels of the reference picture or a subset thereof match or sufficiently match the compared picture or a subset thereof. In another example, sufficient similarity may be achieved if all but 10 (or any other threshold percentage, etc.) percent of pixels of the reference picture or a subset thereof match the compared picture or a subset thereof. Any number of pixels (i.e. 1, 27, 392, 1001, 12001, 103805, 829520, etc.) or percentage of pixels (i.e. 0.13%, 1.1%, 5.9%, 12.5%, 23,7%, 50.2%, 77.4%, 99.9%, etc.) can be defined as highest allowed difference or percentage difference for a sufficiently similar match.

In yet further embodiments, the two above-described thresholds can be utilized in combination with each other. For example, the threshold for highest allowed difference or percentage difference in each compared pixel can be used in the count of sufficiently similar pixels between two digital pictures or subsets thereof. The count of sufficiently similar pixels may then be used in the threshold for highest allowed difference or percentage difference in the number of compared pixels to determine if the two compared digital pictures or subsets thereof sufficiently match.

In further embodiments, other aspects or properties of digital pictures or pixels may be taken into account in picture comparisons. Examples of such aspects or properties include color adjustment, size adjustment, transparency (i.e. alpha channel, etc.), mask, and/or others. In one example, as digital pictures may be captured with various picture taking equipment, in various environments, and under various lighting conditions, Comparator 112 can adjust lighting or color of pixels or otherwise manipulate pixels of a digital picture before comparison with another picture, or before performing any other picture processing. Lighting or color adjustment (also referred to as gray balance, neutral balance, white balance, etc.) may generally include manipulating or rebalancing of the intensities of the colors (typically red, green, and/or blue if RGB color model is used) with a goal to render specific colors correctly or differently for reproduction, comparison, processing, or any other purpose. Comparator 112 can, also, incrementally adjust lighting or color of pixels (i.e. increase or decrease by one the red, green, and/or blue pixel values in each cycle of comparisons, etc.) of a digital picture before comparison with another picture, or before performing any other picture processing. Any of the publically available, custom, or other lighting or color adjustment techniques or programs can be utilized such as color filters, color balancing, color correction, and/or others. In another example, Comparator 112 can resize (i.e. increase or decrease the size proportionally, increase or decrease length or width keeping aspect ratio constant, etc.) or otherwise transform a digital picture before comparison with another picture, or before performing any other picture processing. Also, Comparator 112 can incrementally resize a digital picture (i.e. increase or decrease the size proportionally in each cycle of comparisons, etc.) before comparison with another picture, or before performing any other picture processing. Any of the publically available, custom, or other digital picture resizing techniques or programs can be utilized such as nearest-neighbor interpolation, bilinear interpolation, bicubic interpolation, and/or others. In a further example, in digital pictures comprising transparency features or functionalities, a threshold for the highest allowed transparency difference can be defined and utilized similar to the previously described threshold for the highest allowed color difference. Alternatively, transparency may be applied to one or more pixels of a digital picture and color difference may then be determined between compared pixels taking into account the transparency related color effect. Alternatively, transparent pixels may be excluded from comparison in some implementations. In yet other example, in some digital picture comparisons certain regions or subsets may be ignored during comparison. Examples of such regions or subsets include background, transparent or partially transparent regions, or any arbitrary region or subset. A mask can be utilized in such cases to define a region or subset of pixels excluded from comparison with another picture. For instance, any region or subset of a digital picture determined to contain no content of interest can be omitted from comparison using a mask.

Comparator 112 may include comparison strictness rules and/or logic for determining the strictness criteria for finding a sufficiently similar match between digital pictures or subsets thereof. In some aspects, if the rules are too strict, Comparator 112 may not find a matching picture or a subset thereof. On the other hand, if the rules are too lenient Comparator 112 may find an inaccurate match. Comparator 112 may therefore include the functionality for setting, resetting, or adjusting the strictness of rules for finding sufficiently similar matches, thereby fine tuning Comparator 112 so that the rules for finding the match are not too strict nor too lenient. In some designs, appropriately strict rules for sufficient similarity can be defined based on the type or context of MDP Unit 100, experience, testing, inquiry, analysis, synthesis, or other techniques. As such, strictness rules of Comparator 112 can be set automatically, or by User 50 or MDP Unit 100 administrator based on such experience and knowledge, for example.

Comparator 112 can automatically adjust its level of strictness for finding a sufficiently similar match between compared digital pictures or subsets thereof. Depending on design, various levels of strictness can be used. In some embodiments, Comparator 112 may utilize a strictness level so that only a perfect match between the compared digital pictures or subsets thereof is considered a match or sufficiently similar match. If such a match is not found, Comparator 112 may decrease the strictness level. In some aspects, in response to decreasing the strictness level, Comparator 112 may set the strictness of the rules for a sufficiently similar match in terms of total equivalence or sufficient similarity with respect to regions of pixels representing objects only, thereby tolerating mismatches in regions of pixels representing background or noise, for example. Comparator 112 may choose to relax the rules in response to determining that not a sufficient number of pixels had been found to match using a higher strictness level. All the aforementioned settings of strictness for sufficient similarity may be set, reset, or adjusted by Comparator 112 in response to another strictness level determination.

Figure 19:
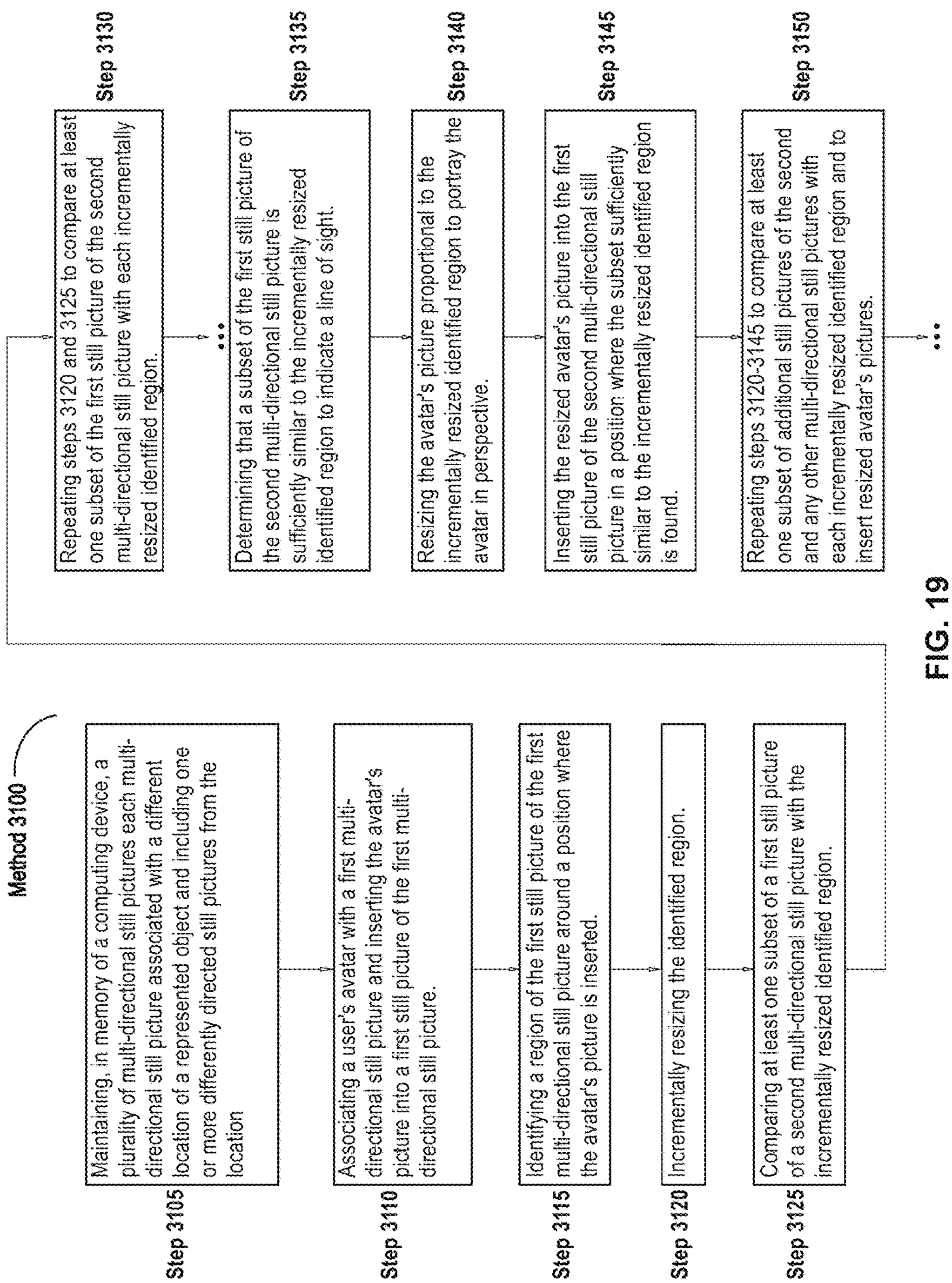
FIG. 19 illustrates a flow chart diagram of an embodiment of a method 3100 implemented by MDP Unit 100.

Referring to FIG. 19, the illustration shows an embodiment of a method 3100 for inserting Avatar 845 into Still Pictures 210*a*, 210*b*, 210*c*, 210*d*, etc. The method may therefore be used on one or more computing devices to show a user's Avatar 845 in Still Pictures 210*a*, 210*b*, 210*c*, 210*d*, etc. of any Multi-directional Still Pictures 200 from various locations and/or distances within a line of sight. In some embodiments, the method may be used on one or more computing devices operating an interface for MDP Unit 100 to show a user's Avatar 845 in Still Pictures 210*a*, 210*b*, 210*c*, 210*d*, etc. of any Multi-directional Still Pictures 200 from various locations and/or distances within a line of sight. Some or all steps of this method can similarly be implemented for inserting Avatar 845 into Motion Pictures 410*a*, 410*b*, 410*c*, 410*d*, etc. in some embodiments, the steps of this method can be used in combination with steps of other disclosed methods.

At step 3105, a plurality of multi-directional still pictures is maintained in memory of a computing device each multi-directional still picture associated with a different location of a represented object and including one or more differently directed still pictures from the location. At step 3110, a user's avatar is associated with a first multi-directional still picture and the avatar's picture is inserted into a first still picture of the first multi-directional still picture. At step 3115, a region of the first still picture of the first multi-directional still picture is identified around a position where the avatar's picture is inserted. At step 3120, the identified region is incrementally resized. At step 3125, at least one subset of a first still picture of a second multi-directional still picture are compared with the incrementally resized identified region. At step 3130, steps 3120 and 3125 are repeated to compare at least one subset of the first still picture of the second multi-directional still picture with each incrementally resized identified region. At step 3135, a determination is made that a subset of the first still picture of the second multi-directional still picture is sufficiently similar to the incrementally resized identified region to indicate a line of sight. At step 3140, the avatar's picture is resized proportional to the incrementally resized identified region to portray the avatar in perspective. At step 3145, the resized avatar's picture is inserted into the first still picture of the second multi-directional still picture in a position where the subset sufficiently similar to the incrementally resized identified region is found. At step 3150, steps 3120-3145 are repeated to compare at least one subset of additional still pictures of the second and any other multi-directional still pictures with each incrementally resized identified region and to insert resized avatar's pictures.

Figure 20:
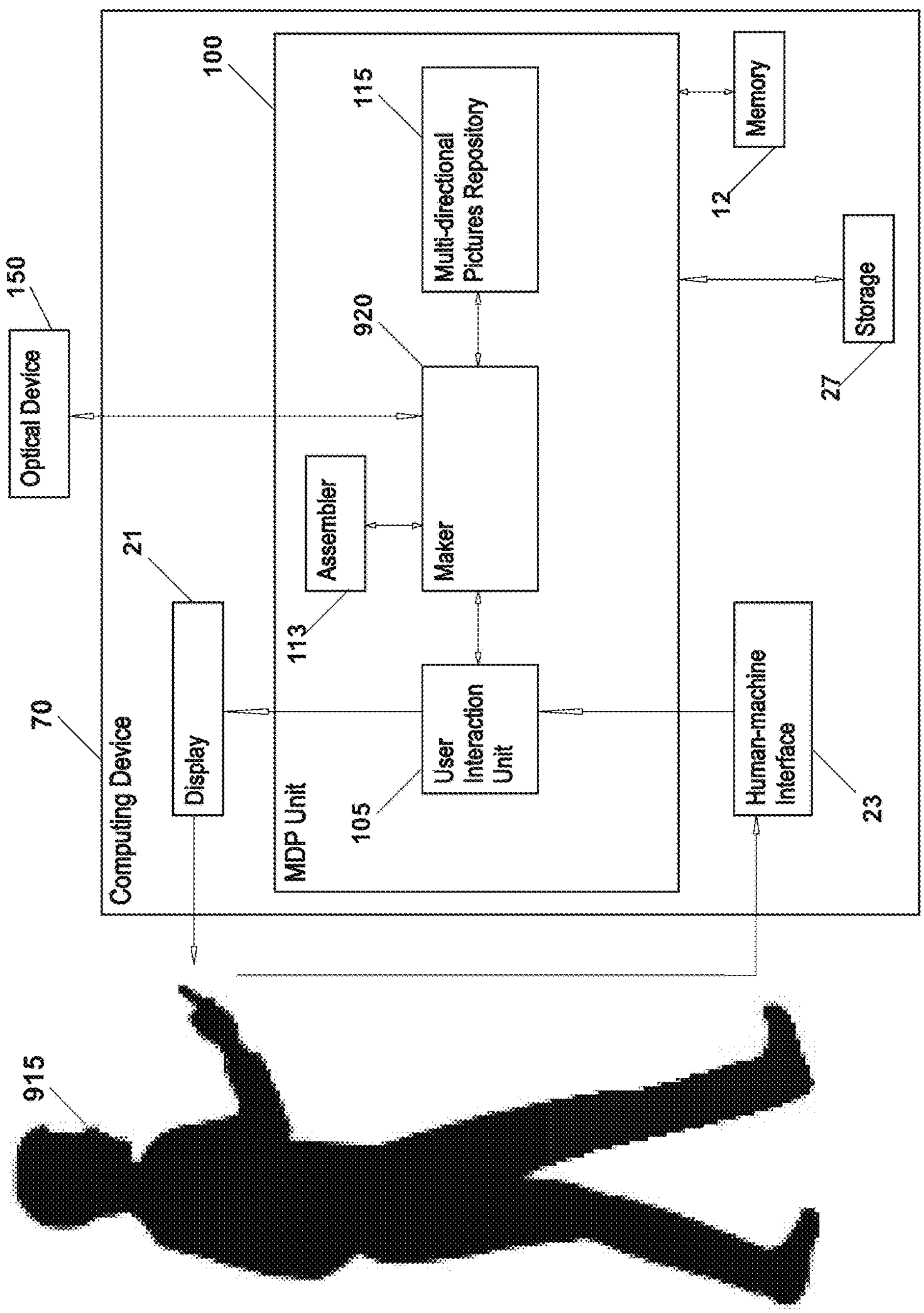
FIG. 20 illustrates an embodiment of MDP Unit 100 comprising the functionality for generating Multi-directional Still Pictures 200.

Referring to FIG. 20, an embodiment of MDP Unit 100 comprising the functionality for generating Multi-directional Still Pictures 200 is illustrated. While a collection of Multi-directional Still Pictures 200 representing an object can be created by a sophisticated computer programmer or complex specialized equipment by following the conceptual description above, Maker 920 enables a non-technical User 50 (also referred to as Designer 915) to generate a collection of Multi-directional Still Pictures 200 representing an object through a guided point and click process. As shown for example in FIG. 20, Designer 915 operates MDP Unit 100 implemented on Computing Device 70. MDP Unit 100 comprises interconnected User interaction Unit 105, Maker 920, Assembler 113, and Multi-directional Pictures Repository 115. MDP Unit 100 can be coupled with Human-machine Interface 23, Display 21, Optical Device 150, Memory 12, and Storage 27, Other additional elements may be included as needed, or some of the disclosed ones may be excluded, or a combination thereof may be utilized in alternate embodiments.

Optical Device 150 comprises the functionality for capturing still or motion pictures, and/or other disclosed functionalities. In some embodiments, Optical Device 150 comprises a still picture camera or other still picture taking equipment. In other embodiments, Optical Device 150 comprises a motion picture camera or other motion picture taking equipment. Optical Device 150 may capture any light (i.e. visible light, infrared light, ultraviolet light, x-ray light, etc.) across the electromagnetic spectrum onto a light-sensitive material. For example, Optical Device 150 comprising a digital camera can utilize a charge coupled device (CCD), a CMOS sensor, and/or other electronic image sensor to capture pictures that can then be stored in a memory, storage, or transferred to a processing element such as Maker 920, Multi-directional Pictures Processor 110, and/or other disclosed elements. In some embodiments, Optical Device 150 includes an external picture capturing device connected with Computing Device 70. In other embodiments, Optical Device 150 may be built in or integrated in Computing Device 70. In further embodiments, Optical Device 150 comprises Computing Device 70 or elements thereof. In general, Optical Device 150 can be implemented in any configuration to provide its functionalities. Optical Device 150 comprises all features and embodiments of the later described Multi-directional Motion Picture Taking Device 480, Motion Picture Camera 490*a*, 490*b*, 490*c*, 490*d*, etc., and/or other motion or still picture taking equipment, and vice versa.

In some aspects, the teaching presented by the disclosure can be implemented in a device or system for generating Multi-directional Still Pictures 200. The device or system may include Maker 920 and an interface, coupled to Maker 920, for receiving one or more still pictures each still picture depicting a differently directed view from a first location of plurality locations of a represented object. The device or system may further include Assembler 113, coupled to Maker 920, for generating a first multi-directional still picture to include the one or more still pictures from the first location. The interface may further be configured to receive one or more still pictures each depicting a differently directed view from a second location of the represented object. Assembler 113 may further be configured to generate a second multi-directional still picture to include the one or more still pictures from the second location and to include a link with the first multi-directional still picture, the first location being adjacent to the second location. Assembler 113 may further be configured to add a link with the second multi-directional still picture to the first multi-directional still picture. Any of the operations of the described elements can be performed repeatedly and/or in different orders in alternate embodiments. For example, one or more Optical Devices 150 may provide a means for capturing still pictures from locations of a represented object. Maker 920 can be implemented as a device or processor that receives or reads the captured still pictures. Assembler 113 can also be implemented as a device or processor that organizes or structures the captured still pictures or references thereto into multi-directional still pictures. Assembler 113 may also enable adding links to or modifying links of multi-directional still pictures. Maker 920 may be further configured to store the still pictures or references thereto, any data structures (i.e. multi-directional still pictures, mazes, sequences, etc.), and/or other elements in Multi-directional Pictures Repository 115. Maker 920 (or its functionalities), Assembler 113 (or its functionalities), and/or other disclosed elements can be implemented as separate hardware components or processors dedicated to their functionalities, they can be implemented as a single program or objects/modules/functions of a single program or separate programs operating on Processor 11, they can be provided in other suitable configurations, or a combination thereof in alternate embodiments. In some designs, Maker 920 may include some or all of the functionalities of Assembler 113 in which case Assembler 113 may be omitted. The device or system for generating Multi-directional Still Pictures 200 can similarly be implemented for generating Multi-directional Motion Pictures 400. The device or system for generating Multi-directional Still Pictures 200 may also include any functionalities or steps of any of the disclosed methods such as method 2200 (later described).

Maker 920 (also referred to as Multi-directional Pictures Maker 920 or other similar name or reference) comprises the functionality for creating or generating a collection of Multi-directional Still Pictures 200 or Multi-directional Motion Pictures 400, and/or other disclosed functionalities. In some embodiments, Maker 920 comprises the functionality for guiding Designer 915 in creating a collection of Multi-directional Still Pictures 200 representing an object. Maker 920 comprises the functionality for guiding Designer 915 in capturing Still Pictures 210*a*, 210*b*, 210*c*, 210*d*, etc. of the represented object needed for generating Multi-directional Still Pictures 200. Maker 920 may also include the functionality for storing Still Pictures 210*a*, 210*b*, 210*c*, 210*d*, etc. and/or any data structures such as Multi-directional Still Pictures 200, Maze 300, and/or Multi-directional Picture Sequences 350 in Multi-directional Pictures Repository 115. Maker 920 or its functionalities can be included in Multi-directional Pictures Processor 110, and/or other disclosed elements, and vice versa, in which case the integrated element may optionally be omitted. In some aspects, Maker 920 may be coupled with Multi-directional Pictures Repository 115, User interaction Unit 105, and/or other elements to facilitate the overall system operation and implement the functionalities described herein.

Assembler 113 comprises the functionality for creating or generating Multi-directional Still Pictures 200 or Multi-directional Motion Pictures 400, and/or other disclosed functionalities. Assembler 113 also comprises the functionality for adding, modifying, and/or manipulating elements (i.e. Still Pictures 210*a*, 210*b*, 210*c*, 210*d*, etc., Multi-directional Still Picture Links 220*a*, 220*b*, 220*c*, 220*d*, etc., Orientation 205, etc.) of Multi-directional Still Pictures 200 or elements (i.e. Motion Pictures 410*a*, 410*b*, 410*c*, 410*d*, etc., Multi-directional Motion Picture Links 420*a*, 420*b*, 420*c*, 420*d*, etc., Orientation 405, etc.) of Multi-directional Motion Pictures 400. Assembler 113 or its functionalities may be included in Maker 920, Multi-directional Pictures Processor 110, and/or other disclosed elements, and vice versa, in which case the integrated element may optionally be omitted.

Figure 21:
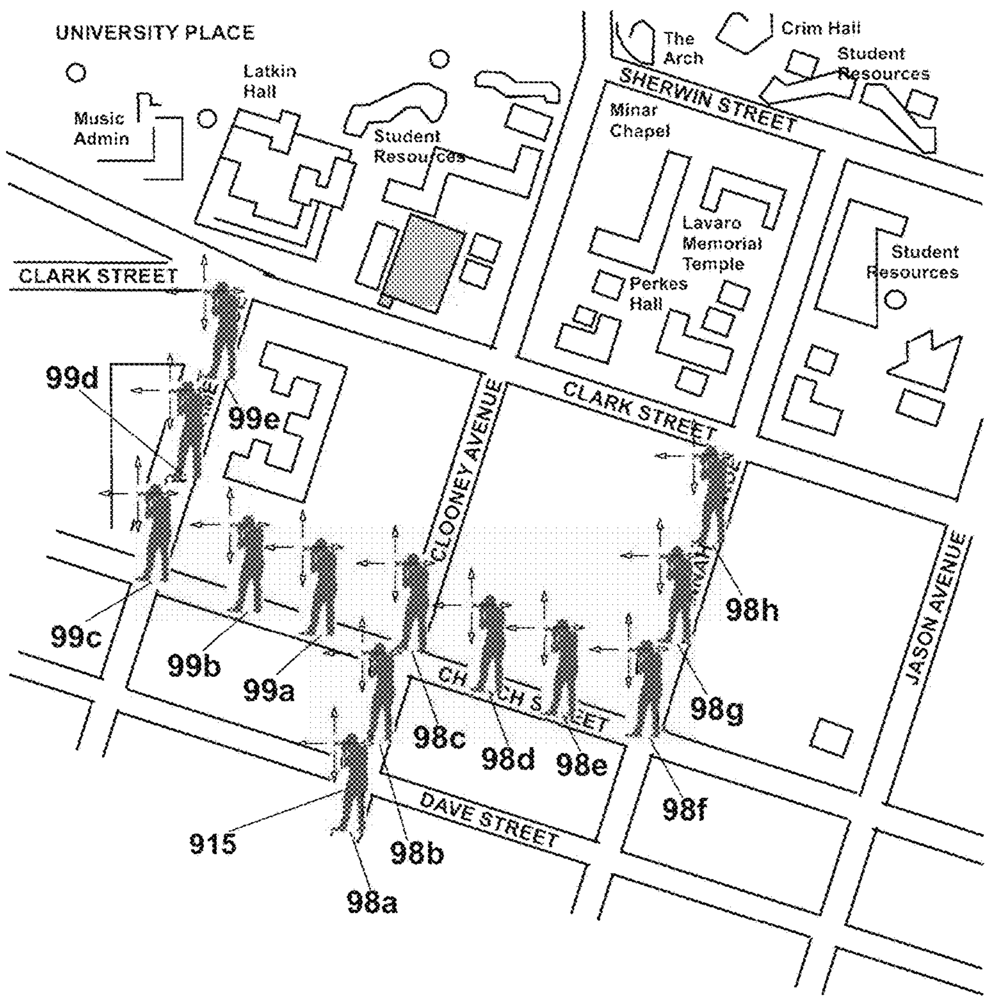
FIG. 21 shows an embodiment where Designer 915 creates Multi-directional Still Pictures 200 in curved paths.

Referring to FIG. 21, an embodiment is illustrated where Designer 915 creates Multi-directional Still Pictures 200 in curved paths, for example. Creating a collection of Multi-directional Still Pictures 200 representing an object using Maker 920 may include the following steps.

STEP 1: Designer 915 may choose an object to be represented by a collection of Multi-directional Still Pictures 200, a park for example.

STEP 2: Designer 915 can run Maker 920 (i.e. a device or system, an installed program, a web application, etc.) on Computing Device 70.

STEP 3: Designer 915 may choose a path within the park such as, for example, the path with Locations 98*a*, 98*b*, 98*c*, 98*d*, 98*e*, 98*f*, 98*g*, 98*h*, etc. Designer 915 may also choose an initial location of the path such as, for example, Location 98*a*.

STEP 4: Maker 920 may ask Designer 915 to move into a location such as the initial Location 98*a*. Maker 920 may guide Designer 915 in generating a Multi-directional Still Picture 200 of Designer's 915 current location by asking him/her to capture Forward Still Picture 210*a*, Backward Still Picture 210*b*, Right Still Picture 210*c*, Left Still Picture 210*d*, and any additional Still Pictures from Designer's 915 current location using a built-in camera of the Computing Device 70, digital camera, optical device, or any other digital picture-taking equipment. Maker 920 may then generate a Multi-directional Still Picture 200 of a current location such as Location 98*a* including the captured Still Pictures 210*a*, 210*b*, 210*c*, 210*d*, etc.

STEP 5: Maker 920 may then ask Designer 915 whether he/she wishes to make a step in forward, backward, right, left or another direction (i.e. up, down, diagonal, angular, etc.). In one example, Designer 915 may indicate a forward direction to a next location such as Location 98*b*. Maker 920 may then guide Designer 915 in generating a Multi-directional Still Picture 200 of Designer's 915 current location by asking him/her to capture Forward Still Picture 210*a*, Backward Still Picture 210*b*, Right Still Picture 210*c*, Left Still Picture 210*d*, and any additional Still Pictures from Designer's 915 current location using a built-in camera of the Computing Device 70, digital camera, or any other digital picture-taking equipment. Maker 920 may then generate a Multi-directional Still Picture 200 of a current location such as Location 98*b* including the captured Still Pictures 210*a*, 210*b*, 210*c*, 210*d*, etc. Maker 920 may then automatically add a Backward Multi-directional Still Picture Link 220*b* to the current Multi-directional Still Picture 200 (i.e. of Location 98*b*, etc.), such Backward Multi-directional Still Picture Link 220*b* may point to a previously generated Multi-directional Still Picture 200 (i.e. of Location 98*a*, etc.). Maker 920 may also automatically add a Forward Multi-directional Still Picture Link 220*a* to a previously generated Multi-directional Still Picture 200 (i.e. of Location 98*a*, etc.), such Forward Multi-directional Still Picture Link 220*a* may point to a current Multi-directional Still Picture 200 (i.e. of Location 98*b*, etc.).

STEP 6: Designer 915 can repeat STEP 5 for subsequent Locations 98*c*, 98*d*, 98*e*, 98*f*, 98*g*, 98*h*, etc. until he/she reaches the end of the current path. Representation of the path may be complete when Still Pictures 210*a*, 210*b*, 210*c*, 210*d*, etc. are captured from all Locations 98*a*, 98*b*, 98*c*, 98*d*, 98*e*, 98*f*, 98*g*, 98*h*, etc. and Multi-directional Still Picture Links 220*a*, 220*b*, 220*c*, 220*d*, etc. are added for adjacent Multi-directional Still Pictures 200 that may need to be linked.

STEP 7: Designer 915 can repeat STEP 3, STEP 4, STEP 5, and STEP 6 for any other paths within the park such as the path with Locations 99*a*, 99*b*, 99*c*, 99*d*, 99*e*, etc.

STEP 8: In order to connect Multi-directional Still Pictures 200 and/or completed paths in all needed directions beyond the above described automatic linking, Maker 920 may include an editor, graphical user interface (GUI), or other means through which Designer 915 can add or modify individual data fields of any of the Multi-directional Still Pictures 200. In one example, Multi-directional Still Pictures 200 on the path of Locations 98*a*, 98*b*, 98*c*, 98*d*, 98*e*, 98*f*, 98*g*, 98*h*, etc. can be connected with Multi-directional Still Pictures 200 on the path of Locations 99*a*, 99*b*, 99*c*, 99*d*, 99*e*, etc. by adding, for example, Left Multi-directional Still Picture Link 220*d* to Multi-directional Still Picture 200 of Location 98*c* to point to Multi-directional Still Picture 200 of Location 99*a*. Designer 915 can also add, for example, Right Multi-directional Still Picture Link 220*c* to Multi-directional Still Picture 200 of Location 99*a* to point to Multi-directional Still Picture 200 of Location 98*c*, This way, Multi-directional Still Pictures 200 on the path of Locations 98*a*, 98*b*, 98*c*, 98*d*, 98*e*, 98*f*, 98*g*, 98*h*, etc. and Multi-directional Still Pictures 200 on the path of Locations 99*a*, 99*b*, 99*c*, 99*d*, 99*e*, etc. can be connected in both directions.

STEP 9: Maker 920 may define and/or store in memory a Multi-directional Pictures Repository 115 including previously generated Multi-directional Still Pictures 200, and/or other elements. In some embodiments, Multi-directional Pictures Repository 115 may be posted as one of plurality Multi-directional Pictures Repositories 115 that have been created by administrators or users of a network service for sharing Multi-directional Pictures Repositories 115. Such Multi-directional Pictures Repositories 115 can be posted into a central repository (i.e. file, DBMS, database, system, process, data structure, and/or any other repository, etc.) accessible to users of the network service as previously described, Multi-directional Pictures Repository 115 can later be accessed and read by Multi-directional Pictures Processor 110 or other disclosed elements to implement the functionalities described herein.

Other additional steps may be included as needed, or some of the disclosed ones may be excluded, reordered or modified, or a combination thereof may be utilized in alternate embodiments.

Figure 22:
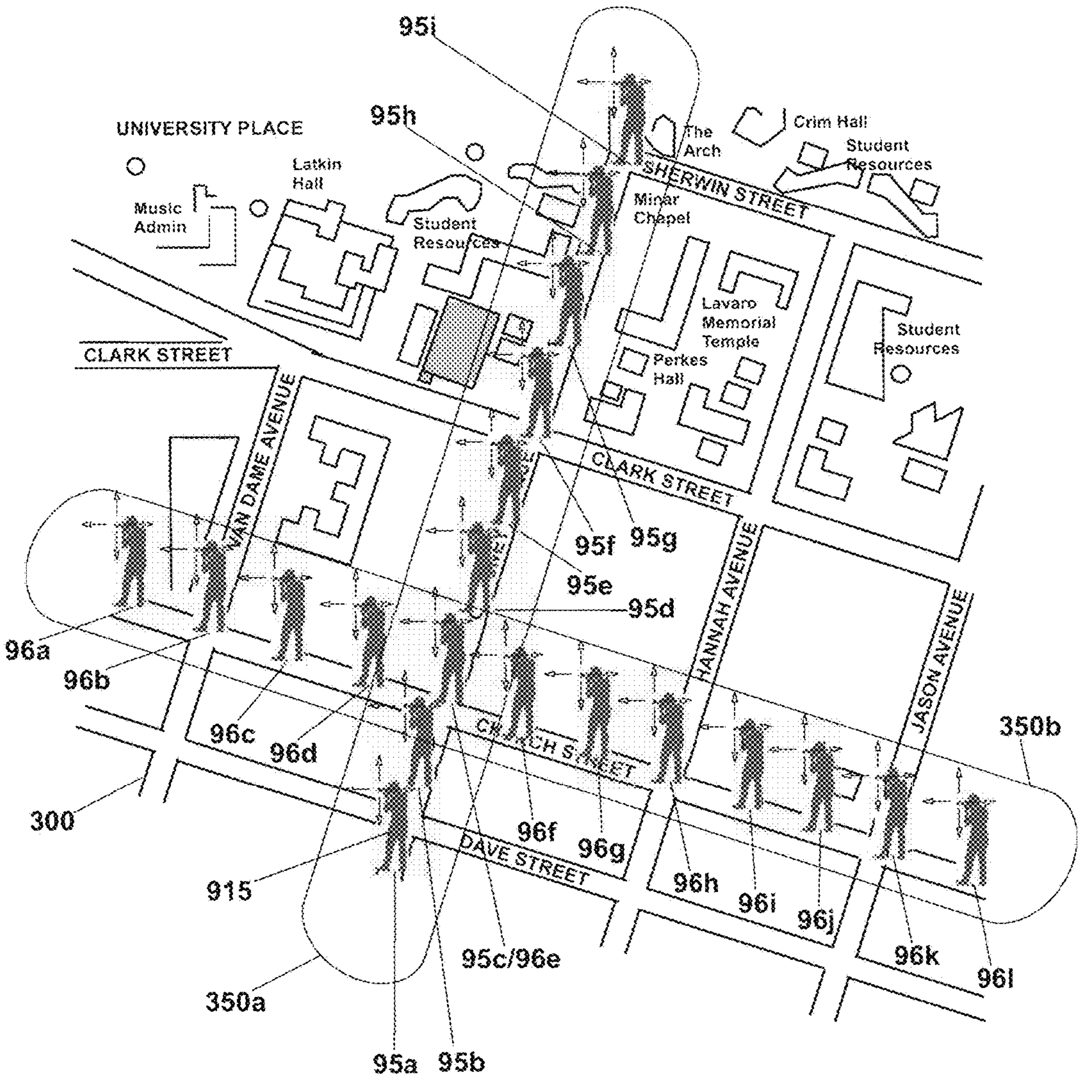
FIG. 22 shows an embodiment where Designer 915 creates Multi-directional Still Pictures 200 in straight paths.

Referring to FIG. 22, an embodiment is illustrated where Designer 915 creates Multi-directional Still Pictures 200 in straight paths using Multi-directional Picture Sequences 350, for example. Creating a collection of Multi-directional Still Pictures 200 representing an object using Maker 920 may include the following steps.

STEP 1: Designer 915 may choose an object to be represented by a collection of Multi-directional Still Pictures 200, a park for example.

STEP 2: Designer 915 can run Maker 920 (i.e. a device or system, an installed program, web application, etc.) on the Computing Device 70.

STEP 3: Designer 915 may choose a path within the park such as, for example, the path with Locations 95*a*, 95*b*, 95*c*, 95*d*, 95*e*, 95*f*, 95*g*, 95*h*, 95*i*, etc. in effect defining a Multi-directional Picture Sequence 350*a* of locations (i.e. steps, etc.) on the path. Designer 915 may also choose an initial location of the path such as, for example, Location 95*a*. A Multi-directional Picture Sequence 350 such as Multi-directional Picture Sequence 350*a* may be conceptual in Designer's 915 mind or an actual data structure utilized to store Multi-directional Still Pictures 200 each representing a location (i.e. step, etc.) on the path.

STEP 4: Maker 920 may ask Designer 915 to move into a location such as the initial Location 95*a*. Maker 920 may guide Designer 915 in generating a Multi-directional Still Picture 200 of Designer's 915 current location by asking him/her to capture Forward Still Picture 210*a*, Backward Still Picture 210*b*, Right Still Picture 210*c*, Left Still Picture 210*d*, and any additional Still Pictures from Designer's 915 current location using a built-in camera of the Computing Device 70, digital camera, optical device, or any other digital picture-taking equipment. Maker 920 may then generate a Multi-directional Still Picture 200 of a current location such as Location 95*a* including the captured Still Pictures 210*a*, 210*b*, 210*c*, 210*d*, etc.

STEP 5: Maker 920 may then ask Designer 915 whether he/she wishes to make a step in forward, backward, right, left or another direction (i.e. up, down, diagonal, angular, etc.). In one example, Designer 915 may indicate a forward direction to a next location such as Location 95*b*. Maker 920 may then guide Designer 915 in generating a Multi-directional Still Picture 200 of Designer's 915 current location by asking him/her to capture Forward Still Picture 210*a*, Backward Still Picture 210*b*, Right Still Picture 210*c*, Left Still Picture 210*d*, and any additional Still Pictures from Designer's 915 current location using a built-in camera of the Computing Device 70, digital camera, optical device, or any other digital picture-taking equipment. Maker 920 may then generate a Multi-directional Still Picture 200 of a current location such as Location 95*b* including the captured Still Pictures 210*a*, 210*b*, 210*c*, 210*d*, etc. Maker 920 may then automatically add a Backward Multi-directional Still Picture Link 220*b* to the current Multi-directional Still Picture 200 (i.e. of Location 95*b*, etc.), such Backward Multi-directional Still Picture Link 220*b* may point to a previously generated Multi-directional Still Picture 200 (i.e. of Location 95*a*, etc.), Maker 920 may also automatically add a Forward Multi-directional Still Picture Link 220*a* to a previously generated Multi-directional Still Picture 200 (i.e. of Location 95*a*, etc.), such Forward Multi-directional Still Picture Link 220*a* may point to a current Multi-directional Still Picture 200 (i.e. of Location 95*b*, etc.).

STEP 6: Designer 915 can repeat STEP 5 for subsequent Locations 95*c*, 95*d*, 95*e*, 95*f*, 95*g*, 95*h*, 95*i*, etc. until he/she reaches the end of the current path. Representation of the path may be complete when Still Pictures 210*a*, 210*b*, 210*c*, 210*d*, etc. are captured from all Locations 95*a*, 95*b*, 95*c*, 95*d*, 95*e*, 95*f*, 95*g*, 95*h*, 95*i*, etc. and Multi-directional Still Picture Links 220*a*, 220*b*, 220*c*, 220*d*, etc. are added for adjacent Multi-directional Still Pictures 200 that may need to be linked.

STEP 7: Designer 915 can repeat STEP 3, STEP 4, STEP 5, and STEP 6 for any other paths within the park such as the path with Locations 96*a*, 96*b*, 96*c*, 96*d*, 96*e*, 96*f*, 96*g*, 96*h*, 96*i*, 96*j*, 96*k*, 96*l* etc.

STEP 8: In order to connect Multi-directional Still Pictures 200 and/or completed paths in all needed directions beyond the above described automatic linking, Maker 920 may include an editor, graphical user interface (GUI), or other means through which Designer 915 may intersect any Multi-directional Picture Sequences 350 at specific Multi-directional Still Pictures 200. Selecting any of the Multi-directional Still Pictures 200 from each Multi-directional Picture Sequence 350 as common Multi-directional Still Pictures 200 may intersect the two Multi-directional Picture Sequences 350. In one example, Multi-directional Picture Sequence 350*a* can be intersected with Multi-directional Picture Sequence 350*b* by selecting Multi-directional Still Picture 200 of Location 95*c* and Multi-directional Still Picture 200 of Location 96*e* as common Multi-directional Still Pictures 200 for Multi-directional Picture Sequences 350*a* and 350*b*. Once common Multi-directional Still Pictures 200 are known, Maker 920 may discard Multi-directional Still Pictures 200 of Locations 95*c* and 96*e*, and generate a new Multi-directional Still Picture 200 of both Locations 95*c* and 96*e* (also referred to as Location 95*c*/96*e*). Maker 920 can also automatically add Still Pictures 210*a*, 210*b*, 210*c*, 210*d*, etc. from any or both Multi-directional Still Pictures 200 of Locations 95*c* and 96*e* to the new Multi-directional Still Picture 200. Maker 920 can also automatically add Multi-directional Still Picture Links 220*a*, 220*b*, 220*c*, 220*d*, etc. to the new Multi-directional Still Picture 200 to point to adjacent Multi-directional Still Pictures 200 such as, in this example, Multi-directional Still Pictures 200 of Locations 95*b*, 95*d*, 96*d* and 96*f*. Maker 920 can also automatically add or modify Multi-directional Still Picture Links 220*a*, 220*b*, 220*c*, 220*d*, etc. of adjacent Multi-directional Still Pictures 200 to point to the new Multi-directional Still Picture 200. In another example, Maker 920 may combine Multi-directional Still Picture Links 220*a*, 220*b*, 220*c*, 220*d*, etc. of Multi-directional Still Pictures 200 of Locations 95*c* and 96*e*. Particularly, the new Multi-directional Still Picture 200 may include (1) Multi-directional Still Picture Links 220*a* and 220*b* of Multi-directional Still Picture 200 of Location 95*c*, and (2) Multi-directional Still Picture Links 220*c* and 220*d* of Multi-directional Still Picture 200 of Location 96*e*. Maker 920 may also add or modify Multi-directional Still Picture Links 220*a*, 220*b*, 220*c*, 220*d*, etc. of the surrounding Multi-directional Still Pictures 200 by reverse linking them with the new Multi-directional Still Picture 200 of Location 95*c*/96*e* as previously described. As such, Multi-directional Picture Sequences 350*a* and 350*b* can be intersected and/or interlinked in all needed directions. In some embodiments, instead of discarding them, any or both of Multi-directional Still Pictures 200 of Locations 95*c* and 96*e* may continue to be used in addition to the new Multi-directional Still Picture 200 of Location 95*c*/96*e* in which case the three Multi-directional Still Pictures 200 can be interlinked.

STEP 9: Maker 920 may define and/or store in memory a Multi-directional Pictures Repository 115 including Multi-directional Picture Sequences 350*a* and 350*b*, previously generated Multi-directional Still Pictures 200, and/or other elements. In some embodiments, Multi-directional Pictures Repository 115 can be posted as one of plurality Multi-directional Pictures Repositories 115 that have been created by administrators or users of a network service for sharing Multi-directional Pictures Repositories 115. Such Multi-directional Pictures Repositories 115 can be posted into a central repository (i.e. file, DBMS, database, system, process, data structure, and/or any other repository, etc.) accessible to users of the network service as previously described. Multi-directional Pictures Repository 115 may later be accessed and read by Multi-directional Pictures Processor 110 or other disclosed elements to implement the functionalities described herein.

Other additional steps may be included as needed, or some of the disclosed ones may be excluded, reordered or modified, or a combination thereof may be utilized in alternate embodiments.

Still referring to FIG. 22, in some instances, Designer 915 may prefer to capture Still Pictures 210*a*, 210*b*, 210*c*, 210*d*, etc. from all locations of a represented object, store them in a memory of Computing Device 70, and generate Multi-directional Still Pictures 200 from the stored Still Pictures 210*a*, 210*b*, 210*c*, 210*d*, etc., for example. Creating a collection of Multi-directional Still Pictures 200 representing an object using Maker 920 may include the following steps.

STEP 1: Designer 915 may choose an object to be represented by a collection of Multi-directional Still Pictures 200, a park for example.

STEP 2: Designer 915 may choose paths within the park such as, for example, the path with Locations 95*a*, 95*b*, 95*c*, 95*d*, 95*e*, 95*f*, 95*g*, 95*h*, 95*i*, etc. and path with Locations 96*a*, 96*b*, 96*c*, 96*d*, 96*e*, 961, 96*g*, 96*h*, 96*i*, 96*j*, 96*k*, 96*l* etc. in effect defining a Maze 300 of locations (i.e. steps, etc.) in the park. Designer 915 may also choose an initial location such as, for example, Location 95*a*. A Maze 300 may be conceptual in Designer's 915 mind or an actual data structure utilized to store (1) Multi-directional Still Pictures 200 each representing a location (i.e. step, etc.) in the park, and/or (2) Multi-directional Picture Sequences 350 each representing a walkway in the park.

STEP 3: Designer 915 may move into a location such as Location 95*a* and capture Forward Still Picture 210*a*, Backward Still Picture 210*b*, Right Still Picture 210*c*, Left Still Picture 210*d*, and/or any additional Still Pictures from Designer's 915 current location using a built-in camera of the Computing Device 70, digital camera, optical device, or any other digital picture-taking equipment. The captured Still Pictures 210*a*, 210*b*, 210*c*, 210*d*, etc. can be stored as digital pictures (i.e. digital picture files, etc.) in Memory 12 or Storage 27 of Computing Device 70, or of a built-in camera of the Computing Device 70, digital camera, optical device, or any other digital picture-taking equipment. In some embodiments, a classic analog photo camera can be used and pictures scanned into digital format later. In other embodiments, a video camera can be used and frames of the video can be captured as Still Pictures 210*a*, 210*b*, 210*c*, 210*d*, etc. In yet other embodiments in which picture stitching is implemented, Still Pictures 210*a*, 210*b*, 210*c*, 210*d*, etc. with overlapping fields of view can be captured to facilitate picture stitching as previously described.

STEP 4: Designer 915 can repeat STEP 3 for subsequent Locations 95*b*, 95*c*, 95*d*, 95*e*, 95*f*, 95*g*, 95*h*, 95*i*, etc. until he/she reaches the end of the current path.

STEP 5: Designer 915 can repeat STEP 3 and STEP 4 for any other paths within the park such as the path with Locations 96*a*, 96*b*, 96*c*, 96*d*, 96*e*, 96*f*, 96*g*, 96*h*, 96*i*, 96*j*, 96*k*, 96*l* etc.

STEP 6: Designer 915 may run Maker 920 (i.e. a device or system, an installed program, web application, etc.) on the Computing Device 70.

Figure 23:
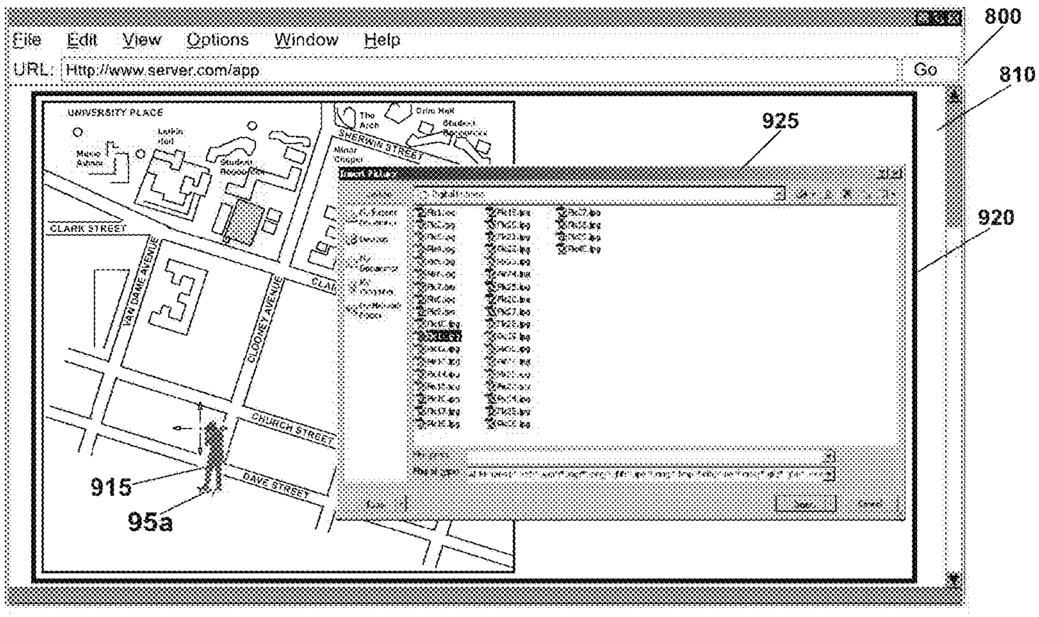
FIG. 23 shows an embodiment where Designer 915 assigns a Still Picture 210.

STEP 7: As shown in FIG. 23, Maker 920 can guide Designer 915 in creating a Multi-directional Still Picture 200 such as the Multi-directional Still Picture 200 of Location 95*a* by asking him/her to add Forward Still Picture 210*a*, Backward Still Picture 210*b*, Right Still Picture 210*c*, Left Still Picture 210*d*, and/or any additional Still Pictures through a Still Picture Selection Window 925. Designer 915 can add Still Pictures 210*a*, 210*b*, 210*c*, 210*d*, etc. to the current Multi-directional Still Picture 200 by selecting from a list of previously stored Still Pictures 210*a*, 210*b*, 210*c*, 210*d*, etc. displayed in the Still Picture Selection Window 925. In some embodiments, Still Picture Selection Window 925 may display Still Pictures 210*a*, 210*b*, 210*c*, 210*d*, etc. each stored in a separate file in Memory 12 or Storage 27.

Figure 24:
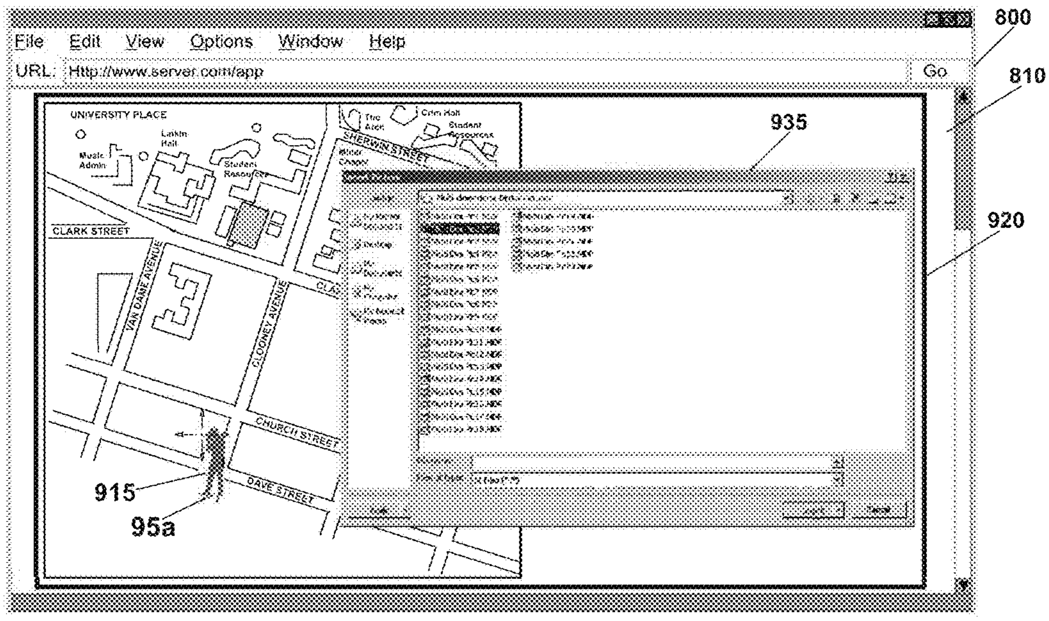
FIG. 24 shows an embodiment where Designer 915 assigns a Multi-directional Still Picture Link 220.

STEP 8: As shown in FIG. 24, Maker 920 can guide Designer 915 in further defining a Multi-directional Still Picture 200 such as the Multi-directional Still Picture 200 of Location 95*a* by asking him/her to add Forward Multi-directional Still Picture Link 220*a*, Backward Multi-directional Still Picture Link 220*b*, Right Multi-directional Still Picture Link 220*c*, Left Multi-directional Still Picture Link 220*d*, and/or any additional Multi-directional Still Picture Links through a Multi-directional Still Picture Selection Window 935. Designer 915 may add Multi-directional Still Picture Links 220*a*, 220*b*, 220*c*, 220*d*, etc. to the current Multi-directional Still Picture 200 by selecting from a list of previously stored Multi-directional Still Pictures 200 displayed in the Multi-directional Still Picture Selection Window 935. In some embodiments, Multi-directional Still Picture Selection Window 935 may display Multi-directional Still Pictures 200 each stored in a separate object file in Memory 12 or Storage 27.

STEP 9: Maker 920 may ask Designer 915 to assign an identifier (i.e. name, etc.) to the current Multi-directional Still Picture 200 or Maker 920 can automatically assign a suitable identifier (i.e. a unique name that may include date and time including seconds or milliseconds, etc.). Maker 920 may then generate the Multi-directional Still Picture 200 including the added Still Pictures 210*a*, 210*b*, 210*c*, 210*d*, etc., Multi-directional Still Picture Links 220*a*, 220*b*, 220*c*, 220*d*, etc., and/or any other elements.

STEP 10: Designer 915 can repeat STEP 7, STEP 8 and STEP 9 to generate any additional Multi-directional Still Pictures 200 each representing a location of a represented object (i.e. park in this example).

STEP 11: In order to connect Multi-directional Still Pictures 200 and/or Multi-directional Picture Sequences 350 (i.e. paths) in all needed directions, Maker 920 may include an editor, graphical user interface (GUI), or other means through which Designer 915 can add or modify individual Multi-directional Still Picture Links 220*a*, 220*b*, 220*c*, 220*d*, etc. of any of the Multi-directional Still Pictures 200 as previously described. Alternatively, Maker 920 may include an editor, graphical user interface (GUI), or other means through which Designer 915 can intersect any Multi-directional Picture Sequences 350 at specific Multi-directional Still Pictures 200 as previously described.

STEP 12: Maker 920 may define and/or store in memory a Multi-directional Pictures Repository 115 including Multi-directional Picture Sequences 350*a* and 350*b*, previously generated Multi-directional Still Pictures 200, and/or other elements. In some embodiments, Multi-directional Pictures Repository 115 can be posted as one of plurality Multi-directional Pictures Repositories 115 that have been created by administrators or users of a network service for sharing Multi-directional Pictures Repositories 115. Such Multi-directional Pictures Repositories 115 can be posted into a central repository (i.e. file, DBMS, database, system, process, data structure, and/or any other repository, etc.) accessible to users of the network service as previously described. Multi-directional Pictures Repository 115 can later be accessed and read by Multi-directional Pictures Processor 110 or other disclosed elements to implement the functionalities described herein.

Other additional steps may be included as needed, or some of the disclosed ones may be excluded, reordered or modified, or a combination thereof may be utilized in alternate embodiments.

In some embodiments, any of the disclosed optical devices, apparatuses, systems, and/or methods for creating or generating a collection of Multi-directional Still Pictures 200 representing an object may include searching digital pictures in any Multi directional Pictures Repository 115, any picture database, any picture repository, or any collection of pictures to find same or similar picture that a user may need or want to capture. Such picture may have been captured previously by the same or another user. If found, such picture may eliminate the need to capture the same or similar picture again saving the user time. For example, public places such as Arlington National Cemetery, Library of Congress, public streets, public parks, and/or other public places may have pictures captured from their various locations and stored in a picture repository that can be accessed by Maker 920. As such, Maker 920 comprises the functionality for detecting pictures needed for creating a collection of Multi-directional Still Pictures 200 representing an object. Such functionality includes any of the previously or later described techniques or steps such as finding Still Pictures 210*a*, 210*b*, 210*c*, 210*d*, etc. that may be within a line of sight from a specific location, automatically detecting Still Pictures 210*a*, 210*b*, 210*c*, 210*d*, etc. from a collection of digital pictures (later described), automatically detecting Multi-directional Still Picture Links 220*a*, 220*b*, 220*c*, 220*d*, etc. (later described), and/or any other techniques known in art for detecting digital pictures having specific patterns. Any of the previously described features and embodiments of Comparator 112 may also be utilized.

Figure 25:
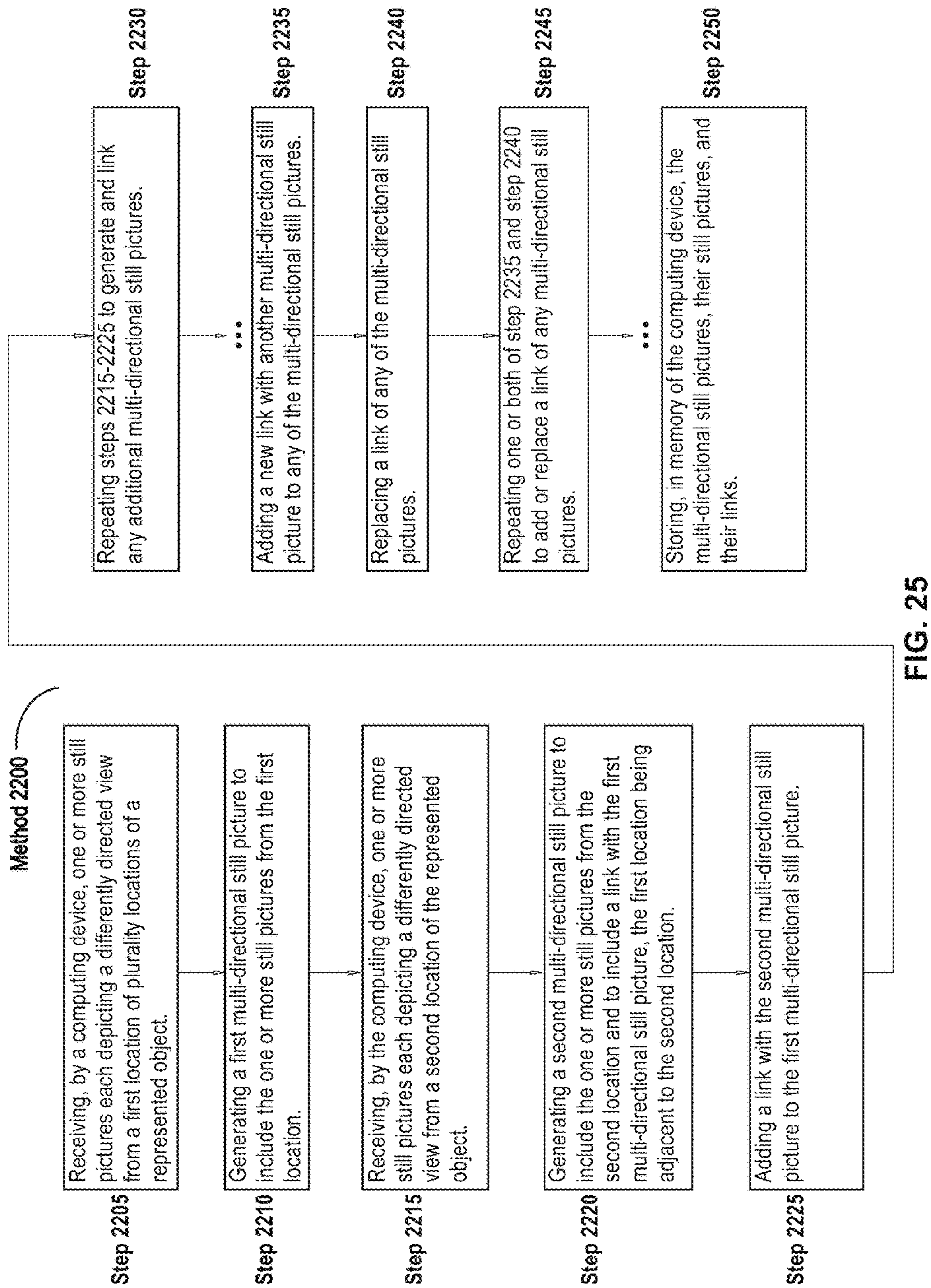
FIG. 25 illustrates a flow chart diagram of an embodiment of a method 2200 implemented by MDP Unit 100.

Referring to FIG. 25, the illustration shows an embodiment of a method 2200 for generating a collection of Multi-directional Still Pictures 200. The method may therefore be used on one or more computing devices to enable a user to generate Multi-directional Still Pictures 200 in a user-friendly process. In some embodiments, the method may be used on one or more computing devices operating an interface for MDP Unit 100 to enable a user to generate Multi-directional Still Pictures 200 in a user-friendly process. Some or all steps of this method can similarly be utilized with Multi-directional Motion Pictures 400 (later described) for generating a collection of Multi-directional Motion Pictures 400. In some embodiments, the steps of this method can be used in combination with steps of any of the disclosed methods such as methods 3200 for automatic detection of Still Pictures 210*a*, 210*b*, 210*c*, 210*d*, etc. from a collection of digital pictures and/or method 3300 for automatic detection of Multi-directional Still Picture Links 220*a*, 220*b*, 220*c*, 220*d*, etc. in a collection of Multi-directional Still Pictures 200.

At step 2205, one or more still pictures each depicting a differently directed view from a first location of plurality locations of a represented object are received by a computing device. MDP Unit 100 enables representation of objects using multi-directional still pictures positioned in locations of the represented object. Any locations can be used to represent the object. In one example, steps (i.e. every two feet, etc.) in a park's walkways can be used as locations to simulate a user's stepping through the park. In another example, evenly spaced points (i.e. points in the center of every square yard, etc.) in a building's interior may be used as locations to simulate a user's stepping through the building. In one example, the first location can be a logical starting point such as near an entrance into a park or near a door to a building. In another example, the first location can be any location of the represented object. A user can capture, using a digital camera or another optical device, one or more still pictures each including a differently directed view from a location such as the first location and the one or more still pictures may be received by a computing device from the digital camera or another optical device. The digital camera or another optical device may be built into a computing device running an instance of MDP Unit 100 in which case the captured one or more still pictures may be received from the digital camera or another optical device through an internal connection or storage means such as, for example, bus, memory, hard drive, or any other direct or operative internal connection or storage means. In one example, the digital camera or another optical device can store a still picture in a file on a hard drive of the computing or mobile device where an instance of MDP Unit 100 may access the file to facilitate the functionalities described herein. The digital camera or another optical device may be separate from the computing device running an instance of MDP Unit 100 in which case the captured one or more still pictures can be received from the digital camera or another optical device through external connection or storage means such as, for example, bus, usb drive, network, or any other direct or operative external connection or storage means. In one example, the digital camera may store a still picture in a file on a network to which the computing device can connect and on which an instance of MDP Unit 100 may access the file to facilitate the functionalities described herein, User can capture views in any directions (forward, backward, right, left, up, down, diagonal, angular, etc.) from locations such as the first and/or any other location.

At step 2210, a first multi-directional still picture is generated to include the one or more still pictures from the first location. Each location of the represented object such as the first location may be associated with a multi-directional still picture comprising one or more differently directed still pictures and one or more links to other multi-directional still pictures. In some embodiments, a multi-directional still picture includes a data structure storing one or more differently directed still pictures and one or more links to other multi-directional still pictures. Multi-directional still pictures enable a user to view all views (i.e. forward, backward, right, left, up, down, diagonal, angular, etc.) from all locations of the represented object and enable the user to move among the multi-directional still pictures this way simulating motion relative to the represented object. In some embodiments, multi-directional still pictures may be ordered to include a first multi-directional still picture, followed by a second multi-directional still picture, which may also be followed by a third multi-directional still picture, and so on, to complete a sequence. In other embodiments, multi-directional still pictures may be organized in a maze that corresponds to a shape of the represented object. In yet other embodiments, multi-directional still pictures may be interlinked in any conceivable manner without using any intermediary or supporting data structures such as the sequence and/or maze. Generally, multi-directional still pictures may correspond to a shape of a represented object whatever that shape is. Since there are no other multi-directional still pictures to which it can be linked, the first multi-directional still picture may be generated to include the still pictures captured from the first location. In some embodiments, picture processing can be implemented to automatically detect still pictures with overlapping fields of view from a specific location of the represented object such as the first location, and to add the detected still pictures to multi-directional still picture representing the location. Furthermore, picture processing can be implemented to interpret the content of a still picture and store or associate this interpretive information (later described) with the still picture or with the multi-directional still picture to which the still picture belongs. Generating comprises any action or operation by or for Maker 920, Assembler 113, and/or other disclosed elements.

At step 2215, one or more still pictures each depicting a differently directed view from a second location of the represented object are received by the computing device. Step 2215 comprises any action or operation described in step 2205 as applicable.

At step 2220, a second multi-directional still picture is generated to include the one or more still pictures from the second location and to include a link with the first multi-directional still picture, the first location being adjacent to the second location. Step 2220 comprises any action or operation described in Step 2210 as applicable. Additionally, a link with a prior multi-directional still picture such as the first multi-directional still picture can be included within a current multi-directional still picture such as the second multi-directional still picture. The link enables the user to move from the second multi-directional still picture to the first multi-directional still picture this way simulating motion relative to the represented object. In some embodiments, picture processing can be implemented to automatically detect a link between multi-directional still pictures and to add the detected link to a multi-directional still picture.

At step 2225, a link with the second multi-directional still picture is added to the first multi-directional still picture. In addition to the previously included still pictures, a link with a current multi-directional still picture such as the second multi-directional still picture can be added to a prior multi-directional still picture such as the first multi-directional still picture. The link enables a user to move from the first multi-directional still picture to the second multi-directional still picture this way simulating motion relative to the represented object. Adding a link comprises any action or operation by or for Maker 920, Assembler 113, and/or other disclosed elements.

At step 2230, steps 2215-2225 are repeated to generate and link any additional multi-directional still pictures. Any number of multi-directional still pictures associated with any number of locations can be generated and interlinked to cover the entire represented object or a portion thereof.

At step 2235, a new link with another multi-directional still picture is added to any of the multi-directional still pictures. MDP Unit 100 may include a means through which the user can access any of the multi-directional still pictures and add to it an additional link with any other multi-directional still picture. In some embodiments in which multi-directional still picture comprises a data structure, such means may include an editor or graphical user interface configured to ask the user to indicate a link with a specific multi-directional still picture and to add a new data field including the new link to the data structure. In other embodiments in which multi-directional still picture comprises a data structure, such means may use picture processing to automatically detect a new link with a multi-directional still picture and add a new data field including the new link to the data structure. Adding a link comprises any action or operation by or for Maker 920, Assembler 113, and/or other disclosed elements.

At step 2240, a link of any of the multi-directional still pictures is replaced. MDP Unit 100 may include a means through which a user can access any of the multi-directional still pictures to replace, delete, or otherwise modify any of its links. In some embodiments in which multi-directional still picture comprises a data structure, such means may include an editor or graphical user interface configured to read a data field including a link, ask the user to indicate a link with another multi-directional still picture, and replace the previous link with the updated link in the data field. In some embodiments in which multi-directional still picture comprises a data structure, such means may read a data field including a link, use picture processing to automatically detect a link with another multi-directional still picture, and replace the previous link with the updated link in the data field. Modifying may include any action or operation by or for Maker 920, Assembler 113, and/or other disclosed elements.

At step 2245, one or both of step 2235 and step 2240 are repeated to add or replace a link of any multi-directional still pictures. Step 2245 comprises any action or operation described in step 2235 and/or step 2240 as applicable. Any number of links among multi-directional still pictures can be used in user's discretion. Such links can connect multi-directional still pictures in any conceivable direction (i.e. forward, backward, right, left, up, down, diagonal, angular, etc.). The links enable a user to move among multi-directional still pictures this way simulating motion relative to the represented object. In one example, links may connect multi-directional still pictures associated with locations (i.e. steps, etc.) on a park's walkways. In another example, links may connect multi-directional still pictures associated with evenly spaced locations (i.e. locations in the center of every square yard, etc.) in a room.

At step 2250, the multi-directional still pictures, their still pictures, and their links, are stored in memory of the computing device. Multi-directional still pictures can be stored, maintained, and/or organized in various arrangements including files, data structures, objects, tables, databases, DBMSs, memory structures, and/or other similar arrangements and/or repositories. In some embodiments, still pictures or references thereto, links, and/or any data structures (i.e. multi-directional still pictures, mazes, sequences, etc.) can be stored in a Multi-directional Pictures Repository 115. In one example, Multi-directional Pictures Repository 115 includes a file, a data structure, and/or other similar repository. In another example, Multi-directional Pictures Repository 115 includes a database management system (DBMS), a database, a system, a process, and/or other similar repository. In a further example, Multi-directional Pictures Repository 115 may be embedded within an instance of MDP Unit 100 (i.e. hard coded in the Multi-directional Pictures Processor 110, etc.). In yet further example, Multi-directional Pictures Repository 115 comprises a separate file (i.e. object file, etc.), a separate data structure, a separate DBMS, a separate database, a separate system, a separate process, and/or other separate repository or system for each of the still pictures or references thereto, for each of the links; and/or for each of the data structures (i.e. multi-directional still pictures, mazes, sequences, etc.). In yet further example, Multi-directional Pictures Repository 115 comprises a collection of definitions of pictures or references thereto, links, and/or any data structures (i.e. multi-directional still or motion pictures, mazes, sequences, etc.) that may be embedded in other files or programs. Storing comprises any action or operation by or for Maker 920, Assembler 113, Multi-directional Pictures Repository 115, and/or other disclosed elements.

Embodiments involving any still picture or multi-directional still picture functionalities may include any features or embodiments involving any motion picture or multi-directional motion picture functionalities as later described.

Figure 26:
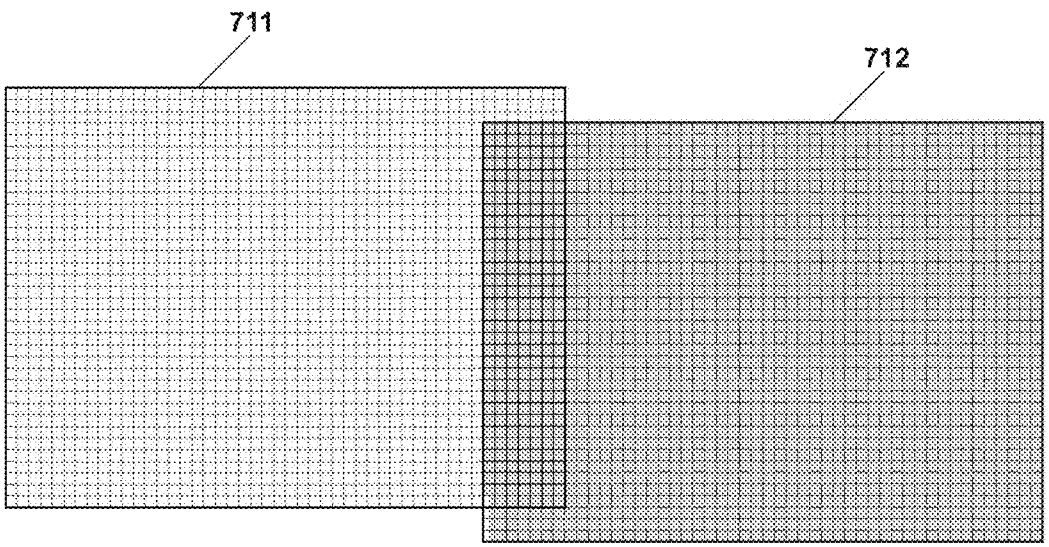
FIG. 26 shows an embodiment of picture processing for automatic detection of Still Pictures 210*a*, 210*b*, 210*c*, 210*d*, etc. from a collection of digital pictures.

Referring to FIG. 26, the illustration shows an embodiment of picture processing for automatic detection of Still Pictures 210*a*, 210*b*, 210*c*, 210*d*, etc. from a collection of digital pictures, MDP Unit 100 comprises picture processing for automatic detection of Still Pictures 210*a*, 210*b*, 210*c*, 210*d*, etc. to aid a user in creating a collection of Multi-directional Still Pictures 200 representing an object. In some embodiments, creating a collection of Multi-directional Still Pictures 200 representing an object includes automatic detection of Still Pictures 210*a*, 210*b*, 210*c*, 210*d*, etc., and generation of Multi-directional Still Pictures 200 including the detected Still Pictures 210*a*, 210*b*, 210*c*, 210*d*, etc. In other embodiments, creating a collection of Multi-directional Still Pictures 200 representing an object further includes automatic detection of Multi-directional Still Picture Links 220*a*, 220*b*, 220*c*, 220*d*, etc. (later described) with adjacent Multi-directional Still Pictures 200. For example, creating a collection of Multi-directional Still Pictures 200 representing an object includes automatic detection of Still Pictures 210*a*, 210*b*, 210*c*, 210*d*, etc. of an initial Multi-directional Still Picture 200, generation of the initial Multi-directional Still Picture 200 including the detected Still Pictures 210*a*, 210*b*, 210*c*, 210*d*, etc., automatic detection of links with, and generation of, adjacent Multi-directional Still Pictures 200 including their automatically detected Still Pictures 210*a*, 210*b*, 210*c*, 210*d*, etc., and so on.

In some embodiments, automatic detection of Still Pictures 210*a*, 210*b*, 210*c*, 210*d*, etc. of a Multi-directional Still Picture 200 includes comparing pictures in a collection of digital pictures to determine if one picture includes an overlapping field of view of another picture. Finding a picture that includes an overlapping field of view of another picture may indicate that the two pictures have been captured from the same location of a represented object in different directions and that the two pictures may belong to a same Multi-directional Still Picture 200. In some aspects, comparing digital pictures to determine if one includes an overlapping field of view of another picture can be performed by determining if a subset of pixels of one picture (i.e. comparative picture) matches or sufficiently matches a subset of pixels of another picture (i.e. reference picture) near opposite edges of the compared pictures. The threshold for similarity in each of the pixels required for a match or sufficient match may be set or adjusted by a user or automatically. The threshold for the number of pixels required for a match or sufficient match can similarly be set or adjusted, Both thresholds and sufficient similarity comparison process are previously described in Comparator 112. Any publically available or other programs or techniques for detecting overlapping fields of view such as techniques used in digital picture stitching can be used in such comparisons. Pictures found to include matching or sufficiently matching subsets of pixels (i.e. overlapping fields of view from a same location of a represented object) can be included as Still Pictures 210*a*, 210*b*, 210*c*, 210*d*, etc. of a same Multi-directional Still Picture 200. If matching or sufficiently matching subsets of pixels (i.e. overlapping fields of view) are not found in a reference picture and a comparative picture, the comparison can be performed between the reference picture and all other pictures (i.e. comparative pictures) in a collection of digital pictures. When the comparison is complete between one reference picture and all comparative pictures, another picture in the collection of digital pictures can then be used as a new reference picture with which all other pictures (i.e. comparative pictures) may be compared until all pictures in the collection are compared. As such, all pictures in the collection of digital pictures may be compared with all other pictures in the collection to find all pictures with overlapping fields of view, in some embodiments, interpretive information (later described) regarding location of each digital picture in a collection of digital pictures can be used to selectively choose to compare reference pictures only with comparative pictures within a certain distance from the reference picture.

In one example, picture processing can be implemented on Computing Device 70 to find Still Pictures 210*a*, 210*b*, 210*c*, 210*d*, etc. of a Multi-directional Still Picture 200 in a collection of digital pictures. The collection of digital pictures includes Pictures 711 and 712 as shown in FIG. 26. Picture 711 may be a reference picture with which all other pictures (i.e. comparative pictures) in the collection of digital pictures can be compared in one cycle of comparisons. Picture 712 may be a comparative picture and one of the pictures in the collection of digital pictures that is compared with Picture 711. Picture 711 and Picture 712 may be compared to determine if a subset of pixels near one edge of Picture 711 matches or sufficiently matches a subset of pixels near the opposite edge of Picture 712. If a subset of pixels of Picture 711 is found to match or sufficiently match a subset of pixels of Picture 712, Pictures 711 and 712 may be Still Pictures (i.e. Forward Still Picture 210*a* and Right Still Picture 210*c* for example, etc.) of a same Multi-directional Still Picture 200. Any of the described steps for comparing Picture 711 and Picture 712 can be performed with all other pictures in the collection of digital pictures to find all pictures that belong to the same Multi-directional Still Pictures 200. In some embodiments, a user can utilize a wide lens camera to capture digital pictures with overlapping fields of view needed for automatic detection of Still Pictures 210*a*, 210*b*, 210*c*, 210*d*, etc. In other embodiments, a user can utilize a standard lens camera to capture an increased number of digital pictures to ensure overlapping fields of view needed for automatic detection of Still Pictures 210*a*, 210*b*, 210*c*, 210*d*, etc. In some aspects, Maker 920 includes an editor, graphical user interface or other means through which a user can access any Multi-directional Still Picture 200 and add to it a new Still Picture 210*a*, 210*b*, 210*c*, 210*d*, etc. (i.e. still picture that the automatic detection may have missed, etc.) or modify its existing Still Picture 210*a*, 210*b*, 210*c*, 210*d*, etc. (i.e. still picture that the automatic detection may have included erroneously, etc.). In some implementations, Still Pictures 210*a*, 210*b*, 210*c*, 210*d*, etc. with overlapping fields of view from a same location of a represented object can be stitched into a Combined Picture 227 through the previously described picture stitching process.

In some embodiments, Maker 920 includes automatic detection of Still Pictures 210*a*, 210*b*, 210*c*, 210*d*, etc. from a collection of digital pictures stored in a picture database. A picture database may include one or more files, one or more DBMSs, one or more databases, one or more data structures, one or more systems, one or more processes, and/or one or more other repositories. A picture database can be a local picture database stored on Computing Device 70 and privately held for a user's use, for example. A picture database may also be a remote picture database stored on a Remote Computing Device 1310 (i.e. application server, cloud, etc.) accessible over a Network 1300 (i.e. corporate enterprise network, Internet, etc.). A picture database comprises pictures of a represented object captured by a number of users. In some aspects, a remote picture database may be publically available such as, for example, Yahoo Images, Google Images, and/or other publically available picture databases. In other aspects, a remote picture database may be available to subscribers or members of an image sharing service such as, for example, flickr.com, tinypic.com, imgur.com, postimage.org, photobucket.com, and/or other image sharing services. In yet other aspects, a remote picture database may be available to subscribers or members of social media that may include picture sharing functionality such as Facebook, Twitter, and/or other social media. In one example, a picture database comprises digital pictures of an object such as Arlington National Cemetery in Virginia, Library of Congress in Washington D.C., and/or any other object of which a number of users may have captured digital pictures from various locations. In another example, a picture database comprises digital pictures of various objects (i.e. Facebook picture database including pictures of all objects captured by all Facebook users, etc.) and a filter may be implemented to seek pictures of the object of interest to be represented in a collection of Multi-directional Still Pictures 200. The filter may seek pictures having "Arlington National Cemetery" included in the picture name, picture descriptor, picture metadata, or other picture data, for example. Once pictures of a desired object are found in the picture database, creating a collection of Multi-directional Still Pictures 200 representing an object may include any of the previously described steps or techniques using Maker 920 to manually or automatically generate Multi-directional Still Pictures 200 of the represented object (i.e. Arlington National Cemetery, Library of Congress, etc.).

The described techniques for automatic detection of Still Pictures 210*a*, 210*b*, 210*c*, 210*d*, etc. can similarly be utilized with Motion Pictures 410*a*, 410*b*, 410*c*, 410*d*, etc. (later described) where automatic detection and/or other operations as described can be performed in streams of still pictures. In some embodiments, automatic detection of Motion Pictures 410*a*, 410*b*, 410*c*, 410*d*, etc. can be performed as previously described where processing or comparisons may be performed for each still picture in a stream of still pictures (i.e. motion picture, etc.) to find a match or sufficient match. Therefore, additional cycles of processing or comparisons may be performed. In some embodiments, still pictures from different streams having same time stamps can be processed or compared. In other embodiments, still pictures from different streams having similar time stamps can be processed or compared in which case a threshold can be defined by user or automatically to control how far before or after a specific still picture (i.e. frame, etc.) a search may go to find a matching or sufficiently matching still picture or a portion thereof.

Figure 27:
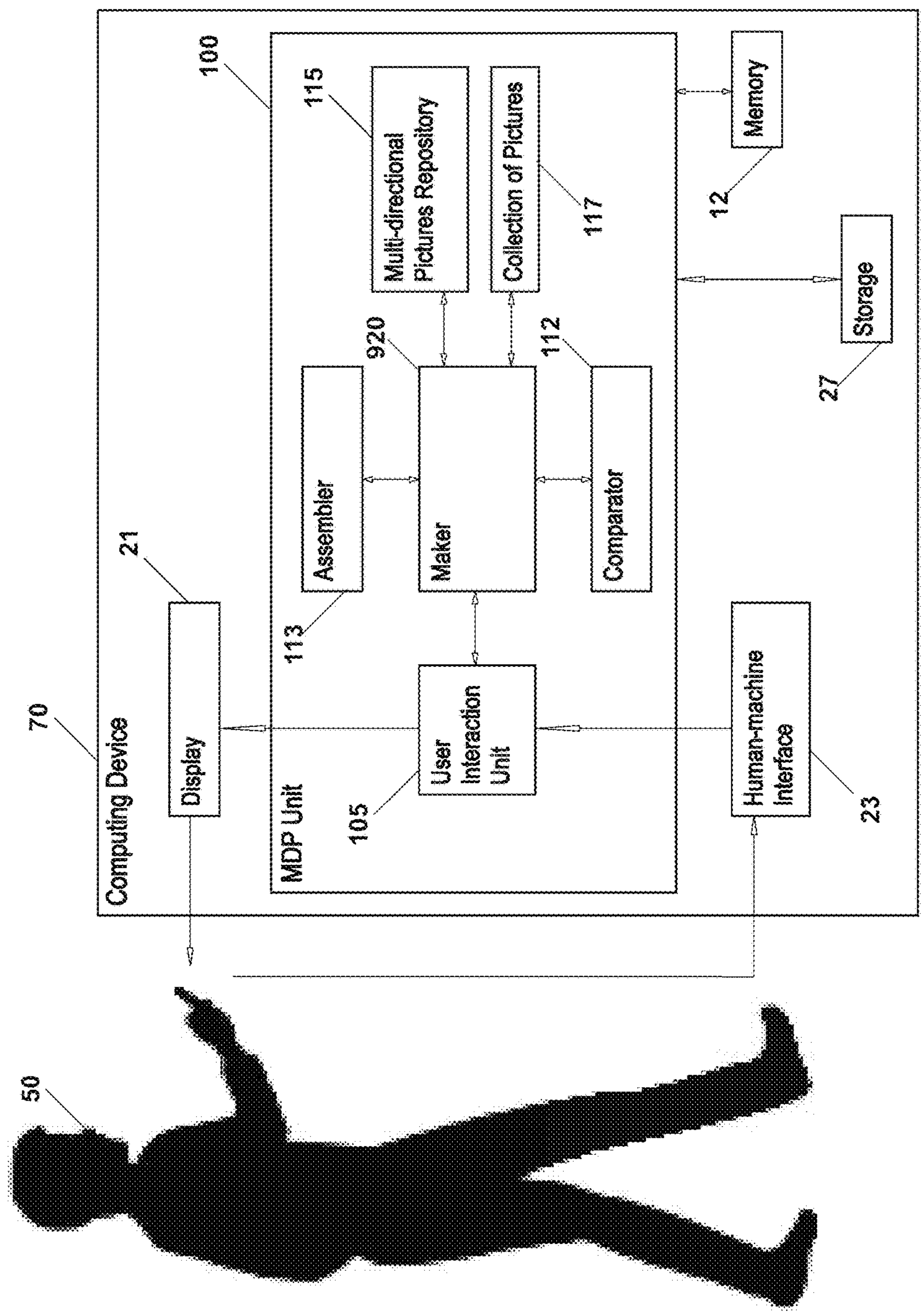
FIG. 27 illustrates an embodiment of MDP Unit 100 implemented in a device or system for automatically detecting Still Pictures 210*a*, 210*b*, 210*c*, 210*d*, etc. from a collection of digital pictures.

Referring to FIG. 27, the illustration shows an embodiment of MDP Unit 100 implemented in a device or system for automatically detecting Still Pictures 210*a*, 210*b*, 210*c*, 210*d*, etc. from a collection of digital pictures. The device or system may include Maker 920 and an interface, coupled to Maker 920, for receiving a collection of still pictures (i.e. Collection of Pictures 117, etc.). The device or system may further include Comparator 112, coupled to Maker 920, for comparing at least one subset of a first still picture and at least one subset of a second still picture, the compared subsets being near opposite edges of the first and the second still pictures, and determining that a subset of the first still picture is sufficiently similar to a subset of the second still picture to indicate an overlapping field of view between the two still pictures. The device or system may further include Assembler 113, coupled to Maker 920, for generating a first multi-directional still picture to include the first and the second still pictures, the first and the second still pictures depicting a first and a second differently directed views from a first location of a represented object. Comparator 112 may further be configured to: compare at least one subset of the first still picture and at least one subset of a third still picture, the compared subsets being near opposite edges of the first and the third still pictures, and determine that a subset of the first still picture is sufficiently similar to a subset of the third still picture to indicate an overlapping field of view between the two still pictures. Assembler 113 may further be configured to add the third still picture to the first multi-directional still picture, the third still picture depicting a third differently directed view from the first location of the represented object. Any of the operations of the described elements can be performed repeatedly and/or in different orders in alternate embodiments. For example, Maker 920 can be implemented as a device or processor that receives or reads a collection of still pictures from a source such as, for example, a picture database (i.e. Collection of Pictures 117, etc.). Comparator 112 can also be implemented as a device or processor that performs previously described picture processing to find still pictures having overlapping fields of view in the collection of still pictures. Assembler 113 can also be implemented as a device or processor that organizes the still pictures found to have overlapping fields of view into multi-directional still pictures. Maker 920 may store the still pictures or references thereto, any data structures (i.e. multi-directional still pictures, mazes, sequences, etc.), and/or other elements in Multi-directional Pictures Repository 115. Maker 920 (or its functionalities), Comparator 112 (or its functionalities), Assembler 113 (or its functionalities), and/or other disclosed elements can be implemented as separate hardware components or processors dedicated to their functionalities, they can be implemented as a single program or objects/modules/functions of a single program or separate programs operating on Processor 11, they can be provided in other suitable configurations, or a combination thereof in alternate embodiments. In some designs, Maker 920 may include some or all of the functionalities of Comparator 112 and/or Assembler 113 in which case Comparator 112 and/or Assembler 113 may be omitted. The device or system for automatically detecting Still Pictures 210*a*, 210*b*, 210*c*, 210*d*, etc. from a collection of digital pictures can similarly be implemented for detecting Motion Pictures 410*a*, 410*b*, 410*c*, 410*d*, etc. from a collection of motion pictures. The device or system for automatically detecting Still Pictures 210*a*, 210*b*, 210*c*, 210*d*, etc. from a collection of digital pictures may include any functionalities or steps of any of the disclosed methods such as method 3200.

Figure 28:
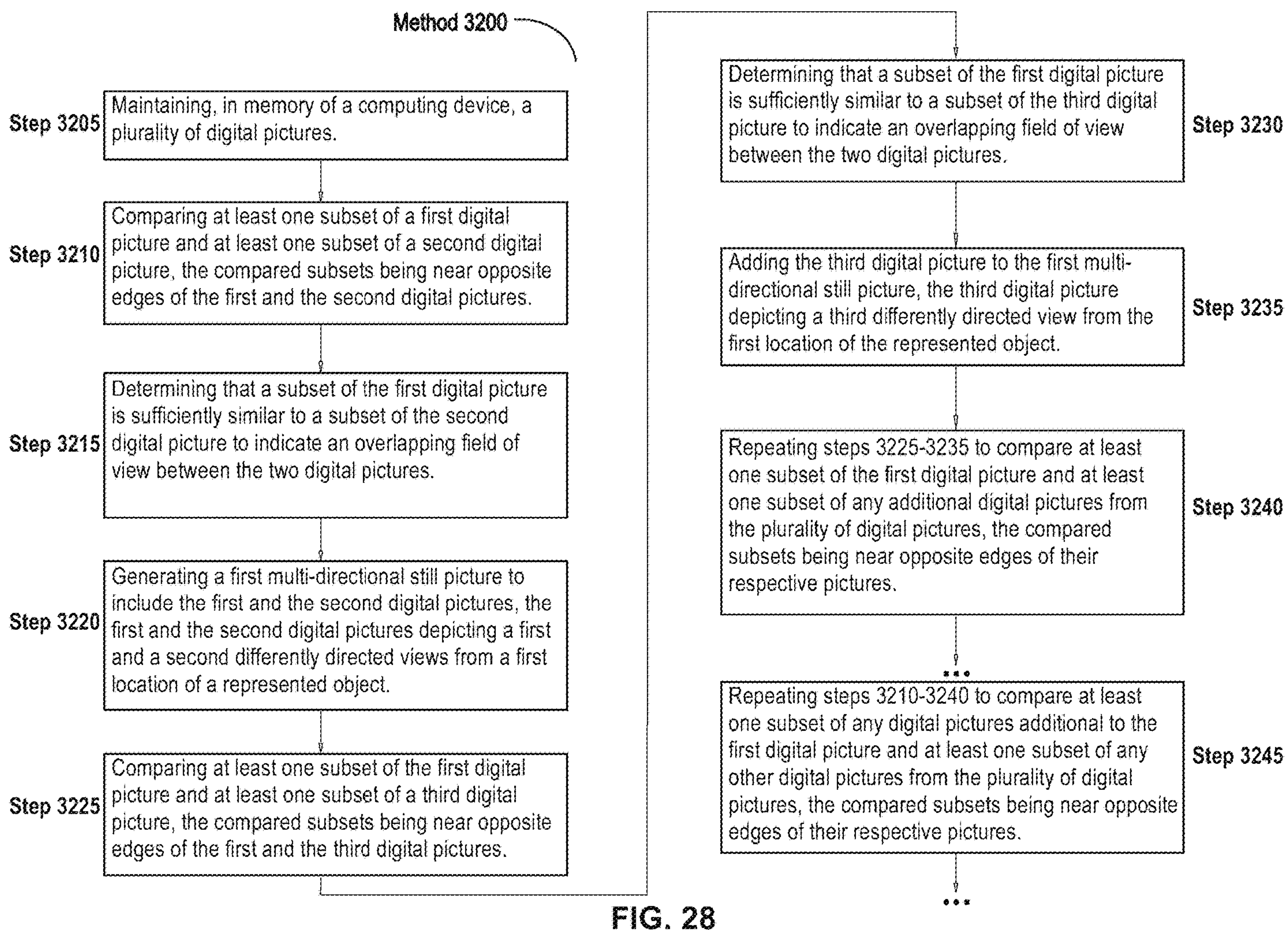
FIG. 28 illustrates a flow chart diagram of an embodiment of a method 3200 implemented by MDP Unit 100.

Referring to FIG. 28, the illustration shows an embodiment of a method 3200 for automatically detecting Still Pictures 210*a*, 210*b*, 210*c*, 210*d*, etc. from a collection of digital pictures. The method may therefore be used on one or more computing devices to detect Still Pictures 210*a*, 210*b*, 210*c*, 210*d*, etc. from a collection of digital pictures and automatically create a collection of Multi-directional Still Pictures 200 representing an object. In some embodiments, the method may be used on one or more computing devices operating an interface for MDP Unit 100 to detect Still Pictures 210*a*, 210*b*, 210*c*, 210*d*, etc. from a collection of digital pictures and automatically create a collection of Multi-directional Still Pictures 200 representing an object. The method provides its functionalities in a user-friendly automatic process that requires no or minimal user effort. Some or all steps of this method can similarly be utilized for automatically detecting Motion Pictures 410*a*, 410*b*, 410*c*, 410*d*, etc. (later described) from a collection of motion pictures (i.e. streams of still pictures). In some embodiments, the steps of this method can be used in combination with steps of other disclosed methods.

At step 3205, a plurality of digital pictures is maintained in memory of a computing device. At step 3210, at least one subset of a first digital picture and at least one subset of a second digital picture are compared, the compared subsets being near opposite edges of the first and the second digital pictures. At step 3215, a determination is made that a subset of the first digital picture is sufficiently similar to a subset of the second digital picture to indicate an overlapping field of view between the two digital pictures. At step 3220, a first multi-directional still picture is generated to include the first and the second digital pictures, the first and the second digital pictures depicting a first and a second differently directed views from a first location of a represented object. At step 3225, at least one subset of the first digital picture and at least one subset of a third digital picture are compared, the compared subsets being near opposite edges of the first and the third digital pictures. At step 3230, a determination is made that a subset of the first digital picture is sufficiently similar to a subset of the third digital picture to indicate an overlapping field of view between the two digital pictures. At step 3235, the third digital picture is added to the first multi-directional still picture, the third digital picture depicting a third differently directed view from the first location of the represented object. At step 3240, steps 3225-3235 are repeated to compare at least one subset of the first digital picture and at least one subset of any additional digital pictures from the plurality of digital pictures, the compared subsets being near opposite edges of their respective pictures. At step 3245, steps 3210-3240 are repeated to compare at least one subset of any digital pictures additional to the first digital picture and at least one subset of any other digital pictures from the plurality of digital pictures, the compared subsets being near opposite edges of their respective pictures.

Figure 29:
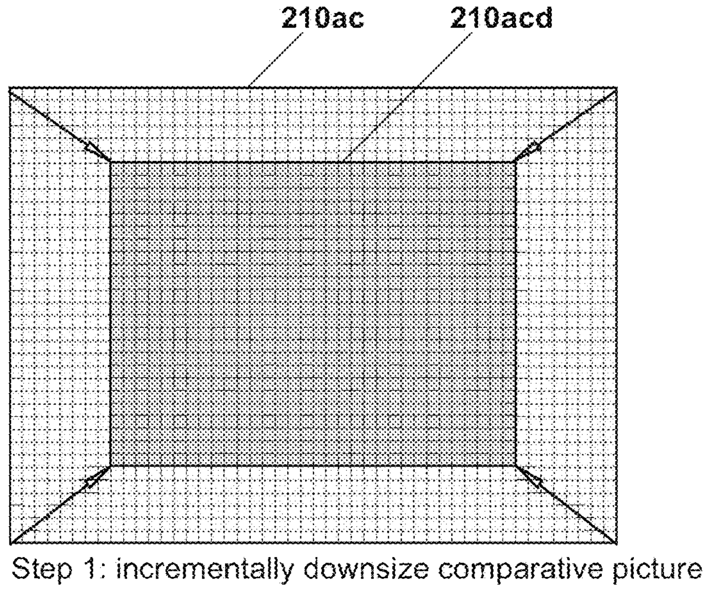
FIG. 29 shows an embodiment of picture processing for automatic detection of Multi-directional Still Picture Links 220*a*, 220*b*, 220*c*, 220*d*, etc.
Figure 29:
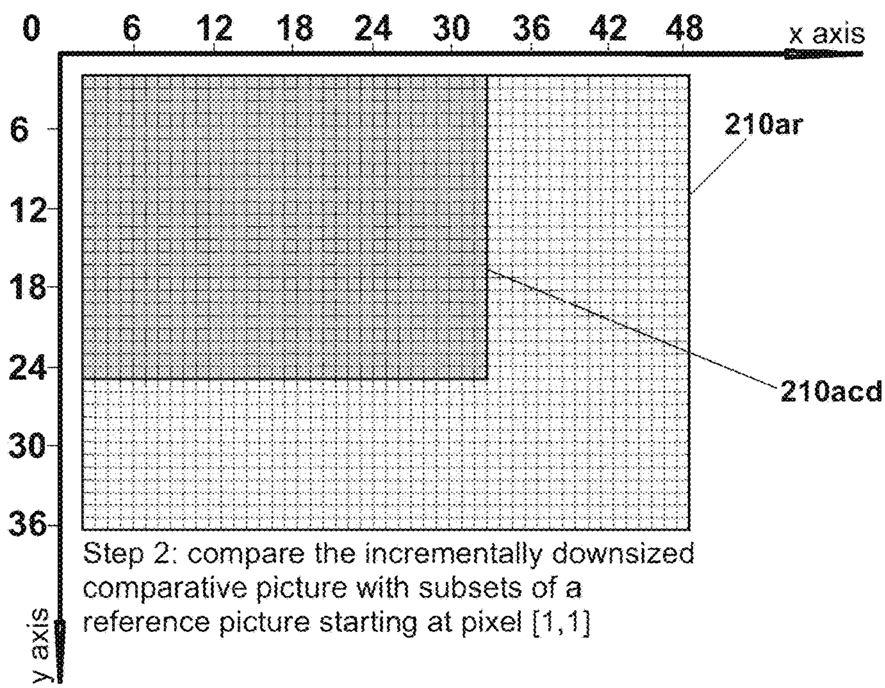

Referring to FIG. 29, the illustration shows an embodiment of picture processing for automatic detection of Multi-directional Still Picture Links 220*a*, 220*b*, 220*c*, 220*d*, etc. Such automatic detection of Multi-directional Still Picture Links 220*a*, 220*b*, 220*c*, 220*d*, etc. among Multi-directional Still Pictures 200 can be utilized to aid a user in creating a collection of Multi-directional Still Pictures 200 representing an object. For example, creating a collection of Multi-directional Still Pictures 200 representing an object includes automatic detection of Multi-directional Still Picture Links 220*a*, 220*b*, 220*c*, 220*d*, etc. of an initial Multi-directional Still Picture 200, automatic detection of Multi-directional Still Picture Links 220*a*, 220*b*, 220*c*, 220*d*, etc. of Multi-directional Still Pictures 200 adjacent to the initial Multi-directional Still Pictures 200, and so on.

In some embodiments, automatic detection of links among Multi-directional Still Pictures 200 includes comparing a Still Picture 210*a*, 210*b*, 210*c*, 210*d*, etc. of one Multi-directional Still Picture 200 with a Still Picture 210*a*, 210*b*, 210*c*, 210*d*, etc. of another Multi-directional Still Picture 200 to determine if a subset of one Still Picture 210*a*, 210*b*, 210*c*, 210*d*, etc. includes all or a portion (i.e. subset, etc.) of another Still Picture 210*a*, 210*b*, 210*c*, 210*d*, etc. Finding a Still Picture 210*a*, 210*b*, 210*c*, 210*d*, etc. of one Multi-directional Still Picture 200 whose subset includes all or a portion (i.e. subset, etc.) of a Still Picture 210*a*, 210*b*, 210*c*, 210*d*, etc. of another Multi-directional Still Picture 200 may indicate a link between the two Multi-directional Still Pictures 200. This indication can be derived from a premise that if a portion (i.e. subset, etc.) of a field of view of one digital picture (i.e. reference picture, etc.) includes all or a portion of a field of view of another digital picture (i.e. comparative picture, etc.), the two digital pictures may be portraying the same line of view in perspective, which may indicate views (i.e. still pictures) of adjacent Multi-directional Still Pictures 200. In some aspects, comparing digital pictures to determine if a subset of one includes all or a portion of another picture can be performed by determining if a subset of pixels of one picture (i.e. reference picture, etc.) matches or sufficiently matches all or a portion (i.e. subset, etc.) of pixels of another picture (i.e. comparative picture, etc.). The threshold for similarity in each of the pixels required for a match or sufficient match may be set or adjusted by a user or automatically. The threshold for the number of pixels required for a match or sufficient match can similarly be set or adjusted. Both thresholds and sufficient similarity comparison process are previously described in Comparator 112. In other aspects, comparing digital pictures to determine if a subset of one includes all or a portion of another picture can be performed by determining if a subset of pixels of one picture (i.e. reference picture, etc.) matches or sufficiently matches all or a portion (i.e. subset, etc.) of pixels of a resized (i.e. downsized, upsized, etc.) another picture (i.e. comparative picture, etc.). Any of the publically available, custom, or other digital picture resizing techniques or programs can be utilized such as nearest-neighbor interpolation, bilinear interpolation, bicubic interpolation, and/or others. Resizing of a comparative picture can be performed incrementally (i.e. proportionally resizing to a next smaller or larger size, resizing by one pixel at a time in length or width keeping aspect ratio constant, etc.) to reduce or increase the size (i.e. number of pixels, etc.) of the comparative picture. Each incrementally resized comparative picture or a copy thereof may then be compared with subsets of a reference picture. A comparative picture whose resized copy is found to match or sufficiently match a largest subset of a reference picture may be a Still Picture 210*a*, 210*b*, 210*c*, 210*d*, etc. of an adjacent Multi-directional Still Picture 200 with which a link may be added. If a match or sufficient match is not found between any subsets of a reference picture and any of the incrementally resized comparative pictures or copies thereof, the comparison can be performed between subsets of the reference picture and resized other Still Pictures 210*a*, 210*b*, 210*c*, 210*d*, etc. (i.e. comparative pictures) or copies thereof in a MDP application (i.e. collection of multi-directional still or motion pictures, etc.). When the comparison is complete between all subsets of one reference picture and all resized comparative pictures or copies thereof, another Still Picture 210*a*, 210*b*, 210*c*, 210*d*, etc. of any Multi-directional Still Picture 200 can be used as a new reference picture whose subsets can be compared with resized other Still Pictures 210*a*, 210*b*, 210*c*, 210*d*, etc. (i.e. comparative pictures) or copies thereof in a MDP application until all Still Pictures 210*a*, 210*b*, 210*c*, 210*d*, etc. are processed (i.e. compared, etc.). As such, subsets of all Still Pictures 210*a*, 210*b*, 210*c*, 210*d*, etc. in a MDP application (i.e. collection of multi-directional still or motion pictures, etc.) may be compared with all other Still Pictures 210*a*, 210*b*, 210*c*, 210*d*, etc. (i.e. resized other Still Pictures 210*a*, 210*b*, 210*c*, 210*d*, etc.) or copies thereof to find all Still Pictures 210*a*, 210*b*, 210*c*, 210*d*, etc. whose subsets include all or a portion of other Still Pictures 210*a*, 210*b*, 210*c*, 210*d*, etc. In some embodiments, interpretive information (later described) regarding location of each of the Multi-directional Still Pictures 200 may be used to selectively choose to compare a reference Still Picture 210*a*, 210*b*, 210*c*, 210*d*, etc. only with Still Pictures 210*a*, 210*b*, 210*c*, 210*d*, etc. of Multi-directional Still Pictures 200 within a certain distance from the Multi-directional Still Picture 200 to which the reference Still Picture 210*a*, 210*b*, 210*c*, 210*d*, etc. belongs.

In one example, picture processing can be implemented on Computing Device 70 to find a link between two Multi-directional Still Pictures 200 one of which comprises a Forward Still Picture 210*ar* and the other Multi-directional Still Picture 200 comprises a Forward Still Picture 210*ac*. Forward Still Picture 210*ar* may be a reference picture with which all other Still Pictures 210*a*, 210*b*, 210*c*, 210*d*, etc. (i.e. comparative pictures) in a MDP application may be compared in one cycle of comparisons. Forward Still Picture 210*ac* may be a comparative picture and one of the Still Pictures 210*a*, 210*b*, 210*c*, 210*d*, etc. that is compared with Forward Still Picture 210*ar*. Forward Still Picture 210*ar* and Forward Still Picture 210*ac* can be compared to determine if a subset of pixels of Forward Still Picture 210*ar* matches or sufficiently matches all or a portion of pixels of Forward Still Picture 210*ac*, Such comparison may include incrementally downsizing Forward Still Picture 210*ac* by one pixel at a time in length or width keeping aspect ratio constant (i.e. reducing the size from 48×36 pixels to 47×35 pixels, etc.) to derive a Downsized Forward Still Picture 210*acd* as shown in Step 1 in FIG. 29. The Downsized Forward Still Picture 210*acd* can then be compared to subsets of Forward Still Picture 210*ar* to find a subset of Forward Still Picture 210*ar* that matches or sufficiently matches all or a portion of pixels of the Downsized Forward Still Picture 210*acd*. The Downsized Forward Still Picture 210*acd* may first be compared with a same sized (i.e. 47×35 pixels in this example, etc.) initial subset of Forward Still Picture 210*ar* starting at pixel [1,1] as shown in Step 2 in FIG. 29. If a match or sufficient match is not found, the Downsized Forward Still Picture 210*acd* may then be compared with a same sized (i.e. 47/35 pixels in this example, etc.) subset of Forward Still Picture 210*ar* starting at pixel [2,1]. If a match or sufficient match is still not found, the Downsized Forward Still Picture 210*acd* may then be compared with same sized (i.e. 47/35 pixels in this example, etc.) subsets of Forward Still Picture 210*ar* each starting at remaining pixels in y line 1 (i.e. [3,1], [4,1], [5,1], . . . [48,1]). If a match or sufficient match is still not found, the Downsized Forward Still Picture 210*acd* may then be compared with same sized (i.e. 47/35 pixels in this example, etc.) subsets of Forward Still Picture 210*ar* each starting at remaining pixels in y lines 2 (i.e. [1,2], [2,2], [3,2], . . . [48,2]), 3, 4, and so on until the last pixel of Forward Still Picture 210*ar*. The comparison may include any initial subset of Forward Still Picture 210*ar* such as, for example, a subset in the middle of Forward Still Picture 210*ar*, subset at the end of Forward Still Picture 210*ar*, subset at right of Forward Still Picture 210*ar*, subset at left of Forward Still Picture 210*ar*, and/or any other initial subset. Also, the comparison may include any search pattern for subsets of Forward Still Picture 210*ar* such as, for example, linear searching in any direction, outward searching from a middle subset, forward searching from a region in the beginning, backward searching from a region at the end, and/or any other search pattern. If a match or sufficient match is not found between the Downsized Forward Still Picture 210*acd* and any subset of Forward Still Picture 210*ar*, Forward Still Picture 210*ac* can be downsized to a next smaller size. The new Downsized Forward Still Picture 210*acd* can then be compared to subsets of Forward Still Picture 210*ar* to find a subset of Forward Still Picture 210*ar* that matches or sufficiently matches all or a portion of the new Downsized Forward Still Picture 210*acd*. Incrementally downsizing Forward Still Picture 210*ac* and comparing the Downsized Forward Still Pictures 210*acd* with subsets of Forward Still Picture 210*ar* may be repeated until a match or sufficient match is found. If any subset of Forward Still Picture 210*ar* is found to match or sufficiently match all or a portion of any Downsized Forward Still Picture 210*acd*, Forward Still Picture 210*ac* may be a Still Picture of an adjacent Multi-directional Still Picture 200 with which a Forward Multi-directional Still Picture Link 220*a* may be added. Any of the described steps for comparing subsets of Forward Still Picture 210*ar* with Downsized Forward Still Pictures 210*acd* can be performed with all Still Pictures 210*a*, 210*b*, 210*c*, 210*d*, etc. in a MDP application (i.e. collection of multi-directional still or motion pictures, etc.) to find links among all Multi-directional Still Pictures 200. In some aspects, Maker 920 includes an editor, graphical user interface or other means through which a user can access any Multi-directional Still Picture 200 and add to it a new Multi-directional Still Picture Link 220*a*, 220*b*, 220*c*, 220*d*, etc. (i.e. a link that the automatic detection may have missed, etc.) and/or modify its existing Multi-directional Still Picture Link 220*a*, 220*b*, 220*c*, 220*d*, etc. (i.e. a link that the automatic detection may have included erroneously, etc.).

The described techniques for automatic detection of links among Multi-directional Still Pictures 200 can similarly be implemented in Multi-directional Motion Pictures 400 (later described) where automatic detection and/or other operations as described may be performed in streams of still pictures. In some embodiments, automatic detection of links among Multi-directional Motion Pictures 400 can be performed as previously described where processing or comparisons may be performed for each still picture in a stream of still pictures (i.e. motion picture, etc.) to find a match or sufficient match. Therefore, additional cycles of processing or comparisons may be performed. In some embodiments, still pictures from different streams having same time stamps can be processed or compared. In other embodiments, still pictures from different streams having similar time stamps can be processed or compared in which case a threshold may be defined by user or automatically to control how far before or after a specific still picture (i.e. frame, etc.) a search may go to find a matching or sufficiently matching still picture or a portion thereof.

Figure 30:
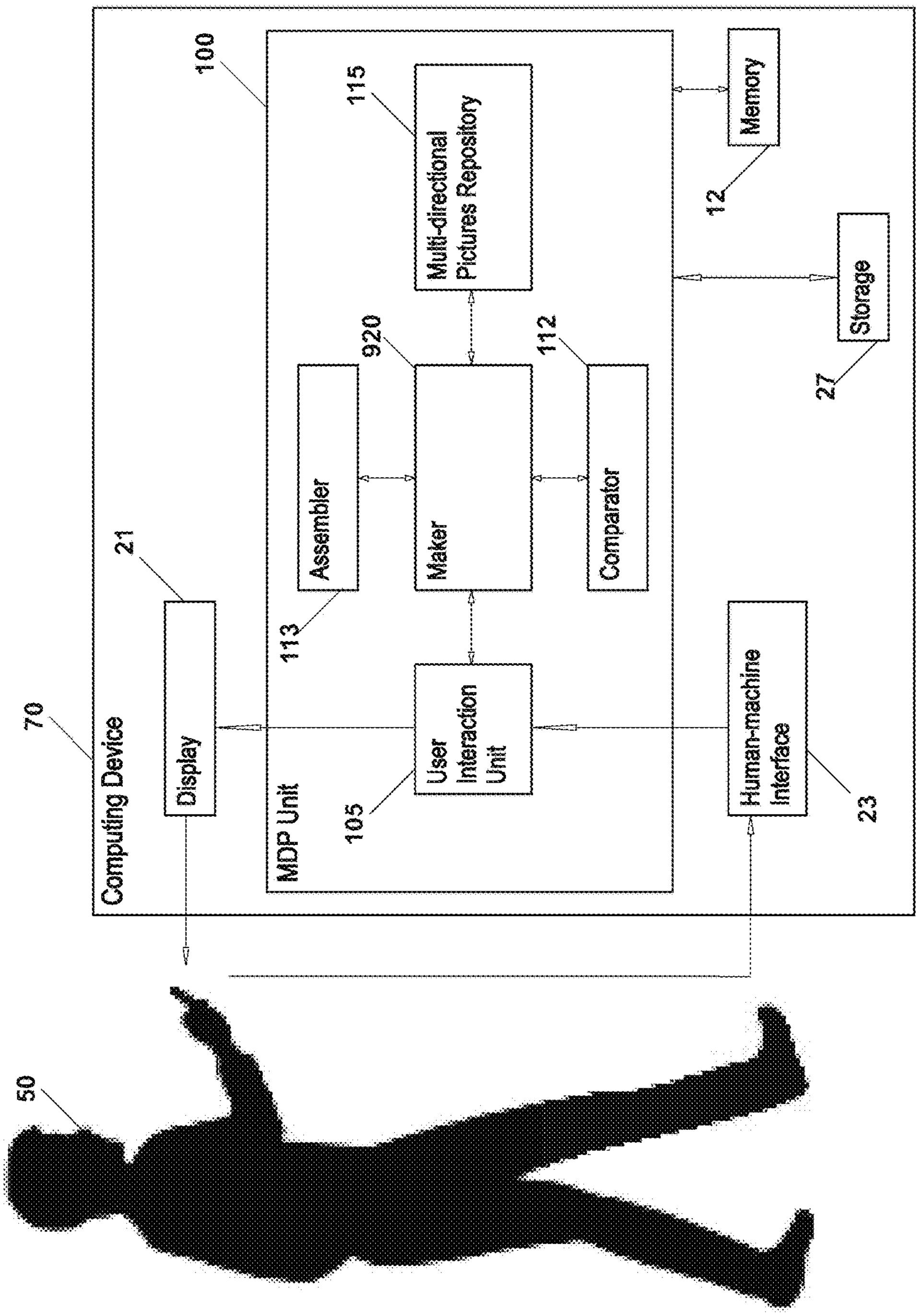
FIG. 30 illustrates an embodiment of MDP Unit 100 implemented in a device or system for automatically detecting Multi-directional Still Picture Links 220*a*, 220*b*, 220*c*, 220*d*, etc. from a collection of Multi-directional Still Pictures 200.

Referring to FIG. 30, the illustration shows an embodiment of MDP Unit 100 implemented in a device or system for automatically detecting Multi-directional Still Picture Links 220*a*, 220*b*, 220*c*, 220*d*, etc. from a collection of Multi-directional Still Pictures 200. The device or system may include Maker 920 and an interface, coupled to Maker 920, for receiving a collection of multi-directional still pictures each multi-directional still picture associated with a different location of a represented object and including one or more differently directed still pictures from the location. The device or system may further include Comparator 112, coupled to Maker 920, for incrementally resizing a first still picture of the first multi-directional still picture, comparing at least one subset of a first still picture of a second multi-directional still picture with the incrementally resized first still picture of the first multi-directional still picture, and determining that a subset of the first still picture of the second multi-directional still picture is sufficiently similar to an incrementally resized first still picture of the first multi-directional still picture to indicate a line of sight. The device or system may further include Assembler 113, coupled to Maker 920, for adding a link with the second multi-directional still picture to the first multi-directional still picture and adding a link with the first multi-directional still picture to the second multi-directional still picture. Any of the operations of the described elements can be performed repeatedly and/or in different orders in alternate embodiments. For example, Maker 920 can be implemented as a device or processor that receives or reads multi-directional still pictures and/or other elements from Multi-directional Pictures Repository 115. Comparator 112 can also be implemented as a device or processor that performs the previously described picture processing to find still pictures of any multi-directional still pictures that may be within a line of sight. Assembler 113 can also be implemented as a device or processor that adds links to or modifies links of multi-directional still pictures whose still pictures are found to be within a line of sight. Maker 920 may then store the multi-directional still pictures including automatically detected links in Multi-directional Pictures Repository 115. Maker 920 (or its functionalities), Comparator 112 (or its functionalities), Assembler 113 (or its functionalities), and/or other disclosed elements can be implemented as separate hardware components or processors dedicated to their functionalities, they can be implemented as a single program or objects/modules/functions of a single program or separate programs operating on Processor 11, they can be provided in other suitable configurations, or a combination thereof in alternate embodiments. In some designs, Maker 920 may include some or all of the functionalities of Comparator 112 and/or Assembler 113 in which case Comparator 112 and/or Assembler 113 may be omitted. The device or system for automatically detecting Multi-directional Still Picture Links 220*a*, 220*b*, 220*c*, 220*d*, etc. from a collection of Multi-directional Still Pictures 200 can similarly be implemented for detecting Multi-directional Motion Picture Links 420*a*, 420*b*, 420*c*, 420*d*, etc. from a collection of Multi-directional Motion Pictures 400. The device or system for automatically detecting Multi-directional Still Picture Links 220*a*, 220*b*, 220*c*, 220*d*, etc. from a collection of Multi-directional Still Pictures 200 may also include any functionalities or steps of any of the disclosed methods such as method 3300.

Figure 31:
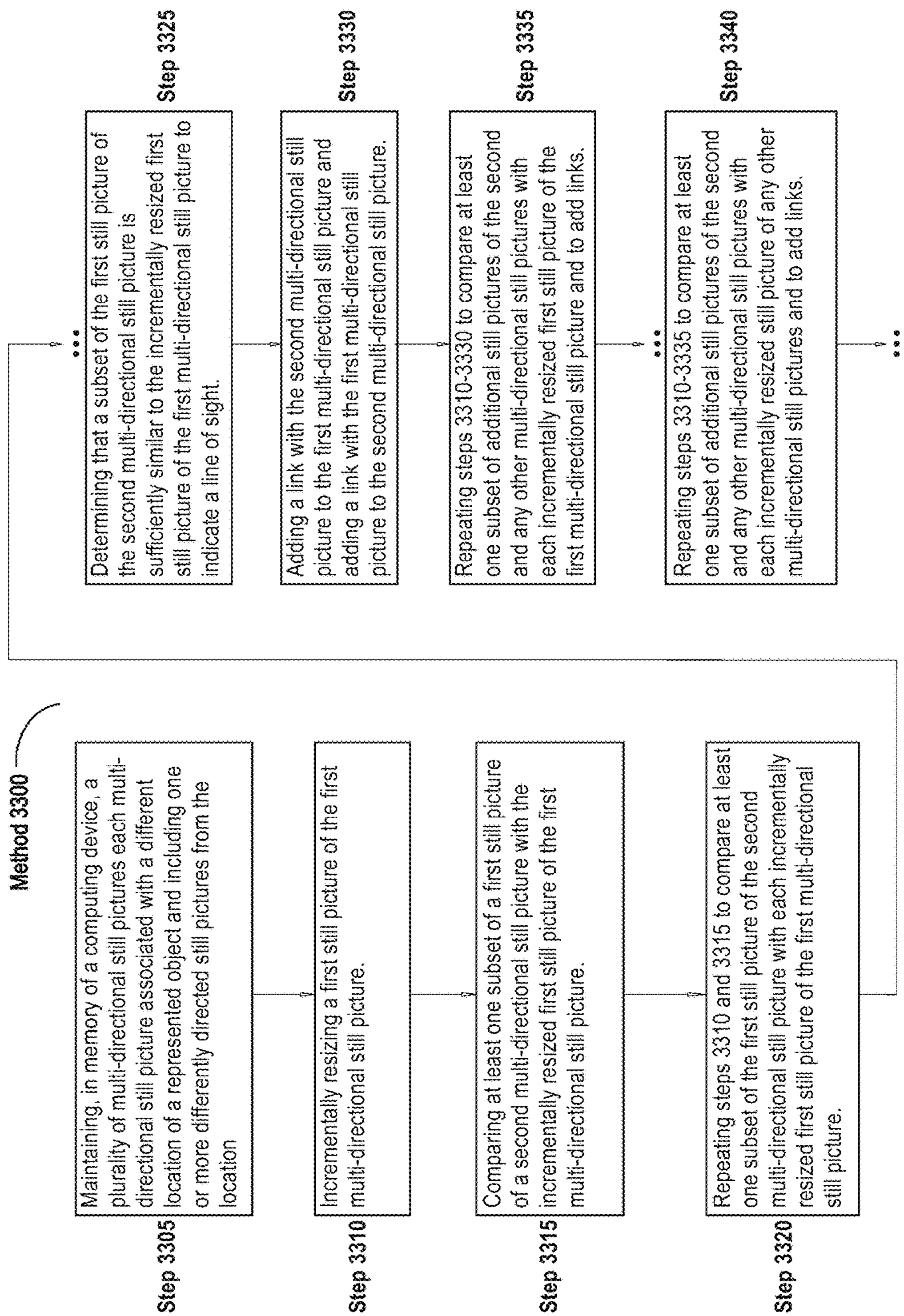
FIG. 31 illustrates a flow chart diagram of an embodiment of a method 3300 implemented by MDP Unit 100.

Referring to FIG. 31, the illustration shows an embodiment of a method 3300 for automatically detecting Multi-directional Still Picture Links 220*a*, 220*b*, 220*c*, 220*d*, etc. from a collection of Multi-directional Still Pictures 200. The method may therefore be used on one or more computing devices to automatically detect and create Multi-directional Still Picture Links 220*a*, 220*b*, 220*c*, 220*d*, etc. among Multi-directional Still Pictures 200 representing an object. In some embodiments, the method may be used on one or more computing devices operating an interface for MDP Unit 100 to automatically detect and create Multi-directional Still Picture Links 220*a*, 220*b*, 220*c*, 220*d*, etc. among Multi-directional Still Pictures 200 representing an object. The method provides its functionalities in a user-friendly automatic process that requires no or minimal user effort. Some or all steps of this method can similarly be utilized for automatically detecting Multi-directional Motion Picture Links 420*a*, 420*b*, 420*c*, 420*d*, etc. from a collection of Multi-directional Motion Pictures 400. In some embodiments, the steps of this method can be used in combination with steps of any of the disclosed methods such as method 3200 for detecting Still Pictures 210*a*, 210*b*, 210*c*, 210*d*, etc. from a collection of digital pictures.

At step 3305, a plurality of multi-directional still pictures is maintained in memory of a computing device each multi-directional still picture associated with a different location of a represented object and including one or more differently directed still pictures from the location. At step 3310, a first still picture of a first multi-directional still picture is incrementally resized. At step 3315, at least one subset of a first still picture of a second multi-directional still picture are compared with the incrementally resized first still picture of the first multi-directional still picture. At step 3320, steps 3310 and 3315 are repeated to compare at least one subset of the first still picture of the second multi-directional still picture with each incrementally resized first still picture of the first multi-directional still picture. At step 3325, a determination is made that a subset of the first still picture of the second multi-directional still picture is sufficiently similar to the incrementally resized first still picture of the first multi-directional still picture to indicate a line of sight. At step 3330, a link with the second multi-directional still picture is added to the first multi-directional still picture and a link with the first multi-directional still picture is added to the second multi-directional still picture. At step 3335, steps 3310-3330 are repeated to compare at least one subset of additional still pictures of the second and any other multi-directional still pictures with each incrementally resized first still picture of the first multi-directional still picture and to add links. At step 3340, steps 3310-3335 are repeated to compare at least one subset of additional still pictures of the second and any other multi-directional still pictures with each incrementally resized still picture of any other multi-directional still pictures and to add links.

Figure 32:
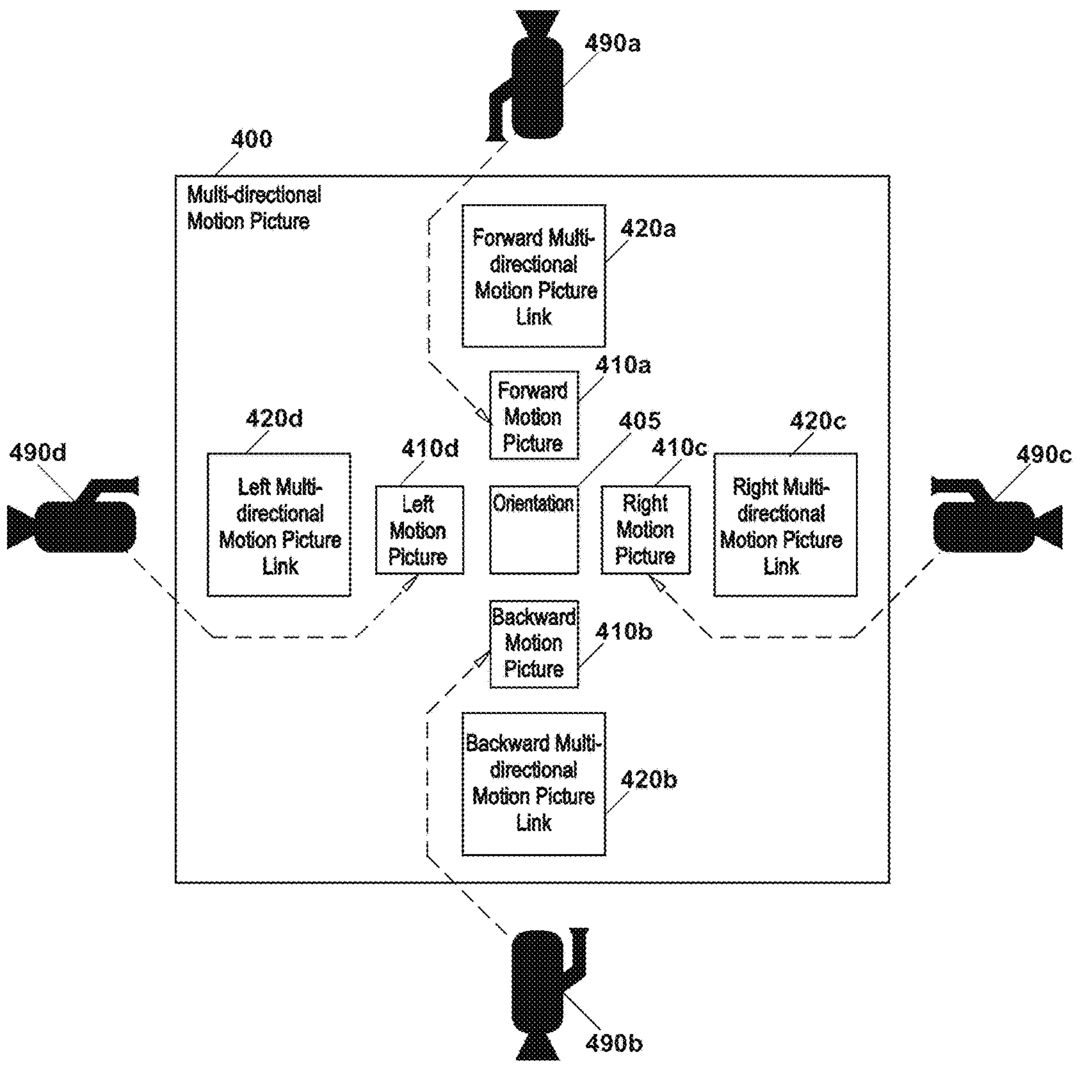
FIG. 32 is a diagram showing an embodiment of a Multi-directional Motion Picture 400.

Referring to FIG. 32, an embodiment of Multi-directional Motion Picture 400 is illustrated. Multi-directional Motion Picture 400 comprises the functionality for organizing and/or storing one or more Motion Pictures 410 or references thereto, one or more Multi-directional Motion Picture Links 420, and/or Orientation 405, and/or other disclosed functionalities. In other embodiments, a Multi-directional Motion Picture 400 comprises the functionality for storing a data structure whose data fields may include one or more Motion Pictures 410 or references thereto, one or more Multi-directional Motion Picture Links 420, and/or Orientation 405. In one example, a Multi-directional Motion Picture 400 includes a data structure comprising nine data fields: (1) Forward Motion Picture 410*a*, (2) Backward Motion Picture 410*b*, (3) Right Motion Picture 410*c*, (4) Left Motion Picture 410*d*, (5) Forward Multi-directional Motion Picture Link 420*a*, (6) Backward Multi-directional Motion Picture Link 420*b*, (7) Right Multi-directional Motion Picture Link 420*c*, (8) Left Multi-directional Motion Picture Link 420*d*, and/or (9) Orientation 405. In general, MDP Unit 100 enables a user to view all conceivable views from all locations represented by Multi-directional Motion Pictures 400, and/or to move among Multi-directional Motion Pictures 400 in all conceivable directions. Therefore, additional Motion Pictures 410 may be included such as up motion picture, down motion picture, diagonal motion picture, angular motion picture, behind motion picture, turn around motion picture, reverse motion picture, oblique motion picture, circular motion picture, and/or others. Also, additional Multi-directional Motion Picture Links 420 may be included such as up link, down link, diagonal link, angular link, behind link, turn around link, reverse link, oblique link, circular link, and/or others. Multi-directional Motion Picture 400 comprises some or all features and embodiments of the previously described Multi-directional Still Picture 200. Also, Multi-directional Motion Picture 400 and/or any of its embodiments and/or elements may include or be combined with some or all the features and embodiments of any of the previously described elements such as, for example, Multi-directional Still Picture 200, Still Picture 210*a*, 210*b*, 210*c*, 210*d*, etc., Multi-directional Still Picture Link 220*a*, 220*b*, 220*c*, 220*d*, etc., Orientation 205, Web Browser 800, Web Page 810, Map 820, Window 830, Picture Display 840, Picture Arrow 860*a*, 860*b*, 860*c*, 860*d*, etc., Direction Arrow 850*a*, 850*b*, 850*c*, 850*d*, etc., Orientation Pointer 870, Multi-directional Still Picture Angle 230*a*, 230*b*, 230*c*, 230*d*, etc., Multi-directional Still Picture Distance 240*a*, 240*b*, 240*c*, 240*d*, etc., and/or any other features or elements.

Motion Picture 410*a*, 410*b*, 410*c*, 410*d*, etc. comprises the functionality for storing a stream of digital pictures or other visual content, or a reference thereto, and/or other disclosed functionalities. While Motion Pictures 410 may be referred to or illustrated as Motion Pictures 410*a-d*, one of ordinary skill in art will understand that any number of Motion Pictures 410*a-n* can be utilized. In some aspects, Motion Picture 410*a*, 410*b*, 410*c*, 410*d*, etc. comprises a live feed from an optical device such as Motion Picture Camera 490*a*, 490*b*, 490*c*, 490*d*, etc., or any optical device capable of capturing a motion picture (i.e. stream of digital pictures, etc.). In other aspects, Motion Picture 410*a*, 410*b*, 410*c*, 410*d*, etc. comprises previously captured and stored motion picture (i.e. stream of digital pictures, etc.). Still pictures (i.e. frames) in a stream of digital pictures may be time stamped or sequenced. In some aspects, a still picture in a stream of time stamped still pictures may include or be associated with an incremental time stamp indicating its position in a time continuum. In other aspects, a still picture in a stream of time stamped still pictures does not need to include or be associated with a time stamp or any reference to its position in a time continuum. In yet other aspects, a still picture in a stream of time stamped still pictures may be sequentially ordered indicating its sequential position in the stream. In yet other aspects, time stamp of a still picture in a stream of time stamped still pictures can be determined or computed using a formula such as a frame rate formula, or other technique known in art A frame rate may indicate a number of pictures (i.e. frames) to be processed in a period of time (i.e. second, etc.). A frame rate may include a constant or variable frame rate. In some embodiments, Motion Picture 410*a*, 410*b*, 410*c*, 410*d*, etc. comprises any type or form of digital pictures such as digital bitmaps, JPEG pictures, GIF pictures, TIFF pictures, PDF pictures, and/or any other digital pictures. In other embodiments, Motion Picture 410*a*, 410*b*, 410*c*, 410*d*, etc. comprises any type or form of digital video such as MPEG, AV, FLV, MOV, RM, SWF, WMV, DivX etc., and/or any other digital video. In yet other embodiments, Motion Picture 410*a*, 410*b*, 410*c*, 410*d*, etc. comprises any computer-generated pictures such as views of a 3D game or CAD/CAM application captured as digital pictures or video. In further embodiments, Motion Picture 410*a*, 410*b*, 410*c*, 410*d*, etc. comprises an application or process of any type that can generate digital pictures, video, or other visual content. Motion Picture 410*a*, 410*b*, 410*c*, 410*d*, etc. may include any features and embodiments of the previously described Still Pictures 210*a*, 210*b*, 210*c*, 210*d*, etc. Motion Picture 410*a*, 410*b*, 410*c*, 410*d*, etc. may also include a reference or pointer to a stream of digital pictures or other visual content. In some embodiments, a user can create Motion Picture 410*a*, 410*b*, 410*c*, 410*d*, etc. by utilizing a digital or video camera, a Motion Picture Camera 490*a*, 490*b*, 490*c*, 490*d*, etc., any optical device capable of capturing motion pictures, and/or any other motion picture taking equipment. Such motion picture taking equipment can be combined with an apparatus specially constructed for motion picture creation such as a tripod, rails, wheels, slidable components, robotic arm, and/or other such apparatuses or devices. In some embodiments, specific pictures (i.e. frames in equal intervals such as 0.04 seconds, etc.) of a stream of pictures from motion picture taking equipment can be captured as a Motion Picture 410*a*, 410*b*, 410*c*, 410*d*, etc. In other embodiments, all pictures (i.e. frames) of a stream of pictures from motion picture taking equipment can be captured as a Motion Picture 410*a*, 410*b*, 410*c*, 410*d*, etc. In yet other embodiments, a user can create a Motion Picture 410*a*, 410*b*, 410*c*, 410*d*, etc. by capturing views (i.e. pictures, frames, etc.) of a computer generated object (i.e. 3D game, CAD/CAM application, etc.) through processing or rendering. In some aspects, Motion Picture 410*a*, 410*b*, 410*c*, 410*d*, etc. can be stored in a digital file in Memory 12 or Storage 27 of Computing Device 70. As such, Multi-directional Pictures Processor 110 can access and utilize the stored Motion Pictures 410*a*, 410*b*, 410*c*, 410*d*, etc. to implement the functionalities described herein. In other aspects, Motion Picture 410*a*, 410*b*, 410*c*, 410*d*, etc. may include a live feed that is not or not yet stored. As such, Multi-directional Pictures Processor 110 may receive and utilize the live feed of Motion Picture 410*a*, 410*b*, 410*c*, 410*d*, etc. to implement the functionalities described herein. Motion Picture 410*a*, 410*b*, 410*c*, 410*d*, etc. comprises some or all the features and embodiments of the previously described Still Picture 210*a*, 210*b*, 210*c*, 210*d*, etc.

Multi-directional Motion Picture Link 420*a*, 420*b*, 420*c*, 420*d*, etc. (also referred to as link, etc.) comprises the functionality for referring to or storing a reference or pointer to a Multi-directional Motion Picture 400, and/or other disclosed functionalities. While Multi-directional Motion Picture Links 410 may be referred to or illustrated as Multi-directional Motion Picture Links 410*a-d*, one of ordinary skill in art will understand that any number of Multi-directional Motion Picture Links 410*a-n* can be utilized. In some embodiments, a Multi-directional Motion Picture Link 420*a*, 420*b*, 420*c*, 420*d*, etc. refers to or includes a reference or pointer to an outside application or process. In other embodiments, Multi-directional Motion Picture Link 420*a*, 420*b*, 420*c*, 420*d*, etc. comprises interpretive information, which interpretive information itself may refer to or include a reference or pointer to a content, resource, system, application, and/or process as later described. In further embodiments, a Multi-directional Motion Picture Link 420*a*, 420*b*, 420*c*, 420*d*, etc. may be undefined, non-existent or empty indicating no reference or pointer to a Multi-directional Motion Picture 400, Multi-directional Motion Picture Link 420*a*, 420*b*, 420*c*, 420*d*, etc. can be created or modified automatically by MPD Unit 100, Multi-directional Pictures Processor 110, Maker 920, Assembler 113, and/or other disclosed elements, or by a user through a means such as a graphical user interface. Multi-directional Motion Picture Link 420*a*, 420*b*, 420*c*, 420*d*, etc. comprises some or all the features and embodiments of the previously described Multi-directional Still Picture Link 220*a*, 220*b*, 220*c*, 220*d*, etc.

Orientation 405 comprises the functionality for storing orientation of a Multi-directional Motion Picture 400, and/or other disclosed functionalities. In some embodiments, Orientation 405 may be associated with a direction of a Motion Picture 410*a*, 410*b*, 410*c*, 410*d*, etc., with a direction of a Multi-directional Motion Picture Link 420*a*, 420*b*, 420*c*, 420*d*, etc., and/or with any other direction as previously described. Orientation 405 may include absolute or relative orientation as previously described. Orientation 405 comprises some or all the features and embodiments of the previously described Orientation 205.

MDP Unit 100 comprising multi-directional motion picture functionalities enables a user to visually experience an object over time. Such multi-directional motion picture functionalities can find applicability in any environment where an object needs to be represented over time. Some examples of such environments include representations of objects that change over time or objects comprising an action scene (i.e. other moving objects or persons, etc.). Therefore, MDP Unit 100 comprising multi-directional motion picture functionalities can be included in entertainment videos (i.e. movies, music videos, etc.), documentaries, sporting event videos, learning videos, video simulations, computer animations, computer graphics, graphics engines, computer games, and/or other applications to provide unparalleled experience.

Figure 33:
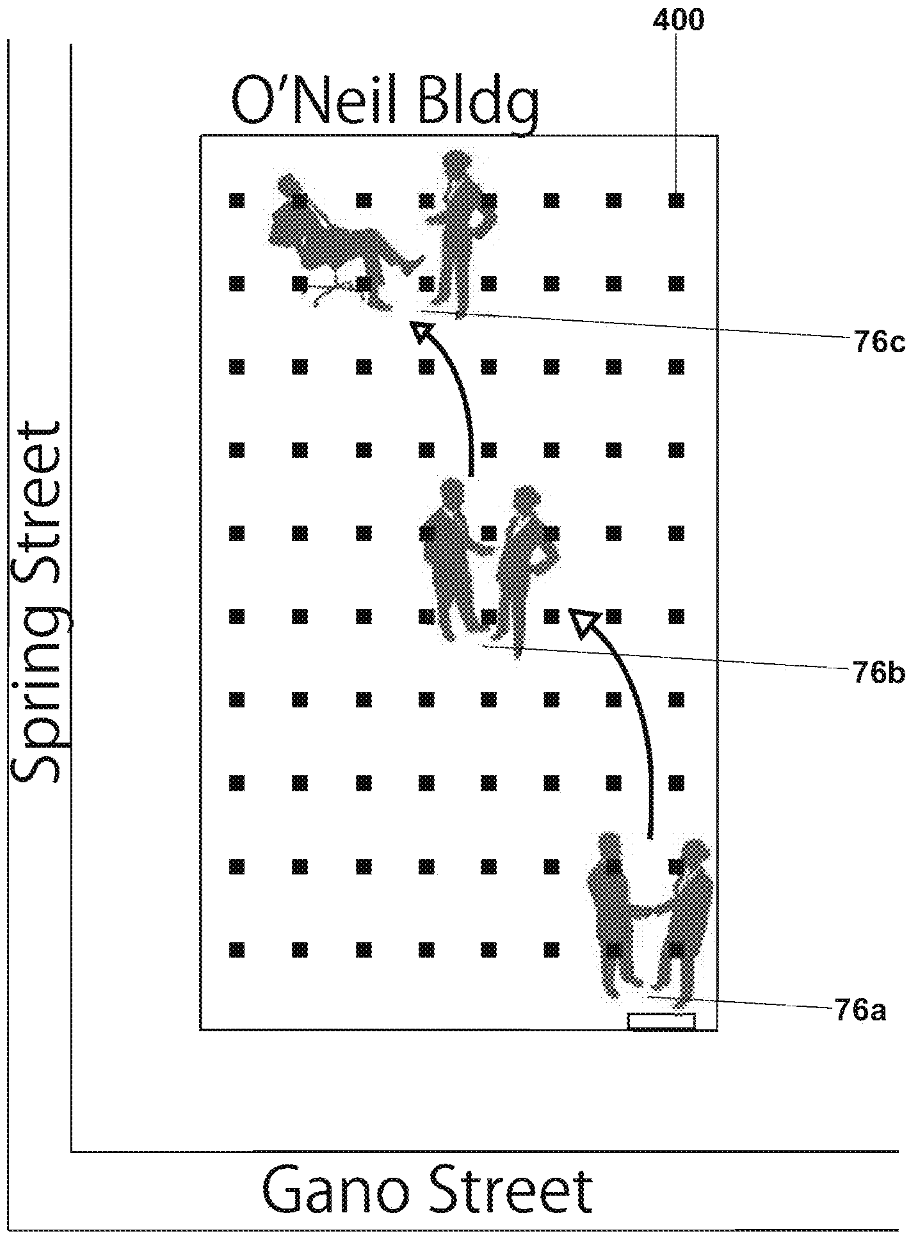
FIG. 33 shows an embodiment of a collection of Multi-directional Motion Pictures 400 representing interior of a building with an action scene.

Referring to FIG. 33, an embodiment of a collection of Multi-directional Motion Pictures 400 representing interior of a building with an action scene is illustrated, for example. As such, MDP Unit 100 enables a user to visually experience interior of a building with an action scene where every step may portray a view of what a user would see stepping through interior of the building in a time continuum. Multi-directional Motion Pictures 400 may be interconnected in such an arrangement to correspond to a shape (i.e. context, etc.) of the interior of the building. In some embodiments, MDP Unit 100 can be implemented to include (1) Multi-directional Motion Pictures 400 arranged to correspond to a shape of a represented object (i.e. interior of a building for example, etc.), and/or (2) a means for a user to move among Multi-directional Motion Pictures 400 in a time continuum. In other embodiments, MDP Unit 100 can be implemented to include (1) Multi-directional Picture Sequences 350 comprising Multi-directional Motion Pictures 400 representing paths (i.e. straight-lined paths, curved paths, etc.) in a represented object (i.e. interior of a building for example, etc.), and/or (2) a means for a user to connect with Multi-directional Picture Sequences 350 and/or move among Multi-directional Motion Pictures 400 in a time continuum. In yet other embodiments, MDP Unit 100 can be implemented to include (1) a Maze 300 comprising Multi-directional Motion Pictures 400 and/or Multi-directional Picture Sequences 350, and/or (2) a means for a user to connect with Multi-directional Picture Sequences 350 and/or Multi-directional Motion Pictures 400 in a time continuum. Other additional elements may be included as needed, or some of the disclosed ones may be excluded, or a combination thereof may be utilized in alternate embodiments. In one example, Multi-directional Motion Pictures 400 may be positioned in the center of every full square yard of a represented room with an action scene. The action scene may include a man and a woman standing at a door of a building greeting each other with a hand shake in the Action Location 76*a*, the man and woman conversing and walking away from the door toward the middle of the building in the Action Location 76*b*, and man sitting on a chair while the woman is talking with him in the corner of the building in the Action Location 76*c*. In general, an action scene may include action figures and/or objects (i.e. man, woman, chair, etc. in this example), explicit Action Locations 76*a*, 76*b*, 76*c* and implied action locations in between the explicit Action Locations 76*a*, 76*b*, 76*c* (i.e. locations where man and woman moved and/or where action occurred, etc.), and/or any other items or aspects relevant to the action scene or the represented object. MDP Unit 100 enables a user to view all views (i.e. forward, backward, right, left, up, down, diagonal, angular, etc.) from all locations (Multi-directional Motion Pictures 400) of a represented object (i.e. room in this example, etc.) including an action scene in a time continuum and move among Multi-directional Motion Pictures 400 this way simulating motion relative to the represented object including an action scene in a time continuum.

Figure 34:
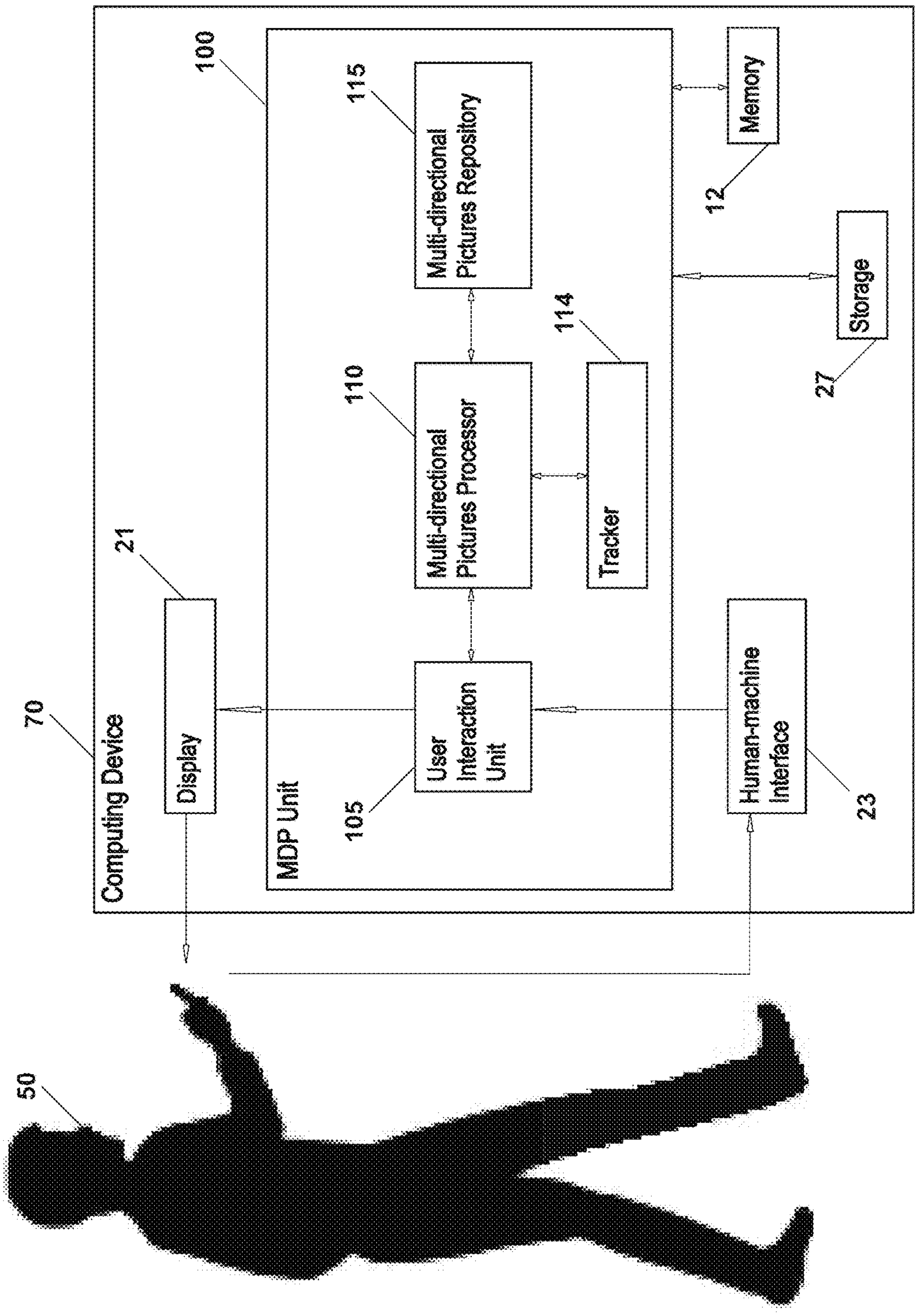
FIG. 34 illustrates an embodiment of MDP Unit 100 implemented in a device or system for using Multi-directional Motion Pictures 400.

Referring to FIG. 34, the illustration shows an embodiment of MDP Unit 100 implemented in a device or system for using Multi-directional Motion Pictures 400. The device or system may include Multi-directional Pictures Processor 110 and an interface, coupled to Multi-directional Pictures Processor 110, for receiving a collection of multi-directional motion pictures each multi-directional motion picture associated with a different location of a represented object and including one or more differently directed streams of time stamped still pictures from the location and one or more links to other one or more multi-directional motion pictures. The device or system may further include Display 21, coupled to Multi-directional Pictures Processor 110, for rendering a first stream of time stamped still pictures of a first multi-directional motion picture. The device or system may further include Human-machine Interface 23 or another input device, coupled to Multi-directional Pictures Processor 110, for receiving a selection (i.e. from a user, etc.) of a first link of the first multi-directional motion picture, the first link referring to a second multi-directional motion picture. The device or system may further include Tracker 114, coupled to Multi-directional Pictures Processor 110, for determining a time stamp of a currently displayed still picture, wherein Multi-directional Pictures Processor 110 may be configured to cause the Display 21 to render a first stream of time stamped still pictures of the second multi-directional motion picture starting with a still picture having an incrementally subsequent time stamp from the time stamp of the currently displayed still picture. Human-machine Interface 23 or another input device may be further configured to receive a selection of a second stream of time stamped still pictures of the second multi-directional motion picture, wherein Tracker 114 may be further configured to determine a time stamp of a currently displayed still picture, and Multi-directional Pictures Processor 110 may be further configured to cause the Display 21 to render the second stream of time stamped still pictures of the second multi-directional motion picture starting with a still picture having an incrementally subsequent time stamp from the time stamp of the currently displayed still picture. Any of the operations of the described elements can be performed repeatedly and/or in different orders in alternate embodiments. For example, Human-machine Interface 23 includes a means for inputting a user's operating instructions regarding the view of the represented object and movement relative to the represented object, which operating instructions can be available to Multi-directional Pictures Processor 110 or other disclosed elements. Multi-directional Pictures Processor 110 can be implemented as a device or processor that receives or reads multi-directional motion pictures and/or other elements from Multi-directional Pictures Repository 115 to obtain appropriate streams of time stamped still pictures from various locations of a represented object that correspond to user's operating instructions. Tracker 114 can also be implemented as a device or processor that determines a time stamp of a currently displayed still picture. Display 21 may render, display or show the streams of time stamped still pictures from various locations of the represented object. Multi-directional Pictures Processor 110 (or its functionalities), Tracker 114 (or its functionalities), and/or other disclosed elements can be implemented as separate hardware components or processors dedicated to their functionalities, they can be implemented as a single program or objects/modules/functions of a single program or separate programs operating on Processor 11, they can be provided in other suitable configurations, or a combination thereof in alternate embodiments. In some designs, Multi-directional Pictures Processor 110 may include some or all of the functionalities of Tracker 114 in which case Tracker 114 may be omitted. The device or system for using Multi-directional Motion Pictures 400 can similarly be implemented for using Multi-directional Still Pictures 200. The device or system for using Multi-directional Motion Pictures 400 may also include any functionalities or steps of any of the disclosed methods such as method 2300 (later described).

Tracker 114 comprises the functionality for determining a time stamp, order, or position of a still picture in a stream of still pictures, and/or other disclosed functionalities. In some embodiments, Tracker 114 can access a still picture (i.e. currently displayed still picture, etc.) in a stream of time stamped still pictures and read the still picture's time stamp, order, or position. In other embodiments, Tracker 114 may calculate (i.e. using frame rate formula or other techniques, etc.) time stamp, order, or position of a still picture in a stream of time stamped still pictures. In further embodiments, as still pictures of a stream of time stamped still pictures are displayed or processed, each still picture's time stamp, order, or position can be transmitted to Tracker 114, thus, enabling Tracker 114 to know which still picture is currently displayed or processed at all times. Tracker 114 or its functionalities can be included in Multi-directional Pictures Processor 110, Maker 920, and/or other disclosed elements, and vice versa, in which case the integrated element may optionally be omitted.

Figure 35:
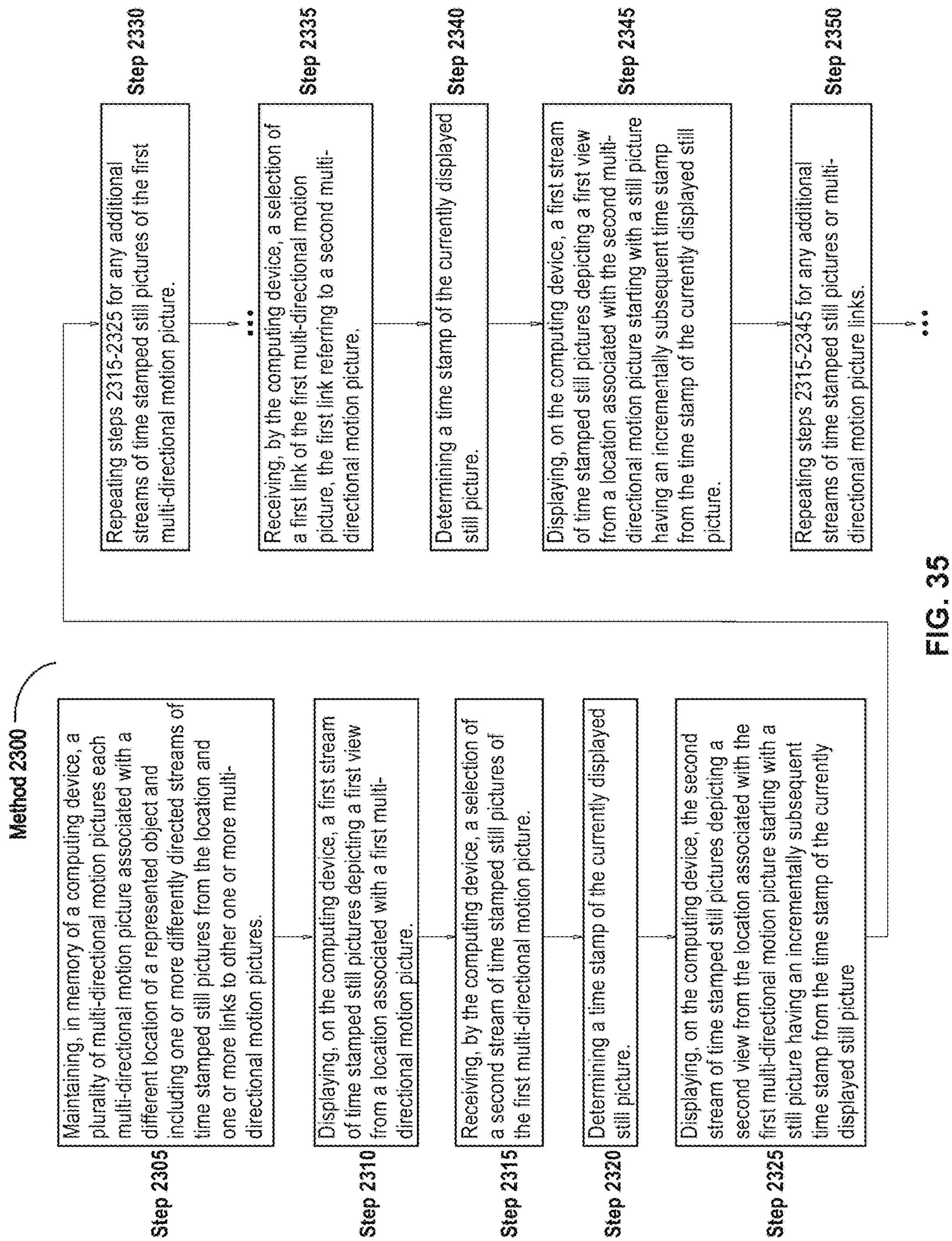
FIG. 35 illustrates a flow chart diagram of an embodiment of a method 2300 implemented by MDP Unit 100.

Referring to FIG. 35, the illustration shows an embodiment of a method 2300 for using Multi-directional Motion Pictures 400. The method may therefore be used on one or more computing devices to enable a user to view all views (i.e. forward, backward, right, left, up, down, diagonal, angular, etc.) from all locations of the represented object over time and enable the user to move among the multi-directional motion pictures this way simulating motion relative to the represented object over time. In some embodiments, the method may be used on one or more computing devices operating an interface for MDP Unit 100 to enable a user to view all views (i.e. forward, backward, right, left, up, down, diagonal, angular, etc.) from all locations of the represented object over time and enable the user to move among the multi-directional motion pictures this way simulating motion relative to the represented object over time. Some or all steps of this method may similarly be implemented for using a collection of Multi-directional Still Pictures 200 (previously described). In some embodiments, the steps of this method can be used in combination with steps of other disclosed methods.

At step 2305, a plurality of multi-directional motion pictures is maintained in memory of a computing device each multi-directional motion picture associated with a different location of a represented object and including one or more differently directed streams of time stamped still pictures from the location and one or more links to other one or more multi-directional motion pictures. One or more multi-directional motion pictures may also be received by the computing device or any computing device in some embodiments. MDP Unit 100 enables representation of objects over time using multi-directional motion pictures associated with locations of a represented object. Any locations can be used to represent the object. In one example, steps (i.e. every two feet, etc.) in a park's walkways can be used as the locations to simulate a user's stepping through the park. In another example, evenly spaced points (i.e. points in the center of every square yard, etc.) in a building's interior can be used as the locations to simulate a user's stepping through the building. In some aspects, a multi-directional motion picture comprises a data structure storing one or more differently directed streams of time stamped still pictures (i.e. motion picture, video, etc.) and one or more links to other multi-directional motion pictures. In some embodiments, multi-directional motion pictures can be ordered to include a first multi-directional motion picture, followed by a second multi-directional motion picture, which may also be followed by a third multi-directional motion picture, and so on, to complete a sequence. In other embodiments, multi-directional motion pictures can be arranged in a maze that corresponds to a shape of the represented object. In yet other embodiments, multi-directional motion pictures can be interlinked in any conceivable manner without using any intermediary or supporting data structures such as the sequence and/or maze. Generally, multi-directional motion pictures may correspond to a shape of a represented object. Any number of multi-directional motion pictures including any number of differently directed (i.e. forward, backward, right, left, up, down, diagonal, angular, etc.) streams of time stamped still pictures (i.e. motion pictures, videos, etc.) can be utilized to cover the entire represented object or a portion thereof. Also, any number of links among multi-directional motion pictures can be used. Such links may connect multi-directional motion pictures in any conceivable direction (i.e. forward, backward, right, left, up, down, diagonal, angular, etc.). The links enable a user to move among multi-directional motion pictures this way simulating motion relative to the represented object in a time continuum. Furthermore, any multi-directional motion picture or an element thereof may include or be associated with interpretive information (later described). In some aspects, any stream of time stamped still pictures may include or be associated with interpretive information on its content. Interpretive information comprises any identifying, descriptive, associative, time related, location related, and/or other information or metadata on a content of a stream of time stamped still pictures or on a multi-directional motion picture to which the stream of time stamped still pictures belongs.

At step 2310, a first stream of time stamped still pictures depicting a first view from a location associated with a first multi-directional motion picture is displayed on the computing device. A user may view on the display of the computing device a stream of time stamped still pictures (i.e. motion picture, video, etc.) such as the first stream of time stamped still pictures of the first multi-directional motion picture. In one example, the first location may be a logical starting point such as a location near an entrance into a park or near a door of a building in which case the first stream of time stamped still pictures (i.e. motion picture, video, etc.) may include a view from this logical starting location (i.e. a view of what a pedestrian would see entering a gate of the park, etc.). In another example, the first location may be any location of the represented object. In some embodiments, a stream of time stamped still pictures (i.e. motion picture, video, etc.) such as the first stream of time stamped still pictures of the first multi-directional motion picture may be obtained from a file, a data structure, an object, and/or other similar repository. In other embodiments, a stream of time stamped still pictures (i.e. motion picture, video, etc.) may be obtained from a database management system (DBMS), a database, a system, a process, and/or other similar repository. In further embodiments, a stream of time stamped still pictures (i.e. motion picture, video, etc.) may be embedded within an instance of MDP Unit 100 (i.e. hard coded in the Multi-directional Pictures Processor 110, etc.). In yet further embodiments, a stream of time stamped still pictures (i.e. motion picture, video, etc.) may be obtained from a separate file (i.e. object file, etc.), a separate data structure, a separate DBMS, a separate database, a separate system, a separate process, and/or other separate repository or system for each of the streams of still pictures or references thereto. In yet further embodiments, a stream of time stamped still pictures (i.e. motion picture, video, etc.) may be obtained from a collection of definitions of streams of time stamped still pictures or references thereto embedded in other files or programs. In further embodiments, a stream of time stamped still pictures (i.e. motion picture, video, etc.) may be obtained from a live feed of a motion picture camera, optical device for capturing motion pictures, or any other motion picture talking equipment. In yet other embodiments, a stream of time stamped still pictures (i.e. motion picture, video, etc.) can be obtained from a Multi-directional Pictures Repository 115 comprising a file (i.e. object file, etc.), a data structure, a DBMS, a database, a system, a process, and/or other repository or system. In some aspects, picture processing can be implemented to insert or overlay a picture of an avatar into/onto a stream of time stamped still pictures such as the first stream of time stamped still pictures of the first multi-directional motion picture. Furthermore, in addition to displaying the first stream of time stamped still pictures, interpretive information (later described) on the content of the first stream of time stamped still pictures or interpretive information on the multi-directional motion picture to which the first stream of time stamped still pictures belongs can also be displayed. Displaying includes any action or operation by or for a User Interaction Unit 105, Picture Display 840, and/or other disclosed elements.

At step 2315, the computing device receives a selection of a second stream of time stamped still pictures of the first multi-directional motion picture. In some embodiments, MDP Unit 100 includes a means such as a graphical user interface (GUI) configured to show graphical pointers each associated with a specific stream of time stamped still pictures (i.e. motion picture, video, etc.) and/or specific multi-directional motion picture link of a multi-directional motion picture such as the first multi-directional motion picture. In one example, a pointer to each of the one or more streams of time stamped still pictures of the first multi-directional motion picture and a pointer to each of the one or more links of the first multi-directional motion picture can be displayed on the computing device for selection by a user. A pointer in a GUI may include an arrow, a triangle, a push button (i.e. web form push button, etc.), a picture, and/or other such directional signs or indicia indicating a direction of its associated stream of time stamped still pictures (i.e. motion picture, video, etc.) and/or multi-directional motion picture link. In one example, an upward pointed triangle may be associated with a forward stream of time stamped still pictures (i.e. motion picture, video, etc.) and/or an upward pointed arrow may be associated with a forward multi-directional motion picture link. In other embodiments, certain areas on the displayed stream of time stamped still pictures may be associated with other streams of time stamped still pictures (i.e. motion picture, video, etc.) and/or multi-directional motion picture links in which case pointers can be used as secondary input means or not used at all. In one example, a user's clicking on any part of a park's forward walkway depicted in a stream of time stamped still pictures (i.e. motion picture, video, etc.) may execute a forward multi-directional motion picture link without selecting its associated pointer. A pointer can be selected through any internal or external input means of the computing device such as Human-machine Interface 23, keyboard, mouse, touch screen, control wheel, remote control, joystick, microphone, and/or other input means, User can select a pointer by manipulating Human-machine Interface 23, by pressing keyboard keys, by touching touch screen buttons, by clicking mouse buttons, by pressing game controller buttons, by pressing joystick buttons, by pressing remote control buttons, by sliding a control wheel (i.e. iPod control wheel, etc.), or by using other directional means associated with particular pointer. Upon user's selection, the selected pointer may be received by MDP Unit 100 or by any component thereof. A pointer comprises any action or operation by or for a Direction Arrow 850*a*, 850*b*, 850*c*, 850*d*, etc., and/or Picture Arrow 860*a*, 860*b*, 860*c*, 860*d*, etc. Receiving includes any action or operation by or for a User Interaction Unit 105, and/or other disclosed elements.

At step 2320, a time stamp of the currently displayed still picture is determined. In some aspects, a still picture (i.e.

frame) in a stream of time stamped still pictures (i.e. motion picture, video, etc.) may include or be associated with a time stamp, order, or position of the still picture in the stream of time stamped still pictures. In some embodiments, a multi-directional motion picture comprises a data structure whose data fields may include or store a time stamp, order, or position of each of the still pictures (i.e. frames) of a stream of time stamped still pictures (i.e. motion picture, video, etc.). In other embodiments, a stream of time stamped still pictures may include or store time stamps, orders, or positions of its own still pictures (i.e. frames) internally. In yet other embodiments, a stream of time stamped still pictures (i.e. motion picture, video, etc.) comprises still pictures (i.e. frames) each stored in its own file where time stamp, order, or position may be stored in the name of the file. Time stamp, order, or position of the currently displayed still picture can be determined by reading the time stamp, order, or position included in or associated with the currently displayed still picture (i.e. frame). Time stamp, order, or position of the currently displayed still picture can also be determined by using a formula to compute the time stamp, order, or position of the currently displayed still picture (i.e. frame). Determining includes any action or operation by or for a Tracker 114, Multi-directional Pictures Processor 110, and/or other disclosed elements.

At step 2325, the second stream of time stamped still pictures depicting a second view from the location associated with the first multi-directional motion picture is displayed on the computing device starting with a still picture having an incrementally subsequent time stamp from the time stamp of the currently displayed still picture. When user selects a pointer associated with a stream of time stamped still pictures (i.e. motion picture, video, etc.), the associated stream of time stamped still pictures may be displayed. In some aspects, time stamps can be utilized for each still picture (i.e. frame) within each stream of time stamped still pictures to enable coordinated transition among streams of time stamped still pictures in a time continuum. As such, when a user chooses to view another stream of time stamped still pictures, Multi-directional Pictures Processor 110 may look for appropriate still picture (i.e. frame) having an incrementally subsequent time stamp within a destination stream of time stamped still pictures (i.e. motion picture, video, etc.). A stream of still pictures (i.e. frames) within the destination stream of time stamped still pictures can then be displayed starting with a still picture (i.e. frame) having an incrementally subsequent time stamp. Step 2325 may include any action or operation described in step 2310 as applicable.

At step 2330, steps 2315-2325 are repeated for any additional streams of time stamped still pictures of the first multi-directional motion picture. Steps 2315-2325 can be performed repeatedly to display any subsequent streams of time stamped still pictures (i.e. motion picture, video, etc.) of a multi-directional motion picture such as the first multi-directional motion picture, Step 2330 may therefore be performed to enable a user to view all views (i.e. forward, backward, right, left, up, down, diagonal, angular, etc.) from a location associated with a multi-directional motion picture such as the first multi-directional motion picture in a time continuum.

At step 2335, the computing device receives a selection of a first link of the first multi-directional motion picture, the first link referring to a second multi-directional motion picture. Step 2335 may include any action or operation described in step 2315 as applicable. Furthermore, any link such as the first link of the first multi-directional motion picture may include or be associated with interpretive information (later described). Such interpretive information itself may include a link or reference to external content, resources, systems, applications or processes that can be executed when the link is utilized. In one example, identifying interpretive information from a stream of time stamped still pictures can be used to link the multi-directional motion picture with a content, resource, or operation the user may want to access or perform such as enter an object, enter a business, visit a website, utilize a representation of an object, utilize another MDP application, utilize an outside application or process, and/or others.

At step 2340, a time stamp of the currently displayed still picture is determined. Step 2340 may include any action or operation described in step 2320 as applicable.

At step 2345, a first stream of time stamped still pictures depicting a first view from a location associated with the second multi-directional motion picture is displayed on the computing device starting with a still picture having an incrementally subsequent time stamp from the time stamp of the currently displayed still picture. Step 2345 may include any action or operation described in step 2325 as applicable. In some embodiments, a pointer to each of the one or more streams of time stamped still pictures of the second multi-directional motion picture and a pointer to each of the one or more links of the second multi-directional motion picture may be displayed on the computing device for selection by a user.

At step 2350, steps 2315-2345 are repeated for any additional streams of time stamped still pictures or multi-directional motion picture links, Some or all steps 2315-2345 can be performed repeatedly to display any streams of time stamped still pictures (i.e. motion pictures, videos, etc.) of any multi-directional motion pictures and/or to move among any multi-directional motion pictures.

Figure 36:
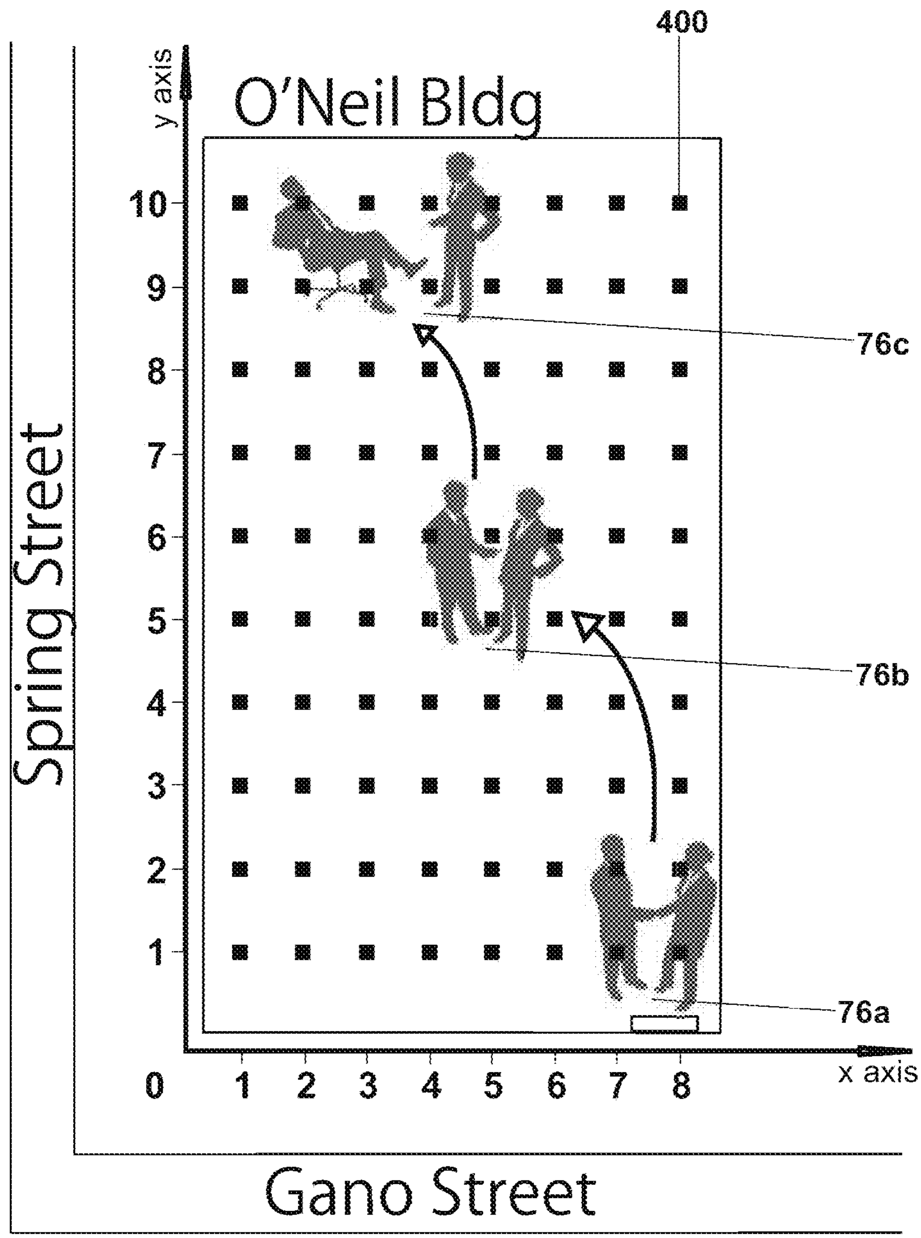
FIG. 36 shows an embodiment of a collection of Multi-directional Motion Pictures 400 each including coordinates.

Referring to FIG. 36, an embodiment of a collection of Multi-directional Motion Pictures 400 each including coordinates is illustrated. Multi-directional Motion Picture 400 may include coordinates of a location represented by the Multi-directional Motion Picture 400. Coordinates may include x and y coordinates such as, for example, coordinates (5,5) of Multi-directional Motion Picture 400 at Action Location 76*b*. Other systems of coordinates can be used including x, y, and z coordinates of 3D objects or spaces, system of coordinates using angle and distance from a reference point, system of coordinates using intersecting angles from various reference points, and/or any other systems of coordinates.

Figure 37:
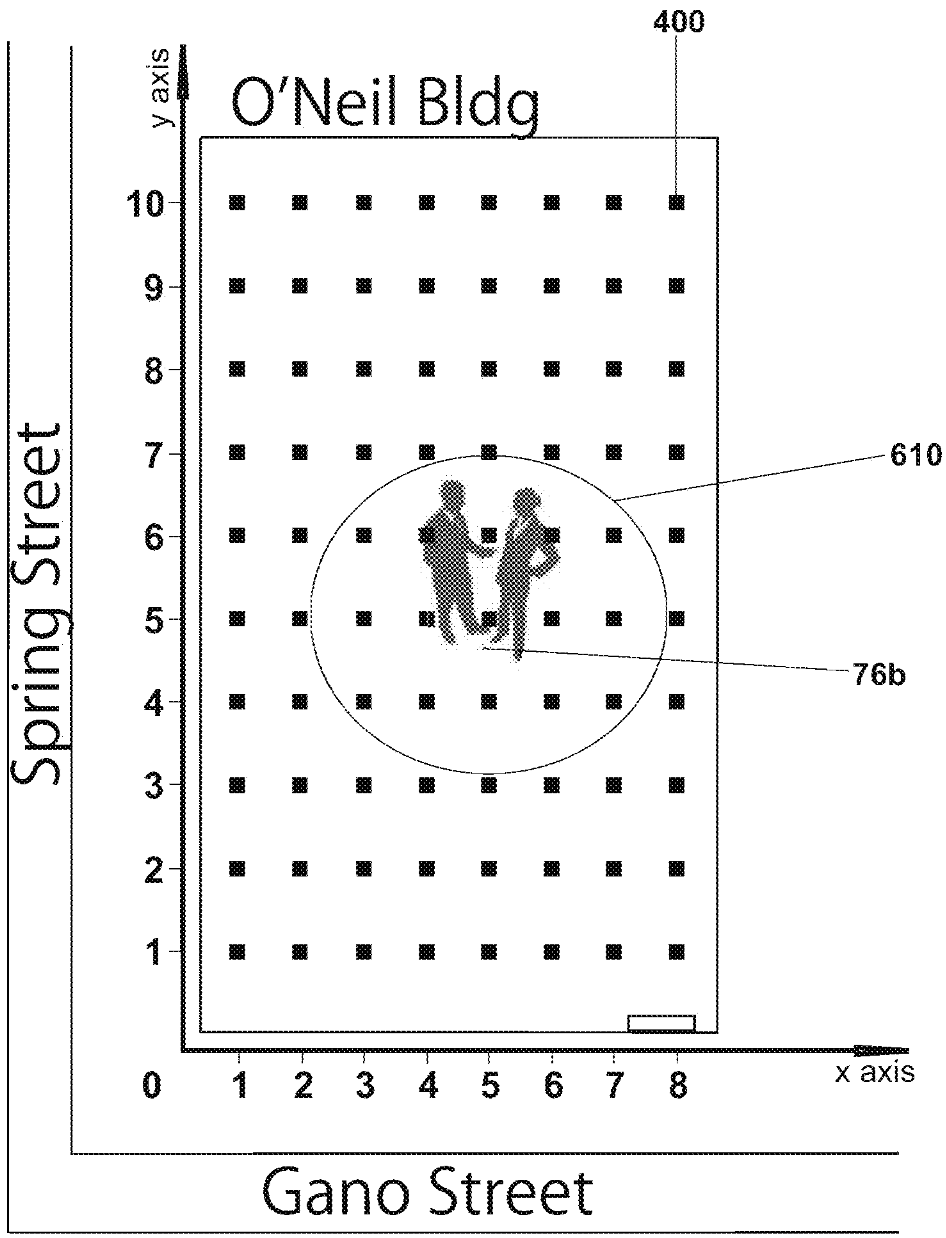
FIG. 37 shows an embodiment of a collection of Multi-directional Motion Pictures 400 where MDP Unit 100 includes automatic pattern of movement among Multi-directional Motion Pictures 400.

Referring to FIG. 37, an embodiment is illustrated of a collection of Multi-directional Motion Pictures 400 where MDP Unit 100 includes automatic pattern of movement among Multi-directional Motion Pictures 400. In some embodiments, a pattern of movement among Multi-directional Motion Pictures 400 may include a sequence of references to Multi-directional Motion Pictures 400 that Multi-directional Pictures Processor 110 can execute to simulate motion among Multi-directional Motion Pictures 400 as if a user were manually moving among the Multi-directional Motion Pictures 400. In other embodiments, a pattern of movement among Multi-directional Motion Pictures 400 may include a sequence of Multi-directional Motion Picture 400 coordinates that Multi-directional Pictures Processor 110 can execute to simulate motion among Multi-directional Motion Pictures 400. Any pattern of movement can be utilized including up, down, diagonal, angular, approaching, retreating, zoom-in, zoom-out, straight, curved, oblique, circular, elliptical, squared, rectangular, triangular, random, and others, A pattern of movement among Multi-directional Motion Pictures 400 may include absolute or relative pattern of movement. An absolute pattern of movement may move among Multi-directional Motion Pictures 400 based on a determined sequence of coordinates regardless of motion of any action scene or object. For example, an absolute pattern of movement among Multi-directional Motion Pictures 400 includes a sequence of coordinates located along the perimeter of a room regardless of where the action scene may be at any particular time. Such absolute pattern of movement among Multi-directional Motion Pictures 400 may include a sequence of coordinates such as, for example: (1, 1), (1, 2), (1, 3), (1, 4), (1, 5), (1, 6), (1, 7), (1, 8), (1, 9), (1, 10), (2, 10), (3, 10), (4, 10), (5, 10), (6, 10), (7, 10), (8, 10), (8, 9), (8, 8), (8, 7), (8, 6), (8, 5), (8, 4), (8, 3), (8, 2), (8, 1), (7, 1), (6, 1), (5, 1), (4, 1), (3, 1), (2, 1), (1, 1). A relative pattern of movement enables movement among Multi-directional Motion Pictures 400 based on a sequence of coordinates relative to coordinates of a reference point such as an action scene or object. A relative pattern of movement may, therefore, change with movement of the reference point (i.e. action scene, etc.). For example, a relative pattern of movement among Multi-directional Motion Pictures 400 includes a sequence of coordinates located on a conceptual Circle 610 having a distance (i.e. two Multi-directional Motion Pictures 400 away, 10 feet away, etc.) from the center of an action scene such as, for example, Action Location 76*b*. The distance from a reference point (i.e. action scene, etc.) can be fixed or variable (i.e. changeable by user or automatically, etc.), and measured using absolute measurements such as length (i.e. meters, decimeters, millimeters, kilometers, yards, feet, inches, miles, etc.) or relative measurements such as a number of Multi-directional Motion Picture 400 distances. Any of the Multi-directional Motion Pictures 400 on or near Circle 610 can be used in the relative pattern of movement, and if near Circle 610, a function to approximate the nearest Multi-directional Motion Pictures 400 may be utilized. Such function to approximate the nearest Multi-directional Motion Pictures 400 may calculate differences between x and y coordinates of points on Circle 610 and x and y coordinates of nearby Multi-directional Motion Pictures 400. Any other function or technique can be utilized to calculate or estimate distances such as Pythagorean theorem, Euclidean distance formula, Haversine formula, trigonometry, and/or other theorems, formulas, or disciplines. Multi-directional Motion Pictures 400 having coordinates with the smallest differences or the smallest absolute differences in x and y values from points on Circle 610 can be included in the relative pattern of movement associated with or represented by Circle 610. In some embodiments, a band around (inside, outside, or both) Circle 610 can be defined and Multi-directional Motion Pictures 400 that fall within the band may be included in the relative pattern of movement associated with or represented by Circle 610. In some aspects, sequence of coordinates of a relative pattern of movement can be recalculated to correspond to movement of an action scene or object (i.e. follow the movement of the action scene or object, etc.). For example, an action scene may move from Action Location 76*b* with coordinates (5, 5) to Action Location with coordinates (5, 6). Such movement of action scene may cause the center of Circle 610 associated with the action scene to also move to the location with coordinates (5, 6). In some aspects, coordinates of Multi-directional Motion Pictures 400 in the relative pattern of movement associated or represented by Circle 610 may be recalculated to correspond to the movement of the center of Circle 610, Such recalculation in this example may include increasing by 1 the y value of coordinates of Multi-directional Motion Pictures 400 or references thereto of the relative pattern of movement. In other aspects, coordinates of Circle 610 may be recalculated to correspond to the movement of the center of Circle 610. Such recalculation in this example may include increasing by 1 the y value of coordinates of points on Circle 610 associated with or representing the relative pattern of movement. After Circle's 610 recalculation, a function to approximate new nearest Multi-directional Motion Pictures 400 can be utilized as previously described.

Patterns of movement among Multi-directional Motion Pictures 400 may include a designer's preferred pattern (i.e. movie director's preferred camera pattern, etc.), user recorded or preferred pattern (i.e. pattern that user may have used previously), shaped patterns (i.e. still, linear, curved, circular, squared, rectangular, triangular, approaching, retreating, etc.), commonly used patterns (i.e. patterns used or preferred by other users, etc.), any patterns of movement toward, away, and/or around an action scene or object, and/or any other conceivable patterns. In the case of a user preferred pattern, MDP Unit 100 may include a process of recording and/or storing a sequence of coordinates of user's movements among Multi-directional Motion Pictures 400. In some aspects, a pattern of movement among Multi-directional Motion Pictures 400 and/or its coordinates can be stored in Multi-directional Pictures Repository 115, or in any external file (i.e. object file, etc.), data structure, DBMS, database, system, process, and/or any other storage or repository. In one example, coordinates of a Multi-directional Motion Picture 400 in a pattern can be stored in a data field of the Multi-directional Motion Picture's 400 data structure. In another example, coordinates of a Multi-directional Motion Picture 400 in a pattern can be stored in a data field of the pattern's data structure and/or associated with the Multi-directional Motion Picture 400.

In some embodiments, a pattern of movement among Multi-directional Motion Pictures 400 includes time periods (i.e. delays, etc.) to measure the length of stay on a particular Multi-directional Motion Picture 400 before moving to a next Multi-directional Motion Picture 400 in the pattern. Any time periods measured in any time units can be used such as, for example, 21 milliseconds, 5 seconds, 113 seconds, 17 minutes, 49 hours, 2 months, 1 year, etc. Time periods can be used to control and/or adjust the speed of movement among Multi-directional Motion Pictures 400 in a pattern. As such, user can manually or the system can automatically adjust time periods of any Multi-directional Motion Pictures 400 at any time before, during, and/or after a pattern's execution. In some aspects, time periods can be stored in Multi-directional Pictures Repository 115, or in any external file (i.e. object file, etc.), data structure, DBMS, database, system, process, and/or any other storage or repository. In one example, a time period of a Multi-directional Motion Picture 400 in a pattern can be stored in a data field of the Multi-directional Motion Picture's 400 data structure. In another example, a time period of a Multi-directional Motion Picture 400 in a pattern can be stored in a data field of the pattern's data structure and/or associated with the Multi-directional Motion Picture 400.

In other embodiments, MDP Unit 100 comprises motion detection in streams of pictures (i.e. motion pictures). Motion detection programs or techniques can be implemented for detecting action scenes or moving objects in Motion Pictures 410*a*, 410*b*, 410*c*, 410*d*, etc. Any programs or techniques for motion detection in streams of digital pictures known in art can be used. Motion detection in streams of digital pictures may generally be performed by comparing pixels of a current picture with pixels of a reference picture (i.e. previous picture, subsequent picture, background picture, etc.) and determining that the number of different pixels meets a minimum or other threshold. Such comparison may include any features and embodiments of the previously described Comparator 112. Motion detection techniques can detect moving objects as well as their direction of movement. Examples of motion detection techniques or programs include AForge.NET, Rise Sun, Pryme, Motion Hunter, Motion Detector Pro, and/or others.

In further embodiments, Motion Picture Cameras 490*a*, 490*b*, 490*c*, 490*d*, etc. (later described) or other motion picture taking equipment can be installed above an action scene such as, for example, on a ceiling of a room. As such, detection of an action scene or any moving objects can be achieved by detecting motion in Motion Pictures 410*a*, 410*b*, 410*c*, 410*d*, etc. of all Multi-directional Motion Pictures 400. Coordinates of the action scene can be determined or estimated in a Multi-directional Motion Picture 400 where no motion is detected. For example, Multi-directional Motion Picture 400 with coordinates (5,5) where motion is not detected may be location of the action scene as the action scene is in the blind spot of Motion Picture Cameras 490*a*, 490*b*, 490*c*, 490*d*, etc. or other motion picture taking equipment whose fields of view may be directed away from the action scene (i.e. forward, backward, right, left, etc.).

Figure 38:
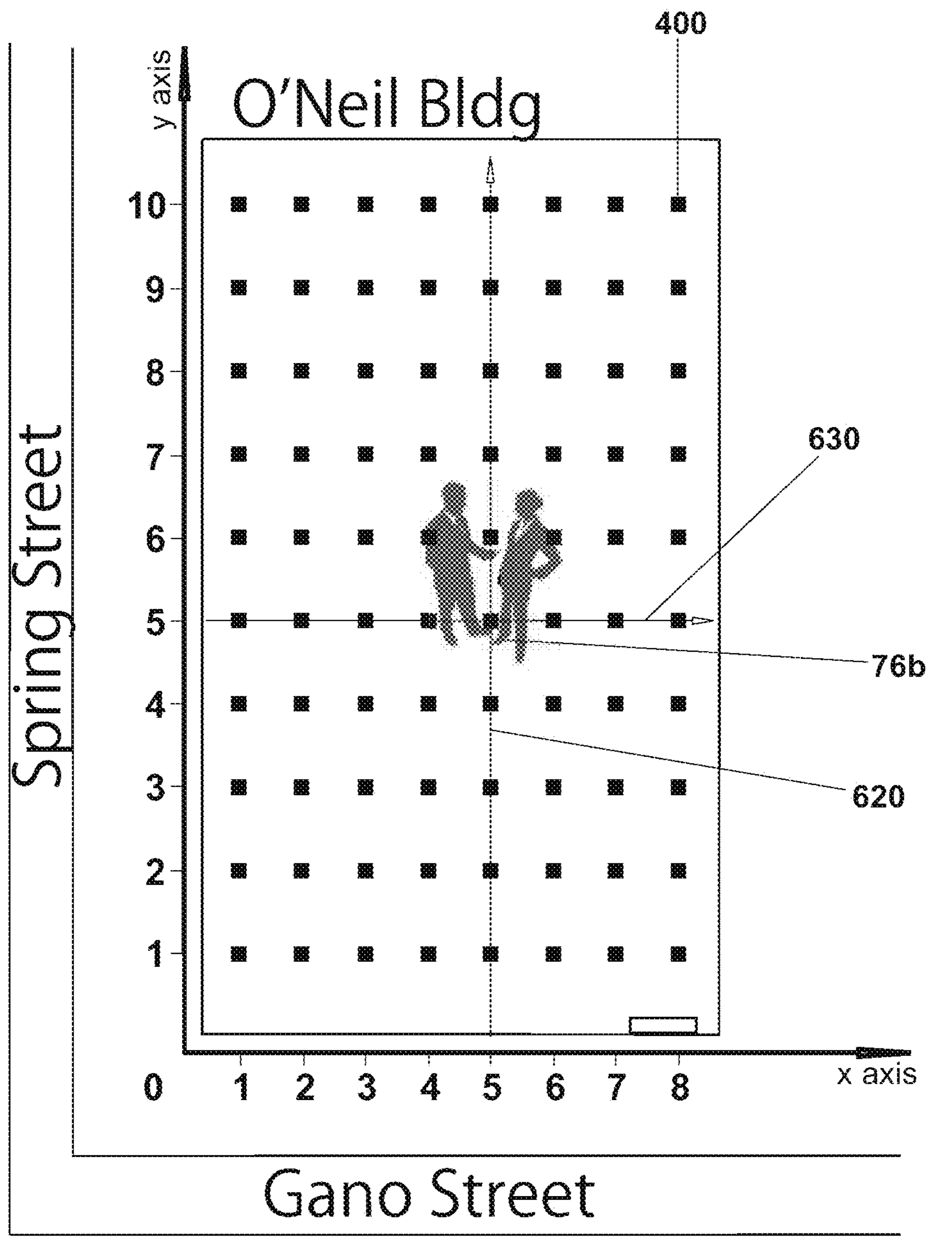
FIG. 38 shows an embodiment of a collection of Multi-directional Motion Pictures 400 where MDP Unit 100 includes detection of an action scene.

Referring to FIG. 38, an embodiment is illustrated of a collection of Multi-directional Motion Pictures 400 where MDP Unit 100 includes detection of an action scene, Such detection of an action scene can be achieved by detecting motion in lines of Multi-directional Motion Pictures 400 aligned with reference points (i.e. corners of buildings, points along walls representing x, y, or z axes, center of a represented object, etc.) of a represented object. In one example, an action scene may be located near the center of a rectangular room such as the Action Location 76*b* with coordinates (5,5). As such, a Motion Picture 410*a*, 410*b*, 410*c*, 410*d*, etc. of a Multi-directional Motion Picture 400 located near one of the walls such as the Multi-directional Motion Picture 400 with coordinates (5,1) can be used to detect the action scene. Once action scene is detected in, for example, Forward Motion Picture 410*a* of the Multi-directional Motion Picture 400 with coordinates (5,1), detection of the action scene can be performed in Forward Motion Pictures 410*a* of Multi-directional Motion Pictures 400 with coordinates (5,2), (5,3), (5,4), (5,5), (5,6), (5,7), (5,8), (5,9), and (5,10) located on Reference Line 620, As such, y coordinate of the action scene can be determined or estimated in y coordinate of the first Multi-directional Motion Picture 400 on Reference Line 620 with Forward Motion Picture 410*a* that did not detect the action scene such as in this example Multi-directional Motion Picture 400 with coordinates (5,5). Similar steps can be used to determine or estimate x coordinate of the action scene by detecting action scene in, for example, all Right Motion Pictures 410*c* of Multi-directional Motion Pictures 400 located on Reference Line 630 starting with Multi-directional Motion Picture 400 with coordinates (1,5). Any Multi-directional Motion Picture 400 can be used as a reference point and/or starting point of a reference line. Also, any Motion Picture 410*a*, 410*b*, 410*c*, 410*d*, etc. of any Multi-directional Motion Picture 400 can be used to detect the action scene or any moving objects.

In some embodiments, Motion Picture Cameras 490*a*, 490*b*, 490*c*, 490*d*, etc. (later described) or other motion picture taking equipment used for capturing Motion Pictures 410*a*, 410*b*, 410*c*, 410*d*, etc. may include a means for detecting motion, a means of aligning itself toward a detected moving object (i.e. action scene, etc.), and/or a means of focusing on the detected object (i.e. action scene, etc.). Detecting motion, aligning and focusing can be performed automatically by the motion picture taking equipment. Detecting motion can be accomplished by utilizing any motion sensing technologies known in art such as infrared (i.e. passive or active sensors, etc.), optics (i.e. video or camera systems, etc.), radio frequency energy (i.e. radar, microwave or tomographic, etc.), sound (i.e. microphones or acoustic sensors, etc.), vibration (i.e. triboelectric, seismic, or inertia-switch sensors, etc.), magnetism (i.e. magnetic sensors or magnetometers, etc.), and/or others. Once motion is detected by a motion sensor, electric motors or other actuators can be used to align the field of view of the motion picture taking equipment or lens thereof toward the detected moving object (i.e. action scene, etc.). Focusing can be accomplished through adjusting the position of a lens of the motion picture taking equipment to achieve focus. Adjusting the position of the lens can be implemented by utilizing a lens moving mechanism including a motor, an actuator, or other mechanism. Automatic motion detecting, aligning, and/or focusing on the detected action scene or object may enhance user experience of moving among Multi-directional Motion Pictures 400 as user would not need to perform these actions him/herself. In some aspects, motion detecting, aligning, and/or focusing functionalities can be used to determine or estimate coordinates of a moving object (i.e. action scene, etc.). For example, any triangulation techniques known in art can be used to determine or estimate coordinates of an action scene by utilizing known coordinates of any three locations (i.e. Multi-directional Motion Pictures 400, etc.) having the described motion picture taking equipment installed.

Figure 39:
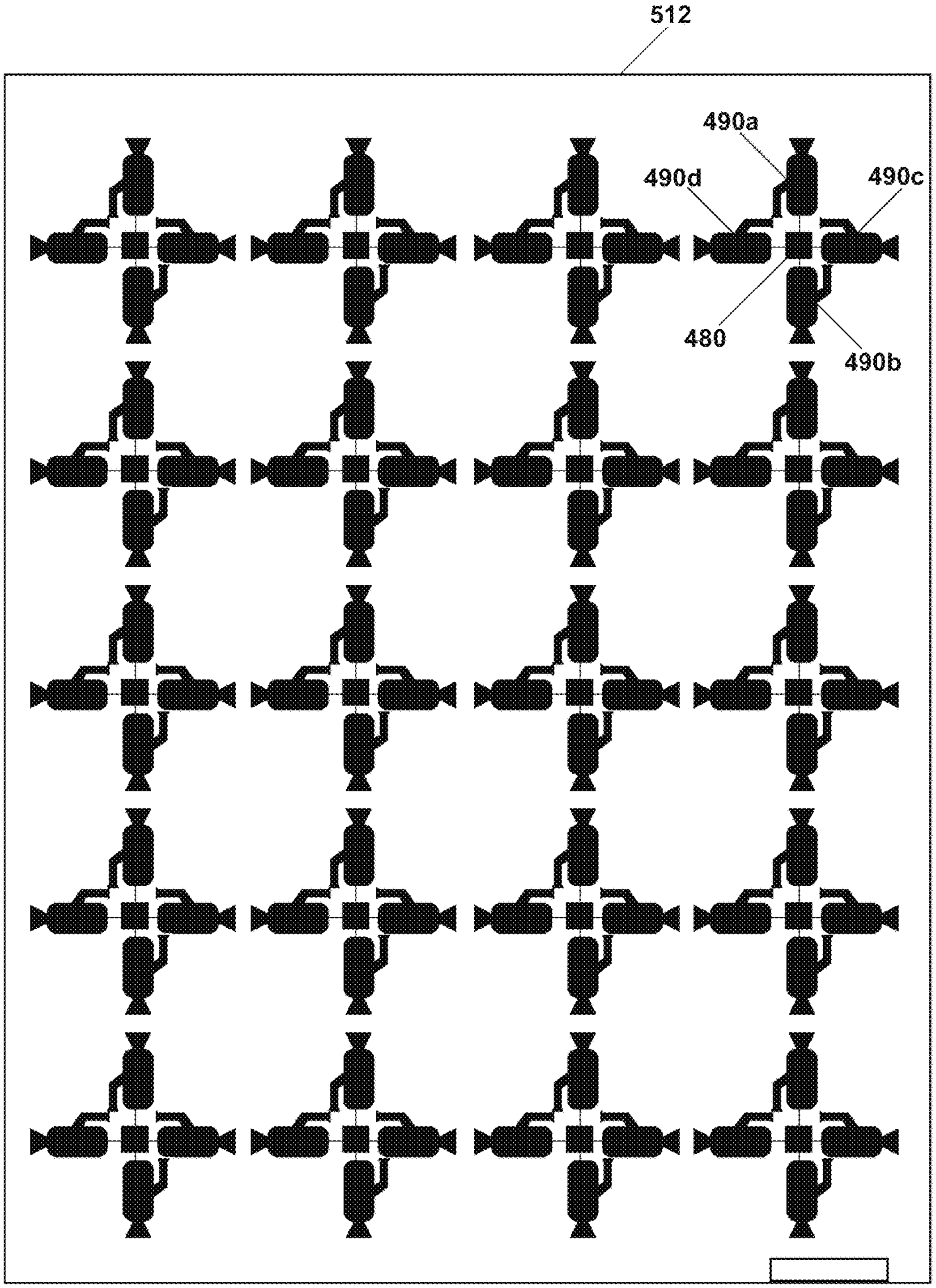
FIG. 39 shows an embodiment of Motion Picture Taking Devices 480 for creating a collection of Multi-Directional Motion Pictures 400.

Referring to FIG. 39, an embodiment of Motion Picture Taking Devices 480 for creating a collection of Multi-Directional Motion Pictures 400 is illustrated. The teaching presented by the disclosure can be implemented to include optical devices, apparatuses, systems, and/or methods for creating collections of Multi-directional Motion Pictures 400. In some embodiments, such optical devices, apparatuses, systems, and/or methods may include motion picture taking equipment such as motion picture cameras individually arranged to simultaneously capture motion pictures (i.e. streams of pictures) in various directions (i.e. forward, backward, right, left, up, down, diagonal, angular, etc.). In other embodiments, optical devices, apparatuses, systems, and/or methods for creating collections of Multi-directional Motion Pictures 400 may include Multi-directional Motion Picture Taking Devices 480. Multi-directional Motion Picture Taking Device 480 comprises the functionality for simultaneously capturing motion pictures (i.e. streams of pictures) in various directions (i.e. forward, backward, right, left, up, down, diagonal, angular, etc.). Such Multi-directional Motion Picture Taking Device 480 may include motion picture taking equipment such as Motion Picture Cameras 490 arranged to point in various directions (i.e. forward, backward, right, left, up, down, diagonal, angular, etc.). In one example, Multi-directional Motion Picture Taking Device 480 comprises Forward Motion Picture Camera 490*a*, Backward Motion Picture Camera 490*b*, Right Motion Picture Camera 490*c*, Left Motion Picture Camera 490*d*, and/or any other Motion Picture Cameras. Other additional elements may be included as needed, or some of the disclosed ones may be excluded, or a combination thereof may be utilized in alternate embodiments. Furthermore, Multi-directional Motion Picture Taking Device 480 can be included in an integrated and/or standardized casing. The casing may include a means such as clips, screws, attachment elements, adhesive elements, or other means to easily attach or mount the casing on ceilings, floors, walls, polls, fences, or other surfaces or items. Such Multi-directional Motion Picture Taking Device 480 may also include a means such as cable, wireless connection, or other connection means to connect the motion picture taking equipment such as Motion Picture Cameras 490*a*, 490*b*, 490*c*, 490*d*, etc. with a Computing Device 70, As shown for example in FIG. 39, Multi directional Motion Picture Taking Devices 480 or individually arranged motion picture taking equipment can be positioned in the center of every full square yard of a represented object such as Room 512 to cover the entire Room 512. Once positioned in their locations, Multi-directional Motion Picture Taking Devices 480 or individually arranged motion picture taking equipment may capture Motion Pictures 410*a*, 410*b*, 410*c*, 410*d*, etc. from each location simultaneously, Each Motion Picture 410*a*, 410*b*, 410*c*, 410*d*, etc. can be transferred via the connection means (i.e. cable, wireless connection, etc.) to a device or program (i.e. MDP Unit 100, etc.) implemented on Computing Device 70. In some embodiments where Multi-directional Motion Picture Taking Devices 480 are used, the device or program may associate each Multi-directional Motion Picture Taking Device 480 with a corresponding Multi-directional Motion Picture 400 and associate each Motion Picture Camera 490*a*, 490*b*, 490*c*, 490*d*, etc. of a Multi-directional Motion Picture Taking Device 480 with a corresponding Motion Picture 410*a*, 410*b*, 410*c*, 410*d*, etc. of a Multi-directional Motion Picture 400. In some embodiments where individually arranged motion picture taking equipment such as Motion Picture Cameras 490*a*, 490*b*, 490*c*, 490*d*, etc. are used, the device or program may associate each set of Motion Picture Cameras 490*a*, 490*b*, 490*c*, 490*d*, etc. from a particular location with a corresponding Multi-directional Motion Picture 400 and associate each Motion Picture Camera 490*a*, 490*b*, 490*c*, 490*d*, etc. with a corresponding Motion Picture 410*a*, 410*b*, 410*c*, 410*d*, etc. All features and embodiments of the Multi-directional Motion Picture Taking Devices 480, Motion Picture Cameras 490*a*, 490*b*, 490*c*, 490*d*, etc., and/or other motion picture taking equipment can similarly be utilized for capturing Still Pictures 210*a*, 210*b*, 210*c*, 210*d*, etc. where they may be referred to as multi-directional still picture taking devices, still picture cameras, and/or other still picture taking equipment.

If an action scene (i.e. moving persons and/or objects, etc.) is caused to enter an object such as Room 512 having the described Multi-directional Motion Picture Taking Devices 480 or individually arranged motion picture taking equipment installed, all views of the action scene including all views of the represented object (i.e. Room 512, etc.) can simultaneously be captured from all locations of the represented object (i.e. Room 512, etc.) for the duration of the motion pictures. User can utilize an instance of MDP Unit 100 on his/her Computing Device 70 to move the view of the action scene and/or the represented object (i.e. Room 512, etc.) in all directions while the action is progressing as previously described. In order to avoid collisions between action figures (i.e. moving persons and/or objects in the action scene) and motion picture taking equipment, the motion picture taking equipment can be installed to hang from the ceiling, to hang from walls, to be raised from the floor, or to be positioned in other suitable locations. In one example, motion picture taking equipment can be installed to hang from the ceiling in which case the motion picture taking equipment or lenses thereof may be angled downward toward the action scene. In another example, motion picture taking equipment can be installed on the floor in which case the motion picture taking equipment or lenses thereof may be angled upward toward the action scene. In yet another example, motion picture taking equipment can be installed on the walls in which case the motion picture taking equipment or lenses thereof may be leveled toward the action scene. In general, motion picture taking equipment or lenses thereof can be angled in any suitable direction. In a case of exterior of an object or exterior open space (i.e. outside of a building, park, street, etc.) with an action scene, any suitable object and/or surface able to hold the motion picture taking equipment can be utilized including, but not limited to, tree, lighting pole, electric pole, fence, building, wall, and/or other suitable object or surface. In some embodiments, custom made holding equipment can be utilized such as, for example, custom made cable maze or metal grid elevated to hold the motion picture taking equipment above the action scene.

In some embodiments, a time stamp, order, or position may be assigned or associated with each of the pictures (i.e. frames) of Motion Pictures 410*a*, 410*b*, 410*c*, 410*d*, etc. to coordinate movement among Multi-directional Motion Pictures 400 and/or switching among Motion Pictures 410*a*, 410*b*, 410*c*, 410*d*, etc. in a time continuum. In one example, when a user chooses to move his/her view of a represented object or an action scene by switching from one Motion Picture 410*a*, 410*b*, 410*c*, 410*d*, etc. to another within the same Multi-directional Motion Picture 400, Multi-directional Pictures Processor 110 or other disclosed element may look in the destination Motion Picture 410*a*, 410*b*, 410*c*, 410*d*, etc. for an appropriate picture (i.e. frame) having an incrementally subsequent time stamp. Multi-directional Pictures Processor 110 may then show through Picture Display 840 a stream of pictures (i.e. frames) of the destination Motion Picture 410*a*, 410*b*, 410*c*, 410*d*, etc. starting with the incrementally subsequent time stamp. In another example, when a user chooses to move his/her view of a represented object or an action scene by moving from one Multi-directional Motion Picture 400 to another, Multi-directional Pictures Processor 110 or other disclosed element may look in the destination Motion Picture 410*a*, 410*b*, 410*c*, 410*d*, etc. of the destination Multi-directional Motion Picture 400 for an appropriate picture (i.e. frame) having an incrementally subsequent time stamp. Multi-directional Pictures Processor 110 may then show through Picture Display 840 a stream of pictures (i.e. frames) of the destination Motion Picture 410*a*, 410*b*, 410*c*, 410*d*, etc. starting with the incrementally subsequent time stamp. In some embodiments, Multi-directional Motion Picture 400 comprises a data structure whose data fields may include time stamp of each of the pictures (i.e. frames) of Motion Pictures 410*a*, 410*b*, 410*c*, 410*d*, etc. in other embodiments, Motion Picture 410*a*, 410*b*, 410*c*, 410*d*, etc. may include or store time stamps of its own pictures (i.e. frames) internally (i.e. internally stored time stamps in a digital video file, etc.). In yet other embodiments, a time stamp may be assigned or associated with each of the pictures (i.e. frames) of a Motion Picture 410*a*, 410*b*, 410*c*, 410*d*, etc. based on a frame rate formula or any other function or technique for computing time stamps in streams of pictures (i.e. motion pictures, etc.). In yet other embodiments, Motion Picture 410*a*, 410*b*, 410*c*, 410*d*, etc. may include a stream of pictures (i.e. frames) where each picture is stored in its own file and where time stamp may be stored in the name of the file. In the following example, time stamps can be stored in names of files comprising 0.04 second increments consistent with digital quality video of 25 frames per second.

```
<PARAM NAME=picture0             VALUE="picture0">
<PARAM NAME=forward_picture0_1   VALUE="Pic0_1_20120803_09:43:22:040.jpg">
<PARAM NAME=forward_picture0_2   VALUE="Pic0_2_20120803_09:43:22:080.jpg">
<PARAM NAME=forward_picture0_3   VALUE="Pic0_3_20120803_09:43:22:120.jpg">
<PARAM NAME=backward_picture0_1  VALUE="Pic1_1_20120803_09:43:22:040.jpg">
<PARAM NAME=backward_picture0_2  VALUE="Pic1_2_20120803_09:43:22:080.jpg">
<PARAM NAME=backward_picture0_3  VALUE="Pic1_3_20120803_09:43:22:120.jpg">
<PARAM NAME=right_picture0_1     VALUE="Pic2_1_20120803_09:43:22:040.jpg">
<PARAM NAME=right_picture0_2     VALUE="Pic2_2_20120803_09:43:22:080.jpg">
<PARAM NAME=right_picture0_3     VALUE="Pic2_3_20120803_09:43:22:120.jpg">
<PARAM NAME=left_picture0_1      VALUE="Pic3_1_20120803_09:43:22:040.jpg">
<PARAM NAME=left_picture0_2      VALUE="Pic3_2_20120803_09:43:22:080.jpg">
<PARAM NAME=left_picture0_3      VALUE="Pic3_3_20120803_09:43:22:120.jpg">
<PARAM NAME=forward_link0        VALUE="picture1">
<PARAM NAME=backward_link0       VALUE="null">
<PARAM NAME=right_link0          VALUE="null>
<PARAM NAME=left_link0           VALUE="null">
<PARAM NAME=picture1             VALUE="picture1">
<PARAM NAME=forward_picture1_1   VALUE="Pic4_1_20120803_09:43:22:040.jpg">
<PARAM NAME=forward_picture1_2   VALUE="Pic4_2_20120803_09:43:22:080.jpg">
<PARAM NAME=forward_picture1_3   VALUE="Pic4_3_20120803_09:43:22:120.jpg">
<PARAM NAME=backward_picture1_1  VALUE="Pic5_1_20120803_09:43:22:040.jpg">
<PARAM NAME=backward_picture1_2  VALUE="Pic5_2_20120803_09:43:22:080.jpg">
<PARAM NAME=backward_picture1_3  VALUE="Pic5_3_20120803_09:43:22:120.jpg">
<PARAM NAME=right_picture1_1     VALUE="Pic6_1_20120803_09:43:22:040.jpg">
<PARAM NAME=right_picture1_2     VALUE="Pic6_2_20120803_09:43:22:080.jpg">
<PARAM NAME=right_picture1_3     VALUE="Pic6_3_20120803_09:43:22:120.jpg">
<PARAM NAME=left_picture1_1      VALUE="Pic7_1_20120803_09:43:22:040.jpg">
<PARAM NAME=left_picture1_2      VALUE="Pic7_2_20120803_09:43:22:080.jpg">
<PARAM NAME=left_picture1_3      VALUE="Pic7_3_20120803_09:43:22:120.jpg">
<PARAM NAME=forward_link1        VALUE="picture2">
<PARAM NAME=backward_link1       VALUE="picture0">
<PARAM NAME=right_link1          VALUE="picture3">
<PARAM NAME=left_link1           VALUE="picture4">
...
```

In some aspects, the teaching presented by the disclosure can be implemented in a device or system for generating Multi-directional Motion Pictures 400, Similar to the illustration in FIG. 20, the device or system may include Maker 920 and an interface, coupled to Maker 920, for receiving one or more streams of time stamped still pictures each stream of time stamped still pictures depicting a differently directed view from a location of plurality locations of a represented object. The device or system may further include Assembler 113, coupled to Maker 920, for generating a first multi-directional motion picture to include the one or more streams of time stamped still pictures from a first location and a second multi-directional motion picture to include the one or more streams of time stamped still pictures from a second location. Assembler 113 may be further configured to add a link with the second multi-directional motion picture to the first multi-directional motion picture and add a link with the first multi-directional motion picture to the second multi-directional motion picture, the first location being adjacent to the second location. Any of the operations of the described elements can be performed repeatedly and/or in different orders in alternate embodiments. For example, any optical or other input devices such as motion picture cameras may provide a means for capturing streams of time stamped still pictures from locations of a represented object. Maker 920 can be implemented as a device or processor that receives or reads the captured streams of time stamped still pictures. Assembler 113 can also be implemented as a device or processor that organizes or structures the captured streams of time stamped still pictures or references thereto into multi-directional motion pictures. Assembler 113 may also enable adding links to or modifying links of multi-directional motion pictures. Maker 920 may be further configured to store the streams of time stamped still pictures or references thereto, any data structures (i.e. multi-directional motion pictures, mazes, sequences, etc.), and/or other elements in Multi-directional Pictures Repository 115. Maker 920 (or its functionalities), Assembler 113 (or its functionalities), and/or other disclosed elements can be implemented as separate hardware components or processors dedicated to their functionalities, they can be implemented as a single program or objects/modules/functions of a single program or separate programs operating on Processor 11, they can be provided in other suitable configurations, or a combination thereof in alternate embodiments. In some designs, Maker 920 may include some or all of the functionalities of Assembler 113 in which case Assembler 113 may be omitted. The device or system for generating Multi-directional Motion Pictures 400 can similarly be implemented for generating Multi-directional Still Pictures 200. The device or system for generating Multi-directional Motion Pictures 400 may also include any functionalities or steps of any of the disclosed methods such as, for example, method 2400.

Figure 40:
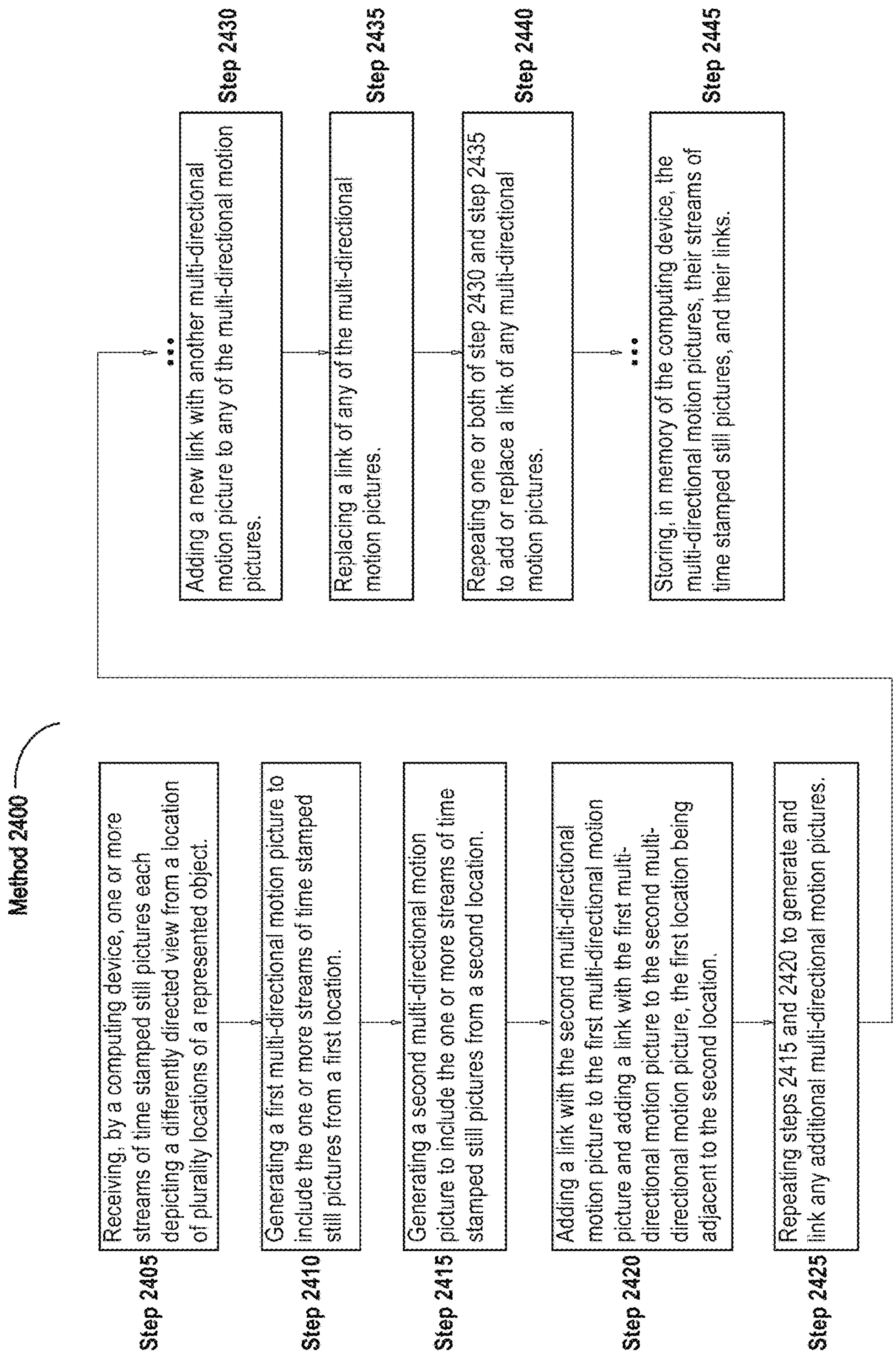
FIG. 40 illustrates a flow chart diagram of an embodiment of a method 2400 implemented by MDP Unit 100.

Referring to FIG. 40, the illustration shows an embodiment of a method 2400 for generating a collection of Multi-directional Motion Pictures 400. The method may therefore be used on one or more computing devices to enable generating Multi-directional Motion Pictures 400 representing an object. In some embodiments, the method may be used on one or more computing devices operating an interface for MDP Unit 100 to enable generating Multi-directional Motion Pictures 400 representing an object. Some or all steps of this method can similarly be utilized for generating a collection of Multi-directional Still Pictures 200 (previously described) representing an object. In some embodiments, the steps of this method can be used in combination with steps of any of the disclosed methods such as methods 3200 for automatic detection of pictures and/or method 3300 for automatic detection of links.

At step 2405, one or more streams of time stamped still pictures each depicting a differently directed view from a location of plurality locations of a represented object are received by a computing device. MDP Unit 100 enables representation of objects over time using multi-directional motion pictures positioned in locations of the represented object. Any locations can be used to represent the object. In one example, steps (i.e. every two feet, etc.) in a park's walkways can be used as the locations to simulate a user's stepping through the park in time continuum. In another example, evenly spaced locations (i.e. locations in the center of every square yard, etc.) in a room can be used as locations to simulate a user's stepping through the room in a time continuum. In one example, a first location can be a logical starting point such as a location near an entrance into a park or near a door to a room. In another example, the first location can be any location of the represented object. In some embodiments, a set of individually arranged motion picture taking equipment such as motion picture cameras and/or any other motion picture taking equipment can be used to simultaneously capture streams of time stamped still pictures (i.e. motion pictures, videos, etc.) in various directions (i.e. forward, backward, right, left, up, down, diagonal, angular, etc.). In other embodiments, a set of integrated motion picture taking equipment such as motion picture cameras and/or any other motion picture taking equipment can be used to simultaneously capture streams of time stamped still pictures (i.e. motion pictures, videos, etc.) in various directions (i.e. forward, backward, right, left, up, down, diagonal, angular, etc.). Such set of integrated motion picture cameras and/or any other motion picture taking equipment can be included in an integrated and/or standardized casing. Such casing can further include a means such as clips, screws, adhesive elements, etc. to easily attach or mount the casing on ceilings, floors, walls, polls, fences, etc. Any number of sets of differently directed motion picture cameras and/or any other motion picture taking equipment can be placed in any number of locations to cover the entire represented object or a portion thereof. In one example, if an action scene (i.e. moving persons or objects, etc.) is caused to enter an object (i.e. park, interior of a building, etc.) with the described motion picture cameras and/or any other motion picture taking equipment installed, all views or angles of the action scene including all views or angles of the represented object may simultaneously be captured for the duration of the streams of time stamped still pictures (i.e. motion pictures, videos, etc.). A computing device may receive the captured streams of time stamped still pictures (i.e. motion pictures, videos, etc.) via a connection means. Such connection means can be utilized to facilitate transfer of streams of time stamped still pictures (i.e. motion pictures, videos, etc.) from each of the motion picture cameras and/or any other motion picture taking equipment to an instance of MDP Unit 100 implemented on the computing device. Such connection means may include a cable, a network, a wireless connection, and/or any other connection means. Such connection means can be included or attached to the motion picture camera and/or any other motion picture taking equipment for user's convenience. In some embodiments, an instance of MDP Unit 100 implemented on the computing device may associate a motion picture camera and/or any other motion picture taking equipment with a corresponding multi-directional motion picture using the connection means to identify a specific motion picture camera and/or any other motion picture taking equipment. In some aspects, the streams of time stamped still pictures (i.e. motion pictures, videos, etc.) may be received from a motion picture camera and/or any other motion picture taking equipment and directed to an instance of MDP Unit 100 through the computing device's internal connection or storage means such as bus, hard drive, memory, or any other directly or operatively connected internal connection or storage means. In one example, a motion picture camera and/or any other motion picture taking equipment may transfer a stream of time stamped still pictures in a file over a network to which the computing device can connect and on which an instance of MDP Unit 100 can access the file. In another example, a motion picture camera and/or any other motion picture taking equipment can store a stream of time stamped still pictures in a file on a hard drive of the computing device where an instance of MDP Unit 100 may access the file. A set of differently directed motion picture cameras and/or any other motion picture taking equipment may include any action or operation by or for Motion Picture Camera 490*a*, 490*b*, 490*c*, 490*d*, etc., Multi-directional Motion Picture Taking Device 480, and/or any of their elements.

At step 2410, a first multi-directional motion picture is generated to include the one or more streams of time stamped still pictures from a first location. Each location of the represented object such as the first location may be associated with a multi-directional motion picture comprising one or more differently directed streams of time stamped still pictures and one or more links to other multi-directional motion pictures. In some embodiments, a multi-directional motion picture includes a data structure storing one or more differently directed streams of time stamped still pictures and one or more links to other multi-directional motion pictures. Multi-directional motion pictures enable a user to view all views (i.e. forward, backward, right, left, up, down, diagonal, angular, etc.) from all locations of a represented object over time and enable the user to move among the multi-directional motion pictures this way simulating motion relative to the represented object over time. Each still picture (i.e. frame) in a stream of time stamped still pictures (i.e. motion picture, video, etc.) may include or be associated with a time stamp, order, or position. In some embodiments, multi-directional motion picture comprises a data structure whose data fields include a time stamp, order, or position of each of the still pictures (i.e. frames) of a stream of time stamped still pictures (i.e. motion picture, video, etc.). In other embodiments, a stream of time stamped still pictures (i.e. motion picture, video, etc.) includes or stores time stamps, orders, or positions of its own still pictures (i.e. frames) internally. In yet other embodiments, a stream of time stamped still pictures (i.e. motion picture, video, etc.) includes still pictures (i.e. frames) each stored in its own file where the time stamp, order, or position may be stored in the name of the file. In yet other embodiments, time stamp, order, or position of each of the still pictures in a stream of time stamped still pictures can be determined or calculated based on a frame rate or other formula. Time stamp, order, or position can be utilized for each still picture (i.e. frame) within each stream of time stamped still pictures (i.e. motion picture, video, etc.) to enable coordinated movement among multi-directional motion pictures in a time continuum. A time stamp, for example, may include any time increments measured in any unit of time such as nanoseconds, milliseconds, seconds, minutes, hours, months, years, and/or any other units of time. In one example, 0.04 second increments can be used for each still picture (i.e. frame) consistent with digital quality video of 25 frames per second. In some embodiments, an instance of MDP Unit 100 can assign a time stamp (i.e. from system clock, etc.), order, or position to each still picture of a stream of still pictures (i.e. motion picture, video, etc.). In other embodiments, motion picture cameras and/or any other motion picture taking equipment can assign a time stamp (i.e. from internal clock, etc.), order, or position to each still picture of a stream of still pictures (i.e. motion picture, video, etc.). Time stamps, orders, or positions may be used to transition among streams of time stamped still pictures (i.e. motion picture, video, etc.) where an instance of MDP Unit 100 may look for an appropriate still picture (i.e. frame) having an incrementally subsequent time stamp within a destination stream of time stamped still pictures (i.e. motion picture, video, etc.) in order to make a proper transition. In some embodiments, multi-directional motion pictures can be ordered to include a first multi-directional motion picture, followed by a second multi-directional motion picture, which may also be followed by a third multi-directional motion picture, and so on, to complete a sequence. In other embodiments, multi-directional motion pictures can be arranged in a maze that corresponds to a shape of the represented object. In yet other embodiments, multi-directional motion pictures can be interlinked in any conceivable manner without using any intermediary or supporting data structures such as the sequence and/or maze. Generally, multi-directional motion pictures may correspond to a shape of a represented object whatever that shape is. In some embodiments, picture processing can be implemented to automatically detect streams of time stamped still pictures with overlapping fields of view from a specific location of the represented object such as the first location, and to add the detected streams of time stamped still pictures to multi-directional motion picture representing the location. Furthermore, picture processing can be implemented to interpret the content of a stream of time stamped still pictures and store or associate this interpretive information (later described) with the stream of time stamped still pictures or with the multi-directional motion picture to which the stream of time stamped still picture belongs. Generating comprises any action or operation by or for Maker 920, Assembler 113, and/or other disclosed elements.

At step 2415, a second multi-directional motion picture is generated to include the one or more streams of time stamped still pictures from a second location. Step 2415 may include any action or operation described in step 2410 as applicable.

At step 2420, a link with the second multi-directional motion picture is added to the first multi-directional motion picture and a link with the first multi-directional motion picture is added to the second multi-directional motion picture, the first location being adjacent to the second location. MDP Unit 100 may include a means through which a user can add bidirectional links to any two adjacent multi-directional motion pictures. In some embodiments in which multi-directional motion picture comprises a data structure, such means may include an editor or graphical user interface configured to ask the user to indicate a link with a specific multi-directional motion picture and to add a new data field including the new link to the data structure. In other embodiments in which multi-directional motion picture comprises a data structure, such means may use picture processing to automatically detect a new link with a multi-directional motion picture and add a new data field including the new link to the data structure. In general, adding bidirectional links between any two adjacent multi-directional motion pictures such as the first and second multi-directional motion pictures enables a user to move between the two multi-directional motion pictures this way simulating motion relative to the represented object. In some embodiments, links can be added individually to their respective multi-directional motion pictures instead of adding bidirectional links in one process step, Adding a link comprises any action or operation by or for Maker 920, Assembler 113, and/or other disclosed elements.

At step 2425, steps 2415 and 2420 are repeated to generate and link any additional multi-directional motion pictures. Step 2425 may include any action or operation described in steps 2415 or 2420 as applicable.

At step 2430, a new link with another multi-directional motion picture is added to any of the multi-directional motion pictures, MDP Unit 100 may include a means through which a user can access any of the multi-directional motion pictures and add to it an additional link with any other multi-directional motion picture. In some embodiments in which multi-directional motion picture comprises a data structure, such means may include an editor or graphical user interface configured to ask the user to indicate a link with a specific multi-directional motion picture and to add a new data field including the new link to the data structure. In other embodiments in which multi-directional motion picture comprises a data structure, such means may use picture processing to automatically detect a new link with a multi-directional motion picture and add a new data field including the new link to the data structure. Adding a link comprises any action or operation by or for Maker 920, Assembler 113, and/or other disclosed elements.

At step 2435, a link of any of the multi-directional motion pictures is replaced. MDP Unit 100 may include a means through which a user can access any of the multi-directional motion pictures to replace, delete, or otherwise modify any of its links. In some embodiments in which multi-directional motion picture comprises a data structure, such means may include an editor or graphical user interface configured to read a data field including a link, ask the user to indicate a link with another multi-directional motion picture, and replace the previous link with the updated link in the data field. In other embodiments in which multi-directional motion picture comprises a data structure, such means may read a data field including a link, use picture processing to automatically detect a link with another multi-directional motion picture, and replace the previous link with the updated link in the data field. Modifying a link comprises any action or operation by or for Maker 920, Assembler 113, and/or other disclosed elements.

At step 2440, one or both of step 2430 and step 2435 are repeated to add or replace a link of any multi-directional motion pictures. Step 2440 may include any action or operation described in step 2430 and/or step 2435 as applicable. Any number of links among multi-directional motion pictures can be used in user's discretion. Such links can connect multi-directional motion pictures in any conceivable direction (i.e. forward, backward, right, left, up, down, diagonal, angular, etc.). The links enable the user to move among multi-directional motion pictures this way simulating motion relative to the represented object. In one example, links may connect multi-directional motion pictures associated with locations (i.e. steps, etc.) on a park's walkways. In another example, links may connect multi-directional motion pictures associated with evenly spaced locations (i.e. locations in the center of every square yard, etc.) in a room.

At step 2445, the multi-directional motion pictures, their streams of time stamped still pictures, and their links are stored in memory of the computing device. Multi-directional motion pictures can be stored, maintained, and/or organized in various arrangements including files, data structures, objects, tables, databases, DBMSs, memory structures, and/or other similar arrangements and/or repositories. In some embodiments, streams of time stamped still pictures or references thereto, links, and/or any data structures (i.e. multi-directional motion pictures, mazes, sequences, etc.) can be stored in a Multi-directional Pictures Repository 115. In one example, Multi-directional Pictures Repository 115 includes a file, a data structure, and/or other repository. In another example, Multi-directional Pictures Repository 115 includes a database management system (DBMS), a database, a system, a process, and/or other repository. In a further example, Multi-directional Pictures Repository 115 may be embedded within an instance of MDP Unit 100 (i.e. hard coded in the Multi-directional Pictures Processor 110). In yet further example, Multi-directional Pictures Repository 115 includes a separate file (i.e. object file, etc.), a separate data structure, a separate DBMS, a separate database, a separate system, a separate process, and/or other separate repository or system for each of the streams of time stamped still pictures (i.e. motion pictures, videos, etc.) or references thereto, for each of the links, and/or for each of the data structures (i.e. multi-directional motion pictures, mazes, sequences, etc.). In yet further embodiments, Multi-directional Pictures Repository 115 includes a collection of definitions of streams of time stamped still pictures or references thereto, links, and/or any data structures (i.e. multi-directional motion pictures, mazes, sequences, etc.) that may be embedded in other files or programs. Storing comprises any action or operation by or for Maker 920, Assembler 113, Multi-directional Pictures Repository 115, and/or other disclosed elements.

Embodiments involving any motion picture or multi-directional motion picture functionalities may include any features or embodiments involving any still picture or multi-directional still picture functionalities as previously described.

Figure 41:
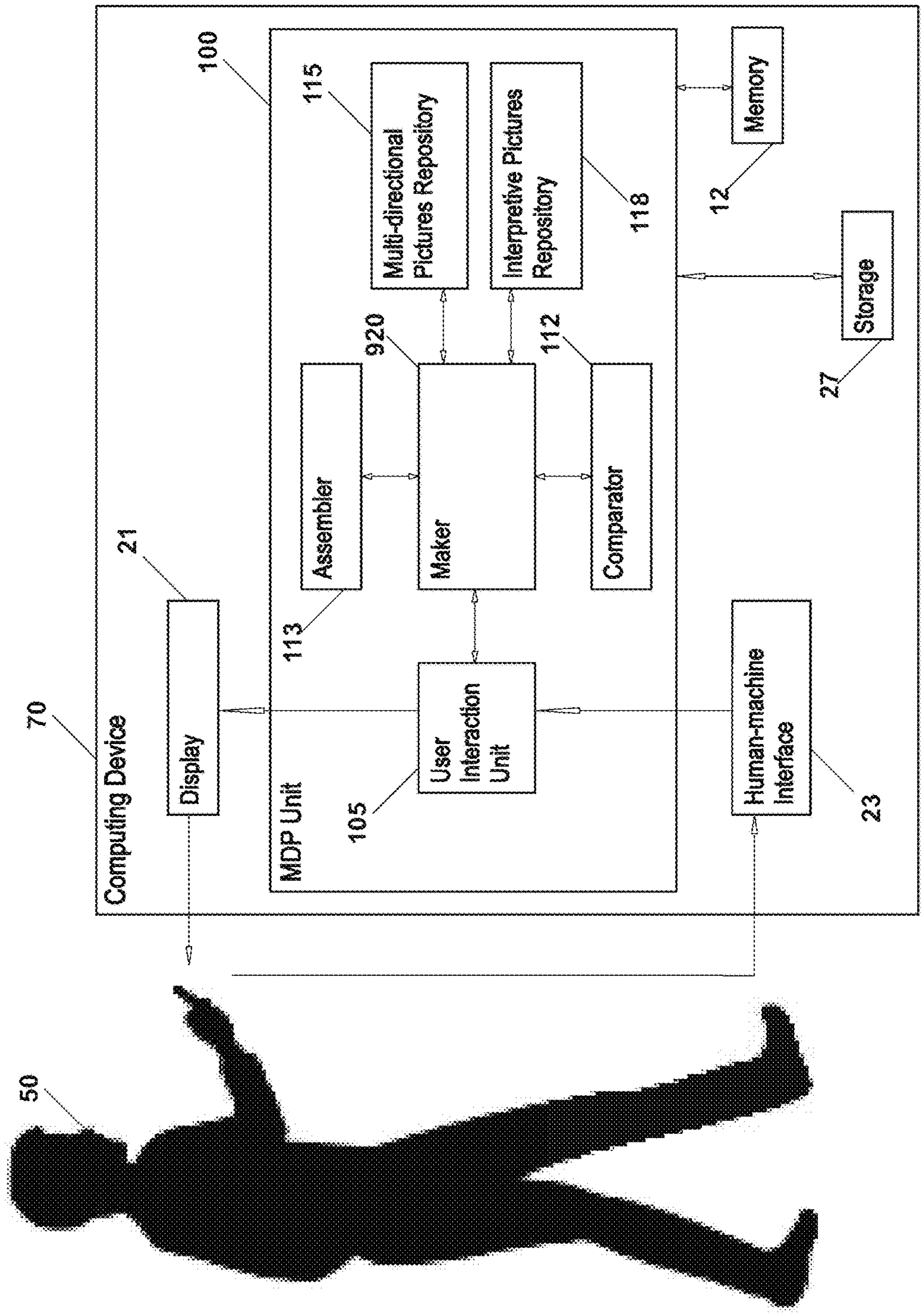
FIG. 41 illustrates an embodiment of MDP Unit 100 comprising the functionality for interpreting Still Pictures 210*a*, 210*b*, 210*c*, 210*d*, etc.

Referring to FIG. 41, an embodiment of MDP Unit 100 comprising the functionality for interpreting Still Pictures 210*a*, 210*b*, 210*c*, 210*d*, etc. is illustrated. MDP Unit 100 comprises interconnected User Interaction Unit 105, Maker 920, Comparator 112, Assembler 113, Multi-directional Pictures Repository 115, and Interpretive Pictures Repository 118. MDP Unit 100 may be coupled with Human-machine Interface 23, Display 21, Memory 12, and Storage 27. Other additional elements may be included as needed, or some of the disclosed ones may be excluded, or a combination thereof may be utilized in alternate embodiments.

In some aspects, the teaching presented by the disclosure can be implemented in a device or system for interpreting Still Pictures 210*a*, 210*b*, 210*c*, 210*d*, etc. The device or system may include Maker 920 and an interface, coupled to Maker 920, for receiving a plurality of multi-directional still pictures each multi-directional still picture associated with a different location of a represented object and including one or more differently directed still pictures from the location. The interface may be further configured to receive a plurality of interpretive still pictures each interpretive still picture associated with an interpretive information on its content. The device or system may further include Comparator 112, coupled to Maker 920, for comparing at least one subset of a first still picture of a first multi-directional still picture with at least one subset of a first interpretive still picture, and determining that a subset of the first still picture of the first multi-directional still picture is sufficiently similar to a subset of the first interpretive still picture. The device or system may further include Assembler 113, coupled to Maker 920, for adding the interpretive information on the content of the first interpretive still picture to the first multi-directional still picture. Any of the operations of the described elements can be performed repeatedly and/or in different orders in alternate embodiments. For example, Maker 920 can be implemented as a device or processor that receives or reads multi-directional still pictures and/or other elements from Multi-directional Pictures Repository 115. Maker 920 may further access interpretive still pictures or references thereto in Interpretive Pictures Repository 118 where each interpretive still picture may include interpretive information about its content. Comparator 112 can also be implemented as a device or processor that compares subsets of a still picture of a multi-directional still picture with subsets of an interpretive still picture, and determines that a subset of the still picture of the multi-directional still picture is sufficiently similar to a subset of the interpretive still picture. Assembler 113 can also be implemented as a device or processor that adds the interpretive information of the interpretive picture to the multi-directional still picture. Maker 920 may then store the multi-directional still pictures including the added interpretive information in Multi-directional Pictures Repository 115. Maker 920 (or its functionalities), Comparator 112 (or its functionalities), Assembler 113 (or its functionalities), and/or other disclosed elements can be implemented as separate hardware components or processors dedicated to their functionalities, they can be implemented as a single program or objects/modules/functions of a single program or separate programs operating on Processor 11, they can be provided in other suitable configurations, or a combination thereof in alternate embodiments. In some designs, Maker 920 may include some or all of the functionalities of Comparator 112 and/or Assembler 113 in which case Comparator 112 and/or Assembler 113 may be omitted. The device or system for interpreting Still Pictures 210*a*, 210*b*, 210*c*, 210*d*, etc. can similarly be implemented for interpreting Motion Pictures 410*a*, 410*b*, 410*c*, 410*d*, etc. The device or system for interpreting Still Pictures 210*a*, 210*b*, 210*c*, 210*d*, etc. may also include any functionalities or steps of any of the disclosed methods such as method 3400 (later described).

Interpretive Picture 218 (shown in a later figure) comprises the functionality for storing visual content for which information (i.e. interpretive information, etc.) is available, and/or other disclosed functionalities. The content of an Interpretive Picture 218 may include any objects, persons, places, or other things or items. Interpretive Picture 218 may generally be stored in a file, but other storage arrangements can be implemented. In some aspects, Interpretive Picture 218 includes a still picture. Examples of still picture files or formats include a BMP, a JPEG, a GIF, a TIFF, a PNG, a PDF, and/or other digital picture file or format. In other aspects, Interpretive Picture 218 includes a motion picture, Examples of motion picture files or formats include a MPEG, an AVI, a FLV, a MOV, a RM, a SWF, a WMV, a DivX, and/or other digital video file or format. In further aspects, Interpretive Picture 218 comprises any visual content including applications or processes that can generate visual content. Interpretive Picture 218 may include any features and embodiments of the previously described Still Picture 210*a*, 210*b*, 210*c*, 210*d*, etc., Motion Picture 410*a*, 410*b*, 410*c*, 410*d*, etc., or any digital still or motion picture. In some embodiments, Interpretive Picture 218 may internally store any interpretive information. In one example, interpretive information such as name or other identifier, any descriptors, any metadata, and/or other information can be stored within Interpretive Picture's 218 file or internal data structure by the creator (i.e. photographer, image editor, etc.) of the Interpretive Picture 218. In another example, interpretive information such as location information (i.e. latitude/longitude/altitude, address, geo-spatial coordinates, etc.), any metadata, and/or other information can be stored within Interpretive Picture's 218 file or internal data structure by an optical device (i.e. GPS enabled digital camera, etc.) used to capture the Interpretive Picture 218. In other embodiments, Interpretive Picture 218 may be associated with any interpretive information. For example, interpretive information such as keywords or other descriptors, any metadata, and/or other information can be associated with an Interpretive Picture 218 and provided as a feature of a publically available picture repository or a picture sharing service.

Interpretive information may include any identifying information on the content of an interpretive Picture 218 such as a name or other identifier of an object, person, or place (the object, person, or place may be simply referred to as object) depicted in the Interpretive Picture 218, and/or other information. Interpretive information may also include any descriptive information on the content of an Interpretive Picture 218 such as one or more words (i.e. keywords, phrases, sentences, etc.), or other descriptors of an object, person, or place depicted in the Interpretive Picture 218, and/or other information. Interpretive information may also include any associative information on the content of an Interpretive Picture 218 such as an identifier, descriptor, or reference to a resource (i.e. picture, video, text, sound, any data, any repository, etc.) comprising similar content, and/or other information. Interpretive information may further include any metadata on an Interpretive Picture 218 such as resolution, format, size (i.e. in kilobytes, megabytes, etc.), time or date of capture or creation, URL where the Interpretive Picture 218 can be or was found, and/or other information. Interpretive information may further include any time information on the content of an Interpretive Picture 218 such as age of an object, person, or place depicted in the Interpretive Picture 218, and/or other information. Interpretive information may further include any location information on the content of an Interpretive Picture 218 such as geo-spatial coordinates, address, latitude/longitude/altitude, any triangulated location information, any vector-based location information, Cartesian (i.e. x/y/z, etc.) coordinates, location reference, or any information that can define a location of an object, person, or place depicted in the interpretive Picture 218, and/or other information. Interpretive information may also include any referential information on the content of an Interpretive Picture 218 such as a reference, link, pointer, or other locator of content, resource, system, application, and/or process that includes or that may provide additional information on an object, person, or place depicted in the Interpretive Picture 218, and/or other information. Generally, interpretive information may include any information on the content of an interpretive Picture 218. The content may include an object, a person, a place, and/or any other item depicted in an Interpretive Picture 218 or another picture.

Interpretive Pictures Repository 118 comprises the functionality for storing Interpretive Pictures 218 or references thereto, any interpretive information (or references thereto) on the content of the Interpretive Pictures 218, and/or other elements. Interpretive Pictures Repository 118 may include one or any number of Interpretive Pictures 218. In some embodiments, Interpretive Pictures Repository 118 comprises one or more files, data structures, objects, databases, database management systems (DBMSs), systems, processes, and/or other repositories. Maker 920 can read interpretive Pictures Repository 118 by opening or connecting to the file, data structure, object, database, DBMS, system, process, and/or other repository, and by accessing the stored Interpretive Pictures 218 or references thereto, any interpretive information on the content of the interpretive Pictures 218, and/or other elements. Interpretive Pictures Repository 118 may include any features and embodiments of the previously described Multi-directional Pictures Repository 115. Interpretive Pictures Repository 118 can reside and/or execute on user's Computing Device 70 or on a Remote Computing Device 1310 (i.e. application server, cloud, etc.) accessible over a Network 1300 (i.e. corporate enterprise network. Internet, etc.) as previously described. In one example, Interpretive Pictures Repository 118 comprises a publically available picture repository such as, for example, Yahoo Images, Google Images, and/or other publically available picture repositories. Such interpretive Pictures Repository 118 may provide interpretive information on each of the pictures (i.e. Interpretive Pictures 218, etc.) such as name or other identifier, any descriptors or keywords, type of object or place shown in the picture (i.e. restaurant, stadium, campus, lake, mountain, car, person, etc.), resolution, size, web site or URL from which the picture was obtained, and/or other information, Such interpretive information can be associated with each picture (i.e. Interpretive Picture 218, etc.) automatically or by an administrator of the publically available picture repository. In another example, Interpretive Pictures Repository 118 comprises a repository available to subscribers or members of a picture sharing service such as, for example, flickr.com, tinypic.com, imgur.com, postimage.org, photobucket.com, and/or other picture sharing services. Such Interpretive Pictures Repository 118 may provide any of the previously described interpretive information on each of the pictures (i.e. Interpretive Pictures 218, etc.) as well as more detailed information such as the exact object or place depicted in a picture (i.e. Lamborghini Aventador, John Doe, Giuliano's Restaurant, etc.), location information on where the object or place is located (i.e. latitude/longitude/altitude, address, geo-spatial coordinates, etc.), and/or other information. Such interpretive information can be associated with each picture (i.e. Interpretive Pictures 218, etc.) by a member who uploaded the picture into the picture sharing service. In yet another example, Interpretive Pictures Repository 118 comprises a repository available to subscribers or members of social media that include picture sharing functionality such as Facebook, Twitter, and/or other social media. Such Interpretive Pictures Repository 118 may include any of the previously described functionalities of publically available picture repositories, picture sharing services, and/or other picture services, databases, or applications.

Figure 42:
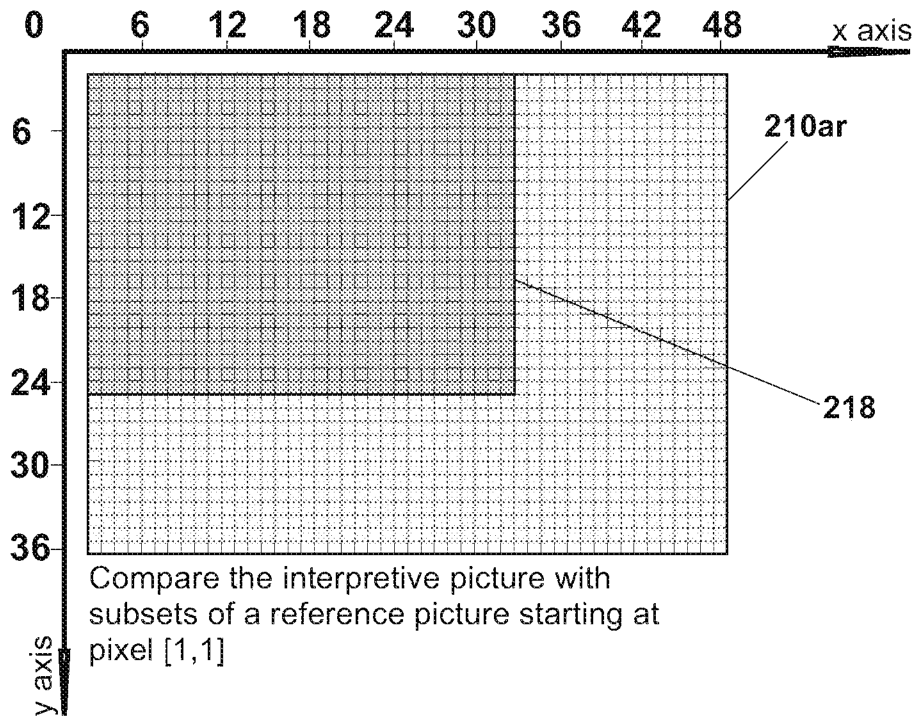
FIG. 42 illustrates an embodiment of picture processing for interpreting Still Pictures 210*a*, 210*b*, 210*c*, 210*d*, etc.

Referring to FIG. 42, the illustration shows an embodiment of picture processing for interpreting Still Pictures 210*a*, 210*b*, 210*c*, 210*d*, etc. MDP Unit 100 comprising the functionality for interpreting Still Pictures 210*a*, 210*b*, 210*c*, 210*d*, etc. enables interpretation of the content of Still Pictures 210*a*, 210*b*, 210*c*, 210*d*, etc. Such interpretation may produce interpretive information that can then be used to enhance user experience and/or further define or extend the functionalities of Still Pictures 210*a*, 210*b*, 210*c*, 210*d*, etc. or Multi-directional Still Pictures 200.

In some embodiments, interpreting a Still Picture 210*a*, 210*b*, 210*c*, 210*d*, etc. includes comparing a Still Picture 210*a*, 210*b*, 210*c*, 210*d*, etc. of a Multi-directional Still Picture 200 with an Interpretive Picture 218 to determine if a subset of the compared Still Picture 210*a*, 210*b*, 210*c*, 210*d*, etc. includes all or a portion (i.e. subset, etc.) of the Interpretive Picture 218. Finding a Still Picture 210*a*, 210*b*, 210*c*, 210*d*, etc. whose subset includes all or a portion (i.e. subset, etc.) of an Interpretive Picture 218 may indicate that interpretive information associated with the interpretive Picture 218 also pertains to the compared Still Picture 210*a*, 210*b*, 210*c*, 210*d*, etc. or to the Multi-directional Still Picture 200 to which the compared Still Picture 210*a*, 210*b*, 210*c*, 210*d*, etc. belongs. This indication can be derived from a premise that if a portion (i.e. subset, etc.) of content depicted in one digital picture (i.e. reference picture, etc.) includes all or a portion of content depicted in another digital picture (i.e. Interpretive Picture 218, etc.), the two digital pictures may share all or some of the same interpretive information on the common content. In some embodiments, the system may automatically select or present a user to select which of the interpretive information of Interpretive Picture 218 to include or associate with the reference picture. In some aspects, comparing digital pictures to determine if a subset of one includes all or a portion (i.e. subset, etc.) of another picture can be performed by determining if a subset of pixels of one picture (i.e. reference picture, etc.) matches or sufficiently matches all or a portion of pixels of another picture (i.e. Interpretive Picture 218, etc.). The threshold for similarity in each of the pixels required for a match or sufficient match may be set or adjusted by a user or automatically. The threshold for the number of pixels required for a match or sufficient match can similarly be set or adjusted. Both thresholds and sufficient similarity comparison process are previously described in Comparator 112. Interpretive information of an Interpretive Picture 218 whose subset is found to match or sufficiently match a subset of a Still Picture 210*a*, 210*b*, 210*c*, 210*d*, etc. can then be included in or associated with the compared Still Picture 210*a*, 210*b*, 210*c*, 210*d*, etc. or the Multi-directional Still Picture 200 to which the compared Still Picture 210*a*, 210*b*, 210*c*, 210*d*, etc. belongs. If a match or sufficient match is not found between any subsets of a Still Picture 210*a*, 210*b*, 210*c*, 210*d*, etc. (i.e. reference picture) and any subsets of an interpretive Picture 218, the comparison can be performed between subsets of the Still Picture 210*a*, 210*b*, 210*c*, 210*d*, etc. and subsets of other Interpretive Pictures 218 in Interpretive Pictures Repository 118. When the comparison is complete between subsets of one Still Picture 210*a*, 210*b*, 210*c*, 210*d*, etc. (i.e. reference picture) and subsets of interpretive Pictures 218 in Interpretive Pictures Repository 118, another Still Picture 210*a*, 210*b*, 210*c*, 210*d*, etc. of any Multi-directional Still Picture 200 in a MDP application can be used as a new reference picture whose subsets may be compared with Interpretive Pictures 218 in Interpretive Pictures Repository 118 until all Still Pictures 210*a*, 210*b*, 210*c*, 210*d*, etc. and all Interpretive Pictures 218 are processed (i.e. compared, etc.). As such, subsets of all Still Pictures 210*a*, 210*b*, 210*c*, 210*d*, etc. in a MDP application (i.e. collection of multi-directional still or motion pictures, etc.) may be compared with all Interpretive Pictures 218 in Interpretive Pictures Repository 118 to find all Still Pictures 210*a*, 210*b*, 210*c*, 210*d*, etc. whose subsets include all or a portion of any Interpretive Pictures 218 in Interpretive Pictures Repository 118. In some embodiments, any of the previously described resizing or incremental resizing techniques or programs can be utilized to resize Interpretive Picture 218 or any other picture to find a match or sufficient match. Also, any of the previously described picture comparison or detection techniques can be utilized in or in combination with any embodiments comprising interpretation of Still Pictures 210*a*, 210*b*, 210*c*, 210*d*, etc.

In one example, picture processing can be implemented to interpret Still Pictures 210*a*, 210*b*, 210*c*, 210*d*, etc. of Multi-directional Still Pictures 200. A MDP application (i.e. collection of multi-directional still or motion pictures, etc.) may include a Multi-directional Still Picture 200 comprising a Forward Still Picture 210*ar*. Interpretive Pictures Repository 118 may include an Interpretive Picture 218, Forward Still Picture 210*ar* may be a reference picture with which Interpretive Pictures 218 in the Interpretive Pictures Repository 118 may be compared in one cycle of comparisons. Forward Still Picture 210*ar* and Interpretive Picture 218 can be compared to determine if a subset of pixels of Forward Still Picture 210*ar* matches or sufficiently matches all or a portion (i.e. subset, etc.) of pixels of Interpretive Picture 218. Interpretive Picture 218 may first be compared with an initial subset of Forward Still Picture 210*ar* starting at pixel [1,1] as shown in FIG. 42. If a match or sufficient match is not found, interpretive Picture 218 may then be compared with a subset of Forward Still Picture 210*ar* starting at pixel [2,1]. If a match or sufficient match is still not found, Interpretive Picture 218 may then be compared with subsets of Forward Still Picture 210*ar* each starting at remaining pixels in y line 1 (i.e. [3,1], [4,1], [5,1], . . . [48,1]). If a match or sufficient match is still not found, Interpretive Picture 218 may then be compared with subsets of Forward Still Picture 210*ar* each starting at remaining pixels in y lines 2 (i.e. [1,2], [2,2], [3,2], . . . [48,2]), 3, 4, and so on until the last pixel of Forward Still Picture 210*ar*. The comparison may include any initial subset of Forward Still Picture 210*ar* such as, for example, a subset in the middle of Forward Still Picture 210*ar*, subset at the end of Forward Still Picture 210*ar*, subset at right of Forward Still Picture 210*ar*, subset at left of Forward Still Picture 210*ar*, and/or any other initial subset. Also, the comparison may include any search pattern for subsets of Forward Still Picture 210*ar* such as, for example, linear searching in any direction, outward searching from a middle subset, forward searching from a region in the beginning, backward searching from a region at the end, and/or any other search pattern. If any subset of Forward Still Picture 210*ar* is found to match or sufficiently match all or a portion (i.e. subset, etc.) of Interpretive Picture 218, interpretive information of Interpretive Picture 218 may be included in or associated with Forward Still Picture 210*ar* or a Multi-directional Still Picture 200 to which Forward Still Picture 210*ar* belongs. Any of the described steps for comparing subsets of Forward Still Picture 210*ar* with Interpretive Picture 218 can be performed among all Still Pictures 210*a*, 210*b*, 210*c*, 210*d*, etc. in a MDP application (i.e. collection of multi-directional still or motion pictures, etc.) and all Interpretive Pictures 218 in Interpretive Pictures Repository 118. In some aspects, MDP Unit 100 includes an editor, graphical user interface or other means through which a user can add additional interpretive information (i.e. interpretive information that the automatic process may have missed, etc.) and/or modify interpretive information (i.e. interpretive information that the automatic process may have included erroneously, etc.).

The described techniques for interpreting Still Pictures 210*a*, 210*b*, 210*c*, 210*d*, etc. can similarly be utilized for interpreting Motion Pictures 410*a*, 410*b*, 410*c*, 410*d*, etc. where content interpretation and/or other described operations may be performed in streams of still pictures. In some embodiments in which interpretive Picture 218 is a still picture, interpretation of a Motion Picture 410*a*, 410*b*, 410*c*, 410*d*, etc. can be performed as previously described where processing or comparisons may be performed between the Interpretive Picture 218 and each still picture (i.e. frame, etc.) in a stream of still pictures (i.e. motion picture, video, etc.) to find a match or sufficient match. Therefore, additional cycles of processing or comparisons may be performed. When a match or sufficient match is found, interpretive information of the interpretive Picture 218 can be included in or associated with the specific matching or sufficiently matching still picture (i.e. frame, etc.) in the stream, with the Motion Picture 410*a*, 410*b*, 410*c*, 410*d*, etc., with a Multi-directional Motion Picture 400 to which the Motion Picture 410*a*, 410*b*, 410*c*, 410*d*, etc. belongs, or with other element. In some embodiments in which Interpretive Picture 218 itself is a motion picture (i.e. stream of still pictures, etc.), interpretation of a Motion Picture 410*a*, 410*b*, 410*c*, 410*d*, etc. can be performed by processing or comparisons of still pictures (i.e. frames, etc.) of the interpretive Picture 218 and still pictures (i.e. frames, etc.) of the Motion Picture 410*a*, 410*b*, 410*c*, 410*d*, etc. to find a match or sufficient match among one or more still pictures in both streams. In some aspects, interpretation of a Motion Picture 410*a*, 410*b*, 410*c*, 410*d*, etc. can be performed by processing or comparisons of groups of still pictures of the interpretive Picture 218 and groups of still pictures of the Motion Picture 410*a*, 410*b*, 410*c*, 410*d*, etc. to find a match or sufficient match among one or more still pictures in both groups. A group of still pictures may include a number of consecutive still pictures, for example. The processing or comparisons can be performed by traversing the streams of still pictures (i.e. motion pictures, video, etc.). Also, a threshold can be defined by user or automatically for a number of matching or sufficiently matching still pictures (i.e. frames, etc.) in a group of still pictures required for a match or sufficient match.

Figure 43A:
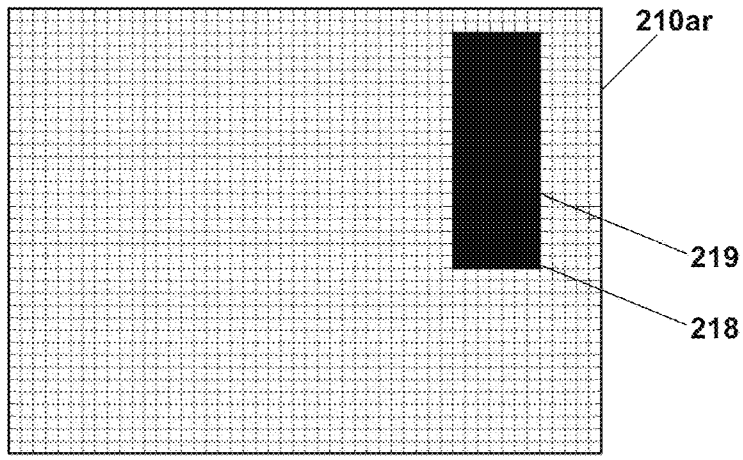
FIG. 43A shows an embodiment of a rectangular matching Subset 219.
Figure 43B:
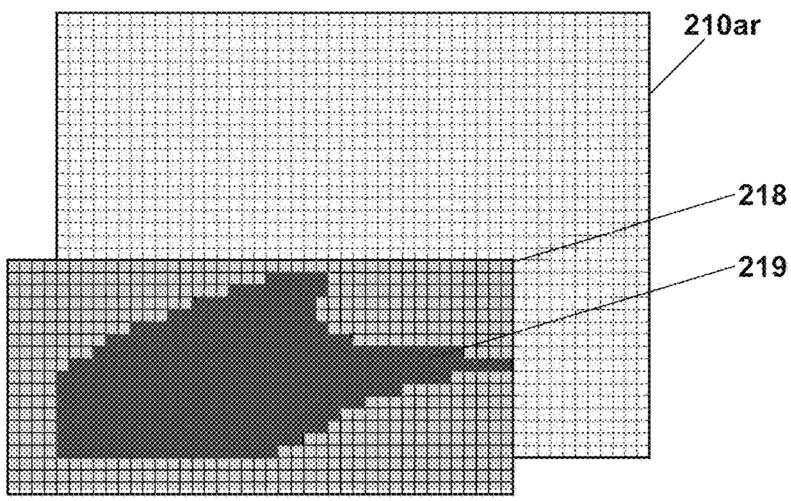
FIG. 43B shows an embodiment of an oddly shaped sufficiently matching Subset 219.
Figure 43C:
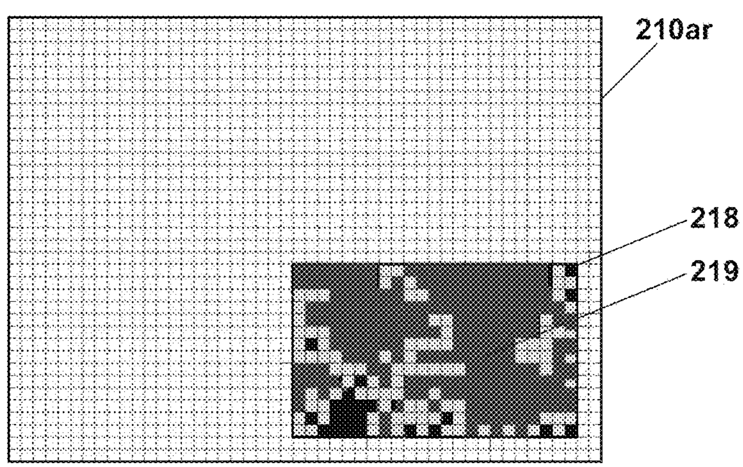
FIG. 43C shows an embodiment of a scattered or random sufficiently matching Subset 219.

Referring to FIG. 43A, an embodiment of a rectangular sufficiently matching Subset 219 between a Forward Still Picture 210*ar* (i.e. reference picture, etc.) and an Interpretive Picture 218 is illustrated. The illustration shows an example in which all pixels of interpretive Picture 218 sufficiently match a Subset 219 of Forward Still Picture 210*ar*. The illustration also shows an example where Subset 219 comprises all pixels of a digital picture (i.e. Subset 219 comprises the entire Interpretive Picture 218). Referring to FIG. 43B, an embodiment of an oddly shaped sufficiently matching Subset 219 between Forward Still Picture 210*ar* (i.e. reference picture, etc.) and Interpretive Picture 218 is illustrated. The illustration shows an example in which comparisons of pixels of Interpretive Picture 218 and pixels of Forward Still Picture 210*ar* can be performed where some pixels of Interpretive Picture 218 may be outside of Forward Still Picture 210*ar*. Referring to FIG. 43C, an embodiment of a scattered or random sufficiently matching Subset 219 between Forward Still Picture 210*ar* (i.e. reference picture, etc.) and Interpretive Picture 218 is illustrated. The illustration shows an example where some of the matching or sufficiently matching pixels may not be connected into a continuous shape. Any Still Picture 210*a*, 210*b*, 210*c*, 210*d*, etc. of any Multi-directional Still Picture 200 can be used in place of Forward Still Picture 210*ar*. In general, Subset 219 comprises a plurality of pixels of any shape or size such as squared, rectangular, triangular, circular, curved, round, oblique, oddly-shaped, scattered, random, and/or others. Subset 219 may be a product of and includes any features and embodiments of Comparator 112.

Figure 44:
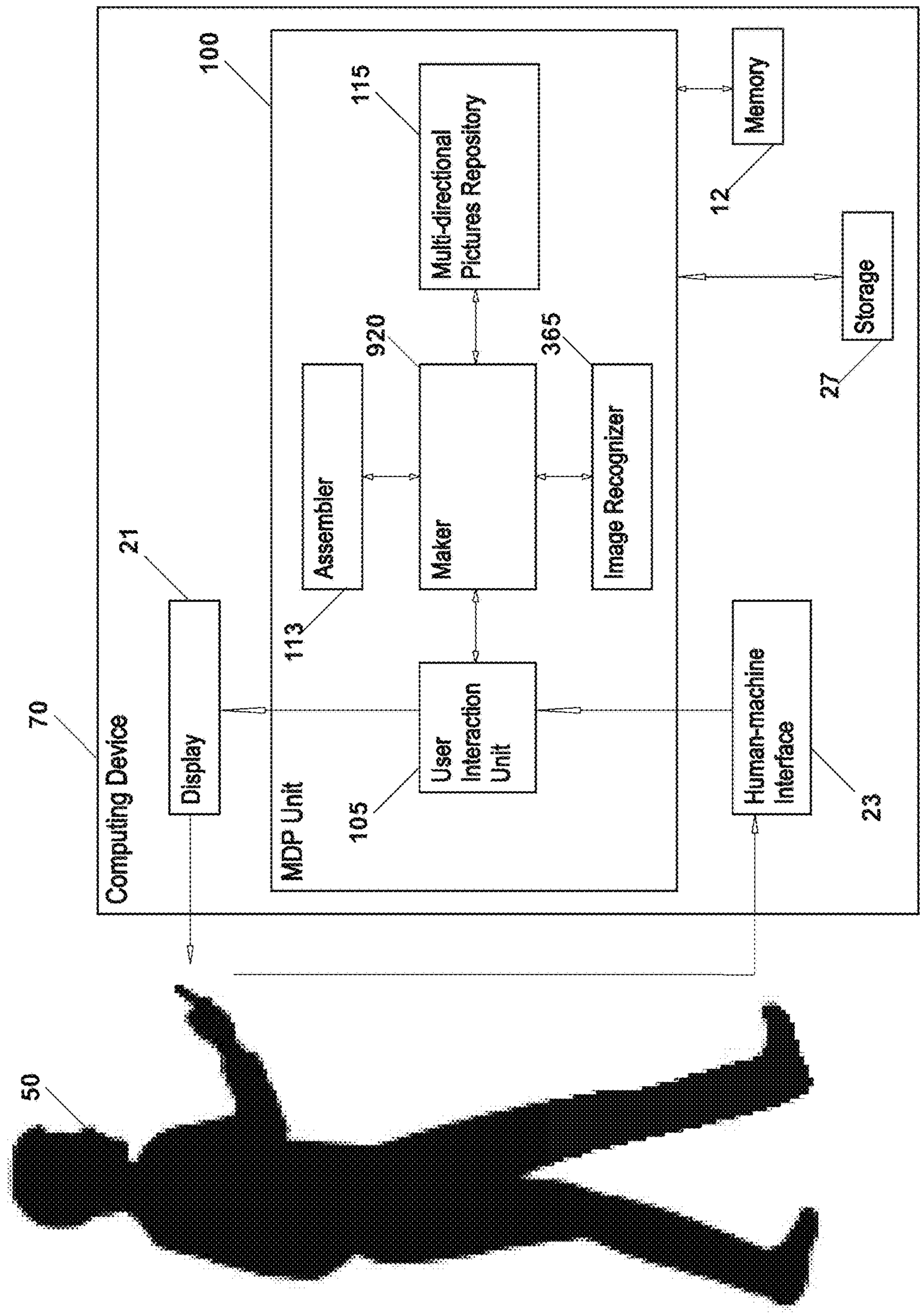
FIG. 44 illustrates an embodiment of MDP Unit 100 including image Recognizer 365.

Referring to FIG. 44, an embodiment of MDP Unit 100 including Image Recognizer 365 is illustrated. Image Recognizer 365 comprises the functionality for processing visual data into textual or other type of data or information (i.e. interpretive information, etc.), and/or other disclosed functionalities. Image Recognizer 365 comprises the functionality for processing visual data into interpretive information for use by elements of MDP Unit 100. Visual data includes digital pictures (i.e. bitmaps, vector graphics, etc.), digital video, and/or other visual data. Examples of file formats that can be utilized to store visual data include JPEG, GIF, TIFF, PNG, PDF, AVI, DivX, MPEG, and/or other file formats. In some aspects, image Recognizer 365 can identify or recognize objects or persons from a picture or video frame (or portions thereof) by comparing regions of pixels from the picture or video frame with regions of pixels from a database of known pictures. The database of known pictures can be stored locally on Computing Device 70 or remotely on a Remote Computing Device 1310 accessible over a Network 1300 (previously described).

In some embodiments, optical character recognition (OCR) techniques and/or tools such as Asprise OCR software development kit (SDK), ABBYY FineReader Engine, Dynamsoft OCR SDK, Tesseract Engine, and/or others can be utilized for recognizing textual information in digital pictures. In some aspects, OCR techniques and/or tools may involve conversion of digital pictures (i.e. bitmaps, etc.) containing typewritten or printed textual data into computer-encoded text that can be edited, stored, or otherwise manipulated. For example, Asprise OCR SDK may process visual data from a digital picture containing textual shapes (i.e. a sign over a restaurant with inscribed text Giuliano's Restaurant, etc.) into interpretive information (i.e. text or identifier "Giuliano's Restaurant", etc.) that can be utilized by MDP Unit 100, and/or other elements.

In other embodiments, facial recognition techniques and/or tools such as OpenCV (Open Source Computer Vision) library, Animetrics FaceR API, Lambda Labs Facial Recognition API, Face++ SDK, Neven Vision (also known as N-Vision) Engine, and/or others can be utilized for recognizing faces in digital pictures. In some aspects, facial recognition techniques and/or tools may involve identifying and/or analyzing facial features such as the relative position, size, and/or shape of the eyes, nose, cheekbones, jaw, etc., which can then be used to search for pictures with matching features. For example, FaceR API may process visual data from a digital picture containing a person (i.e. Nelson Mandela, etc.) into interpretive information (i.e. identifier "Nelson Mandela", descriptor "South Africa", etc.) that can be utilized by MDP Unit 100, and/or other elements.

In further embodiments, object recognition techniques and/or tools such as OpenCV (Open Source Computer Vision) library, CamFind API, Kooaba, 6px API, Dextro API, and/or others can be utilized for recognizing objects (i.e. objects, people, etc.) in digital pictures. In some aspects, object recognition techniques and/or tools may involve identifying and/or analyzing object features such as lines, edges, ridge, corners or blobs, regions, and/or their relative positions, sizes, shapes, etc., which can then be used to search for pictures with matching features. For example, OpenCV library may process visual data from a digital picture containing an object (i.e. Taj Mahal, etc.) into interpretive information (i.e. identifier "Taj Mahal", descriptor "India", geo-coordinates 27.1750° N, 78.0419° E, etc.) that can be utilized by MDP Unit 100, and/or other elements.

Figure 45:
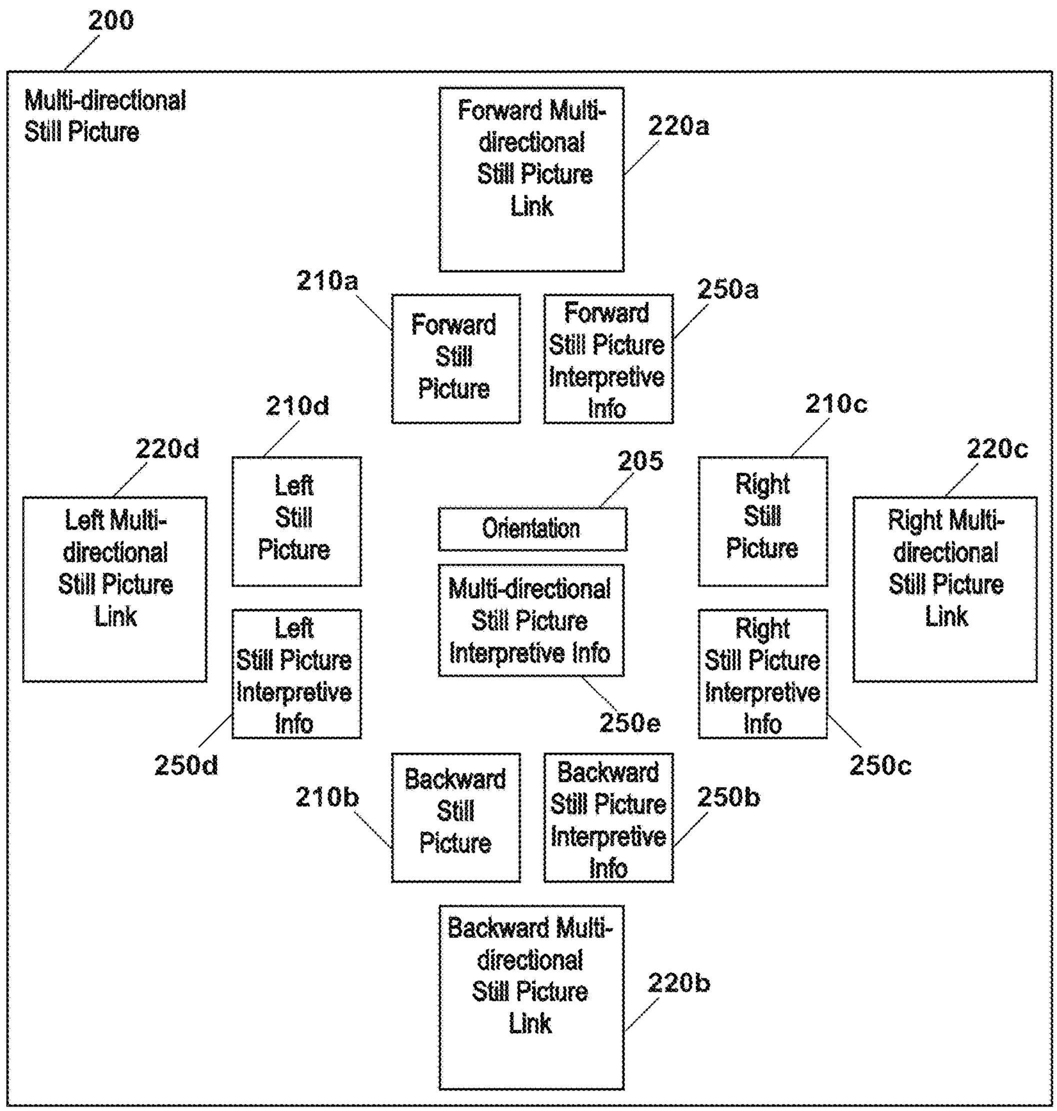
FIG. 45 shows an embodiment of Multi-directional Still Picture 200 comprising Interpretive Infos 250*a*, 250*b*, 250*c*, 250*d*, 250*e*, etc.

Referring to FIG. 45, an embodiment of Multi-directional Still Picture 200 comprising Interpretive Information 250*a*, 250*b*, 250*c*, 250*d*, 250*e*, etc. (also referred to as Interpretive Infos) is illustrated. While Interpretive Infos 250 can be referred to or illustrated as Interpretive Infos 250*a-e*, one of ordinary skill in art will understand that any number of Interpretive Infos 250*a-n* can be utilized. Once interpreting of a Still Picture 210*a*, 210*b*, 210*c*, 210*d*, etc. is complete and interpretive information identified, the interpretive information can be included in or associated with the Still Picture 210*a*, 210*b*, 210*c*, 210*d*, etc. or a Multi-directional Still Picture 200 to which the Still Picture 210*a*, 210*b*, 210*c*, 210*d*, etc. belongs, in some aspects, interpretive information can be stored in an external data structure or repository and associated with the Still Picture 210*a*, 210*b*, 210*c*, 210*d*, etc. or Multi-directional Still Picture 200 to which the Still Picture 210*a*, 210*b*, 210*c*, 210*d*, etc. belongs. Any other storage or association arrangement can be implemented. In other aspects, interpretive information can be included in or associated with any element of a Multi-directional Still Picture 200 such as Multi-directional Still Picture Link 220*a*, 220*b*, 220*c*, 220*d*, etc., Orientation 205, Multi-directional Still Picture Angle 230*a*, 230*b*, 230*c*, 230*d*, etc., Multi-directional Still Picture Distance 240*a*, 240*b*, 240*c*, 240*d*, etc., and/or other element. Interpretive info 250*a*, 250*b*, 250*c*, 250*d*, 250*e*, etc. comprises any of the previously described interpretive or other information included in or associated with a particular Still Picture 210*a*, 210*b*, 210*c*, 210*d*, etc., a particular Multi-directional Still Picture 200, or another element. In some embodiments, Multi-directional Still Picture 200 comprises the functionality for storing a data structure whose data fields include one or more Interpretive Infos 250. In one example, a Multi-directional Still Picture 200 includes a data structure comprising fourteen data fields: (1) Forward Still Picture 210*a*, (2) Backward Still Picture 210*b*, (3) Right Still Picture 210*c*, (4) Left Still Picture 210*d*, (5) Forward Multi-directional Still Picture Link 220*a*, (6) Backward Multi-directional Still Picture Link 220*b*, (7) Right Multi-directional Still Picture Link 220*c*, (8) Left Multi-directional Still Picture Link 220*d*, (9) Forward Still Picture Interpretive Info 250*a*, (10) Backward Still Picture Interpretive Info 250*b*, (11) Right Still Picture Interpretive Info 250*c*, (12) Left Still Picture Interpretive Info 250*d*, (13) Multi-directional Still Picture Interpretive Info 250*e*, and/or (14) Orientation 205.

In some embodiments, Interpretive Info 250*a*, 250*b*, 250*c*, 250*d*, 250*e*, etc. can be provided to a user as he/she operates a MDP application. Such interpretive info 250*a*, 250*b*, 250*c*, 250*d*, 250*e*, etc. may include identifying, descriptive, associative, and/or other interpretive information on a displayed Still Picture 210*a*, 210*b*, 210*c*, 210*d*, etc. that can be presented to a user to provide additional information on what is shown on the displayed Still Picture 210*a*, 210*b*, 210*c*, 210*d*, etc. For example, User 50 can utilize a collection of Multi-directional Still Pictures 200 (i.e. MDP application) representing an object such as Taj Mahal by moving from one Multi-directional Still Picture 200 to another as previously described. A Still Picture 210*a*, 210*b*, 210*c*, 210*d*, etc. of a Multi-directional Still Picture 200 may include a view of Mumtaz Mahal's tomb within Taj Mahal, at which point Interpretive Info 250*a*, 250*b*, 250*c*, 250*d*, 250*e*, etc. can be displayed to the user identifying the object in the picture as the tomb of Mumtaz Mahal. Additional Interpretive Info 250*a*, 250*b*, 250*c*, 250*d*, 250*e*, etc. can also be displayed such as description of the tomb, location of the tomb (i.e. relative location within Taj Mahal or general location, etc.), associative information on other resources with similar content, and/or other information. Interpretive information on the content of what the user is looking at is clearly useful information that the user would otherwise not have without further research and effort.

In other embodiments, Interpretive Info 250*a*, 250*b*, 250*c*, 250*d*, 250*e*, etc. can be used to further define or extend the functionality of any Still Picture 210*a*, 210*b*, 210*c*, 210*d*, etc., any Multi-directional Still Picture 200, a MDP application, or any of the disclosed elements. In some aspects, interpretive Info 250*a*, 250*b*, 250*c*, 250*d*, 250*e*, etc. regarding location of a Multi-directional Still Picture 200 can be used to find or position the Multi-directional Still Picture 200 on an electronic map. For example, a collection of Multi-directional Still Pictures 200 representing an object such as Taj Mahal may be created by using any of the previously described techniques. Initially, Multi-directional Still Pictures 200 may not include any information about the locations of the object which they represent. MDP Unit 100 comprising the functionality for interpreting Still Pictures 210*a*, 210*b*, 210*c*, 210*d*, etc. can be utilized to produce Interpretive Info 250*a*, 250*b*, 250*c*, 250*d*, 250*e*, etc. including location information such as geo-spatial coordinates as previously described. Interpretive Info 250*a*, 250*b*, 250*c*, 250*d*, 250*e*, etc. comprising geo-spatial coordinates such as latitude and longitude can then be utilized to automatically position a Multi-directional Still Picture 200 on an electronic map (i.e. Map 820, etc.). Specifically, in this example, a Multi-directional Still Picture 200 comprising coordinates 27.1750° N, 78.0419° E would be positioned in a location of Taj Mahal in Agra, India on an electronic map. Other Multi-directional Still Pictures 200 representing locations of Taj Mahal can similarly be positioned on an electronic map using similar Interpretive Info 250*a*, 250*b*, 250*c*, 250*d*, 250*e*, etc. regarding their locations. The Multi-directional Still Pictures 200 positioned on an electronic map may then be clickable to enable a user to quickly access a Multi-directional Still Picture 200 of interest. In other aspects, Interpretive info 250*a*, 250*b*, 250*c*, 250*d*, 250*e*, etc. regarding location of a Multi-directional Still Picture 200 can be used to calculate distances, angles, and/or other such information among Multi-directional Still Pictures 200. For example, distance (i.e. Multi-directional Still Picture Distance 240*a*, 240*b*, 240*c*, 240*d*, etc., etc.) and/or angle (i.e. Multi-directional Still Picture Angle 230*a*, 230*b*, 230*c*, 230*d*, etc., etc.) among Multi-directional Still Pictures 200 can be calculated or estimated from their coordinates by utilizing Pythagorean theorem, Euclidean distance formula, Haversine formula, trigonometry, and/or other theorems, formulas, or functions. Angle calculation may include a reference point relative to which the angle is calculated. Any reference point can be utilized such as an object (i.e. tree, building, mountain, etc.), a side of the world (i.e. north, south, east, west, northeast, northwest, southeast, southwest, etc.), a line (i.e. x, y, or z axis, equator, prime meridian, etc.), any Multi-directional Still Picture 200 for which location is known, an arbitrary point (i.e. point with coordinates [0,0], etc.), and/or any other reference point. In yet other aspects, Interpretive Info 250*a*, 250*b*, 250*c*, 250*d*, 250*e*, etc. regarding location of a Multi-directional Still Picture 200 can be used to automatically create links among proximal Multi-directional Still Pictures 200. For example, proximities (i.e. distances, etc.) and/or angles (i.e. directions, bearings, etc.) can be calculated as previously described among Multi-directional Still Pictures 200 representing locations of an object such as Taj Mahal. Links may then be created automatically among Multi-directional Still Pictures 200 whose proximities fall within one or both of a minimum and a maximum proximity thresholds and/or whose angles fall within one or both of a minimum and a maximum angle thresholds. The proximity and angle thresholds can be defined by a user or automatically defined by the system. In one example, the minimum and maximum proximity thresholds can be defined based on the scale of the represented object (i.e. the thresholds may be different for a room and a city block, etc.). In another example, the minimum and maximum proximity thresholds can be defined based on distances (i.e. Multi-directional Still Picture Distances 240*a*, 240*b*, 240*c*, 240*d*, etc., etc.) to Multi-directional Still Pictures 200 pointed to by existing Multi-directional Still Picture Links 220*a*, 220*b*, 220*c*, 220*d*, etc. (i.e. the thresholds may be defined to find closer or better positioned Multi-directional Still Pictures 200, etc.). The minimum and maximum proximity thresholds can be defined based on any other criteria or inputs in alternate embodiments. In a further example, the minimum and maximum angle thresholds can also be defined based on angles (i.e. Multi-directional Still Picture Angles 230*a*, 230*b*, 230*c*, 230*d*, etc., etc.) to Multi-directional Still Pictures 200 pointed to by existing Multi-directional Still Picture Links 220*a*, 220*b*, 220*c*, 220*d*, etc. (i.e. the thresholds may be defined to find better angled Multi-directional Still Pictures 200, etc.). The minimum and maximum angle thresholds can be defined based on any other criteria or inputs in alternate embodiments. Proximity and angle thresholds can be utilized in combination with each other to link a Multi-directional Still Picture 200 to most suitable other Multi-directional Still Pictures 200 in a collection of Multi-directional Still Pictures 200. For example, proximity and angle thresholds can be utilized in combination to automatically link proximal Multi-directional Still Pictures 200 in directions in which a link may not exist or to replace an existing link (i.e. if a closer or better positioned/angled Multi-directional Still Picture 200 is found, etc.).

Figure 46:
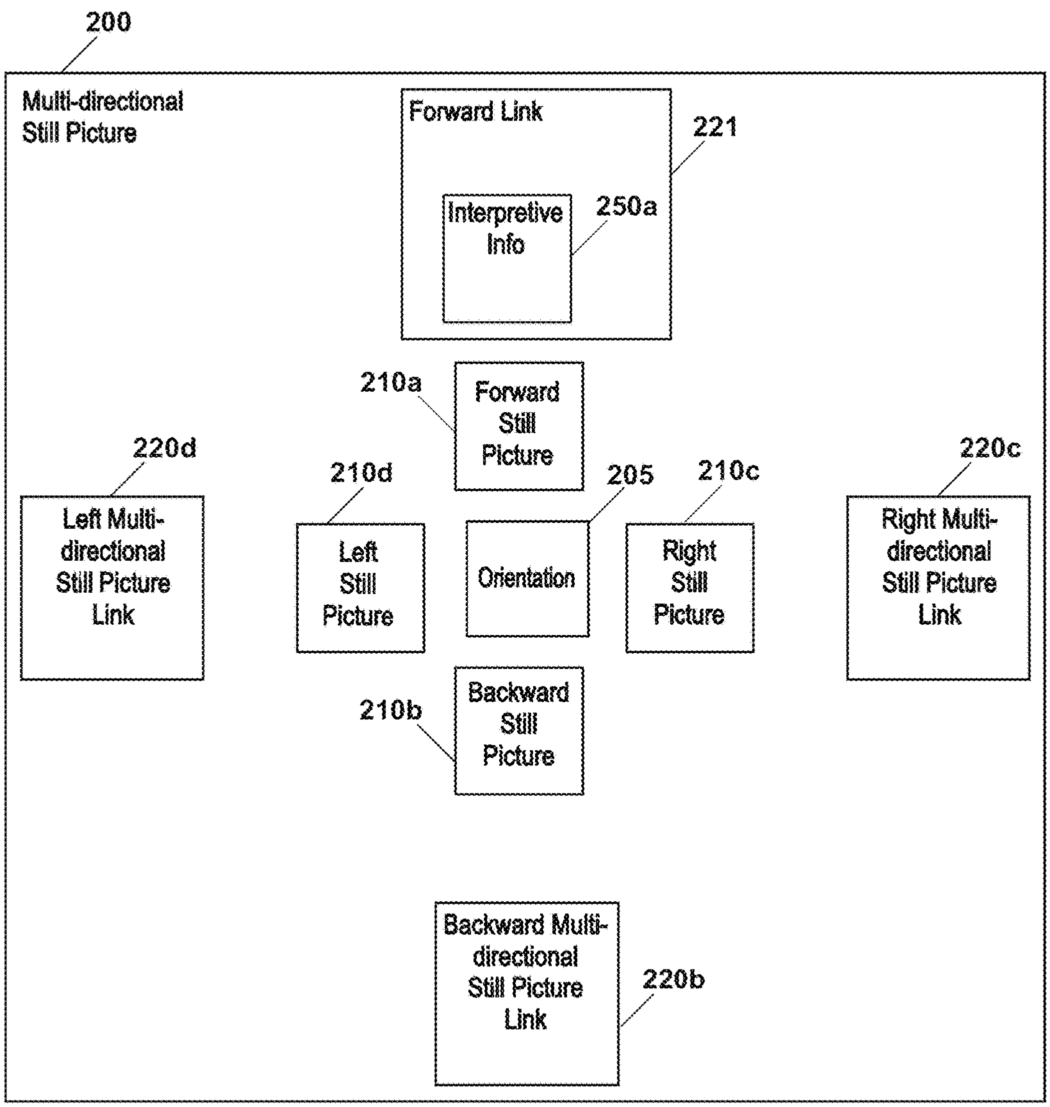
FIG. 46 shows an embodiment of Multi-directional Still Picture 200 comprising Interpretive Info 250*a* included in Forward Link 221.

In further embodiments, Interpretive Info 250*a*, 250*b*, 250*c*, 250*d*, 250*e*, etc. can be used to relate, reference, or link any Multi-directional Still Picture 200, a MDP application, or any of the disclosed elements with content, resources, systems, applications, and/or processes comprising information on an object, person, or place depicted in a Still Picture 210*a*, 210*b*, 210*c*, 210*d*, etc. In some aspects, interpretive information identifying, describing, or referencing an object from a Still Picture 210*a*, 210*b*, 210*c*, 210*d*, etc. of a Multi-directional Still Picture 200 can be used to link the Multi-directional Still Picture 200 with a next logical or likely operation the user may want to perform with the object such as access or enter the object (i.e. enter a building, enter a business, etc.), utilize a representation of the object (i.e. utilize another MDP application representing the object, utilize a virtual tour of the object, utilize a 3D model of the object, etc.), see additional information about the object (i.e. see a picture or video of the object, visit a website comprising information on the object, etc.), and/or perform other operations (i.e. utilize an external application or process, etc.). Such Interpretive Info 250*a*, 250*b*, 250*c*, 250*d*, 250*e*, etc. can be included in or associated with any of the disclosed elements to facilitate the linking. As shown for instance in FIG. 46, Interpretive Info 250*a* can be included in or associated with a Forward Link 221 where Interpretive Info 250*a* comprises a reference or pointer to content, resource, system, application, and/or process including information on an object, person, or place depicted in a Still Picture 210*a*, 210*b*, 210*c*, 210*d*, etc. Forward Link 221 may include any features and embodiments of the previously described Multi-directional Still Picture Link 220*a*, 220*b*, 220*c*, 220*d*, etc. or Multi-directional Motion Picture Link 420*a*, 420*b*, 420*c*, 420*d*, etc. In one example, a user can utilize a collection of Multi-directional Still Pictures 200 (i.e. MDP application) representing an object such as Taj Mahal's garden by moving from one Multi-directional Still Picture 200 to another as previously described. When user reaches the entrance into the main building, MDP Unit 100 comprising the functionality for interpreting Still Pictures 210*a*, 210*b*, 210*c*, 210*d*, etc. may recognize that the current view comprises the entrance into an object such as Taj Mahal's main building and automatically link the current Multi-directional Still Picture 200 with a virtual tour application representing interior of Taj Mahal's main building. The automatic linking may include creating a new or replacing an existing link to point to the virtual tour application representing interior of Taj Mahal's main building. In another example, user can utilize a collection of Multi-directional Still Pictures 200 (i.e. MDP application) representing a street on which an object such as Giuliano's restaurant (or any other store or business, object, etc.) is located by moving from one Multi-directional Still Picture 200 to another as previously described. When user reaches an entrance into the restaurant, MDP Unit 100 comprising the functionality for interpreting Still Pictures 210*a*, 210*b*, 210*c*, 210*d*, etc. may recognize that currently displayed Still Picture 210*a*, 210*b*, 210*c*, 210*d*, etc. shows a sign or another visual feature of Giuliano's Restaurant and automatically link the current Multi-directional Still Picture 200 with a representation of the restaurant (i.e. MDP application of the restaurant, virtual tour of the restaurant, etc.) or with additional content or resources on the restaurant (i.e. the restaurant's web site, the restaurant's Wikipedia site, the restaurant's Facebook site, etc.). In a further example, user can utilize a collection of Multi-directional Still Pictures 200 (i.e. MDP application) representing a street on which an object such as Apple store is located by moving from one Multi-directional Still Picture 200 to another as previously described. When user reaches an entrance into the Apple store, MDP Unit 100 comprising the functionality for interpreting Still Pictures 210*a*, 210*b*, 210*c*, 210*d*, etc. may recognize that currently displayed Still Picture 210*a*, 210*b*, 210*c*, 210*d*, etc. shows a sign for "Apple", Apple's company logo (i.e. bitten apple, etc.), or any other visual feature of the company and automatically link the current Multi-directional Still Picture 200 with Apple's online store for the user to purchase Apple products, with a representation of the Apple store (i.e. MDP application of the store, virtual tour of the store, etc.), or with additional content or resources on the store (i.e. the store's web site, the store's Wikipedia site, the store's Facebook site, etc.).

Figure 47:
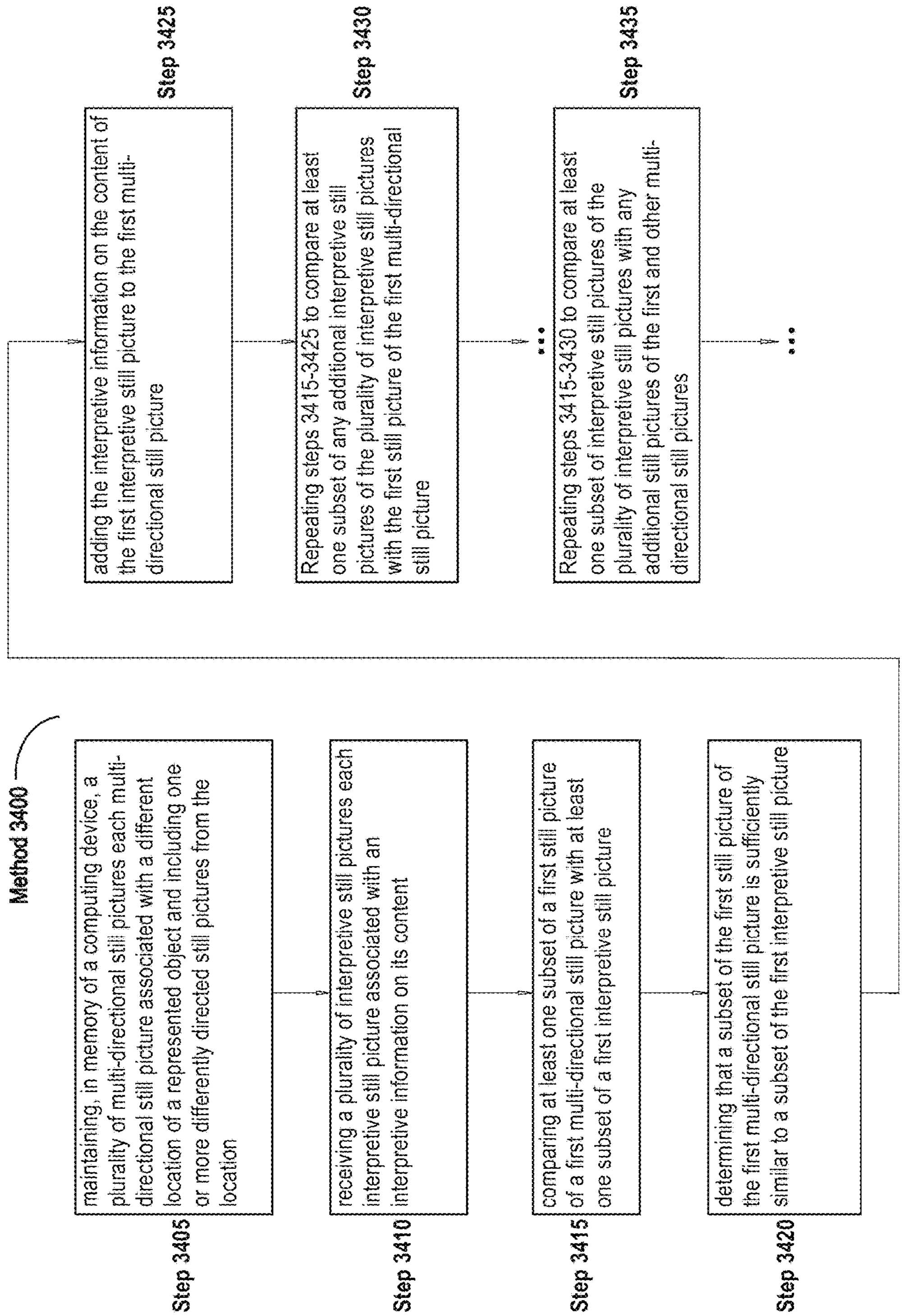
FIG. 47 illustrates a flow chart diagram of an embodiment of a method 3400 implemented by MDP Unit 100.

Referring to FIG. 47, the illustration shows an embodiment of a method 3400 for interpreting Still Pictures 210*a*, 210*b*, 210*c*, 210*d*, etc. The method may therefore be used on one or more computing devices to generate interpretive information about a Still Picture 210*a*, 210*b*, 210*c*, 210*d*, etc. in some embodiments, the method may be used on one or more computing devices operating an interface for MDP Unit 100 to generate interpretive information about a Still Picture 210*a*, 210*b*, 210*c*, 210*d*, etc. Some or all steps of this method can similarly be implemented for interpreting Motion Pictures 410*a*, 410*b*, 410*c*, 410*d*, etc. In some embodiments, the steps of this method can be used in combination with steps of any of the disclosed methods such as method 2200 for generating a collection of Multi-directional Still Pictures 200, method 2400 for generating a collection of Multi-directional Motion Pictures 400, and/or method 3200 for detecting Still Pictures 210*a*, 210*b*, 210*c*, 210*d*, etc. from a collection of digital pictures.

At step 3405, a plurality of multi-directional still pictures are maintained in memory of a computing device each multi-directional still picture associated with a different location of a represented object and including one or more differently directed still pictures from the location. At step 3410, a plurality of interpretive still pictures are received each interpretive still picture associated with an interpretive information on its content. At step 3415, at least one subset of a first still picture of a first multi-directional still picture is compared with at least one subset of a first interpretive still picture. At step 3420, a determination is made that a subset of the first still picture of the first multi-directional still picture is sufficiently similar to a subset of the first interpretive still picture. At step 3425, the interpretive information on the content of the first interpretive still picture is added to the first multi-directional still picture. At step 3430, steps 3415-3425 are repeated to compare at least one subset of any additional interpretive still pictures of the plurality of interpretive still pictures with the first still picture of the first multi-directional still picture. At step 3435, steps 3415-3430 are repeated to compare at least one subset of interpretive still pictures of the plurality of interpretive still pictures with any additional still pictures of the first and other multi-directional still pictures.

Figure 48:
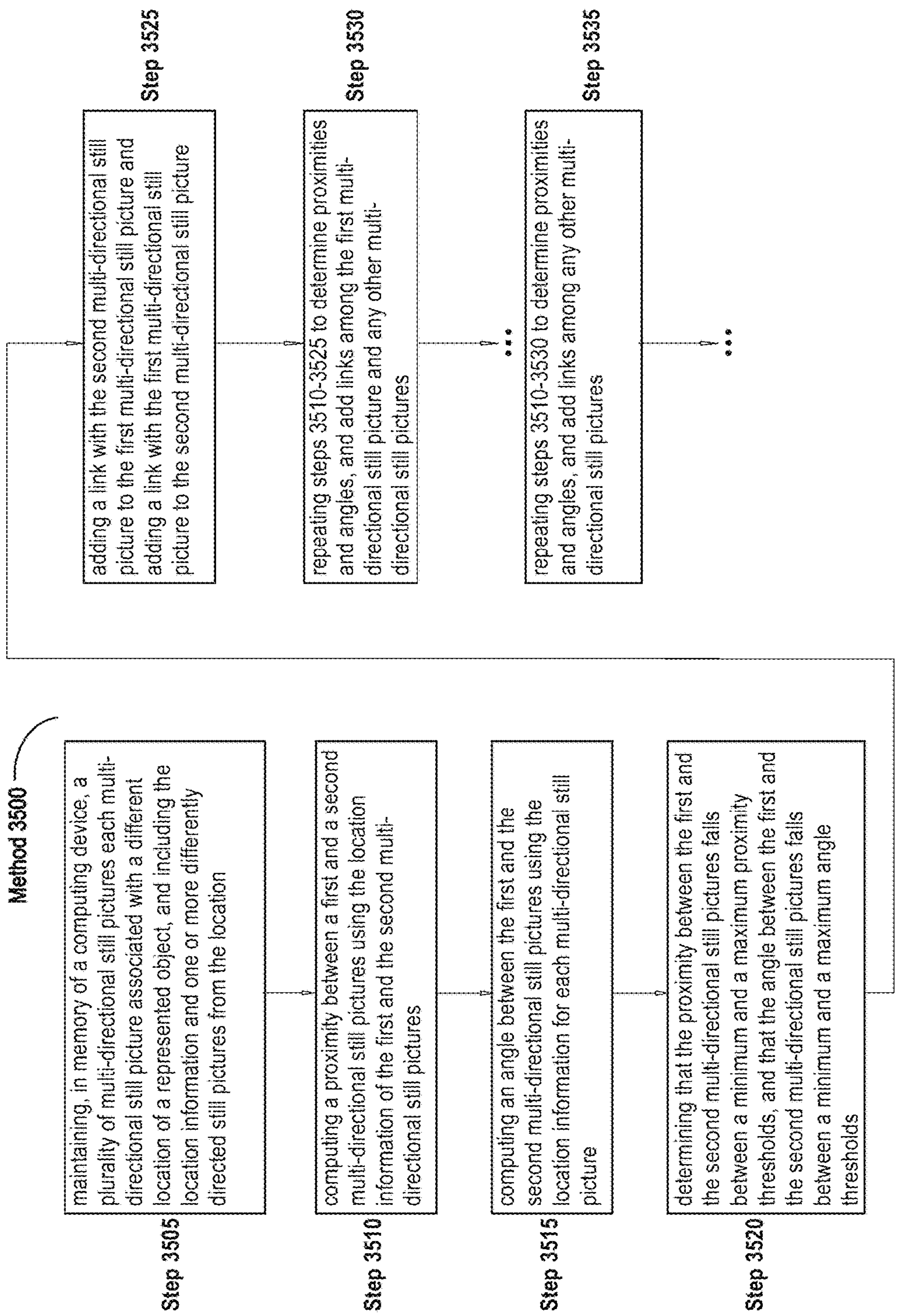
FIG. 48 illustrates a flow chart diagram of an embodiment of a method 3500 implemented by MDP Unit 100.

Referring to FIG. 48, the illustration shows an embodiment of a method 3500 for automatically creating Multi-directional Still Picture Links 220*a*, 220*b*, 220*c*, 220*d*, etc. using Interpretive info 250*a*, 250*b*, 250*c*, 250*d*, 250*e*, etc. The method may therefore be used on one or more computing devices to automatically create Multi-directional Still Picture Links 220*a*, 220*b*, 220*c*, 220*d*, etc. among proximal and/or properly angled Multi-directional Still Pictures 200 representing an object. In some embodiments, the method may be used on one or more computing devices operating an interface for MDP Unit 100 to automatically create Multi-directional Still Picture Links 220*a*, 220*b*, 220*c*, 220*d*, etc. among proximal and/or properly angled Multi-directional Still Pictures 200 representing an object. The method provides its functionalities in a user-friendly automatic process that requires no or minimal user effort. Some or all steps of this method can similarly be utilized for automatically creating Multi-directional Motion Picture Links 420*a*, 420*b*, 420*c*, 420*d*, etc. among proximal and/or properly angled Multi-directional Motion Pictures 400. In some embodiments, the steps of this method can be used in combination with steps of any of the disclosed methods such as method 2200 for generating a collection of Multi-directional Still Pictures 200, method 2400 for generating a collection of Multi-directional Motion Pictures 400, and/or method 3200 for detecting Still Pictures 210*a*, 210*b*, 210*c*, 210*d*, etc. from a collection of digital pictures.

At step 3505, a plurality of multi-directional still pictures are maintained in memory of a computing device each multi-directional still picture associated with a different location of a represented object, and including the location information and one or more differently directed still pictures from the location. At step 3510, a proximity is computed between a first and a second multi-directional still pictures using the location information of the first and the second multi-directional still pictures. At step 3515, an angle is computed between the first and the second multi-directional still pictures using the location information for each multi-directional still picture. At step 3520, a determination is made that the proximity between the first and the second multi-directional still pictures falls between a minimum and a maximum proximity thresholds, and that the angle between the first and the second multi-directional still pictures falls between a minimum and a maximum angle thresholds. At step 3525, a link with the second multi-directional still picture is added to the first multi-directional still picture and a link with the first multi-directional still picture is added to the second multi-directional still picture. At step 3530, steps 3510-3525 are repeated to determine proximities and angles, and add links among the first multi-directional still picture and any other multi-directional still pictures. At step 3535, steps 3510-3530 are repeated to determine proximities and angles, and add links among any other multi-directional still pictures.

In some embodiments, the teaching presented by the disclosure can be implemented in a device or system for automatically creating Multi-directional Still Picture Links 220*a*, 220*b*, 220*c*, 220*d*, etc. using interpretive info 250*a*, 250*b*, 250*c*, 250*d*, 250*e*, etc. The device or system may include Maker 920 and an interface, coupled to Maker 920, for receiving a plurality of multi-directional still pictures each multi-directional still picture associated with a different location of a represented object, and including the location information and one or more differently directed still pictures from the location. Maker 920 may be configured to compute a proximity and an angle between a first and a second multi-directional still pictures using the location information of the first and the second multi-directional still pictures. Maker 920 may be further configured to determine that the proximity between the first and the second multi-directional still pictures falls between a minimum and a maximum proximity thresholds, and that the angle between the first and the second multi-directional still pictures falls between a minimum and a maximum angle thresholds. The device or system may further include Assembler 113, coupled to Maker 920, for adding a link with the second multi-directional still picture to the first multi-directional still picture and adding a link with the first multi-directional still picture to the second multi-directional still picture. Any of the operations of the described elements can be performed repeatedly and/or in different orders in alternate embodiments. For example, Maker 920 can be implemented as a device or processor that receives or reads multi-directional still pictures and/or other elements from Multi-directional Pictures Repository 115. Maker 920 can also perform the previously described distance and angle computations among any multi-directional still pictures and determine that proximities and angles among any multi-directional still pictures fall between minimum and maximum thresholds. Assembler 113 can also be implemented as a device or processor that adds links to multi-directional still pictures whose proximities and angles are found to be within the minimum and maximum thresholds relative to other multi-directional still pictures. Maker 920 may then store the multi-directional still pictures including the added links in Multi-directional Pictures Repository 115. Maker 920 (or its functionalities), Assembler 113 (or its functionalities), and/or other disclosed elements can be implemented as separate hardware components or processors dedicated to their functionalities, they can be implemented as a single program or objects/modules/functions of a single program or separate programs operating on Processor 11, they can be provided in other suitable configurations, or a combination thereof in alternate embodiments. In some designs, Maker 920 may include some or all of the functionalities of Assembler 113 in which case Assembler 113 may be omitted. The device or system for automatically creating Multi-directional Still Picture Links 220*a*, 220*b*, 220*c*, 220*d*, etc. using Interpretive Info 250*a*, 250*b*, 250*c*, 250*d*, 250*e*, etc. can similarly be implemented for automatically creating Multi-directional Motion Picture Links 420_a_, 420_b_, 420_c_, 420_d_, etc. The device or system for automatically creating Multi-directional Still Picture Links 220_a_, 220_b_, 220_c_, 220_d_, etc. using Interpretive Info 250_a_, 250_b_, 250_c_, 250_d_, 250_e_, etc. may also include any functionalities or steps of any of the disclosed methods such as method 3500.

Figure 49A:
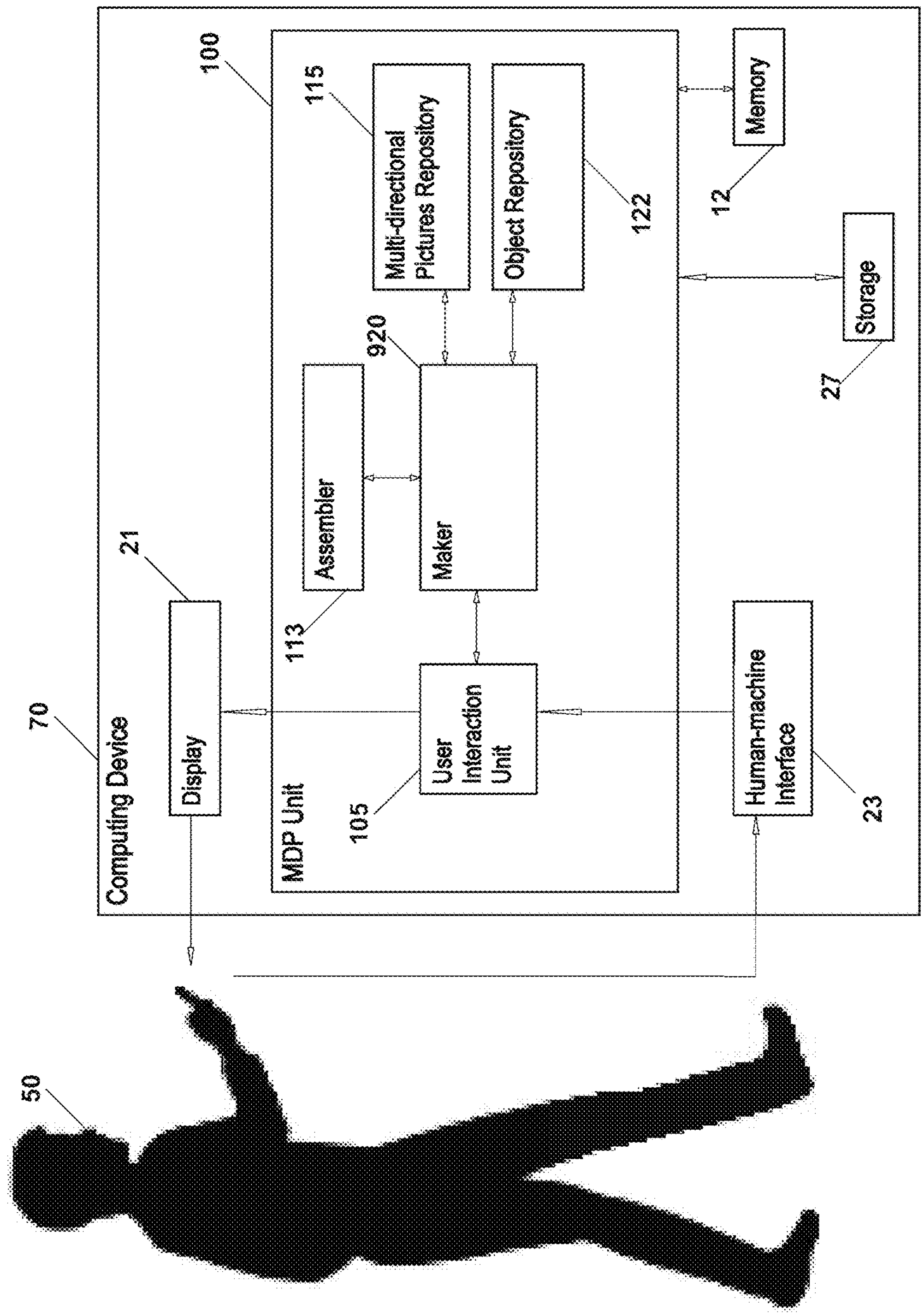
FIG. 49A, shows an embodiment of MDP Unit 100 comprising the functionality for interpreting a location of a Multi-directional Still Picture 200.

Referring to FIG. 49A, an embodiment of MDP Unit 100 comprising the functionality for associating a Multi-directional Still Picture 200 using location information is illustrated. MDP Unit 100 comprises interconnected User Interaction Unit 105, Maker 920, Assembler 113, Multi-directional Pictures Repository 115, and Object Repository 122. MDP Unit 100 may be coupled with Human-machine Interface 23, Display 21, Memory 12, and Storage 27. Other additional elements may be included as needed, or some of the disclosed ones may be excluded, or a combination thereof may be utilized in alternate embodiments.

In some aspects, the teaching presented by the disclosure can be implemented in a device or system for associating a Multi-directional Still Picture 200 using location information. The device or system may include Maker 920 and an interface, coupled to Maker 920, for receiving a plurality of multi-directional still pictures each multi-directional still picture including a location information on the multi-directional still picture and one or more differently directed still pictures from the location, the location information on the multi-directional still picture identifying a location with which the multi-directional still picture is associated. The interface may be further configured to receive a plurality of objects each object including a location information on the object, the location information on the object identifying the object's location. Maker 920 may be further configured to compare the location information on a first multi-directional still picture with the location information on a first object, and determine that the location information on the first multi-directional still picture corresponds to the location information on the first object. The device or system may further include Assembler 113, coupled to Maker 920, for associating the first multi-directional still picture with the first object. Any of the operations of the described elements can be performed repeatedly and/or in different orders in alternate embodiments. For example, Maker 920 can be implemented as a device or processor that receives or reads multi-directional still pictures and/or other elements from Multi-directional Pictures Repository 115. Maker 920 may further access one or more objects or references thereto in Object Repository 122 where each object may include or be associated with a location information on the object, and where the location information on the object identifies the object's location. An object may also include interpretive information on the object. Maker 920 can be configured to compare the location information (i.e. coordinates, address, etc.) on a first multi-directional still picture with the location information (i.e. coordinates, address, etc.) on a first object, and determine that the two compared location information correspond. Comparing the location information may include comparing addresses or computing proximity using the coordinates of the first multi-directional still picture and the first object. Determining correspondence between the compared location information may include determining similarity or equivalence of the compared addresses or determining proximity that falls within a proximity threshold. Assembler 113 can also be implemented as a device or processor that associates the first multi-directional still picture with the first object. Associating may include adding a link with the first object to the first multi-directional still picture, or adding the interpretive information on the first object to the first multi-directional still picture. Maker 920 may then store the multi-directional still pictures including any added links and/or interpretive information in Multi-directional Pictures Repository 115. Maker 920 (or its functionalities), Assembler 113 (or its functionalities), and/or other disclosed elements can be implemented as separate hardware components or processors dedicated to their functionalities, they can be implemented as a single program or objects/modules/functions of a single program or separate programs operating on Processor 11, they can be provided in other suitable configurations, or a combination thereof in alternate embodiments. In some designs, Maker 920 may include some or all of the functionalities of Assembler 113 in which case Assembler 113 may be omitted. The device or system for associating a Multi-directional Still Picture 200 using location information can similarly be implemented for associating a Multi-directional Motion Picture 400 using location information. The device or system for associating a Multi-directional Still Picture 200 using location information may also include any functionalities or steps of any of the disclosed methods such as method 3600 (later described).

Object 222 (shown in a later figure) comprises a representation of and/or information (i.e. interpretive or other information, etc.) on an object, a person, or a place, and/or other disclosed functionalities. The object, person, and/or place comprise a physical or computer generated object, person, and/or place. Object 222 can be stored in a file, record of a database, data structure, or other repository or storage arrangement. Object 222 may include or be associated with location information such as coordinates (i.e. latitude/longitude/altitude, x/y/z, etc.), address, any location reference, or any information that can define a location of an object, person, or place represented by the Object 222. Object 222 may also include or be associated with any of the previously described interpretive information on an object, person, or place represented by the Object 222 such as identifying information, descriptive information, associative information, time information, referential information, and/or other information, Generally, interpretive information may include any information on an object, person, or place represented by the Object 222.

Object Repository 122 comprises the functionality for storing Objects 222 or references thereto, any information (i.e. interpretive information, etc.) or references thereto on the Objects 222, and/or other elements. Object Repository 122 comprises one or any number of Objects 222. In some embodiments, Object Repository 122 comprises one or more files, data structures, objects, databases, database management systems (DBMSs), systems, processes, and/or other repositories, Maker 920 can read Object Repository 122 by opening or connecting to the file, data structure, object, database, DBMS, system, process, and/or other repository, and by accessing the stored Objects 222 or references thereto, any information (i.e. interpretive information, etc.) on the Objects 222, and/or other elements. In one example, Object Repository 122 comprises an electronic directory of businesses where each listing may define an Object 222 (or a portion of Object 222) that includes a representation of and/or information (i.e. interpretive information such as coordinates, address, name, description, web site, etc.) on a business. In another example, Object Repository 122 comprises a collection of 3D models of campus buildings where each 3D model may define an Object 222 (or a portion of Object 222) that includes a representation of and/or information (i.e. interpretive information such as coordinates, address, description, etc.) on a building. In a further example, Object Repository 122 comprises a collection of digital videos of places (i.e. attractions, etc.) at a historic site where each video may define an Object 222 (or a portion of Object 222) that includes a representation of and/or information (i.e. interpretive information such as coordinates, description, reference to related information, etc.) on a place. In yet another example, Object Repository 122 comprises a collection of digital pictures of persons (i.e. friends, etc.) at a campus where each picture may define an Object 222 (or a portion of Object 222) that includes a representation of and/or information (i.e. interpretive information such as coordinates of current location obtained from the person's smartphone, name, age, Facebook page, etc.) on a person. Object 222 may include any other representation of an object, person, or place instead of or in addition to the ones described such as a MDP application of an object, a virtual tour of an object, or any other repository, content, resource, system, application, and/or process comprising information on the object, person, or place. Object Repository 122 may include any features and embodiments of the previously described Multi-directional Pictures Repository 115 and interpretive Pictures Repository 118. Object Repository 122 can reside and/or execute on user's Computing Device 70 or on a Remote Computing Device 1310 (i.e. application server, cloud, etc.) accessible over a Network 1300 (i.e. corporate enterprise network, Internet, etc.) as previously described. In some aspects, a subset or index of Object Repository 122 comprising location information on Objects 222 stored in Object Repository 122 may be available to Maker 920 to facilitate quick access to the Objects' 222 location information. When a correspondence between location information of a Multi-directional Still Picture 200 and an Object 222 is determined, the rest of the information (i.e. interpretive information, etc.) on the Object 222 may then be accessed by referencing the Object's 222 location and/or other information or reference, for example.

In some embodiments, location information (or Interpretive Info 250*a*, 250*b*, 250*c*, 250*d*, 250*e*, etc. comprising location information, etc.) on a Multi-directional Still Picture 200 can be identified through the previously described interpreting of Still Pictures 210*a*, 210*b*, 210*c*, 210*d*, etc. in other embodiments, location information on a Multi-directional Still Picture 200 can be identified by any other system or method such as by a GPS enabled optical device (i.e. still or motion picture camera, etc.), GPS enabled Multi-directional Motion Picture Taking Device 480 or its still picture equivalent, or any other system used to capture any of the Still Pictures 210*a*, 210*b*, 210*c*, 210*d*, etc. of a Multi-directional Still Picture 200. In further embodiments, location information on a Multi-directional Still Picture 200 can be added manually to the Multi-directional Still Picture 200 or other element by a user.

Regardless of the source, location information on a Multi-directional Still Picture 200 can then be compared to location information on Objects 222 to find an Object 222 in a same or proximal location as the Multi-directional Still Picture 200. Finding an Object 222 in a same or proximal location as the Multi-directional Still Picture 200 may indicate an association or relation between the Multi-directional Still Picture 200 and the Object 222. Any information (i.e. interpretive information, etc.) on the Object 222 may also pertain to the Multi-directional Still Picture 200. In one example, location information such as address of a Multi-directional Still Picture 200 may be stored in Interpretive Info 250*e* of the Multi-directional Still Picture 200. Also, location information such as address of an Object 222 may be stored in a data field of the Object 222. Comparison can then be preformed between location information on the Multi-directional Still Picture 200 and Object 222 to determine if the two location information refer or correspond to a same or proximal location (i.e. same or similar address, etc.). If a correspondence is determined, a link (i.e. Multi-directional Still Picture Link 220*a*, 220*b*, 220*c*, 220*d*, etc., Link 221, etc.) with the Object 222 may be added to or included in the Multi-directional Still Picture 200, thereby, linking the Multi-directional Still Picture 200 with a surrounding Object 222 or with repository, content, resource, system, application, and/or process comprising information on the Object 222. Interpretive information on the Object 222 may be included in or associated with the Multi-directional Still Picture 200 instead of or in addition to adding the link. Which interpretive information on the Object 222 to include in or associate with the Multi-directional Still Picture 200 may be selected by a user or automatically selected by the system. In another example, location information such as coordinates (i.e. latitude/longitude/altitude, x/y/z, etc.) of a Multi-directional Still Picture 200 may be stored in interpretive Info 250*e* of a Multi-directional Still Picture 200. Also, location information such as coordinates (i.e. latitude/longitude/altitude, x/y/z, etc.) of an Object 222 may be stored in a data field of an Object 222. Proximity (i.e. distance, etc.) can then be calculated or estimated between the Multi-directional Still Picture 200 and the Object 222 by utilizing Pythagorean theorem, Euclidean distance formula, Haversine formula, trigonometry, and/or other theorems, formulas, or functions. If the proximity is determined to fall within a proximity threshold, a link (i.e. Multi-directional Still Picture Link 220*a*, 220*b*, 220*c*, 220*d*, etc., Link 221, etc.) with the Object 222 may be added to or included in the Multi-directional Still Picture 200, thereby linking the Multi-directional Still Picture 200 with a surrounding Object 222 or with repository, content, resource, system, application, and/or process comprising information on the Object 222. Interpretive information on the Object 222 may be included in or associated with the Multi-directional Still Picture 200 instead of or in addition to adding the link, Such interpretive information can be included in or associated with any of the disclosed elements of a Multi-directional Still Picture 200. The proximity threshold can be set by a user or automatically by the system based, for example, on a scale of the object, and/or other considerations or inputs as previously described. The proximity threshold can include any measure of distance such as 0.012 meters, 0.9 meters, 8 meters, 23.7 meters, 173 meters, 1328.265 meters, 9100 meters, and so on, or any of their equivalents in other units of distance. In some aspects, angle and/or other such information can also be calculated or estimated between the Multi-directional Still Picture 200 and the Object 222 using their location information. Angle can be utilized to add a properly directed or angled link (i.e. Multi-directional Still Picture Link 220*a*, 220*b*, 220*c*, 220*d*, etc., Link 221, etc.) to a Multi-directional Still Picture 200, for example. In other aspects, location information such as address may be converted into its coordinates to enable the previously described proximity, angle, and/or other calculations.

Figure 49B:
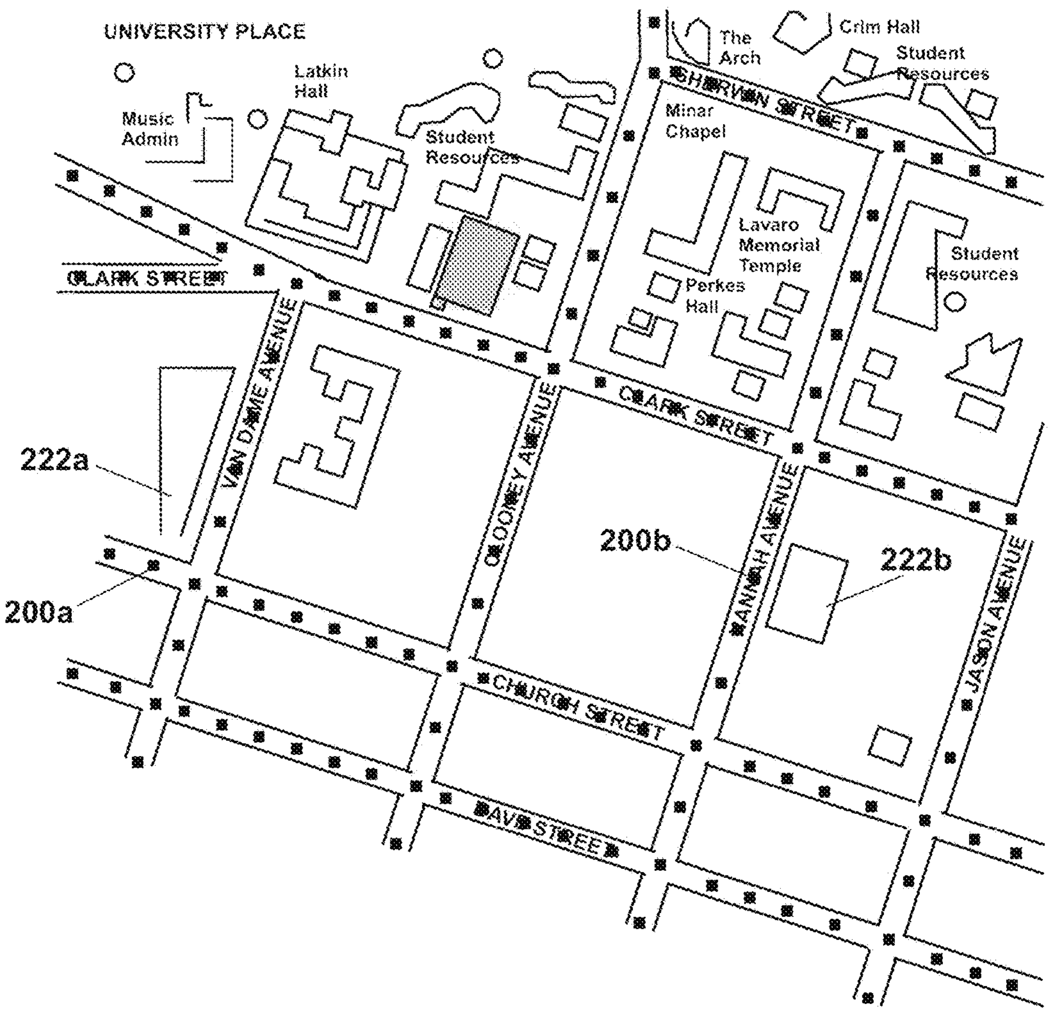
FIG. 49B, shows linking of a Multi-directional Still Picture 200 with a proximal Object 222.

Referring to FIG. 49B, linking of a Multi-directional Still Picture 200 with a proximal Object 222 is illustrated. Once location correspondence or proximity between a Multi-directional Still Picture 200 and an Object 222 is determined as previously described, the Multi-directional Still Picture 200 can be linked with a next logical or likely operation a user may want to perform with the Object 222 such as access or enter the object (i.e. enter a building, enter a business, etc.), utilize a representation of the object (i.e. utilize another MDP application representing the object, utilize a virtual tour of the object, utilize a 3D model of the object, etc.), see additional information about the object (i.e. see a picture or video of the object, visit a website comprising information on the object, etc.), and/or perform other operations (i.e. utilize an external application or process, etc.). In one example, a user can utilize a collection of Multi-directional Still Pictures 200 (i.e. MDP application) representing a street on which Object 222*a* such as Giuliano's restaurant (or any other store or business, object, etc.) is located by moving from one Multi-directional Still Picture 200 to another as previously described. Object 222*a* comprises hypothetical latitude and longitude coordinates of [42,37351, −71.11940]. When user reaches an entrance into Giuliano's restaurant at Multi-directional Still Picture 200*a* with hypothetical latitude and longitude coordinates of [42,37346, −71.11937], MDP Unit 100 may compute proximity of 6.081 meters using Haversine formula, for example, and determine that Giuliano's restaurant is proximal to Multi-directional Still Picture 200*a* since the proximity falls within a threshold of up to 10 meters, for example. MDP Unit 100 may then link Multi-directional Still Picture 200*a* with a representation of the restaurant (i.e. MDP application of the restaurant, virtual tour of the restaurant, 3D model of the restaurant, etc.) or with additional content or resources on the restaurant (i.e. the restaurant's picture or video, the restaurant's web site, the restaurant's Wikipedia site, the restaurant's Facebook site, etc.). The linking may include creating a new or replacing an existing link as previously described to point or refer to the representation of, or to additional content, resource, system, application, and/or process including information on Giuliano's restaurant. In another example, user can utilize a collection of Multi-directional Still Pictures 200 (i.e. MDP application) representing a street on which Object 222*b* such as Apple store is located by moving from one Multi-directional Still Picture 200 to another as previously described, Object 222*b* comprises hypothetical latitude and longitude coordinates of [42,37352, −71.11474]. When user reaches an entrance into Apple store at Multi-directional Still Picture 200*b* with hypothetical latitude and longitude coordinates of [42.37355, −71.11478], MDP Unit 100 may compute proximity of 4.682 meters using Haversine formula, for example, and determine that Apple store is proximal to Multi-directional Still Picture 200*b* since the proximity falls within a threshold of up to 10 meters, for example. MDP Unit 100 may then link Multi-directional Still Picture 200*b* with Apple's online store for the user to purchase Apple products, with a representation of the Apple store (i.e. MDP application of the store, virtual tour of the store, 3D model of the store, etc.), or with additional content or resources on the store (i.e. the store's picture or video, the store's web site, the store's Wikipedia site, the store's Facebook site, etc.).

In some embodiments, associating a Multi-directional Still Picture 200 using location information can be performed to permanently associate one or more Multi-directional Still Pictures 200 with their surroundings. For example a link with or information (i.e. interpretive information) on a proximal Object 222 can be permanently included in or associated with a Multi-directional Still Picture 200 where such link or information are available for future use. Permanent link or interpretive information may be appropriate for immobile objects such as buildings or monuments. In other embodiments, associating a Multi-directional Still Picture 200 using location information can be performed to temporarily associate one or more Multi-directional Still Pictures 200 with their surroundings. For example, a link with or information (i.e. interpretive information) on a proximal Object 222 can be temporarily included in or associated with a Multi-directional Still Picture 200 where such link or information are available while a user utilizes the Multi-directional Still Picture 200. Temporary link or interpretive information may be appropriate for moving objects such as vehicles or persons.

In further embodiments, once interpretive information is obtained from an Object 222 or from another source and added to or associated with a Multi-directional Still Picture 200, the interpretive information can be used to obtain, reference, or generate other interpretive information through a process similar to obtaining interpretive information from a proximal Object 222 using location information. For example, Interpretive Info 250*a*, 250*b*, 250*c*, 250*d*, 250*e*, etc. of a Multi-directional Still Picture 200 may include an identifier of an object, person, or place depicted in a Still Picture 210*a*, 210*b*, 210*c*, 210*d*, etc. Such identifier can then be compared with identifiers in a collection of objects, persons, or places (i.e. Objects 222, etc.) to find an object, person, or place with a similar identifier whose interpretive info (i.e. descriptive, associative, and/or referential information, etc.) can then be included in or associated with the Multi-directional Still Picture 200 and used as previously described.

All described features and embodiments of any interpretive information, Interpretive Info 250*a*, 250*b*, 250*c*, 250*d*, 250*e*, etc., and/or other such disclosed information can similarly be utilized in Multi-directional Motion Pictures 400. In such embodiments involving Multi-directional Motion Pictures 400, Interpretive Info 250*a*, 250*b*, 250*c*, 250*d*, 250*e*, etc. may be referred to as Motion Picture Interpretive info or Multi-directional Motion Picture Interpretive Info.

Figure 49C:
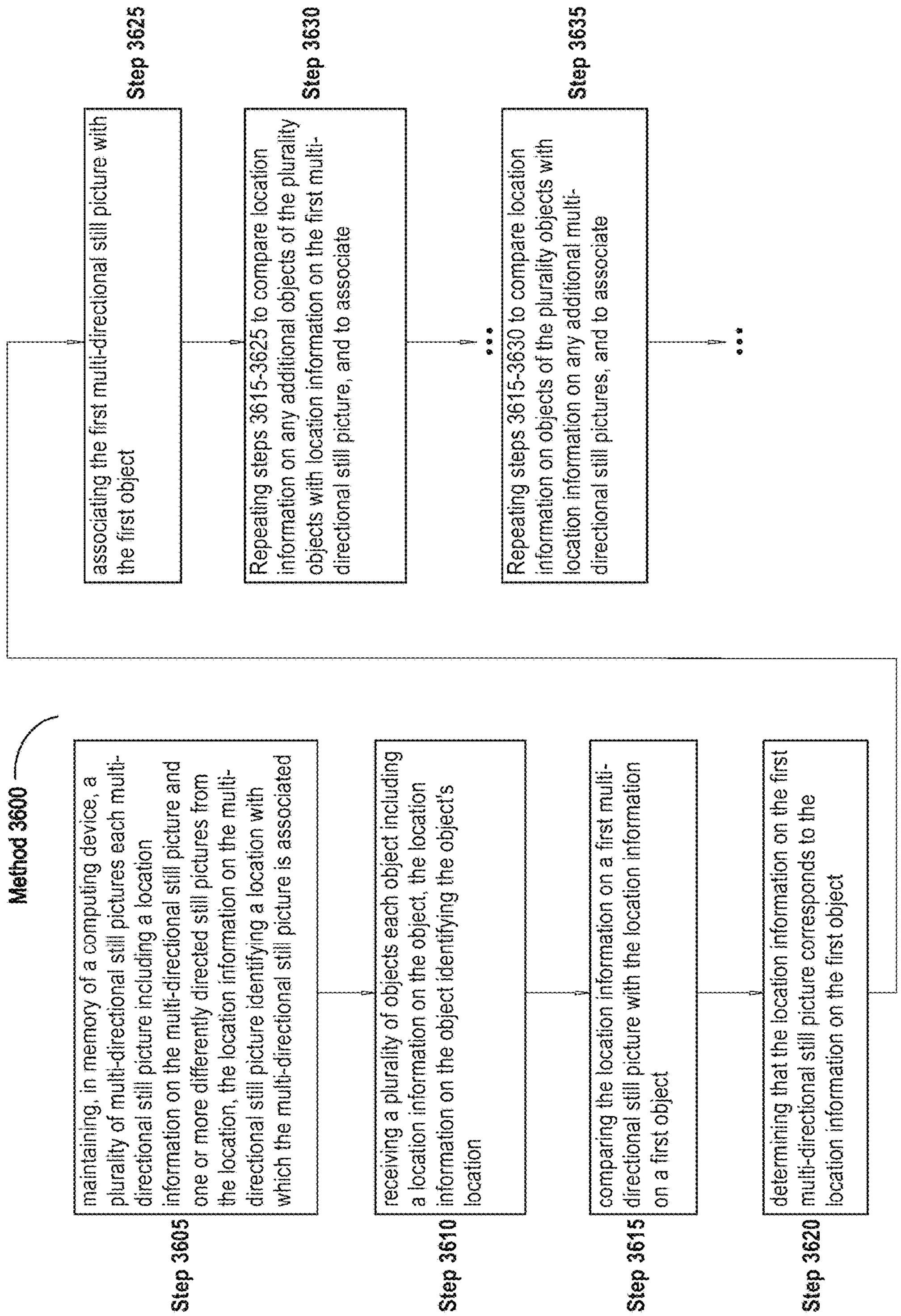
FIG. 49C, illustrates a flow chart diagram of an embodiment of a method 3600 implemented by MDP Unit 100.

Referring to FIG. 49C, the illustration shows an embodiment of a method 3600 for associating a Multi-directional Still Picture 200 using location information. The method may therefore be used on one or more computing devices to link the Multi-directional Still Picture 200 with its surrounding or to obtain information (i.e. interpretive information, etc.) from the Multi-directional Still Picture's 200 surrounding. In some embodiments, the method may be used on one or more computing devices operating an interface for MDP Unit 100 to link the Multi-directional Still Picture 200 with its surrounding or to obtain information (i.e. interpretive information, etc.) from the Multi-directional Still Picture's 200 surrounding. Some or all steps of this method can similarly be implemented for associating a Multi-directional Motion Picture 400 using location information. In some embodiments, the steps of this method can be used in combination with steps of any of the disclosed methods such as method 2200 for generating a collection of Multi-directional Still Pictures 200, method 2400 for generating a collection of Multi-directional Motion Pictures 400, and/or method 3400 for interpreting Still Pictures 210*a*, 210*b*, 210*c*, 210*d*, etc.

At step 3605, a plurality of multi-directional still pictures are maintained in memory of a computing device each multi-directional still picture including a location information on the multi-directional still picture and one or more differently directed still pictures from the location, the location information on the multi-directional still picture identifying a location with which the multi-directional still picture is associated. At step 3610, a plurality of objects are received each object including a location information on the object, the location information on the object identifying the object's location. At step 3615, the location information on a first multi-directional still picture is compared with the location information on a first object. At step 3620, a determination is made that the location information on the first multi-directional still picture corresponds to the location information on the first object. At step 3625, the first multi-directional still picture is associated with the first object. At step 3630, steps 3615-3625 are repeated to compare location information on any additional objects of the plurality objects with location information on the first multi-directional still picture, and to associate. At step 3635, steps 3615-3630 are repeated to compare location information on objects of the plurality objects with location information on any additional multi-directional still pictures, and to associate.

It must be noted that as used herein and in the appended claims, the singular forms "a", "an", and "the" include plural referents unless the context clearly dictates otherwise.

A number of embodiments have been described herein. While this disclosure contains many specific implementation details, these should not be construed as limitations on the scope of any inventions or of what may be claimed, but rather as descriptions of features specific to particular embodiments. It will be understood that various modifications may be made without departing from the spirit and scope of the invention. The logic flows depicted in the figures do not require the particular order shown, or sequential order, to achieve desirable results. In addition, other or additional steps, elements, or connections may be provided, or some of the steps, elements, or connections may be eliminated, and/or other components may be added to, or removed from, the described methods, systems, and techniques. Further, the various aspects of the disclosed methods, systems, and techniques can be combined in whole or in part with each other to produce additional implementations. Moreover, the separation of various components in the embodiments described herein should not be understood as requiring such separation in all embodiments, and it should be understood that the described components may generally be integrated together in a single application product or packaged into multiple application products. Accordingly, other embodiments are within the scope of the following claims.

The invention claimed is:

1. A system comprising:

one or more processor circuits;

a memory that stores at least a first multi-directional picture; and a picture capturing device, wherein the one or more processor circuits:

receive a user input indicating at least a direction of a second location of a represented object relative to a first location of the represented object;

guide the user to capture one or more pictures from the second location of the represented object using the picture capturing device;

generate a second multi-directional picture including the one or more pictures from the second location of the represented object;

add, to the first multi-directional picture, a link that points to the second multi-directional picture, wherein the link that points to the second multi-directional picture is determined at least based on the user input; and cause the memory to store the second multi-directional picture.

2. The system of claim 1, wherein the one or more processor circuits further:

guide the user to capture one or more pictures from the first location of the represented object using the picture capturing device;

generate the first multi-directional picture including the one or more pictures from the first location of the represented object; and cause the memory to store the first multi-directional picture.

3. The system of claim 1, wherein the one or more processor circuits further:

guide the user to capture one or more pictures from a third location of the represented object using the picture capturing device;

generate a third multi-directional picture including the one or more pictures from the third location of the represented object;

add, to the second multi-directional picture, a link that points to the third multi-directional picture, wherein the link that points to the third multi-directional picture is determined without any user input; and cause the memory to store the third multi-directional picture.

4. The system of claim 1, wherein the receive the user input indicating at least the direction of the second location of the represented object relative to the first location of the represented object includes receiving, via a user guiding interface, the user input indicating at least the direction of the second location of the represented object relative to the first location of the represented object, and wherein the guide the user to capture the one or more pictures from the second location of the represented object using the picture capturing device includes guiding the user, via the user guiding interface, to capture the one or more pictures from the second location of the represented object using the picture capturing device.

5. The system of claim 1, wherein the one or more processor circuits of the system or another one or more processor circuits of the system:

receive, via an interface for editing multi-directional pictures, a user selection to add a new picture to: one or more pictures of the first multi-directional picture, or the one or more pictures of the second multi-directional picture; and add the new picture to: the one or more pictures of the first multi-directional picture, or the one or more pictures of the second multi-directional picture.

6. The system of claim 1, wherein the one or more processor circuits of the system or another one or more processor circuits of the system:

receive, via an interface for editing multi-directional pictures, a user selection to modify or delete a picture of: one or more pictures of the first multi-directional picture, or the one or more pictures of the second multi-directional picture; and modify or delete the picture of: the one or more pictures of the first multi-directional picture, or the one or more pictures of the second multi-directional picture.

7. The system of claim 1, wherein the one or more processor circuits of the system or another one or more processor circuits of the system:

receive, via an interface for editing multi-directional pictures, a user selection to add a new link to: one or more links of the first multi-directional picture, or the one or more links of the second multi-directional picture; and add the new link to: the one or more links of the first multi-directional picture, or the one or more links of the second multi-directional picture.

8. The system of claim 1, wherein the one or more processor circuits of the system or another one or more processor circuits of the system:

receive, via an interface for editing multi-directional pictures, a user selection to modify or delete a link of: one or more links of the first multi-directional picture, or the one or more links of the second multi-directional picture; and modify or delete the link of: the one or more links of the first multi-directional picture, or the one or more links of the second multi-directional picture.

9. The system of claim 1, wherein the one or more processor circuits further:

generate the first multi-directional picture, wherein the generating the first multi-directional picture includes the adding, to the first multi-directional picture, the link that points to the second multi-directional picture.

10. The system of claim 1, wherein the second multi-directional picture includes a link that points to an outside application or process.

11. The system of claim 1, wherein the one or more processor circuits of the system or another one or more processor circuits of the system:

associate an interpretive information with at least a subset of a picture of the one or more pictures of the second multi-directional picture in response to determining that at least the subset of the picture of the one or more pictures of the second multi-directional picture at least partially matches at least a subset of an interpretive picture, wherein the interpretive information is included in or associated with the interpretive picture.

12. The system of claim 11, wherein the one or more processor circuits of the system or the another one or more processor circuits of the system:

traverse a plurality of pictures to find the interpretive picture, and wherein the plurality of pictures include at least one of: a plurality of pictures from a picture sharing service, a plurality of pictures from a social medium, a plurality of pictures from a directory of businesses, a plurality of pictures from a directory of persons, or a plurality of pictures from a picture repository.

13. The system of claim 11, wherein the one or more processor circuits of the system or the another one or more processor circuits of the system:

receive, via an interface for editing interpretive information, a user selection to modify or delete the interpretive information; and modify or delete the interpretive information.

14. The system of claim 1, wherein the first multi-directional picture includes one or more pictures from the first location of the represented object, and wherein the first multi-directional picture includes:

a multi-directional still picture, in which case at least one picture of the one or more pictures of the first multi-directional picture are still pictures, or a multi-directional motion picture, in which case at least one picture of the one or more pictures of the first multi-directional picture are motion pictures, and wherein the second multi-directional picture includes:

a multi-directional still picture, in which case at least one picture of the one or more pictures of the second multi-directional picture are still pictures, or a multi-directional motion picture, in which case at least one picture of the one or more pictures of the second multi-directional picture are motion pictures.

15. A non-transitory machine readable medium having stored thereon instructions that when executed by one or more processor circuits cause the one or more processor circuits to perform operations comprising:

accessing a memory that stores at least a first multi-directional picture;

receiving a user input indicating at least a direction of a second location of a represented object relative to a first location of the represented object;

guiding the user to capture one or more pictures from the second location of the represented object using a picture capturing device;

generating a second multi-directional picture including the one or more pictures from the second location of the represented object;

adding, to the first multi-directional picture, a link that points to the second multi-directional picture, wherein the link that points to the second multi-directional picture is determined at least based on the user input; and causing the memory to store the second multi-directional picture.

16. The non-transitory machine readable medium of claim 15, wherein the operations further comprising:

guiding the user to capture one or more pictures from a third location of the represented object using the picture capturing device;

generating a third multi-directional picture including the one or more pictures from the third location of the represented object;

adding, to the second multi-directional picture, a link that points to the third multi-directional picture, wherein the link that points to the third multi-directional picture is determined without any user input; and causing the memory to store the third multi-directional picture.

17. The non-transitory machine readable medium of claim 15, wherein the operations further comprising:

associating an interpretive information with at least a subset of a picture of the one or more pictures of the second multi-directional picture in response to determining that at least the subset of the picture of the one or more pictures of the second multi-directional picture at least partially matches at least a subset of an interpretive picture, wherein the interpretive information is included in or associated with the interpretive picture.

18. A method comprising:

(a) accessing a memory that stores at least a first multi-directional picture, the accessing of (a) performed by one or more processor circuits;

(b) receiving a user input indicating at least a direction of a second location of a represented object relative to a first location of the represented object, the receiving of (b) performed by the one or more processor circuits;

(c) guiding the user to capture one or more pictures from the second location of the represented object using a picture capturing device, the guiding of (c) performed by the one or more processor circuits;

(d) generating a second multi-directional picture including the one or more pictures from the second location of the represented object, the generating of (d) performed by the one or more processor circuits;

(e) adding, to the first multi-directional picture, a link that points to the second multi-directional picture, wherein the link that points to the second multi-directional picture is determined at least based on the user input, the adding of (e) performed by the one or more processor circuits; and (f) causing the memory to store the second multi-directional picture, the causing of (f) performed by the one or more processor circuits.

19. The method of claim 18, further comprising:

(g) guiding the user to capture one or more pictures from a third location of the represented object using the picture capturing device, the guiding of (g) performed by the one or more processor circuits;

(h) generating a third multi-directional picture including the one or more pictures from the third location of the represented object, the generating of (h) performed by the one or more processor circuits;

(i) adding, to the second multi-directional picture, a link that points to the third multi-directional picture, wherein the link that points to the third multi-directional picture is determined without any user input, the adding of (i) performed by the one or more processor circuits; and (j) causing the memory to store the third multi-directional picture, the causing of (j) performed by the one or more processor circuits.

20. The method of claim 18, further comprising:

(g) associating an interpretive information with at least a subset of a picture of the one or more pictures of the second multi-directional picture in response to determining that at least the subset of the picture of the one or more pictures of the second multi-directional picture at least partially matches at least a subset of an interpretive picture, wherein the interpretive information is included in or associated with the interpretive picture, the associating of (g) performed by the one or more processor circuits or by another one or more processor circuits.

* * * * *